(12) United States Patent
Horstemeyer

(10) Patent No.: US 8,242,935 B2
(45) Date of Patent: Aug. 14, 2012

(54) NOTIFICATION SYSTEMS AND METHODS WHERE A NOTIFIED PCD CAUSES IMPLEMENTATION OF A TASK(S) BASED UPON FAILURE TO RECEIVE A NOTIFICATION

(75) Inventor: Scott A. Horstemeyer, Atlanta, GA (US)

(73) Assignee: Eclipse IP, LLC, Delray Beach, FL (US)

( * ) Notice: Subject to any disclaimer, the term of this patent is extended or adjusted under 35 U.S.C. 154(b) by 0 days.

(21) Appl. No.: 13/268,291

(22) Filed: Oct. 7, 2011

(65) Prior Publication Data

US 2012/0030525 A1 Feb. 2, 2012

Related U.S. Application Data

(60) Division of application No. 13/005,702, filed on Jan. 13, 2011, now Pat. No. 8,068,037, which is a division of application No. 11/924,810, filed on Oct. 26, 2007, now Pat. No. 7,876,239, which is a continuation of application No. 10/858,752, filed on Jun. 2, 2004, now Pat. No. 7,319,414, which is a continuation of application No. 10/706,591, filed on Nov. 12, 2003, now Pat. No. 7,119,716.

(60) Provisional application No. 60/473,738, filed on May 28, 2003, provisional application No. 60/473,742, filed on May 28, 2003, provisional application No. 60/473,949, filed on May 28, 2003, provisional application No. 60/486,768, filed on Jul. 11, 2003, provisional application No. 60/498,819, filed on Aug. 29, 2003.

(51) Int. Cl.
*G08G 1/095* (2006.01)
(52) U.S. Cl. ............... 340/994; 340/988; 340/995.11; 340/502; 340/504; 340/506; 340/539.13

(58) Field of Classification Search .................. 340/994, 340/988, 995.11, 502, 504, 506, 539.13; 701/200, 201, 207, 208
See application file for complete search history.

(56) References Cited

U.S. PATENT DOCUMENTS 3,568,161 A 3/1971 Knickel ........................ 340/994
(Continued)

FOREIGN PATENT DOCUMENTS

EP 0219859 A2 4/1987
(Continued)

OTHER PUBLICATIONS

Moriok, et al., "Advanced Vehicle Monitoring and communication Systems for Bus Transit—Benefits and Economic Feasibility", Final Report—U.S. Department of Transportation, Sep. 1991, Revised Mar. 1993, Dot-T-94-03.

(Continued)

*Primary Examiner* — Tai T Nguyen
(74) *Attorney, Agent, or Firm* — Thomas, Kayden, Horstemeyer & Risley, LLP

(57) ABSTRACT

Systems and methods are disclosed for automated notification systems. A representative system, among others, can be summarized as follows. A host computer system, or base station, is designed to monitor travel data corresponding to a mobile thing and to initiate a notification communication to a personal communications device (PCD) indicating travel status of the mobile thing (MT) to a remote computer system. The remote computer system, within or associated with the PCD, is designed to detect a failure to receive the notification communication and to cause one or more tasks to be performed based upon the notification communication failure.

30 Claims, 50 Drawing Sheets

U.S. PATENT DOCUMENTS

| | | | |
|---|---|---|---|
| 3,644,883 A | 2/1972 | Borman et al. | 340/23 |
| 3,845,289 A | 10/1974 | French | 235/151.2 |
| 3,886,515 A | 5/1975 | Cottin et al. | 340/994 |
| 3,934,125 A | 1/1976 | Macano | 235/150.2 |
| 4,220,946 A | 9/1980 | Henriot | 340/23 |
| 4,297,672 A | 10/1981 | Fruchey et al. | 340/23 |
| 4,325,057 A | 4/1982 | Bishop | 340/539 |
| 4,350,969 A | 9/1982 | Greer | 340/23 |
| 4,525,601 A | 6/1985 | Barnich et al. | 379/7 MM |
| 4,585,904 A | 4/1986 | Mincone et al. | 179/7.1 TP |
| 4,713,661 A | 12/1987 | Boone et al. | 340/994 |
| 4,791,571 A | 12/1988 | Takahashi et al. | 364/436 |
| 4,799,162 A | 1/1989 | Shinkawa et al. | 364/436 |
| 4,804,837 A | 2/1989 | Farley | 250/251 |
| 4,804,937 A | 2/1989 | Barbiaux et al. | 340/52 F |
| 4,812,843 A | 3/1989 | Champion, III et al. | 340/905 |
| 4,813,065 A | 3/1989 | Segala | 379/112 |
| 4,857,925 A | 8/1989 | Brubaker | 340/994 |
| 4,894,649 A | 1/1990 | Davis | 340/825.44 |
| 4,956,777 A | 9/1990 | Cearley et al. | 364/424.02 |
| 5,003,584 A | 3/1991 | Benyacar et al. | 379/119 |
| 5,006,847 A | 4/1991 | Rush et al. | 340/994 |
| 5,014,206 A | 5/1991 | Scribner et al. | 364/449 |
| 5,021,780 A | 6/1991 | Fabiano et al. | 340/994 |
| 5,048,079 A | 9/1991 | Harrington et al. | 379/112 |
| 5,068,656 A | 11/1991 | Sutherland | 340/989 |
| 5,097,429 A | 3/1992 | Wood et al. | 364/569 |
| 5,103,475 A | 4/1992 | Shuen | 379/115 |
| 5,113,185 A | 5/1992 | Ichikawa | 340/995 |
| 5,121,326 A | 6/1992 | Moroto et al. | 364/449 |
| 5,122,959 A | 6/1992 | Nathanson et al. | 364/424 |
| 5,131,020 A | 7/1992 | Liebesny et al. | 379/59 |
| 5,144,301 A | 9/1992 | Jackson et al. | 340/994 |
| 5,146,491 A | 9/1992 | Silver et al. | 379/114 |
| 5,155,689 A | 10/1992 | Wortham | 364/460 |
| 5,168,451 A | 12/1992 | Bolger | 364/436 |
| 5,179,584 A | 1/1993 | Tsumura | 379/114 |
| 5,218,629 A | 6/1993 | Dumond, Jr. et al. | 379/59 |
| 5,218,632 A | 6/1993 | Cool | 379/126 |
| 5,223,844 A | 6/1993 | Mansell et al. | 342/357 |
| 5,243,529 A | 9/1993 | Kashiwazaki | 364/449 |
| 5,271,484 A | 12/1993 | Bahjat et al. | 187/29.1 |
| 5,299,132 A | 3/1994 | Wortham | 364/460 |
| 5,323,456 A | 6/1994 | Oprea | 379/375 |
| 5,351,194 A | 9/1994 | Ross et al. | 364/449 |
| 5,361,296 A | 11/1994 | Reyes et al. | 379/96 |
| 5,381,338 A | 1/1995 | Wysocki et al. | 364/449 |
| 5,381,467 A | 1/1995 | Rosinski et al. | 379/121 |
| 5,394,332 A | 2/1995 | Kuwahara et al. | 364/449 |
| 5,398,190 A | 3/1995 | Wortham | 364/460 |
| 5,400,020 A | 3/1995 | Jones | 340/994 |
| 5,420,794 A | 5/1995 | James | 364/436 |
| 5,424,727 A * | 6/1995 | Shieh | 340/928 |
| 5,428,546 A | 6/1995 | Shah et al. | 364/449 |
| 5,432,841 A | 7/1995 | Rimer | 379/59 |
| 5,440,489 A | 8/1995 | Newman | 364/426.05 |
| 5,444,444 A | 8/1995 | Ross | 340/994 |
| 5,446,678 A | 8/1995 | Saltzstein et al. | 364/514 |
| 5,448,479 A | 9/1995 | Kemner et al. | 365/424.02 |
| 5,461,374 A | 10/1995 | Lewiner et al. | 340/994 |
| 5,483,234 A | 1/1996 | Correel et al. | 340/994 |
| 5,483,454 A | 1/1996 | Lewiner et al. | 364/443 |
| 5,493,295 A | 2/1996 | Lewiner et al. | 340/994 |
| 5,493,694 A | 2/1996 | Vlcek et al. | 455/53.1 |
| 5,506,893 A | 4/1996 | Buscher et al. | 379/114 |
| 5,513,111 A | 4/1996 | Wortham | 364/460 |
| 5,515,421 A | 5/1996 | Sikand et al. | 379/67 |
| 5,519,621 A | 5/1996 | Wortham | |
| 5,526,401 A | 6/1996 | Roach, Jr. et al. | 379/59 |
| 5,539,810 A | 7/1996 | Kennedy, III et al. | 379/59 |
| 5,544,225 A | 8/1996 | Kennedy, III et al. | 379/59 |
| 5,546,444 A | 8/1996 | Roach, Jr. et al. | 379/59 |
| 5,552,795 A | 9/1996 | Tayloe et al. | 342/357 |
| 5,559,871 A | 9/1996 | Smith | 379/115 |
| 5,570,100 A | 10/1996 | Grube et al. | 364/446 |
| 5,577,101 A | 11/1996 | Bohm | 379/58 |
| 5,579,376 A | 11/1996 | Kennedy, III et al. | 379/60 |
| 5,587,715 A | 12/1996 | Lewis | 342/357 |
| 5,594,650 A | 1/1997 | Shah et al. | 364/449.1 |
| 5,594,787 A | 1/1997 | Ohshima et al. | 379/114 |
| 5,602,739 A | 2/1997 | Haagenstad et al. | 364/436 |
| 5,623,260 A | 4/1997 | Jones | 340/994 |
| 5,648,770 A | 7/1997 | Ross | 340/994 |
| 5,652,707 A | 7/1997 | Wortham | 364/460 |
| 5,657,010 A | 8/1997 | Jones | 340/994 |
| 5,668,543 A | 9/1997 | Jones | 340/994 |
| 5,673,305 A | 9/1997 | Ross | 379/58 |
| 5,680,119 A | 10/1997 | Magliari et al. | 340/904 |
| 5,694,322 A | 12/1997 | Westerlage et al. | 364/464 |
| 5,694,459 A | 12/1997 | Backaus et al. | 379/427 |
| 5,699,275 A | 12/1997 | Beasley et al. | 364/514 R |
| 5,712,908 A | 1/1998 | Brinkman et al. | 379/119 |
| 5,715,307 A | 2/1998 | Zazzera | 379/265 |
| 5,719,771 A | 2/1998 | Buck et al. | 364/443 |
| 5,724,243 A | 3/1998 | Westerlage et al. | 364/446 |
| 5,724,584 A | 3/1998 | Peters et al. | 395/671 |
| 5,729,597 A | 3/1998 | Bhusri | 379/115 |
| 5,732,074 A | 3/1998 | Spaur et al. | 370/313 |
| 5,734,981 A | 3/1998 | Kennedy, III et al. | 455/445 |
| 5,736,940 A | 4/1998 | Burgener | 340/994 |
| 5,739,774 A | 4/1998 | Olandesi | 340/994 |
| 5,742,672 A | 4/1998 | Burk | 379/198 |
| 5,751,245 A | 5/1998 | Janky et al. | 342/357 |
| 5,760,742 A | 6/1998 | Branch et al. | 342/457 |
| 5,771,282 A | 6/1998 | Friedes | 379/121 |
| 5,771,455 A | 6/1998 | Kennedy, III et al. | 455/456 |
| 5,774,825 A | 6/1998 | Reynolds | 364/449.7 |
| 5,781,156 A | 7/1998 | Krasner | 342/357 |
| 5,784,443 A | 7/1998 | Chapman et al. | 379/119 |
| 5,785,520 A * | 7/1998 | Carano et al. | 433/7 |
| 5,793,853 A | 8/1998 | Sbisa | 379/120 |
| 5,796,365 A | 8/1998 | Lewis | 342/357 |
| 5,799,073 A | 8/1998 | Fleischer, III et al. | 379/113 |
| 5,799,263 A | 8/1998 | Culbertson | 701/117 |
| 5,805,680 A | 9/1998 | Penzias | 379/118 |
| 5,808,565 A | 9/1998 | Matta et al. | 340/994 |
| RE35,920 E | 10/1998 | Sorden et al. | 342/457 |
| 5,835,580 A | 11/1998 | Fraser | 379/115 |
| 5,841,847 A | 11/1998 | Graham et al. | 379/114 |
| 5,852,659 A | 12/1998 | Welter, Jr. | 379/116 |
| 5,864,610 A | 1/1999 | Ronen | 379/127 |
| 5,875,238 A | 2/1999 | Glitho et al. | 379/116 |
| 5,881,138 A | 3/1999 | Kearns et al. | 379/114 |
| 5,910,979 A | 6/1999 | Goel et al. | 379/120 |
| 5,912,954 A | 6/1999 | Whited et al. | 379/115 |
| 5,915,006 A | 6/1999 | Jagadish et al. | 379/127 |
| 5,920,613 A | 7/1999 | Alcott et al. | 379/114 |
| 5,922,040 A | 7/1999 | Prabhakaran | 701/117 |
| 5,937,044 A | 8/1999 | Kim | 379/121 |
| 5,943,320 A | 8/1999 | Weik et al. | 370/259 |
| 5,943,406 A | 8/1999 | Leta et al. | 379/120 |
| 5,943,657 A | 8/1999 | Freestone et al. | 705/400 |
| 5,945,919 A | 8/1999 | Trask | 340/825.491 |
| 5,946,379 A | 8/1999 | Bhusri | 379/115 |
| 5,950,174 A | 9/1999 | Brendzel | 705/34 |
| 5,955,974 A | 9/1999 | Togawa | 340/994 |
| 5,956,391 A | 9/1999 | Melen et al. | 379/114 |
| 5,982,864 A | 11/1999 | Jagadish et al. | 379/115 |
| 5,987,108 A | 11/1999 | Jagadish et al. | 379/114 |
| 5,987,377 A | 11/1999 | Westerlage et al. | 701/204 |
| 5,991,377 A | 11/1999 | Malik | 379/114 |
| 5,991,380 A | 11/1999 | Bruno et al. | 379/115 |
| 5,991,381 A | 11/1999 | Bouanaka et al. | 379/115 |
| 5,995,602 A | 11/1999 | Johnson et al. | 379/116 |
| 6,006,159 A | 12/1999 | Schmier et al. | 701/200 |
| 6,094,149 A | 7/2000 | Wilson | 340/904 |
| 6,097,317 A | 8/2000 | Lewiner et al. | 340/994 |
| 6,111,538 A | 8/2000 | Schuchman et al. | 342/357 |
| 6,124,810 A | 9/2000 | Segal et al. | 340/994 |
| 6,134,501 A | 10/2000 | Oumi | 701/209 |
| 6,137,425 A | 10/2000 | Oster et al. | 340/994 |
| 6,144,301 A | 11/2000 | Frieden | 340/572.8 |
| 6,178,378 B1 | 1/2001 | Leibold | 701/202 |
| 6,184,802 B1 | 2/2001 | Lamb | 340/994 |
| 6,191,708 B1 | 2/2001 | Davidson | 340/994 |
| 6,212,393 B1 | 4/2001 | Suarez et al. | 455/456 |
| 6,222,462 B1 | 4/2001 | Hahn | 340/904 |

| | | | | |
|---|---|---|---|---|
| 6,240,362 | B1 | 5/2001 | Gaspard, II | 701/209 |
| 6,253,146 | B1 | 6/2001 | Hanson et al. | 701/202 |
| 6,253,148 | B1 | 6/2001 | Decaux et al. | 701/204 |
| 6,278,936 | B1 | 8/2001 | Jones | 701/201 |
| 6,313,760 | B1 | 11/2001 | Jones | 340/994 |
| 6,317,060 | B1 | 11/2001 | Jones | 340/994 |
| 6,360,101 | B1 | 3/2002 | Irvin | 445/456 |
| 6,363,254 | B1 | 3/2002 | Jones et al. | 455/456 |
| 6,363,323 | B1 | 3/2002 | Jones | 701/213 |
| 6,374,176 | B1 | 4/2002 | Schmier et al. | 701/200 |
| 6,400,956 | B1 | 6/2002 | Richton | 455/456 |
| 6,411,891 | B1 | 6/2002 | Jones | 701/201 |
| 6,415,207 | B1 | 7/2002 | Jones | 701/1 |
| 6,486,801 | B1 | 11/2002 | Jones | 340/994 |
| 6,492,912 | B1 | 12/2002 | Jones | |
| 6,510,383 | B1 | 1/2003 | Jones | |
| 6,618,668 | B1 | 9/2003 | Laird | 701/204 |
| 6,683,542 | B1 | 1/2004 | Jones | 340/994 |
| 6,700,507 | B2 | 3/2004 | Jones | 340/994 |
| 6,738,711 | B2 | 5/2004 | Ohmura et al. | 701/208 |
| 7,197,537 | B2 | 3/2007 | Koch | 709/206 |
| 2002/0016171 | A1 | 2/2002 | Doganata et al. | 455/456 |
| 2002/0049723 | A1 | 4/2002 | Kurihara et al. | 707/1 |
| 2002/0069017 | A1 | 6/2002 | Schmier et al. | 701/213 |
| 2002/0082770 | A1 | 6/2002 | Jones | 701/201 |
| 2002/0099500 | A1 | 7/2002 | Schmier et al. | 701/200 |
| 2003/0083809 | A1 | 5/2003 | Hatano | 701/207 |
| 2003/0093218 | A1 | 5/2003 | Jones | 701/201 |
| 2003/0098802 | A1 | 5/2003 | Jones | 340/994 |
| 2003/0135427 | A1 | 7/2003 | Murakami | 705/26 |
| 2003/0146854 | A1 | 8/2003 | Jones | 340/988 |
| 2003/0193412 | A1 | 10/2003 | Jones | 340/994 |
| 2003/0193413 | A1 | 10/2003 | Jones | 340/994 |
| 2003/0193414 | A1 | 10/2003 | Jones | 340/994 |
| 2003/0195696 | A1 | 10/2003 | Jones | 701/201 |
| 2003/0195697 | A1 | 10/2003 | Jones | 701/201 |
| 2003/0195698 | A1 | 10/2003 | Jones | 701/201 |
| 2003/0195699 | A1 | 10/2003 | Jones | 701/201 |
| 2003/0233188 | A1 | 12/2003 | Jones | 701/200 |
| 2003/0233190 | A1 | 12/2003 | Jones | 701/207 |

FOREIGN PATENT DOCUMENTS

| | | |
|---|---|---|
| EP | 0805427 A1 | 11/1997 |
| EP | 0889455 A1 | 1/1999 |
| FR | 2 559 930 | 8/1985 |
| FR | 2674355 | 9/1992 |
| JP | 52066175 | 6/1977 |
| JP | 63288400 | 11/1988 |
| JP | 11034872 A | 2/1999 |
| WO | WO 90/01236 | 2/1990 |
| WO | WO 93/13503 | 7/1993 |
| WO | WO 93/13510 A1 | 7/1993 |
| WO | WO 9313510 A1 | 7/1993 |
| WO | WO 94/02922 | 2/1994 |
| WO | WO 94/27264 | 11/1994 |
| WO | WO 96/04634 | 2/1996 |
| WO | WO 96/16386 | 5/1996 |
| WO | WO 98/07128 | 2/1998 |
| WO | WO 98/08206 | 2/1998 |
| WO | WO 98/14926 | 4/1998 |
| WO | WO 98/40837 | 9/1998 |

OTHER PUBLICATIONS

Brynielsson, Thore, Step by Step Development Towards Attractive Public Transport, Chalmers University of Technology, Gotebord, Sweden, Department of Transportation, 1976.
"Public Transporation Information and Management Ssytems", IEE Colloquium, Computing and Control Division, May 25, 1993, pp. 9/1-9/4, 12/1-12/2, 7/1-7/3.
"Vehicle Location and Fleet Management Systems", IEE Colloquium, Computing and Control Division, Jun. 8, 1993.
The 3rd International Conference on Vehicle Navigation & Information Systems (VNIS) Norway, Sep. 2-4, 1992, pp. 312-315.
Preiss, George; Jenson, Lillian; "The Satref and GPS Information Projects", 1992 IEEE—3rd International Conference on Vehcile Navigation Information Systems, pp. 648-655.
"Vehicle Navigation & Information Systems Conference Proceedings" (P-253), Society of Automotive Engineers, Inc., Oct. 1991, pp. 789-796.
"1992 Compendium of Technical Papers", Institute of Transportation Engineers—INRAD: A Deminostration of Two-Way Roadway to Vehicle Communication for use in Traffic Operations, Annual Meeting, Washington, D.C. pp. 214-218.
"Paving the Way for GPS in Vehicle Tracking", Showcase World, Dec. 1992.
"Advanced Vehicle Monitoring and Communication Systems for Bus Transit", Federal Transit Administration, Sep. 1991, Revised Mar. 1993.
Koncz, et al., "GIS-Based Transit Information Bolsters Travel Options", GIS World, Jul. 1995, pp. 62-64.
Helleker, Jan, Real-Time Traveller Information—in everyone's pocket?!—a pilot test using hand-portable GSM terminals, IEEE—IEE Vehicle Navigation & Information systems Conference, Ottawa, VNIS 1993, pp. 49-52.
Burgener, E.C., et al., "A Personal Transit Arrival Time Receiver", IEEE—IEE Vehicle Navigation & Information Systems Conference, Ottawa, VNIS 1993, pp. 54-55.
Peng, Zhong-Ren, "A Methodology for Design for a GIS-Based Automatic Transit Traveler Information System", Computer, Environment and Urban Systems, vol. 21, No. 5, pp. 359-372, 1997.
Lessard, Robert, "The Use of Computer for Urban Transit Operations", IEEE—IEE Vehicle Navigation & Information systems Conference, Ottawa, VNIS 1993, pp. 586-590.
Sommerville, Fraser, et al., "Reliable Information in Everyone's Pocket—a Pilot Test", IEEE, vol. 1927, Mar. 1994, pp. 425-428.
"PROMISE—Personal Mobile Traveller and Traffic Information Service—Specification of Promise Services, Ver. 7", Telematics Application Programme A2, Transport, Jul. 1, 1996.
"PROMISE—Personal Mobile Traveller and Traffic Information Service—Generic Promise System Architecture, Ver. 2", Telematics Application Programme A2, Transport, Sep. 10, 1996.
PROMISE—Personal Mobile Traveller and Traffic Information Service—Summary of Promise Public Relation Activities, Ver. 1, Telematics Application Programme A2, Transport, Feb. 12, 1999.
"PROMISE"—A Personal Mobile Traveller and Traffic Information Service—Abstract, The Institution of Electrical Engineers, 1997.
Sommerville, Fraser, et al., "The Promise of Increased Patronage", The Institution of Electrical Engineers, 1993, pp. 3/1-3/4.
"Automatic Transit Location System", Washington State Department of Transportation, Final Report, Feb. 1996.
"Advanced Traveler Aid Systems for Public Transportation", Federal Transit Administration, Sep. 1994.
"Advanced Vehicle Monitoring and Communication Systems for Bus Transit: Benefits and Economic Feasibility", U.S. Department of Transportation, Urban Mass Transportation Administration, Sep. 1991.
Leong, Robert, et al., "An Unconventional Approach to Automatic Vehicle Location and Control for Urban Transit", IEEE 1989, pp. 219-223.
"1994 Vehicle Navigation & Information Systems Conference Proceedings", Yokahama, Japan, Aug. 31-Sep. 2, 1994, pp. 807-810.
"Vehicle Navigation & Information Systems Conference Proceedings—P-253, Part 2", Society of Automotive Engineers, Inc., Oct. 1991.
Vehicle Navigation & Information Systems—Conference Record of Papers presented at the 3rd Vehicle Navigation & Information Systems Conference 1992., Reso Hotel, Osio Plaza., pp. 49-52.
Nelson, J. Richard, "Experiences Gained in Implementing an Economical Universal Motorist System", , IEEE—IEE Vehicle Navigation & Information Systems Conference, Ottawa, VNIS 1993, pp. 67-71.
"The Cassiope/Eurobus Approach", IEEE—IEE Vehicle Navigation & Information Systems Conference, Ottawa, VNIS 1993, pp. 79-81.
Kihl, Mary, "Advanced Vehicle Location System for Paratransit in Iowa", IEEE—IEE Vehicle Navigation & Information Systems Conference, Ottawa, VNIS 1993, pp. 381-384.
Gault, Helen, et al., "Automatic Vehicle Location and Control at OC Transpo", , IEEE—IEE Vehicle Navigation & Information Systems Conference, Ottawa, VNIS 1993, pp. 596-600.

Vehicle navigation & Information System—Conference Record of Papers presented at the First Vehicle Navigation and Information Systems Conference (VNIS '89), Sep. 11-13, 1999, pp. 602-605.

Heti, Gabriel, "Travelguide: Ontario's Route Guidance System Demonstration", , IEEE—IEE Vehicle Navigation & Information Systems Conference, Ottawa, VNIS 1993, pp. A13-A18.

Jeffery, D.J., et al., "Advanced Traveller Information Systems in the UK: Experience from the Pleiades and Romanse Projects", , IEEE—IEE Vehicle Navigation & Information Systems Conference, Ottawa, VNIS 1993, pp. 309-313.

Sweeney, Lawrence, E., et al., "Travinfo: A Progress Report", 1994 Vehicle Navigation & Information Systems Conference Proceedings, Yokahama, Japan, Aug. 31-Sep. 2, 1994, pp. 315-320.

Shimamura, Yta, et al., "Combined Position Detection System for Pedestrian/Train Mode", 1994 Vehicle Navigation & Information Systems Conference Proceedings, Yokahama, Japan, Aug. 31-Sep. 2, 1994, pp. 603-606.

Zavoli, Walt, "Customer Location Services", 1994 Vehicle Navigation & Information Systems Conference Proceedings, Yokahama, Japan, Aug. 31-Sep. 2, 1994, pp. 613-617.

Tanaka, Yoshimi, et al., "Automatic Traffic Information Provision System Utilizing Facsimile and Telephone (Now Operating in Osaka), 1994 Vehicle Navigation & Information Systems Conference Proceedings", Yokahama, Japan, Aug. 31-Sep. 2, 1994, pp. 627-632.

McDonald, Mike, et al., "Romanse (Road Management System for Europe) Project", 1994 Vehicle Navigation & Information Systems Conference Proceedings, Yokahama, Japan, Aug. 31-Sep. 2, 1994, pp. A-11-A-14.

Scott III, Robert H., "Computer-Aided Dispatch,", 1998, pp. 46-50.

Moore, Rodney J., "Hold the Phone!", American Demographics, Ithaca, Jan./Feb. 1996, p. 68.

Delong, Jr., Edgar S., "Making 911 even better", Telephony, Dec. 14, 1987, pp. 60-63.

Bruzek, Frank J., "Class Calling Service—A Consumer Service Perspective", Globecom '85 IEEE Global Telecommunications Conference, Dec. 2-5, 1985, vol. 1 of 3, pp. 11.4.1-11.4.4.

Powell, R., et al., "Real Time Passenger Information System for the Romanse Project", Colloouin Digest—IEE, Boston, Sep. 1993, pp. 9/1-9/3.

Huber, Paul, "Public Transport Information Systems in Munich", Intelligent Transport Systems World Congress '95—Second Wold Congress on Intelligent Transport Systems, Yokohama, Japan., Nov. 9-11, 1995, pp. 2362-2366.

Ronez, Nicholas, et al, "GIS-Based Transit Information Bolsters Travel Options", GIS World, vol. 6, part 7, Jun. 1995, pp. 62-64.

Catling, Ian, et al., "TABASCO—Improving Transport Systems in Europe", Pacific Rim TransTech Conference, Jul. 30-Aug. 2, 1995, 995 Vehicle Navigation & Information Systems Conference Proceedings, Washington State Convention and Trade Center, Seattle, Washington, USA, pp. 503-507.

Dailey, D.J., "Demonstration of an Advance Public Transportation System in the Context of an IVHS Regional Architecture", Proceedings of the First World Congress on Applications of Transport Telematics and Intelligent Vehicle-Highway Systems, Nov. 30-Dec. 3, 1994, Paris, France, pp. 3024-3031.

Hubner, Paul, "Advance Public Transportation Information in Munich", International Conference on Public Transport Electronic Systems, Conference Publication No. 42, Jun. 1996.

Thompson, S.M., et al., "Exploiting Telecommunications to Delivery Real Time Transport Information", Road Transport Information and Control, Apr. 21-23, 1998, pp. 59-63, Conference Publication No. 454 IEE 1998.

Kaminitzer, David, et al., Driver Information Systems: Influencing your Route, IEE Seminar, Mar. 3, 1999, pp. 5/1-5/5.

"Board Cites ATC in Spokane Near Miss", Article in Aviation Week & Space Technology, Mar. 28, 1977, URL: http://www.aviationnow.com.

Shifrin, Carole A., "Gate Assignment Expert System Reduces Delays at United's Hubs", Article in Aviation Week & Space Technology, Jan. 25, 1988.

"United Airlines applies TI's advance technologies to improve gate management at major airports", Article in Business Wire, Inc., Nov. 19, 1987.

Musich, Paula, "Airline Designs Software to move planes, people; Unite Airline's use of Covia Corp.'s Open Systems Manager, Connectivity Section", Article in PC Week, Jun. 7, 1988, vol. 5, No. 23, p. C11.

Stoll, Marilyn, "Systems help Airlines Manage Gate Schedules; Connectivity Supplement", PC Week, Jul. 25, 1988, vol. 5, No. 30, p. C4.

Reddy, Shyamala, "Traveling LAN: United Airlines Networks Its Terminals", Article in the Local Area Network Magazine, Jan. 1990, vol. 5, No. 1, p. 108.

Fisher, Sharon, "Networked Airport Systems help Travelers find their way; United Airlines subsidiary Covia Corp. devices integrated network.", Article in Software Magazine, Mar. 15, 1990, vol. 10, No. 4, p. 31.

Henderson, Danna K., "Automation Takes aim at airports: the power of the networked PC is being unleashed on passenger handling and ramp activities worldwide.", Article in Air Transport Wold, Aug. 1990., vol. 27, No. 8, p. 52.

"United Airlines introduces United Cargo Plug I, a new cargo computer system to serve freight forwarders", Business Wire, Oct. 22, 1990.

Miller, Barry, "Special Report: Airline Equipment, Service Center", Aviation Week & Space Technology, Aug. 25, 1975, p. 51.

Lyon, Mark W., "Cargo Net Debate Splits Industry", Journal of Commerce, Specials, p. 4, Jul. 27, 1992.

Davies, I.L., et al., "Electronics and the Aeroplane", Proceedings of the Institution of Electrical Engineers, Paper No. 7604, delivered before the IEE Electronics Division, Oct. 29, 1975.

"Global Niche", Flight International, Sep. 26, 1990.

"Real-Time Briefings", Aviation Week and Space Technology, Oct. 13, 1986.

Flanagan, Mike, et al., "Amelia Earhart—Mystery Still Clouds Soaring Achievements", Chicago Tribune, Jul. 5, 1987, Final Edition, p. 5, Tempo Woman.

"Official Airline Guides", Airports®, Nov. 20, 1990, Around Airports, vol. 7, No. 47, p. 485.

"Automation System Gains Acceptance", Aviation Week & Space Technology, Nov. 23, 1992, vol. 137, No. 21, p. 97.

Klass, Philip, "French Testing Ground-Derived MLS", Aviation & Space Technology, Avionics, p. 56, Dec. 15, 1975.

"Forecast Realized for ATC System", Aviation & Space Technology, Mar. 17, 1975, Avionics, p. 168.

Henderson, Danna, et al., "Ionworks: America West Automates New Phoenix Terminal Fully Integrated System to Handle Customer-Service Demands (America West Airlines Inc) (Includes Related Article Automation of passenger Service at Airports)", Airport Transport World, May 1, 1991. vol. 62.

3 Pages from a web site search under http://mit.edu/afs/net.mit/edu/project/attic/usa-today/tech/37, Jun. 12, 2003.

"What's New in passenger Handling Equipment", Air Transport World, vol. 24, p. 62, Sep. 1987.

"Senator Urges Acceleration of Navstar", Aviation & Space Technology, Avionics, p. 153, Oct. 3, 1983.

"AFSC Broadens Joint Program Efforts", Aviation & Space Technology, System Acquisition, p. 83, Jul. 19, 1976.

Herskovitz, Don, "GPS Insurance Antijamming the System; Brief Article", Journal of Electronic Defense, Dec. 1, 2000, No. 12, vol. 23, p. 41.

Hambly, Richard M., et al., "Aircraft Traffic Management on the Airport Surface Using VHF Data Link for CNS", IEEE AES Systems Magazine, Mar. 1995, pp. 9-13.

Berzins, G., et al., "INMARSAT: Worldwide Mobile Satellite Services on Seas, in Air and on Land", Space Technology, vol. 10, No. 4, pp. 231-237, 1990.

Jenney, L.L., et al., "Man as Manager of Automated Resources in an Advanced Air Traffic System", J. Aircraft, vol. 12, No. 12, Dec. 1975.

"Routing & Scheduling System improvements from RTSI; Routing Technology Software, Inc.; Product Announcement", Modern Brewery Age, vol. 43, No. 3, p. 11S, Jan. 20, 1992.

Klass, Philip J., "Two Carriers Plan Automatic Data Link", Aviation Week and Space Technology, Air Transport Section, May 23, 2977, p. 36.

"Data Link Evolved Over Three Decades", Aviation Week and Space Technology, Air Transport Section, May 23, 1977, p. 36.

Klass, Philip J., "American to Install Printers in Cockpits", Aviation Week and Space Technology, Avionics, Jul. 21, 1980, p. 56.

Lefer, Henry, "Computers on a boon to E&M, but at a price", Air Transport World, vol. 23, p. 53, Feb. 1986.

Donaghue, J.A., "Choice of Data Link Systems Expands as New Generation Hits the Market", Air Transport World, vol. 20, p. 58, Apr. 1983.

Klass, Philip J., "Digital Network Could Improve Aircraft Links to Operations, ATC", Aviation Week and Space Technology, International Air Transport Section, vol. 131, No. 21, p. 121, Nov. 20, 1989.

Board Cites ATC in Spokane Near Miss, Article in Aviation Week & Space Technology, Safety Section, Mar. 28, 1977, p. 59.

* cited by examiner

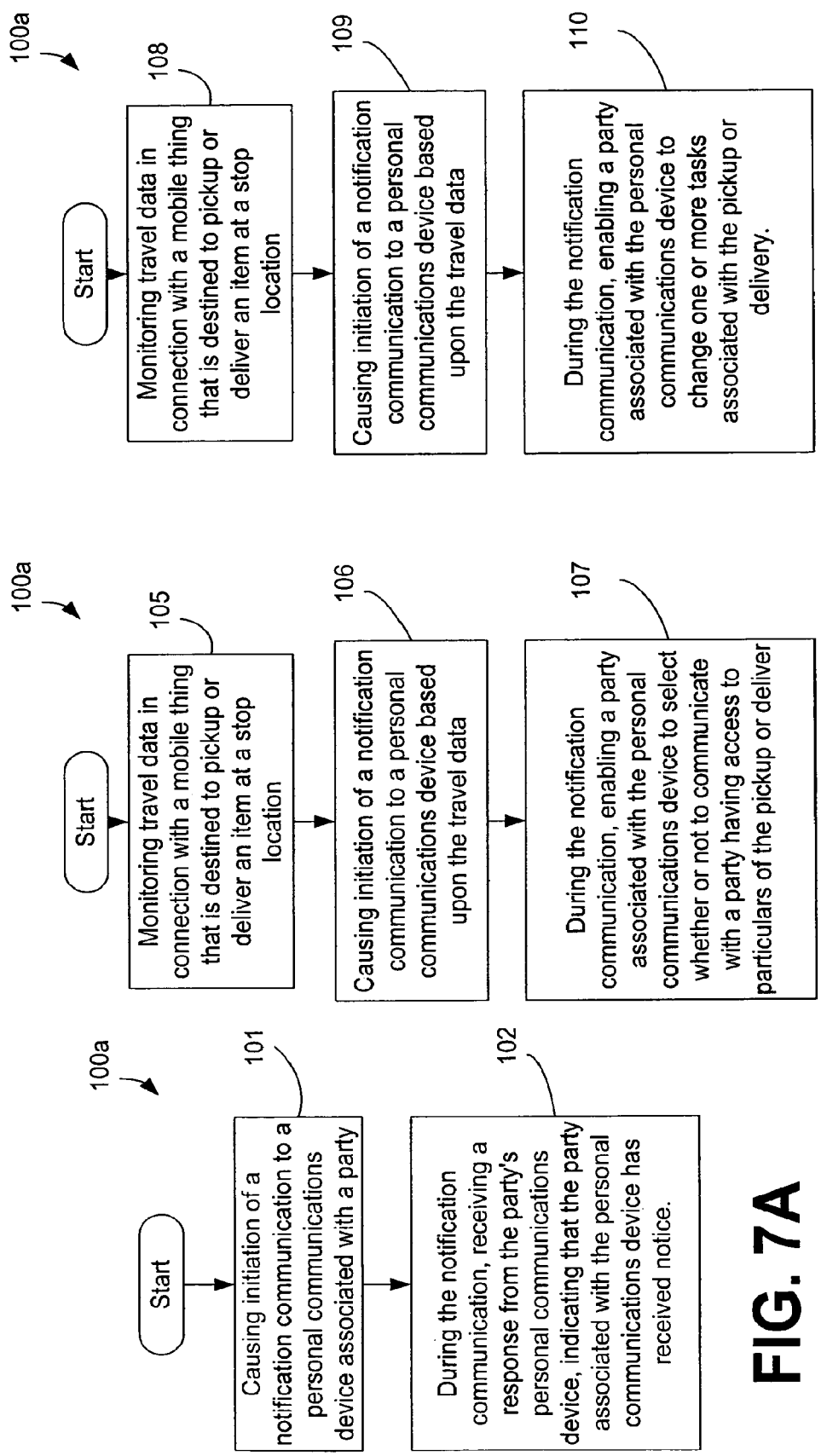

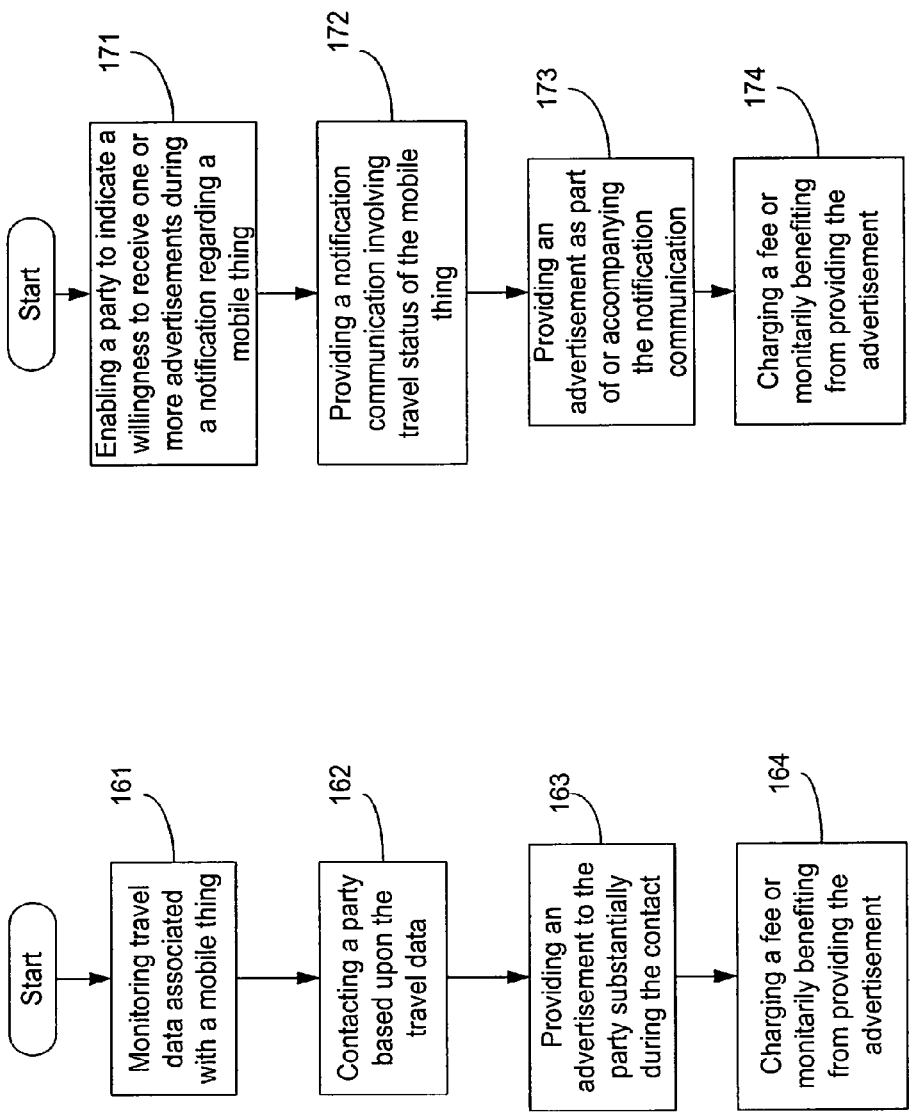

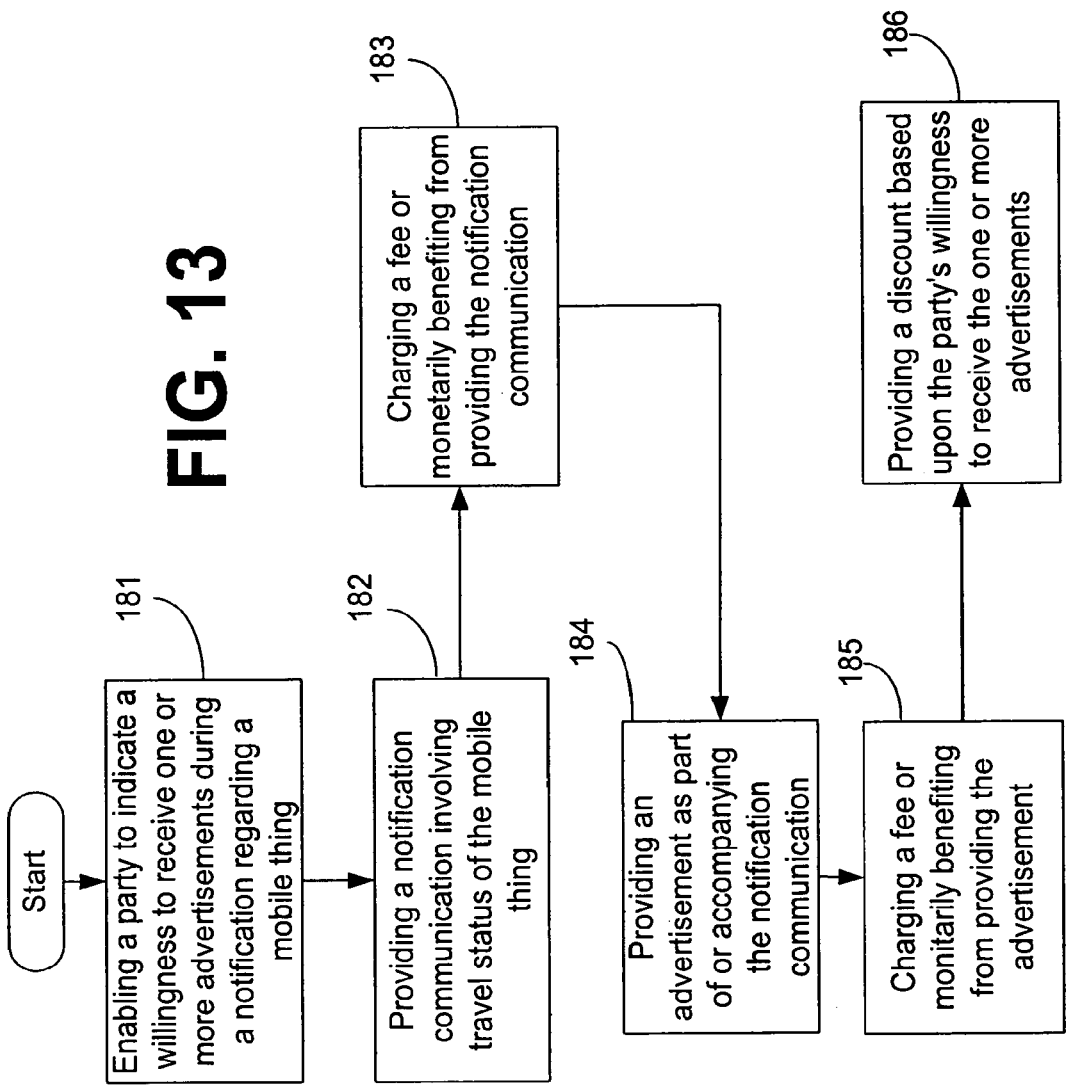

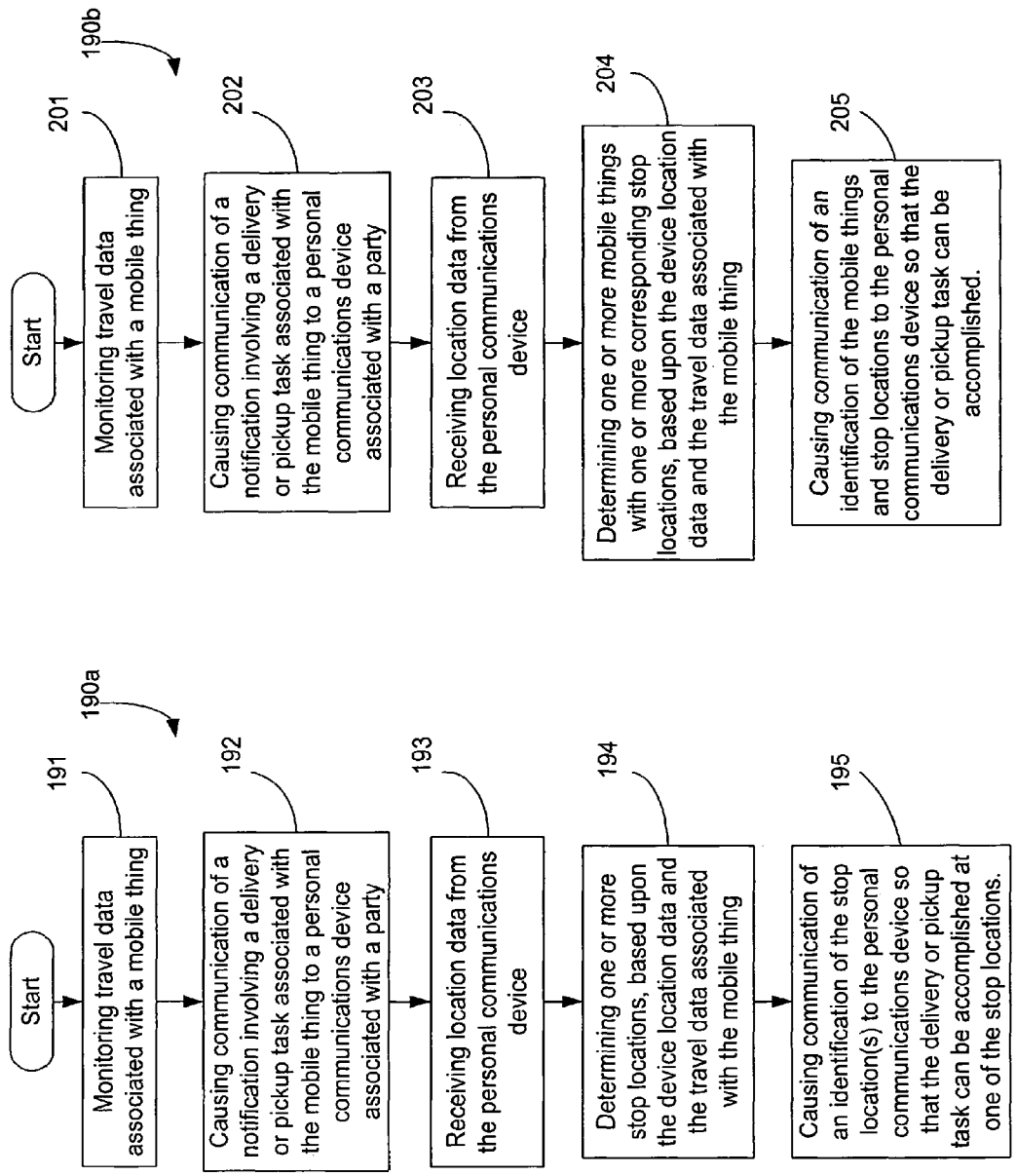

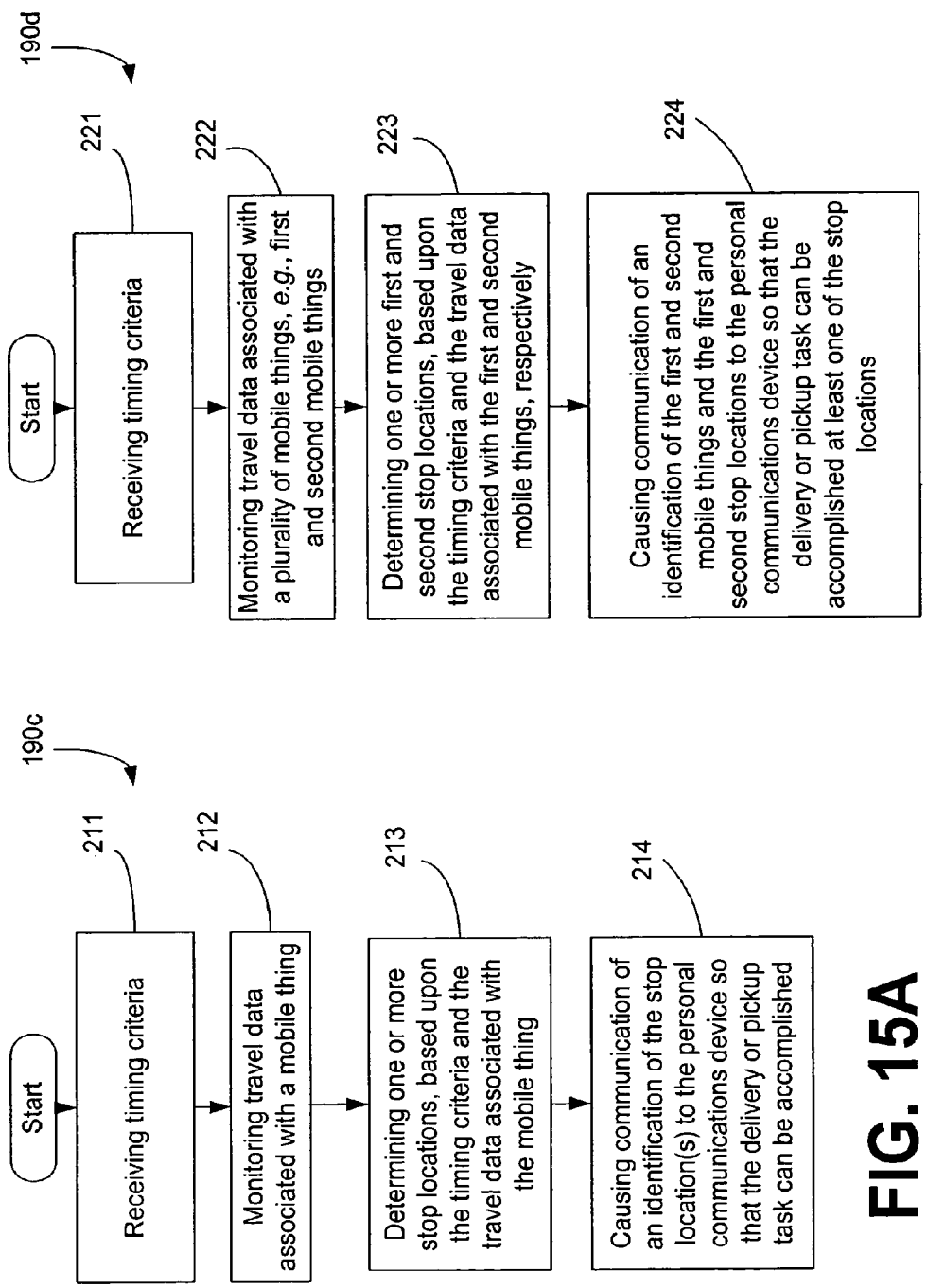

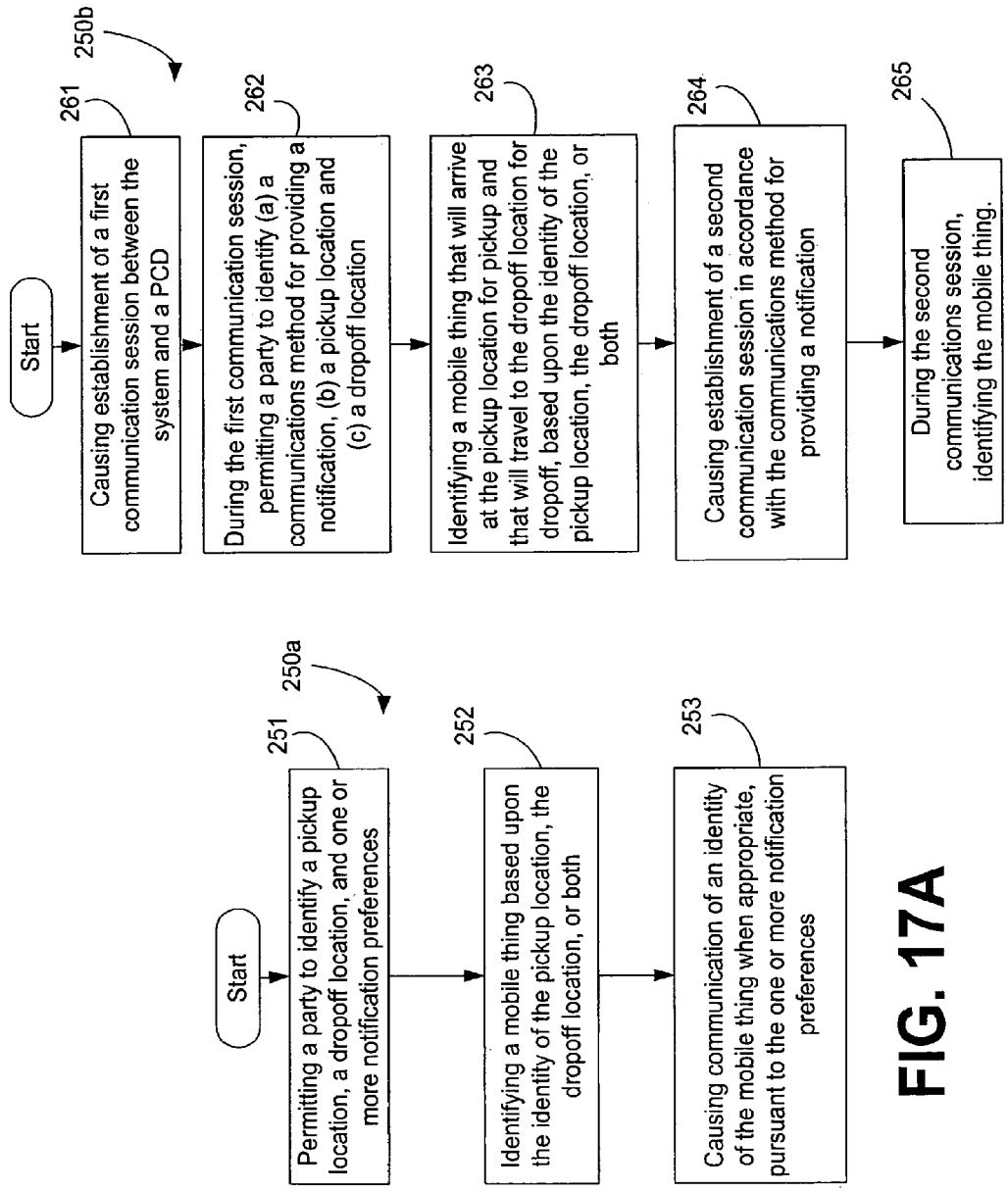

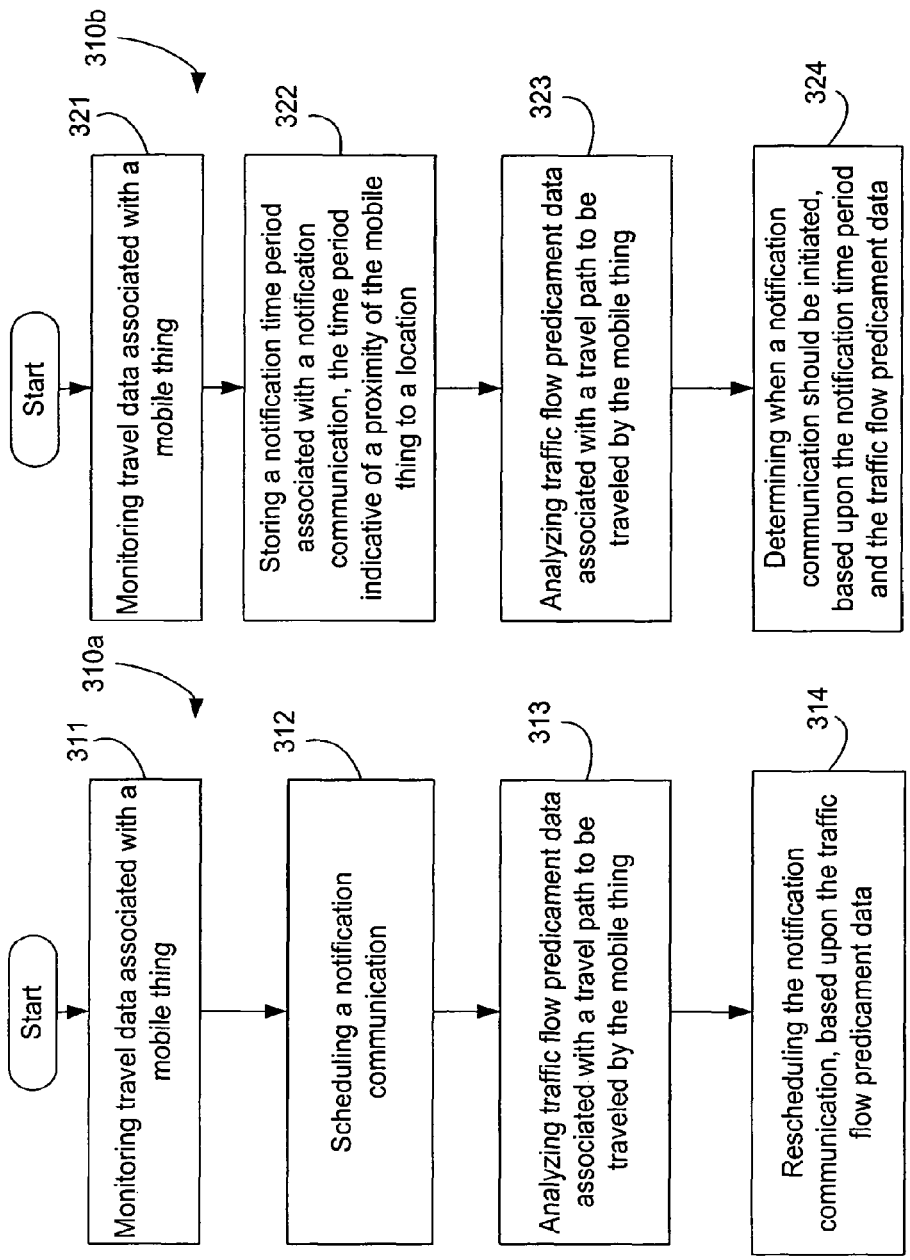

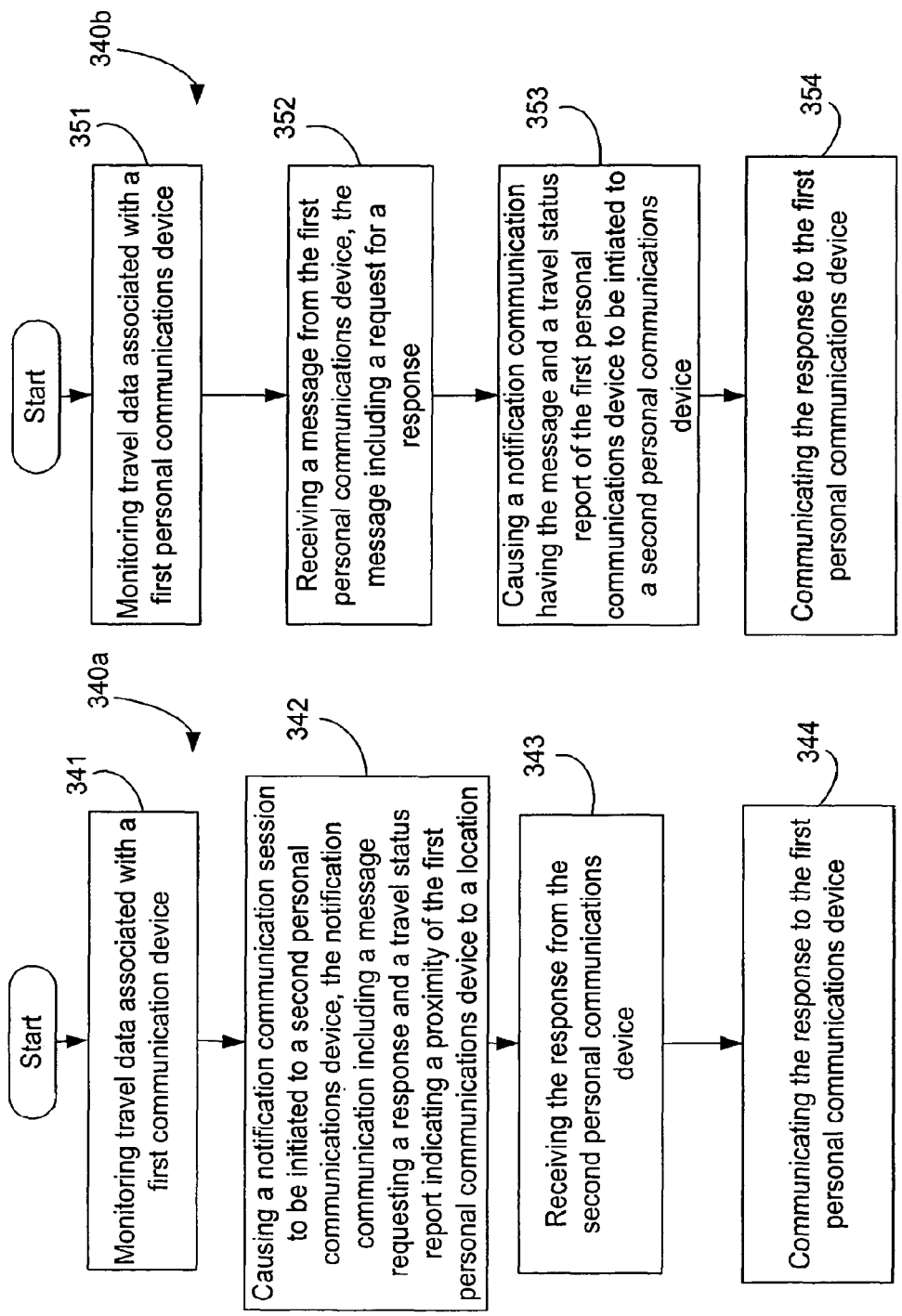

ROUTE DATA

| STOP NUMBER | | GPS / LOCATION | TIME TO STOP (PLANNED) | TIME OF DAY (PLANNED) |
|---|---|---|---|---|
| STOP | 001 | 18T, 0505050, 1212121 | 07:22 | 07:37:22AM |
| STOP | 002 | 18T, 0404040, 6565656 | 04:10 | 07:41:32AM |
| STOP | 003 | 18T, 0303030, 1818181 | 05:45 | 07:47:17AM |
| STOP | 004 | 18T, 0202020, 3737373 | 09:03 | 07:56:50AM |
| ADJUSTMENT | | | (10:00) | DELAY |
| STOP | 005 | 18T, 0101010, 5515515 | 06:44 | 08:13:34AM |
| STOP | 006 | 18T, 0909090, 7227227 | 06:12 | 08:19:46AM |
| STOP | 007 | 18T, 0808080, 4394994 | 05:51 | 08:25:37AM |
| STOP | 008 | 18T, 0707070, 2002002 | 12:30 | 08:38:07AM |
| STOP | 009 | 18T, 0606060, 8338338 | 03:58 | 08:42:05AM |
| STOP | 010 | 18T, 1515151, 9449449 | 04:33 | 08:46:38AM |
| STOP | 011 | 18T, 1414141, 1313131 | 07:29 | 08:54:08AM |
| STOP | 012 | 18T, 1313131, 6464646 | 06:55 | 09:01:01AM |
| STOP | 013 | 18T, 1212121, 1919191 | 07:36 | 09:08:37AM |
| STOP | 014 | 18T, 1111111, 3338383 | 04:50 | 09:13:27AM |
| STOP | 015 | 18T, 0090090, 6626626 | 05:20 | 09:18:47AM |
| STOP | 016 | 18T, 0080080, 8118118 | 09:48 | 09:28:35AM |
| STOP | 017 | 18T, 0070070, 5505005 | 03:33 | 09:32:08AM |
| STOP | 018 | 18T, 0060060, 9119119 | 07:15 | 09:39:23AM |
| STOP | 019 | 18T, 0050050, 0030030 | 05:31 | 09:44:54AM |
| STOP | 020 | 18T, 0040040, 8558558 | 08:01 | 09:52:55AM |
| STOP | 021 | 18T, 0030030, 1333133 | 05:44 | 09:58:39AM |
| STOP | 022 | 18T, 0020020, 6444644 | 05:49 | 10:04:28AM |
| STOP | 023 | 18T, 0010010, 1999199 | 07:22 | 10:11:50AM |
| STOP | 024 | 18T, 0009000, 000  0090 | 05:10 | 10:17:00AM |

DRIVER DISPLAY DATA

| CONFIRM CODE | STOP NUMBER | NAME | ADDRESS |
|---|---|---|---|
| C | 001 | AB COMPANY | 18 John Doe Drive |
| C | 002 | JACK SMITH | 2100 Jones Street |
| C | 003 | XYZ COMPANY | 999 Smith Street |
| U | 004 | MIKE LONG | 36 Horse Street |
| U | 005 | STEVE JONES | 855 Long Drive |
| U | 006 | GLOBAL INC. | 1000 Chase Street |
| U | 007 | FRED SEED | 105 River Street |
| U | 008 | AAA COMPANY | 555 Howard Ave. |
| U | 009 | CLAY INDUSTRY | 1004 Business Drive |
| U | 010 | JOHN DOE | 232 Fairview Street |
| C | 011 | BETTY SMITH | 9191 Oak Drive |
| U | 012 | A&A VENTURES | 8881 Second Street |
| U | 013 | C. L. BLACK | 777 Lookout Drive |
| W | 014 | JIM SMITH | 1100 Abe Drive |
| C | 015 | L. WILLIAMS | 9922 highlower Street |
| C | 016 | PARK COMPANY | 3300 Walk Drive |
| C | 017 | UNITED COMPANY | 12 Tower Place |
| W | 018 | Y&Y COMPANY | 400 Tower Place |
| W | 019 | SUSAN JONES | 390 Harris Drive |
| W | 020 | IDEAL SPORTS | 844 Third Street |
| W | 021 | THE BROWN COMPANY | 555 Third Street |
| W | 022 | OUT SIDE SPORTS | 1530 Third Street |
| W | 023 | K. FIELD | 200 Pine Drive |
| W | 024 | LANCE PATTERSON | 501 Pine Street |

FIG. 32

NOTIFICATION SYSTEMS AND METHODS WHERE A NOTIFIED PCD CAUSES IMPLEMENTATION OF A TASK(S) BASED UPON FAILURE TO RECEIVE A NOTIFICATION

CLAIM OF PRIORITY

This application is a divisional of application Ser. No. 13/005,702, filed Jan. 13, 2011, now U.S. Pat. No. 8,068,037, issued Nov. 29, 2011, which is a divisional application of application Ser. No. 11/924,810, filed Oct. 26, 2007, now U.S. Pat. No. 7,876,239, issued Jan. 25, 2011, which is a continuation of application Ser. No. 10/858,752, filed Jun. 2, 2004, now U.S. Pat. No. 7,319,414, issued Jan. 15, 2008, which is a continuation of application Ser. No. 10/706,591, filed Nov. 12, 2003, now U.S. Pat. No. 7,119,716, issued Oct. 10, 2006, which claims the benefit of and priority to the following provisional application Ser. No. 60/473,738, filed May 28, 2003; Ser. No. 60/473,742, filed May 28, 2003; Ser. No. 60/473,949, filed May 28, 2003; Ser. No. 60/486,768, filed Jul. 11, 2003; and Ser. No. 60/498,819, filed Aug. 29, 2003. All of the foregoing applications are incorporated by reference in their entirety.

BACKGROUND OF THE INVENTION

1. Field of the Invention

The present invention generally relates to data communications, information, and messaging systems and, more particularly, to systems and methods that notify a party of travel status associated with one or more mobile things (MTs).

2. Related Art

For at least the purposes of allowing better preparation and scheduling, for example, with respect to pickups or deliveries, it would be desirable to know, with substantial accuracy, the expected arrival or departure time of a mobile vehicle or thing (for example but not limited to, a bus, automobile, truck, train, ship, plane, aircraft, etc.) with respect to a location.

For example, consider a commercial bus service. A person intending to catch a bus or intending to pick up a friend or relative at the commercial bus station usually calls the bus station to find out the approximate arrival time (information which is oftentimes unavailable or unreliable) and/or arrives at the bus station prior to the scheduled arrival or departure time of the bus, hoping that the bus is not significantly delayed. With knowledge of accurate arrival or departure information, adjustments can be made to one's schedule to avoid having to wait extended periods for a vehicle.

Another example involves school children that ride school buses. The arrival times of school buses at scheduled stops can be significantly affected by many factors, such as maintenance problems, rush hour traffic, congested urban/suburban conditions, and adverse weather. As a result, school children typically wait at bus stops for long periods of time, oftentimes in adverse weather conditions, on unlit street corners, or in hazardous conditions near busy or secluded streets. An advance notification system that would inform the students of the school bus's proximity would be desirable so that students can avoid having to wait for the school bus at the bus stop for extended time periods.

Yet another example involves the commercial overnight package industry, wherein packages are delivered or picked up many times on a tight schedule. Customers oftentimes wait on delivery or pickup of important time-critical packages, not knowing precisely when the delivery or pickup will occur. A notification system that can inform a customer of the precise arrival or departure time of a delivery vehicle with respect to a location would be desirable in order to improve customer service and to allow the customer to better schedule a delivery or pickup of an item.

Still another example involves the airline industry. It is desirable to notify airline workers, such as those who unload baggage from airplanes, when an airplane is about to land or has landed. A notification system can be employed to track the airplane travel status and to send notifications to these workers, when appropriate.

To date, notification systems have been developed to address the foregoing needs and some are known in the art. Mr. M. Kelly Jones, a prolific inventor in this field, obtained numerous patents that describe examples of such notification systems, some of which are as follows: U.S. Pat. No. 5,400,020; U.S. Pat. No. 5,444,444; U.S. Pat. No. 5,623,260; U.S. Pat. No. 5,647,010; U.S. Pat. No. 5,648,770; U.S. Pat. No. 5,657,010; U.S. Pat. No. 5,668,543; and U.S. Pat. No. 5,400,020; U.S. Pat. No. 6,278,936; U.S. Pat. No. 6,317,060; U.S. Pat. No. 6,363,323; U.S. Pat. No. 6,363,254; U.S. Pat. No. 6,411,891; U.S. Pat. No. 6,415,207; U.S. Pat. No. 6,492,912; U.S. Pat. No. 6,510,383; and U.S. Pat. No. 6,618,668.

A nonexhaustive list of other examples of notification systems is as follows: U.S. Pat. No. 6,006,159 (for a public bus transit system); U.S. Pat. No. 6,374,176 (for a public bus transit system); application Ser. No. 09/163,535, filed on Sep. 30, 1998; U.S. Pat. No. 5,602,739 (for a public transit system); U.S. Pat. No. 5,736,940 (tracking system for buses; notice of impending arrival is described); U.S. Pat. No. 5,808,565 (GPS triggered automatic enunciator for public transportation vehicles that notifies of a stop based upon the location of the vehicle); U.S. Pat. No. 5,955,974 (apparatus carried by a user to notify of arrival so user does not miss stop); U.S. Pat. No. 5,987,377 (dispatch system that determines expected time of arrival and indicates to dispatcher when a vehicle will be late); U.S. Pat. No. 6,124,810 (vehicle apparatus determines when vehicle has arrived or departed from a planned or unplanned stop and communicates such information to a central facility); U.S. Pat. No. 6,137,425 (waiting time prediction system for a public transit system); U.S. Pat. No. 6,178,378 (a vehicle navigation system where a start call, such as by telephone, is made); and U.S. Pat. No. 6,184,802 (system for informing users when a next vehicle will arrive at their boarding site).

Furthermore, a nonexhaustive list of examples of tracking systems is as follows: U.S. Pat. No. 5,014,206; U.S. Pat. No. 5,113,185; U.S. Pat. No. 5,155,689; U.S. Pat. No. 5,168,451 (transit system for dispatching vehicles); U.S. Pat. No. 5,223,844; U.S. Pat. No. 5,243,529 (in-vehicle navigation apparatus with map display); U.S. Pat. No. 5,299,132; U.S. Pat. No. 5,394,332 (on-board navigation system); U.S. Pat. No. 5,398,190; U.S. Pat. No. 5,432,841 (system for locating and communicating with mobile vehicles); U.S. Pat. No. 5,448,479; U.S. Pat. No. 5,483,454; U.S. Pat. No. 5,519,621; U.S. Pat. No. 5,587,715 (describes a satellite based tracking system); U.S. Pat. No. 5,594,650 (describes a tracking system with map display capabilities); U.S. Pat. No. 5,652,707; U.S. Pat. No. 5,724,243 (on board vehicle system tracks location and expected time of arrival); U.S. Pat. No. 5,739,774 (mass transit monitoring system); U.S. Pat. No. 5,760,742 (integrated mobile GIS/GPS/AVL with wireless messaging); U.S. Pat. No. 5,796,365 (uses satellites, vehicle tracking units, and a central computer); U.S. Pat. No. 5,922,040 (vehicle positioning data is exchanged between vehicles and a central processor having a map display); U.S. Pat. No. 5,945,919 (dispatch system tracks vehicles); U.S. Pat. No. 6,191,708 (vehicle location tracking without satellites); U.S. Pat. No.

6,253,148 (tracks buses and communicates waiting times to radio receivers); and U.S. Pat. No. 6,360,101 (cellular phone that displays or sends messages upon its arrival at a predetermined location).

Another tracking system that has been known in the art is the FlightView airline tracking system developed by RLM Software, Inc., which monitors the progress of an airplane and displays its location on a map on a user's computer screen. RLM receives real-time flight data (for example, position and speed) for each flight over North America. This data comes from transponders located on aircraft. The FAA collects the transponder data, adds radar and other information, and supplies it to RLM. This data feed is known in the aviation industry as "ASDI," which stands for Aircraft Situation Display for Industry and has been made available by the FAA since 1996. RLM processes this data and stores it in the FlightView database. A user can then request the status of any commercial flight from the FlightView system (by providing the airline and flight number), which sends to the user's computer screen a map showing the current position, route, and expected arrival time of the flight.

As can be seen from the aforementioned prior art, the systems that give notice concerning the status of moving things are still evolving and, in some sense, the art is still in a state of infancy. Accordingly, I write and submit this application and invention for the public good to educate and further advance the technology associated with such systems.

SUMMARY OF THE INVENTION

The present invention provides systems and methods for automated notification systems.

A representative system, among others, can be summarized generally as follows. A host computer system, or base station, is designed to monitor travel data corresponding to a mobile thing and to initiate a notification communication to a personal communications device (PCD) indicating travel status of the mobile thing to a remote computer system. The remote computer system, within or associated with the PCD, is designed to detect a failure to receive the notification communication and to cause one or more tasks to be performed based upon the notification communication failure.

A representative method, among others, can be generally summarized by the following steps: failing to receive a scheduled notification communication, the scheduled notification communication indicating travel status of a mobile thing in relation to a stop location; and causing one or more tasks to be performed based upon the scheduled notification communication failure. A representative system, among others, comprises a computer or other automated system that is programmed or designed to perform the foregoing steps.

Other systems, methods, features, and advantages of the present invention will become apparent from the accompanying Drawings and following Detailed Description section.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention.

Furthermore, like reference numerals designate corresponding parts throughout the several views.

FIG. 7A is a flow chart illustrating an exemplary implementation of a response system feedback analyzer, which is optionally implemented as at least part of the architecture, functionality, and operation of the BS manager of FIGS. 1 and 3.

FIG. 7B is a flow chart illustrating another exemplary implementation of a response system feedback analyzer, which is optionally implemented as at least part of the architecture, functionality, and operation of the BS manager of FIGS. 1 and 3. A response from a notified party causes a telecommunications connection to be made between the notified party and a party associated with a tracked MT that will make a pickup or delivery at a stop location.

FIG. 7C is a flow chart illustrating yet another exemplary implementation of a response system feedback analyzer, which is optionally implemented as at least part of the architecture, functionality, and operation of the BS manager of FIGS. 1 and 3. A response from a notified party is used to change one or more tasks associated with a pickup or delivery of an item or service associated with a stop location.

FIG. 11 is a flow chart illustrating an exemplary implementation of an advertisement method of doing business that can be optionally implemented in connection with any notification system.

FIG. 12 is a flow chart illustrating an exemplary implementation of another advertisement method of doing business that can be optionally implemented in connection with any notification system.

FIG. 13 is a flow chart illustrating an exemplary implementation of yet another advertisement method of doing business that can be optionally implemented in connection with any notification system.

FIG. 14A is a flow chart illustrating an exemplary implementation of a first stop location determination system (and method; system and method are based upon feedback regarding the location of the PCD and/or user) that can be optionally implemented in connection with any notification system, for example, as at least part of the architecture, functionality, and operation of the BS manager of FIGS. 1 and 3.

FIG. 14B is a flow chart illustrating an exemplary implementation of a second stop location determination system (and method; system and method are based upon feedback regarding the location of the PCD and/or user) that can be optionally implemented in connection with any notification system, for example, as at least part of the architecture, functionality, and operation of the BS manager of FIGS. 1 and 3.

FIG. 15A is a flow chart illustrating an exemplary implementation of a third stop location determination system (and method; system and method are based upon timing criteria) that can be optionally implemented in connection with any notification system, for example, as at least part of the architecture, functionality, and operation of the BS manager of FIGS. 1 and 3.

FIG. 15B is a flow chart illustrating an exemplary implementation of a fourth stop location determination system (and method; system and method are based upon timing criteria) that can be optionally implemented in connection with any notification system, for example, as at least part of the architecture, functionality, and operation of the BS manager of FIGS. 1 and 3.

FIG. 17A is a flow chart illustrating an exemplary implementation of a first mobile thing determination system (and method; system and method are based upon pickup and dropoff locations that are communicated to the notification system) that can be optionally implemented in connection with any notification system, for example, as at least part of the architecture, functionality, and operation of the BS manager of FIGS. 1 and 3.

FIG. 17B is a flow chart illustrating an exemplary implementation of a second mobile thing determination system (and method system and method are based upon pickup and dropoff locations that are communicated to the notification system) that can be optionally implemented in connection with any notification system, for example, as at least part of the architecture, functionality, and operation of the BS manager of FIGS. 1 and 3.

FIG. 19A is a flow chart illustrating an exemplary implementation of a first system (and method) for making more accurate notifications by considering traffic flow predicament data. This system can be optionally implemented in connection with any notification system, for example, as at least part of the architecture, functionality, and operation of the BS manager of FIGS. 1 and 3.

FIG. 19B is a flow chart illustrating an exemplary implementation of a second system (and method) for making more accurate notifications by considering traffic flow predicament data. This system can be optionally implemented in connection with any notification system, for example, as at least part of the architecture, functionality, and operation of the BS manager of FIGS. 1 and 3.

FIG. 20A is a flow chart illustrating an exemplary implementation of a first system (and method) for monitoring travel of MTs that are PCDs and communicating notifications and responses among the PCDs. This system can be optionally implemented in connection with any notification system, for example, as at least part of the architecture, functionality, and operation of the BS manager of FIGS. 1 and 3.

FIG. 20B is a flow chart illustrating an exemplary implementation of a second system (and method) for monitoring travel of MTs that are PCDs and communicating notifications and responses among the PCDs. This system can be optionally implemented in connection with any notification system, for example, as at least part of the architecture, functionality, and operation of the BS manager of FIGS. 1 and 3.

FIG. 32 is an illustration of an embodiment of route data and corresponding driver display data that can be maintained and implemented in connection with a delivery or pickup service.

DETAILED DESCRIPTION

A. Notification System

Figure 1:
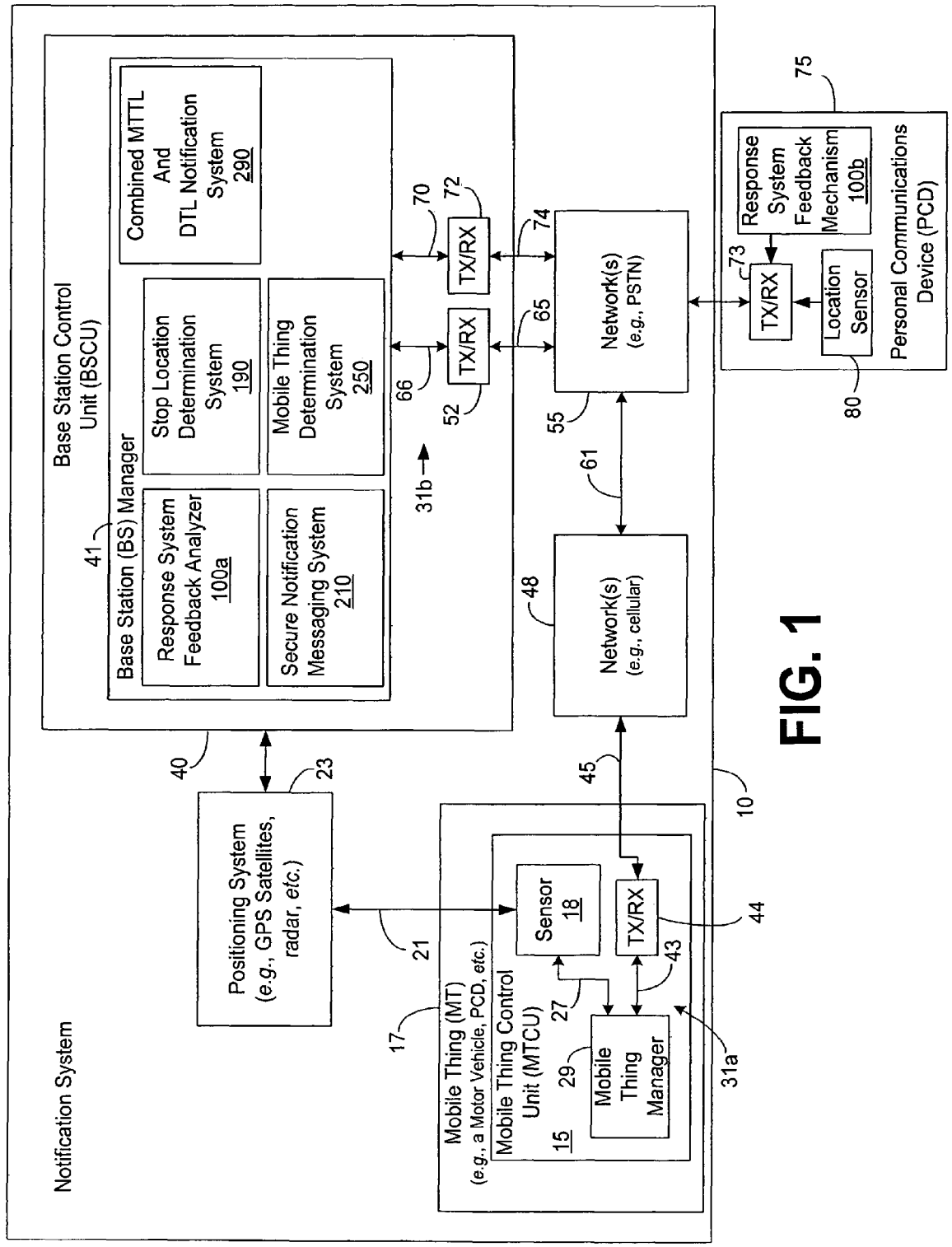
FIG. 1 is a block diagram illustrating an exemplary implementation of an automated notification system, which in this case, is a computer-based system.

The systems and methods of this patent application can be implemented in connection with any type of notification service or system, messaging system, information system, data communications system, or tracking system, that notifies a party of travel status associated with one or more moving things (all referred to herein as "notification system"). The notification system may or may not have a tracking subsystem that actually directly or indirectly tracks the mobile things (MTs), but has access to information or data, perhaps from a tracking system(s) or data source, that can be used by it to monitor travel of the MTs. There are a number of such notification, messaging, and tracking systems that are known in the art.

As mentioned in the Background, Mr. Martin Kelly Jones has been an active pioneering inventor in this area and has filed applications for patent on various notification systems, a few of which, are as follows: U.S. Pat. No. 5,400,020; U.S. Pat. No. 5,444,444; U.S. Pat. No. 5,623,260; U.S. Pat. No. 5,647,010; U.S. Pat. No. 5,648,770; U.S. Pat. No. 5,657,010; U.S. Pat. No. 5,668,543; and U.S. Pat. No. 5,400,020; U.S. Pat. No. 6,278,936; U.S. Pat. No. 6,317,060; U.S. Pat. No. 6,363,323; U.S. Pat. No. 6,363,254; U.S. Pat. No. 6,411,891; U.S. Pat. No. 6,415,207; U.S. Pat. No. 6,492,912; U.S. Pat. No. 6,510,383; and U.S. Pat. No. 6,618,668. All of the foregoing patents are incorporated herein by reference in their entirety. The inventions that are claimed near the end of this document can be implemented and practiced in the systems described in the foregoing patents, as will be clear from the discussion that follows.

A nonexhaustive list of other examples of notification systems is as follows: U.S. Pat. No. 6,006,159 (for a public bus transit system); U.S. Pat. No. 6,374,176 (for a public bus transit system); application Ser. No. 09/163,535, filed on Sep.

30, 1998; U.S. Pat. No. 5,602,739 (for a public transit system); U.S. Pat. No. 5,736,940 (tracking system for buses; notice of impending arrival is described); U.S. Pat. No. 5,808,565 (GPS triggered automatic enunciator for public transportation vehicles that notifies of a stop based upon the location of the vehicle); U.S. Pat. No. 5,955,974 (apparatus carried by a user to notify of arrival so user does not miss stop); U.S. Pat. No. 5,987,377 (dispatch system that determines expected time of arrival and indicates to dispatcher when a vehicle will be late); U.S. Pat. No. 6,124,810 (vehicle apparatus determines when vehicle has arrived or departed from a planned or unplanned stop and communicates such information to a central facility); U.S. Pat. No. 6,137,425 (waiting time prediction system for a public transit system); U.S. Pat. No. 6,178,378 (a vehicle navigation system where a start call, such as by telephone, is made); and U.S. Pat. No. 6,184,802 (system for informing users when a next vehicle will arrive at their boarding site). All of the aforementioned patents or applications are incorporated herein by reference in their entirety. The inventions that are claimed in this document can be implemented and practiced in the systems described in the foregoing patents.

Furthermore, a nonexhaustive list of examples of, what appear to be tracking systems, are as follows: U.S. Pat. No. 5,014,206; U.S. Pat. No. 5,113,185; U.S. Pat. No. 5,155,689; U.S. Pat. No. 5,168,451 (transit system for dispatching vehicles); U.S. Pat. No. 5,223,844; U.S. Pat. No. 5,243,529 (in-vehicle navigation apparatus with map display); U.S. Pat. No. 5,299,132; U.S. Pat. No. 5,394,332 (on-board navigation system); U.S. Pat. No. 5,398,190; U.S. Pat. No. 5,432,841 (system for locating and communicating with mobile vehicles); U.S. Pat. No. 5,448,479; U.S. Pat. No. 5,483,454; U.S. Pat. No. 5,519,621; U.S. Pat. No. 5,587,715 (describes a satellite based tracking system); U.S. Pat. No. 5,594,650 (describes a tracking system with map display capabilities); U.S. Pat. No. 5,652,707; U.S. Pat. No. 5,724,243 (on board vehicle system tracks location and expected time of arrival); U.S. Pat. No. 5,739,774 (mass transit monitoring system); U.S. Pat. No. 5,760,742 (integrated mobile GIS/GPS/AVL with wireless messaging); U.S. Pat. No. 5,796,365 (uses satellites, vehicle tracking units, and a central computer); U.S. Pat. No. 5,922,040 (vehicle positioning data is exchanged between vehicles and a central processor having a map display); U.S. Pat. No. 5,945,919 (dispatch system tracks vehicles); U.S. Pat. No. 6,191,708 (vehicle location tracking without satellites); U.S. Pat. No. 6,253,148 (tracks buses and communicates waiting times to radio receivers); and U.S. Pat. No. 6,360,101 (cellular phone that displays or sends messages upon its arrival at a predetermined location). All of these mentioned patents or applications are incorporated herein by reference in their entirety. The inventions that are claimed in this document can be implemented and practiced in the systems described in these mentioned patents.

The claimed systems (and methods) of the invention can be implemented in many other known notification systems, messaging systems, or tracking systems, that notify a party of travel status associated with one or more moving things and that are not specifically referenced, shown, or described in this document for reasons of simplicity.

As a nonlimiting example, FIG. 1 depicts a notification system 10 illustrating a possible context, among others, in which the invention may be implemented. As shown by FIG. 1, the notification system 10 has a tracking aspect and a notification aspect.

As depicted in FIG. 1, an MT control unit (MTCU) 15 is disposed on an MT 17, which is capable of transporting the MTCU 15 over various distances. For example, MT 17 can be any movable object or thing, including but not limited to, a motor vehicle, such as an automobile, motorcycle, truck, bus, limousine, or taxicab, a bicycle, an aircraft such as an airplane, helicopter, balloon, or rocket, a train, a water vehicle such as a cruise ship, cargo ship, or other boat/ship, a package, a human being, an animal, an electronic email or transmission, an amusement park vehicle, or any other thing capable of being moved across or through the Earth's surface and/or atmosphere.

The notification service can be implemented in connection with any vehicle 17 for delivering items to a destination or for picking up items at a destination. Items can include any of many various types of packages or goods to be delivered or picked up, for example but not limited to, mail, pizza, beverages, shipping vessels, containers, produce, etc. Furthermore, items can also include persons to be picked up or delivered, such as when a bus picks up and/or delivers passengers at different bus stops or such as when an airplane picks up and/or delivers passengers at airports. Although not necessary for implementation, the MT 17 can travel along a predetermined route or modifiable route in making its deliveries, and the MT 17 may make one or more stops along its route in order to deliver or pick up different items at different locations.

The notification service can also be implemented in connection with any services to be delivered, or performed at or near, a destination. The notification service can be implemented in connection with the following nonlimiting list of examples: maid service, pest control, telephone repair or installation, television repair, cable repair or installation, garbage pickup, yard maintenance, pool maintenance, power meter maintenance/reading, etc.

B. Mobile Thing Control Unit (MTCU)

In the preferred embodiment, a sensor 18 within MTCU 15 is configured to sense signals to help determine and/or determine the location of the sensor 18 relative to a predetermined reference point. In the preferred embodiment, sensor 18 is a global positioning system (GPS) sensor(s), although other types of positioning systems (having components that are local to and/or remote from the MTCU 15) and/or sensors are also possible. For example, other types of positioning systems that may be used include, but are not limited to, GLONASS, LORAN, Shoran, Decca, TACAN, radar, traffic system monitoring, a system for monitoring vehicle stops along a route, or any other of numerous possible tracking systems or combinations thereof. It is also possible to indirectly monitor the location of the MT 17 by monitoring or tracking pickup or delivery of people, products, packages, or things that are transported by the MT 17. The GPS sensor 18 of the preferred embodiment is configured to receive signals 21 from a plurality of GPS satellites 23, and as known in the art, sensor 18 is designed to analyze signals 21 in order to determine the sensor's location or coordinate values relative to a predetermined reference point. For example, in the preferred embodiment where sensor 18 is a GPS sensor, the sensor 18 determines the sensor's location values relative to the Earth's zero degree latitude and zero degree longitude reference point, which is located at the intersection of the Equator and the Prime Meridian. U.S. Pat. No. 5,781,156 entitled, "GPS Receiver and Method for Processing GPS Signals" and filed on Apr. 23, 1997 by Krasner, which is incorporated herein by reference, discusses a sensor for the processing of GPS signals 21 received from GPS satellites 23 in order to determine the sensor's location values. Since the sensor 18 is located within MTCU 15, the location values determined by the sensor 18 are assumed to match the location values of the MT 17 and the MTCU 15.

A location value can be any value or set of values that may be used to determine a location of a point on the Earth or within the Earth's atmosphere. This value may be a coordinate value (i.e., grid value), polar value, vector value, time-distance value, or any other type of value or values known in the art for indicating locations of points.

In alternative embodiments, the positioning system 23 may determine MT location information and merely transmit the position information to the MT 17. For example, radar could be used to remotely track the MT 17 and then the radar system could be designed to convey MT position information to the MT 17 (and/or the base station control unit (BSCU) 40, which will be described in detail hereinafter).

In alternative embodiments, the positioning system 23 may be the Federal Aviation Administration (FAA), which collects transponder data from airplanes, adds radar and other information, and makes the resultant data available for tracking purposes. This data feed is known in the aviation industry as "ASDI," which stands for Aircraft Situation Display for Industry. This data feed can be accessed by the BSCU 40 (and/or the MTCU 15).

In alternative embodiments, the positioning system 23 may be associated with a computer system server communicatively coupled to the Internet that makes location information pertaining to the MT 17 available to the BSCU 40 and/or to the MTCU 15 over the Internet. In such embodiments, it is also possible for the BSCU 40 to communicate the server's uniform resource locator (URL) to the notified PCD 75, which can be equipped with a web browser, so that location information pertaining to the tracked MT 17 (as well as the PCD 75) can be accessed by the notified PCD 75 from the server.

In alternative embodiments, the positioning system 23 may be a tracking system that tracks a vehicle's progress along a predetermined route based upon its arrival at and/or departure from stops along the route.

Referring back to FIG. 1, sensor 18 is designed to transmit a signal 27 to MT manager 29 indicating the MT's current location values. MT manager 29 is configured to receive signal 27 and to monitor the location of the MT 17 over time by processing multiple signals 27. The MT manager 29 can be implemented in software, hardware, or a combination thereof. In the preferred embodiment, as illustrated by way of example in FIG. 2, the MT manager 29 along with its associated methodology is implemented in software and stored in computer memory 30*a* of a computer system 31*a*.

Note that the MT manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the MT manager 29 may be magnetically stored and transported on a conventional portable computer diskette.

Figure 2:
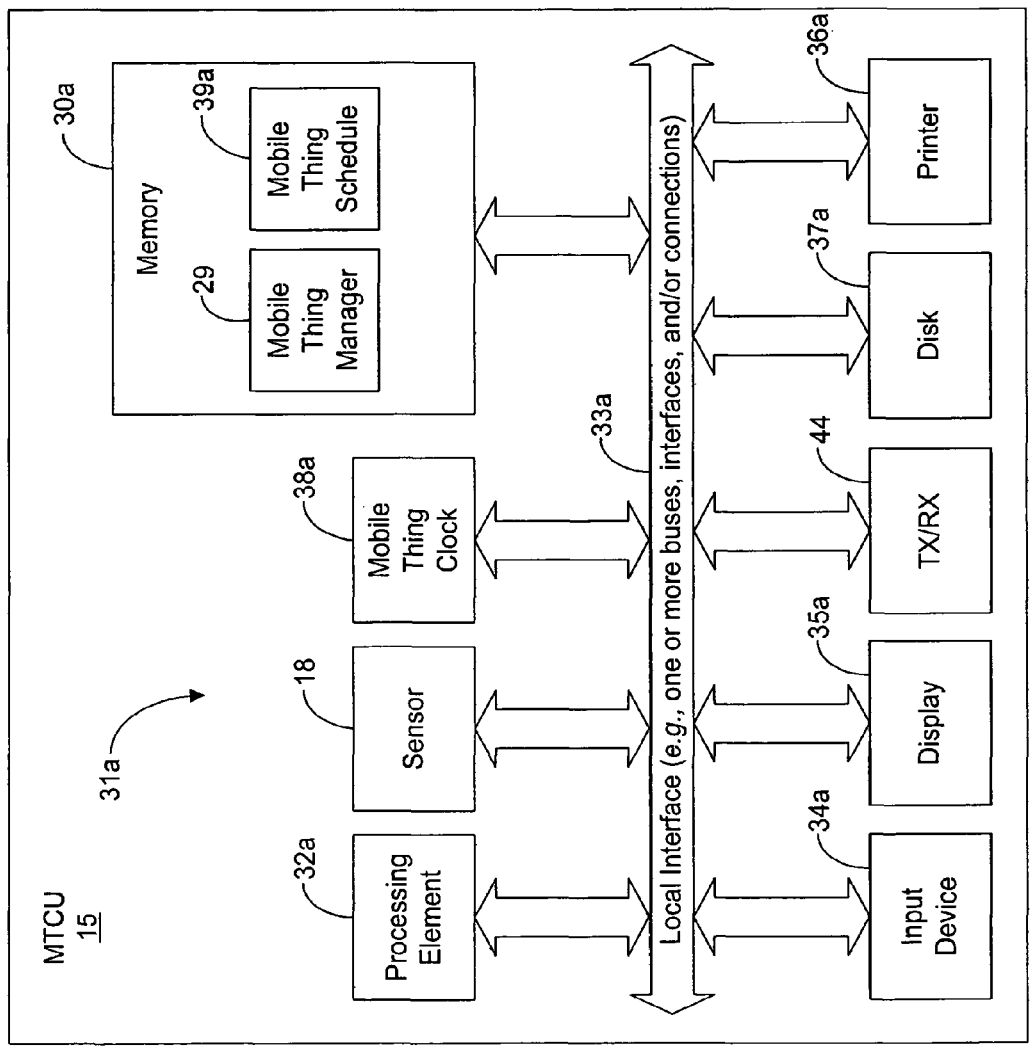
FIG. 2 is a block diagram illustrating an exemplary implementation of a computer system implementing the functionality of the mobile thing manager of FIG. 1.

An exemplary embodiment of the computer system 31*a* of FIG. 2 comprises one or more conventional processing elements 32*a*, such as microprocessors, digital signal processors (DSPs), or other suitable processing means, that communicate to and drive the other elements within the system 31*a* via a local interface 33*a*, which can include one or more buses. Furthermore, an input device(s) 34*a*, for example, a keyboard, mouse, or trackball, can be used to input data from a user of the system 31*a*, and screen display(s) 35*a* or a printer(s) 36*a* can be used to output data to the user. A nonvolatile disk storage mechanism 37*a* can be connected to the local interface 33*a* to transfer data to and from a nonvolatile disk (e.g., magnetic, optical, etc.). It should be noted that input device 34*a*, display 35*a*, printer 36*a*, and disk storage mechanism 37*a* are optional and are not a part of the preferred embodiment, although other embodiments may include these features.

The MT manager 29 is preferably configured to maintain a predefined MT schedule 39*a* within memory 30*a*. The predefined MT schedule 39*a* corresponds with a route of travel for the MT 17. In this regard, the predefined MT schedule 39*a* stored in memory 30*a* includes data defining locations along the MT's intended route of travel. Furthermore, each location is associated with a particular time value indicating when the MT 17 is expected to reach the associated location. Each time value along with its associated location defines an entry in the MT schedule 39*a*.

In the preferred embodiment, the time value corresponds to the estimated amount of time that should lapse between the time that the MT 17 starts its intended route and the time that the MT 17 reaches the associated location along the route. However, other time values may be used. For example, the time of day that the MT 17 is expected to reach the associated location may be used. Any time value that indicates when the MT 17 is expected to reach the associated location is sufficient. However, for illustrative purposes, the system will be discussed hereinafter assuming that the time values in the entries of the MT schedule 39*a* conform to the preferred embodiment (i.e., that the time values represent the amount of time that should lapse between the time that the MT 17 starts its intended route and the time that the MT 17 reaches the associated location along the route).

The MT manager 29 is configured to monitor the amount of time that lapses as the MT 17 travels along the MT's route. For example, the computer system 31*a* can include a clock 38*a* that indicates the time of day. In this situation, the MT manager 29 is configured to store the time value of the clock 38*a* when the MT 17 begins the route. Therefore, the MT manager 29 can determine the amount of time that has lapsed since the start of the route by comparing the current time value of the clock 38*a* versus the stored time value for the start of the route. Alternatively, the clock 38*a* can be designed as a counter that begins timing or counting in response to a start signal transmitted by the MT manager 29. Therefore, the MT manager 29 transmits the start signal when the MT 17 starts the route, and thereafter, the MT manager 29 can determine the amount of time that has lapsed since the start of the route by analyzing the value of the clock 38a. Other devices and/or methodologies may be employed to determine the amount of time that has lapsed since the start of the route.

As the MT 17 travels along the predetermined route of travel, the MT manager 29 is configured to determine the MT's current position by analyzing the location values from the sensor 18. Furthermore, as the MT 17 travels, the MT 17 passes the points or locations along the route that are defined in the MT schedule 39a. The MT manager 29 is designed to compare the current location values of the MT 17 (i.e., of the sensor 18) with the location values defined by the MT schedule 39a in order to determine which entry in the MT schedule 39a corresponds with the current location of the MT 17. In the preferred embodiment, the entry that corresponds with the current location of the MT 17 is the entry having location values most closely matching the location values currently supplied by the sensor 18. In other words, the corresponding entry includes location values representing the location that is closest to the location of the MT 17. This entry will be referred to hereinafter as the "corresponding entry."

After determining which entry corresponds with the current location of the MT 17, the MT manager 29 is designed to determine whether the MT 17 is off schedule or on schedule. The MT 17 is off schedule if the amount of time that has lapsed since the start of the route differs from an estimated lapsed time by a predetermined amount of time. In the preferred embodiment, the estimated lapsed time is represented by the time value in the corresponding entry of the MT schedule 39a. As an example, assume for illustrative purposes only that the predetermined amount of time is five minutes. If the MT manager 29 determines that the difference between the actual lapsed time since the start of the trip and the estimated lapsed time (i.e., the time value in the corresponding entry) is greater than five minutes, then the MT 17 is off schedule. Otherwise the MT 17 is on schedule.

Furthermore, if the MT 17 is off schedule, then the MT manager 29 is also designed to determine whether the MT 17 is early or late. If the actual time lapsed since the start of the trip is greater than the estimated lapsed time, then the MT 17 is late. If the actual time lapsed since the start of the trip is less than the estimated lapsed time, then the MT 17 is early.

Alternatively, the MT manager 29 can be configured to select the corresponding entry in the predefined schedule 39a via comparison of time values instead of location values. In this regard, the MT manager 29 can be configured to compare the current time value indicated by the clock 38a (e.g., the lapsed time since the start of the route) with the time values in the entries of the MT schedule 39a. The corresponding entry is then the entry in MT schedule 39a having the estimated time value that differs the least with the actual time value indicated by clock 38a.

In this situation, the MT manager 29 compares the current location values from sensor 18 with the location values associated with the corresponding entry of the MT schedule 39a in order to determine whether or not the MT 17 is on schedule. If the location values differ by more than a predefined threshold value, then the MT 17 is off schedule. Otherwise, the MT 17 is on schedule. Furthermore, if the actual location of the MT 17 (as defined by the current location values from sensor 18) is further along the route of travel than the location associated with the corresponding entry (as defined by the location values in the corresponding entry), then the MT 17 is early. If the location associated with the corresponding entry (as defined by the location values in the corresponding entry) is further along the route of travel than the actual location of the MT 17 (as defined by the current location values from sensor 18), then the MT 17 is late.

In response to a determination by the MT manager 29 that the MT 17 is off schedule, the MT manager 29 is designed to transmit a status message to base station control unit 40 (BSCU; FIG. 1; essentially, the host computer), which is remotely located from the MT 17. The status message preferably indicates that MT 17 is off schedule and indicates the amount that MT 17 is off schedule. U.S. Pat. No. 6,363,254 entitled, "System and Method for Enciphering and Communicating Vehicle Tracking Information," describes a system and method for transmitting messages to BSCU 40. The foregoing document is incorporated herein by reference.

C. Base Station Control Unit (BSCU)

BSCU 40 preferably, although not necessarily, includes a base station (BS) manager 41 designed to monitor the travel of each MT 17 associated with the notification system 10. In the preferred embodiment, although not limited to this implementation, unlike the MTCU 15, the BSCU 40 is non-mobile (although it could be in some embodiments). As an example, the BSCU 40 can be located in a central office of a telephone company.

The BS manager 41 can be implemented in software, hardware, or a combination thereof. In the preferred embodiment, as illustrated by way of example in FIG. 3, the BS manager 41 along with its associated methodology is implemented in software and stored in computer memory 30b of a computer system 31b. The computer system 31b can be similar to computer system 31a, as can be seen by comparing FIG. 2 to FIG. 3. In this regard, the computer system 31b may include memory 30b for storing the BS manager 41, and the computer system 31b may also include processing element 32b for executing software, local interface 33b for connecting the various components, input device(s) 34b (e.g., mouse, keyboard, etc.), display(s) 35b, printer(s) 36b, and nonvolatile storage device(s) 37b. In the preferred embodiment, transceiver (TX/RX) device(s) 52, 72 include one or more suitable network interfaces that allow the system 31b to communicate data in connection with network 55 (FIG. 1).

D. Transmission of a Status Message

In order to transmit the status message to the BSCU 40, the MT manager 29 is configured to transmit the status message, via signal 43 (FIG. 1), to a communications device 44, which is capable of transmitting and receiving data to and from devices outside of MT 17. In this regard, communications device 44 is preferably, although not necessary, a cellular modem configured to transmit and receive wireless signals to and from a cellular network 48 (FIG. 1).

The communications device 44 can transmit the status message over the voice channels associated with the cellular network 48, as is done by most cellular modems of the prior art. However, in order to reduce the cost associated with transmitting the travel data through the cellular network 48, the status message may be communicated through the cellular network 48 via a data or control channel. In this regard, the status message can be encoded by altering identifiers of the communications device 44, such as the mobile identification number (MIN) or electronic serial number (ESN), transmitted over a data channel of the cellular network 48. Alternatively, the status message can be appended to a feature request transmitted over the data channel. As examples, U.S. Pat. No. 5,771,445 entitled, "Data Messaging in a Communications Network using a Feature Request," filed on Dec. 15, 1995, by Kennedy, Ill., et al., and U.S. Pat. No. 5,546,444 entitled, "Methods and Apparatus for Communicating Data Via a Cellular Network Control Channel" filed on Mar. 11, 1994, by Roach, Jr., et al., which are both incorporated herein by reference, discuss the transmission of travel data over a data or control channel associated with the cellular network 48 in further detail. Also, see U.S. Pat. No. 5,526,401, which is incorporated herein by reference and which describes a system for communications over a wireless network as well as text messaging to personal pagers. Also, see U.S. Pat. No. 5,544,225, which is incorporated herein by reference and which describes a system for communications over a wireless network as well as communication of the location or status information of a mobile item.

In order to transmit the status message through a data channel by manipulating identifiers of the communications device 44, the MIN of the communications device 44 is altered to include the status message, but the ESN remains fixed to be used as an identifier of the communications device 44. Therefore, after transmitting the identifiers through the data channel, the communications device 44 can be identified by the ESN, and the status message can be determined from the MIN. Alternatively, the ESN of communications device 44 can be altered while the MIN is kept constant. It should be understood that the invention contemplates modification of the MIN, ESN, both the MIN and ESN, or other identifiers of the communications device 44 to accomplish the dual task of transmitting status messages and identifying the communications device 44.

Alternatively or in combination with the manipulation of the identifiers of the communications device 44, the status message can be communicated through the data channel by appending the status message to feature requests that are transmitted through the data channel. In this regard, most feature requests are generated by automatically or manually dialing the star key ("*") followed by a two-digit feature request identification code, and 29 digits of data. Therefore, for each feature request generated, 29 digits of data pertaining to the status message can be appended to the two-digit feature request identification code and sent over the data channel of the wireless cellular network 48. Other embodiments may transmit different amounts of data following the feature request. By utilizing the manipulation of identifiers or the appendage of travel data to feature requests, less data is transmitted through the voice channels of the cellular network 48, thereby reducing the cost of transmitting data through the cellular network 48.

In order for successful communication to exist between MT manager 29 and BS manager 41, both managers 29 and 41 should be aware of the communications protocol utilized. Therefore, it is desirable for the BS manager 41 or the MT manager 29 to initially transmit an instruction via the data channel of the cellular network 48 to the other manager 29 or 41 indicating the protocol to be utilized. Thereafter, the MT manager 29 transmits messages to the BS manager 41 via the selected protocol.

Cellular network 48 is designed to transmit the status message to a communications device 52 (FIG. 1) at the BSCU 40. Although not necessary for implementation, cellular network 48 is preferably designed to transmit to the communications device 52 via a public switched telephone network (PSTN) 55. In this regard, PSTN 55 establishes a link between communications device 52 and cellular network 48, whereby cellular network 48 and communications device 52 can communicate via signals 61 and 65, which are transmitted over land-line connections in the preferred embodiment. Therefore, communications device 52 is preferably designed as or to include a PSTN modem capable of communicating signals 65 between BS manager 41 and PSTN network 55.

Although the preferred embodiment utilizes a cellular network 48 and a PSTN network 55 to communicate travel data to BS manager 41, one ordinarily skilled in the art should realize that other configurations are possible. For example, communications device 52 can be configured as a cellular modem capable of communicating signals directly with cellular network 48. Alternatively, utilization of communications networks 48 and 55 can be completely circumvented by configuring the communications device 44 to communicate directly with communications device 52, for example. Any embodiment capable of communicating data between MT manager 29 and BS manager 41 should be suitable.

It should be noted that by transmitting a status message only when the MT 17 is off schedule reduces the cost of operating the notification system 10. In this regard, communication through a cellular network 48 is relatively expensive, and the cost is based on the amount of data transmitted. By refraining from transmitting any data from the MT manager 29 to the BS manager 41 when the MT 17 is on schedule, the amount of data transmitted through the cellular network 48 is reduced, thereby reducing the communications cost associated with the notification system 10. Therefore, the methodology of assuming the MT 17 is on schedule and of only transmitting data to the BS manager 41 when the MT 17 is off schedule enables the notification system 10 to minimize costs. It should be noted that the foregoing feature is optional.

E. Base Station Manager

BS manager 41 is designed to monitor the travel of the MT 17 and (when employed in the context of advance notification system 10) is also designed to transmit a notification message to a user when the MT 17 is a predetermined proximity from a particular MT destination or other location. The predetermined proximity can be a particular time or distance that the MT 17 is from the destination. If the MT 17 is off schedule, then the BS manager 41 is further configured to transmit a message to the user indicating that the MT 17 is off schedule.

The BS manager 41 of tracking notification system 10 is designed to determine the current location of the MT 17 and to compare the current location of the MT 17 to a predefined location along the route of travel of the MT 17 in order to determine whether notification should be sent to the user. In this regard, like the MT manager 29, the BS manager 41 includes a predefined schedule 39b, referred herein as the "base station schedule 39b," in memory 30b. Furthermore, similar to the computer system 31a (FIG. 2), the computer system 31b (FIG. 3) includes a clock 39b or other type of counter that can be used to determine the amount of time that has lapsed since the MT 17 started traveling along the MT's route. When the MT 17 begins the route, the MT manager 29 preferably transmits a message to the BS manager 41 via communications devices 44 and 52 indicating that travel on the route is beginning. In response, the BS manager 41, like the MT manager 29, begins monitoring the amount of time lapsed since the start of the route.

In the preferred embodiment, the base station schedule 39b stored in memory 30b matches the MT schedule 39a stored in memory 30a, although variations in the two predefined schedules 39a and 39b are possible. Furthermore, the BS manager 41 is configured to retrieve an entry, the "corresponding entry," in the base station schedule 39b corresponding with the amount of time lapsed since the MT 17 began travelling its route. In this regard, the BS manager 41 compares the amount of time that has lapsed since the MT 17 began its route (as determined from the clock 38b at the BSCU 40) with the time values in the base station schedule 39b. The corresponding entry in the base station schedule 39b is the entry having the time value differing the least with the value indicated by the clock 38b (i.e., the time value indicating the amount of time that has lapsed since the MT 17 began its route).

The BS manager 41 assumes that the MT 17 is on schedule, unless the BS manager 41 has received a recent status message from the MT manager 29. As used herein, a "recent status message" is the most recent status message that has been received by the BS manager 41 within a predetermined time. For example, a recent status message could be the latest status message received within the last five minutes, or at the start of a route, or some other suitable time frame. Therefore, if the BS manager 41 has not received a recent status message from the MT manager 29, then the BS manager 41 assumes that the location values in the corresponding entry of the predefined base station schedule 39b indicate the current location of the MT 17.

Recalling that BS manager 41 (when employed within the context of notification system 10) is to transmit a notification message when the MT 17 is a predetermined proximity from a particular location (e.g., a predefined MT stop, etc.), the BS manager 41 then compares the location values in the corresponding entry (which represent the current location of the MT 17) with location values defining the predetermined proximity. If the location values from the corresponding entry differ from the location values of the predetermined proximity by less than a predetermined amount, then the BS manager 41 transmits a notification message to the user. Otherwise no notification message is transmitted to the user.

Alternatively, the BS manager 41 can be configured to compare time values instead of location values in order to determine whether a notification message should be transmitted to the user. In this regard, the BS manager 41 is designed to compare the time value in the corresponding entry with a predetermined threshold value indicating the amount of time that should lapse between the MT 17 starting its route and arriving at a location associated with the predetermined proximity (e.g., a threshold value indicating how long the MT 17 should travel along its route before notification should be sent to the user). If the threshold value in the corresponding entry exceeds the predetermined time value, then the BS manager 41 causes a notification message to be communicated to the user.

If the BS manager 41 of notification system 10 has received a recent status message from the MT manager 29, then the BS manager 41 determines the actual location values of the MT 17 based on the location values in the corresponding entry and the recent status message. In this regard, the location values in the corresponding entry represent the estimated location of the MT 17. The status message indicates how much the MT 17 is off schedule (i.e., how far the MT 17 is from the estimated location). For example, the status message can indicate that the MT 17 is five miles off schedule.

Therefore, the BS manager 41 is designed to calculate new location values based on the estimated location and the status message. These new location values represent the actual location of the MT 17. Therefore, by using the new location values instead of the values in the corresponding entry, the BS manager 41 can determine whether a notification message should be sent to the user according to the methodology described hereinabove.

Furthermore, instead of indicating how far the MT 17 is from the estimated location via location values, the status message can indicate how far the MT 17 is from the estimated location via a time value (e.g., the status message can indicate that the MT 17 is ten minutes late). In this case, the BS manager 41 is designed to adjust the time value in the corresponding entry to account for the MT 17 being off schedule. For example, if the MT 17 is early, then the time value in the corresponding entry is increased a corresponding amount, and if the MT 17 is late, then the time value in the corresponding entry is decreased a corresponding amount. This adjusted time value is then compared with the predetermined threshold value described hereinabove in order to determine whether notification should be sent. If the adjusted time exceeds the predetermined time value, then the BS manager 41 causes a notification message to be transmitted to the user.

In an alternative embodiment, the location values transmitted in the status message can represent the actual location of the MT 17 instead of representing how far the MT 17 is off schedule. In this embodiment, the BS manager 41 can be designed to directly compare these location values with the location values defining the predetermined proximity in order to determine whether notification should be sent to the user. Accordingly, if these location values differ from the location values defining the predetermined proximity by less than a predetermined amount, then the BS manager 41 transmits a notification message to the user. Otherwise, no notification message is sent to the user.

Furthermore, when the BS manager 41 determines that the MT 17 is off schedule, the BS manager 41 preferably transmits an off schedule message to the user, as described hereinbelow, to notify the user that the MT 17 is off schedule. This message can include a variety of information including, but not limited, how much (in time or distance) the MT 17 is off schedule. However, it should be noted that communication of the off schedule message is not a necessary feature.

F. Transmission of Off Schedule and Notification Messages

Once the BS manager 41 of systems 10 and 12 determines that a notification or an off schedule message should be sent to a user, the BS manager 41 is designed to communicate the message to the user via PSTN network 55 and communications devices 72 and 73 (FIG. 1). In this regard, communications devices 72 and 73 are or include PSTN transceiver modems capable of interfacing with and communicating with PSTN network 55. BS manager 41 is designed to transmit the message as signal 70 to user communications device 72, which communicates the message with PTSN network 55 via signal 74. PTSN network 55 then communicates the message to personal communications device (PCD) 75, which has a receiver and a transmitter, or a transceiver, denoted by block 73, in the preferred embodiment.

PCD 75 is configured to notify the user and communicate a notification message, which may merely be a ring in the case of a telephone or pager, optionally accompanied by an audible, text, and/or other message that can be communicated. A PCD 75 is a communications device that can be personally associated with a party and enable point-to-point communications between the notification system 10 and the party. Nonlimiting examples of PCDs 75 are as follows: a personal computer (PC) capable of displaying the notification through e-mail or some other communications software, a television, a wireless (e.g., cellular, satellite, etc.) or non-wireless telephone, a pager, a personal data assistant, a navigation system in a motor vehicle, a radio receiver or transceiver, or any other device capable of notifying the user with some type of user perceptible emission. Many, although not all, PCDs 75 are transportable. Furthermore, a plurality of communications devices 72 may exist in some applications, so that the BS manager 41 can simultaneously or substantially concurrently notify a plurality of parties having respective devices 72 of the impending arrival of the MT 17 at a particular MT stop.

Note that examples of useful PCDs 75 that can be utilized to implement many of the features described in this document are portable wireless telephones having image capabilities (e.g., a Sanyo Model 8100 wireless PCS vision picture phone distributed by Sprint, a Sony Ericsson T300 wireless picture phone distributed by T Mobile, etc.). The Wireless Access Protocol (WAP; developed by the WAP Forum; see WAP Version 2.0 specification at www.wapforum.org, which is incorporated herein by reference in its entirety) can be implemented in connection with wireless telephones in order to enable these telephones to communicate with (send data packets to and/or receive data packets from) computers or computer-based devices, such as servers, that are communicatively coupled to the World Wide Web (WWW) of the Internet (by way of their respective cellular or PCS networks).

Note further that the PCDs 75 can be non-standard input/output (I/O) devices that can be communicated with over an open network, such as the Internet, using an extended open network protocol, such as extended HTML, as is described in U.S. Pat. Nos. 5,742,845 and 5,905,908, both of which are incorporated herein in their entirety by reference.

Although the preferred embodiment utilizes a PSTN network 55 to communicate a notification or an off schedule message to PCD 75, one ordinarily skilled in the art should realize that other configurations are possible. For example, other communications networks can be utilized or utilization of communications networks can be completely circumvented by configuring communications device 72 to communicate directly with communications device 73. Any communications system capable of communicating data between BS manager 41 and PCD 75 should be suitable.

As an example, the BS manager 41 may notify the user of the impending arrival of the MT 17 by transmitting a distinctive ring to the user's message device. In this embodiment, the PCD 75 is a telephone. A distinctive ring is a ringing cadence that is different than the standard ringing cadence used to notify the user of a telephone call. Since the user can different the different ringing cadence, the user is aware that the telephone call corresponds to a notification message from the BS manager 41 indicating that arrival of the MT 17 is imminent. A system for transmitting a distinctive telephone ring as the notification message is fully described in U.S. patent application entitled, "Advance Notification System and Method Utilizing a Distinctive Telephone Ring," assigned Ser. No. 08/762,052 and filed on Dec. 9, 1996, which is incorporated herein by reference.

G. Creation of the MT and Base Station Schedules

It should be noted that the predefined MT schedule 39a and the predefined base station schedule 39b can be determined or defined by a variety of methodologies. For example, the predetermined schedules 39a and 39b can be estimated based on various factors, such as the types of speeds likely to be traveled by the MT 17 and the types of traffic conditions expected to be encountered during travel. However, in the preferred embodiment, the predefined schedules 39a and 39b are defined via a previous delivery of the MT 17 along the same route of travel.

In this regard, delivery vehicles 17 frequently travel the same routes. This is especially true for buses, for example, where a bus routinely travels the same route and makes the same stops. As the MT 17 is traveling the route, the MT manager 29 is configured to periodically read the sensor 18 and to store an entry in memory 30a. The entry preferably includes the current location values of the MT 17 indicated by sensor 18 and the time value indicated by clock 38a (i.e., the time value indicating the amount of time that has lapsed since the start of the travel on the route). Therefore, when the MT 17 reaches the end of the route, the MT manager 29 has stored numerous entries which define the predefined MT schedule 39a. This predefined schedule 39a may also be used as the base station schedule 39b. Other methodologies may be employed to define the MT schedule 39a and/or the base station schedule 39b.

Figure 4A:
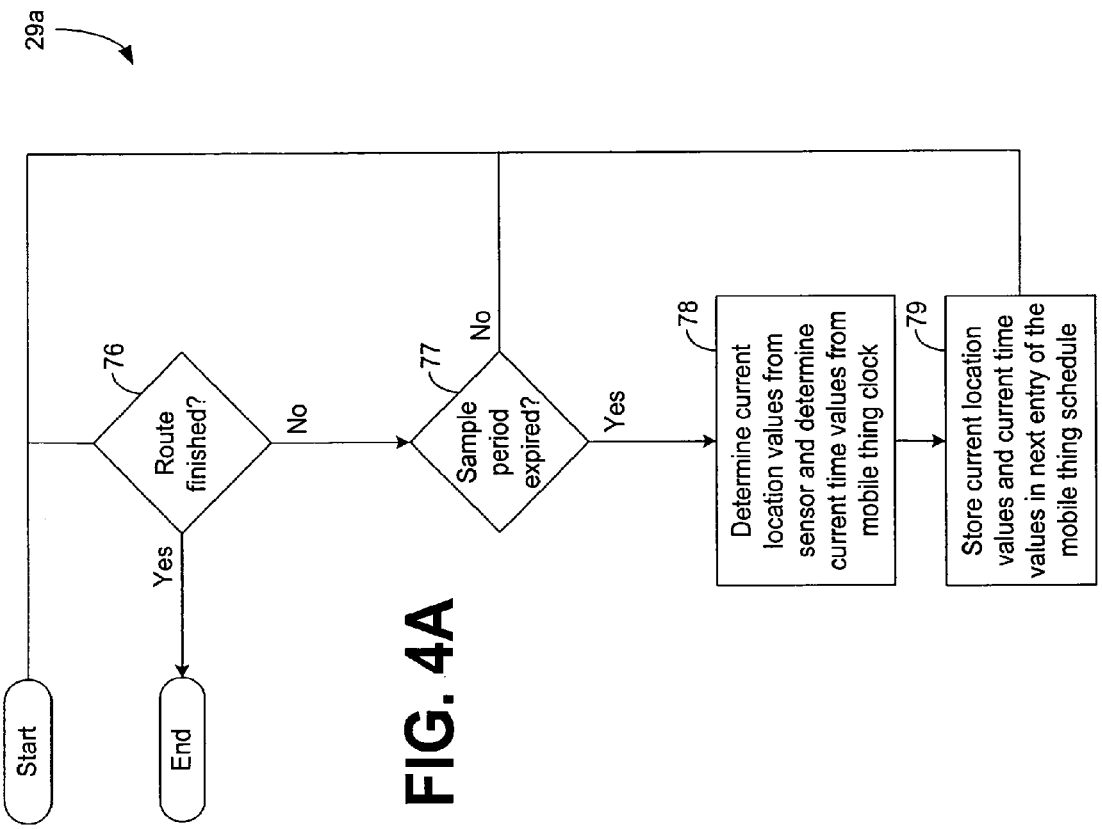
FIG. 4A is a flow chart illustrating an exemplary implementation of at least part of the architecture, functionality, and operation of the mobile thing manager of FIG. 1 that creates the mobile thing schedule.

FIG. 4A is a flow chart depicting the operation and functionality of the MT manager 29 in embodiments where the MT manager 29 determines the MT schedule 39a while traveling along the route of travel. As shown by blocks 76 and 77, the MT manager 29 determines whether a sample period has expired while the MT 17 is traveling on the route (i.e., before the MT 17 has finished the route). The sample period is a predetermined amount of time that lapses between samples, which will be discussed in more detail hereinbelow. Preferably, the MT clock 38a indicates whether the sample period has expired. For example, when the clock 38a is a counter, the sample period can be defined as a predetermined number of counts by the clock 38a. Therefore, the MT manger 29 can determine whether the sample period has expired by counting the number of increments or cycles of the clock 38a.

When the MT manager 29 determines that the sample period has expired, the MT manager 29 samples the current location values of the MT 17 and the time value of the clock 38a. In other words, the MT manager 29 determines the current location values of the MT 17 and the current time value from the clock 38a and stores these values in the next entry of the MT schedule 39a, as depicted by blocks 78 and 79. This process repeats until the MT manager 29 determines that the MT 17 has completed the route. Thereafter, the MT manager 29 can use the MT schedule 39a to track the MT's progress on future deliveries that utilize the route defined by the MT schedule 39a.

H. Alarm System

The MT manager 29 can be configured to compare the corresponding entry and the location values supplied from the sensor 18 in order to determine whether an alarm signal should be generated. In this regard, the MT manager 29 preferably subtracts the location values in the corresponding entry from the current location values of the MT 17 (as determined by the sensor 18) to produce a deviation indicator. Therefore, the deviation indicator indicates how far the MT 17 has deviated from the route defined by the MT schedule 39a.

The MT manager 29 is then designed to compare the deviation indictor to an alarm threshold value to determine whether an alarm signal should be transmitted to the BS manager 41. The alarm threshold value corresponds with the distance that the MT 17 can deviate from the predefined MT schedule 39a before an alarm is generated. Therefore, if the deviation indicator exceeds the alarm threshold value, the MT manager 29 transmits an alarm message to the BS manager 41 via communications devices 44 and 52. Preferably the alarm message includes the current location values produced by the sensor 18 so that the travel of the MT 17 can be tracked by the BS manager 41.

Providing an alarm message, as described hereinabove, helps to discover when an MT 17 has been stolen or hijacked and helps law enforcement agencies to recover the MT 17 by tracking the travel of the MT 17 once the MT 17 has been stolen. In this regard, the MT manager 29 automatically generates an alarm message and monitors travel of the MT 17 once the MT 17 deviates from the MT schedule 39a by a predetermined amount. The alarm message can be used by law enforcement agencies to discover when the MT 17 has been stolen and where the MT 17 is located, thereby helping law enforcement agencies to recover the MT 17 once it has been stolen.

Because the deviation indicator is defined relative to points along the MT's route of travel, an alarm can be generated when the MT 17 deviates from the route by a relatively small amount. For example, the MT manager 29 can be configured to transmit an alarm signal when the MT 17 deviates from its predefined route by approximately 20 feet. Other distances, both less than and greater than 20 feet, may be used to trigger an alarm signal. However, it is generally desirable that a certain amount of deviation (depending on the expected driving conditions and the precision of sensor 18) be allowed so that the MT 17 can reasonably maneuver through traffic without generating false alarms.

In addition, the alarm threshold value is selectable in the preferred embodiment. This value can be entered into the computer system 31a by a human operator at the MT 17 via input device 34a, for example. Alternatively, this value can be communicated from the BS manager 41 to the MT manager 29 via communications devices 44 and 52 at or around the start of the route. The alarm threshold value can also be hardwired into the computer system 31a with switches that can be manipulated by a human operator in order to selectively change the value. Many other methodologies known in the art may be used for selecting the value of the alarm threshold value.

It should be noted that in other embodiments, it may be desirable for the MT manager 29 to generate an alarm signal based on comparisons of the location of MT 17 to a predefined geographical region instead of the route defined in MT schedule 39a. For example, it may desirable to define a region that is 30 miles (or some other distance) from the start of the route (or some other particular location). Then, the MT manager 29 can be configured to generate an alarm signal if the MT manager 29 determines that the MT 17 is outside of this predefined region based on the signals 27 received from sensor 18. Such a methodology for generating an alarm signal is particularly suitable for applications where only local deliveries are expected, for example.

There are various methodologies for determining whether the MT 17 is outside of the predefined region. For example, in one embodiment, the MT manger 29 subtracts the current location values determined from signals 27 with the location values of a particular point (e.g., the location values of the start of the route, when the region is defined as any point within a certain distance of the start of the route) to derive the deviation indicator. As in the preferred embodiment, if the deviation indicator has a magnitude greater than the alarm threshold value, the MT manager 29 generates an alarm signal. Otherwise, no alarm signal is generated.

Further note that U.S. Pat. No. 5,751,245, which is entirely incorporated herein by reference describes an alarm system that can be employed when a vehicle substantially departs from a predetermined route, for the security of transported cargo.

J. Alternative Embodiment of the MTCU

In an alternative embodiment of the MTCU, the "corresponding entry" of the MT schedule 39a can be defined as the entry having location values defining a location along the route that was most recently passed by the MT 17. Therefore, the MT manager 29 monitors the signals 27 from the sensor 18 until the MT manager 29 determines that the MT 17 passed a location corresponding with one of the entries in the MT schedule 39a. The MT manager 29 determines whether the MT 17 is early or late via the techniques described hereinabove using the aforementioned entry as the corresponding entry.

After determining whether to generate an alarm signal and/or status message for the corresponding entry (and after generating the alarm signal and/or the status message, if necessary), the MT manager 29 monitors the signals 27 again for the next corresponding entry. Therefore, when a corresponding entry is detected (i.e., when the MT manager 29 determines that the MT 17 passed a location corresponding with the location values in one of the entries of the MT schedule 39a for the first time), the MT manager 29 analyzes the values of the sensor 18, the clock 38a, and the corresponding entry to determine whether an alarm signal and/or status message should be generated. Thereafter, the MT manager 29 waits until the next corresponding entry is detected before determining whether to generate another status message. Therefore, the MT manager 29 determines whether a status message should be communicated to the BS manager 41 each time the MT 17 passes a location corresponding with the location values in one of the entries of the MT schedule 39a, and the MT manager 29 refrains from communicating status messages as the MT 17 travels between locations defined by the data in the MT schedule 39a. In other words, the only time the MT manager 28 transmits a status message is when the MT 17 is passing a location corresponding with one of the entries in the MT schedule 39a or a short time thereafter.

However, since it is possible for the MT 17 not to pass any of the locations defined in the predefined schedule when the MT 17 deviates from the route (e.g., when the MT 17 is stolen), the MT manager 29 preferably determines whether to communicate an alarm signal periodically rather than waiting for one of the locations defined by the MT manager 29 to be passed.

K. Overall Notification System Operation

A possible implementation of use and operation of the notification system 10 and associated methodology are described hereafter. For illustrative purposes only, assume that the MT 17 is to travel a predetermined route to a destination where the MT 17 is to pick up or deliver an item. For example, assume that the MT 17 is a bus that is to travel to a bus stop to pick up a passenger and that this passenger is to receive a notification signal when the MT 17 is ten minutes from the bus stop.

Initially, the MT schedule 39a is stored in the MT manager 29 and the base station schedule 39a is stored in the BS manager 41. In the preferred embodiment, the MT schedule 39a was created and stored in the MT manager 29 as the MT 17 previously traveled along the same route. A copy of the MT schedule 39a is preferably transferred to the BS manager 41 via any suitable methodology and stored as the base station schedule 39a. For example, the MT schedule 39a can be copied to a magnetic disk and later downloaded in memory 30b or a copy of the MT schedule 39a can be transmitted to the BS manager 41 via communications devices 44 and 52.

In embodiments where the MT schedule 39a is not previously created and stored by the MT manager 29, the MT schedule 39a is preferably downloaded into both the BS manager 41 and the MT manager 29. It is possible to download the base station schedule 39a in the BS manager 41 and to transmit a copy of the base station schedule 39a to the MT manager 29 via communications devices 44 and 52 prior to the start of the route. Any methodology for respectively storing the MT schedule 39a and the base station schedule 39b into the MT manager 29 and the BS manager 41 is suitable.

When the MT 17 begins travel, the MT manager 29 stores the current value of the MT clock 38a and begins to monitor the amount of time that lapses from that point until completion of the route. Furthermore, as can be seen by block 82 of FIG. 4B, the MT manager 29 also transmits a start signal to the base station manger 41 via communications devices 44 and 52 indicating that travel of the MT 17 is beginning. In response, the BS manager 41 begins to monitor the lapsed time as well.

In many situations, it may be desirable to begin monitoring travel of the MT 17 after the MT 17 starts its route. This is particularly true when unpredictable delays usually occur close to the staring point of the route. For example, when the MT 17 is a school bus taking children home from school, unpredictable delays may occur close to the starting point (i.e., at the school) where traffic is often congested. Therefore, instead of transmitting a start signal to the BS manager 41 when the MT 17 begins traveling, the MT manager 29 waits for a predetermined time period or until the MT 17 has traveled a predetermined distance from the starting point before transmitting the start signal. For example, the MT manager 29 can monitor the travel of the MT 17 from the starting point via the sensor 18 and transmit the start signal once the MT manager 29 determines that the MT has traveled one-eighth of a mile from the starting point. In this regard, location values representing a predetermined point along the route of travel and one-eighth of a mile from the starting point can be stored in the MT manager 29. When the MT manager 29 determines that the MT 17 passes this point, the MT manager 29 determines that the MT 29 has traveled more than one-eighth of a mile and transmits the start signal.

Preferably, the predetermined schedules 39a and 39b both use the point where the MT manager 29 transmits the start signal as the starting point for the route. Therefore, the distances and times stored in the predetermined schedules 39a and 39b are relative to the predetermined location where MT manager 29 transmits the start signal instead of the actual starting point of the route. However, this is not a necessary feature, and the location values and time values stored in the predetermined schedules 39a and 39b may be relative to other points both along the route of travel and outside of the route of travel.

Figure 4B:
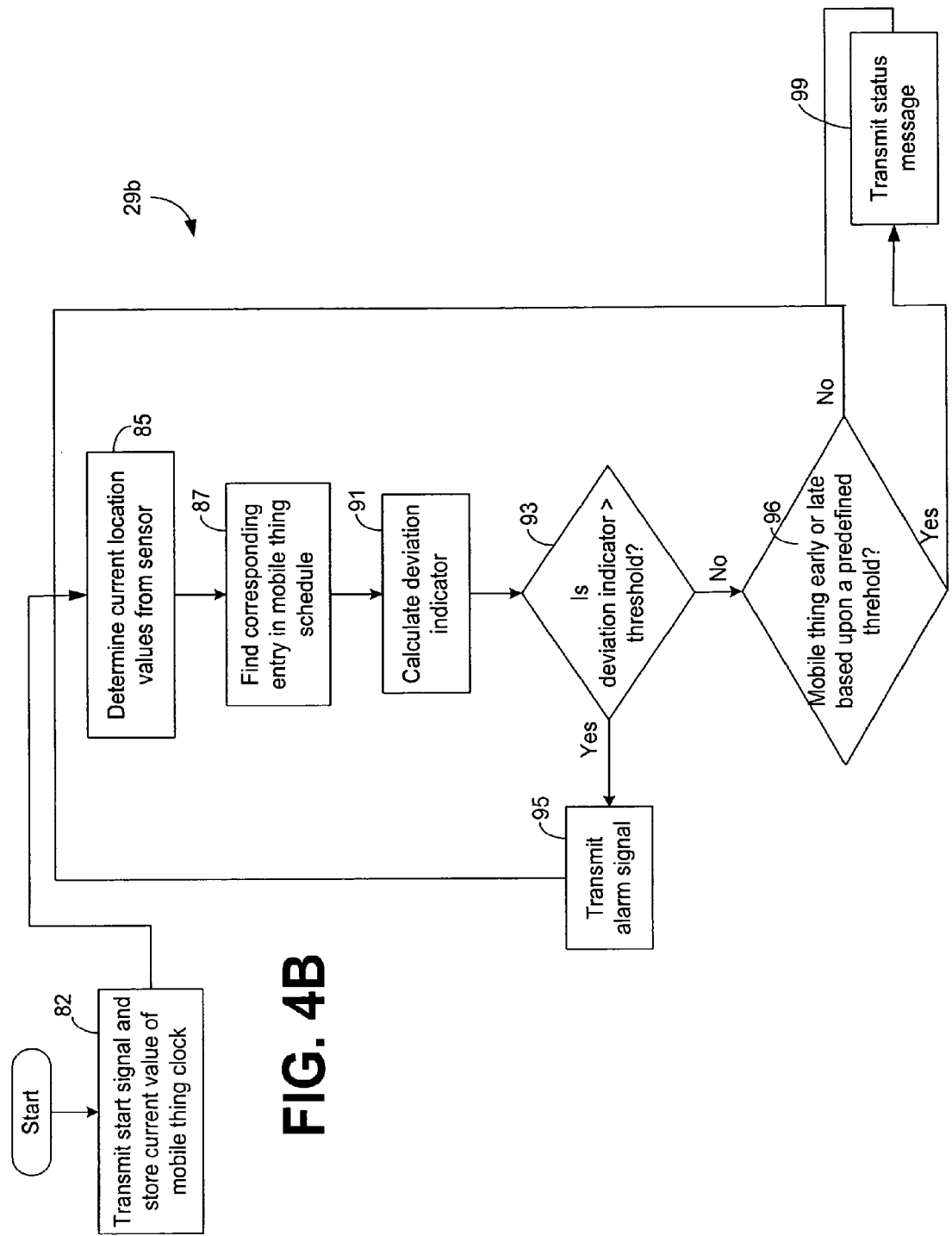
FIG. 4B is a flow chart illustrating an exemplary implementation of at least part of the architecture, functionality, and operation of the mobile thing manager of FIG. 1 that tracks the mobile thing.

As the MT 17 travels, GPS satellites 23 transmit wireless signals 21 to sensor 18 that can be analyzed through techniques well known in the art to determine a position (i.e., current location values) of the sensor 18 (and, therefore, of the MT 17) relative to a particular reference point, as depicted by block 85 of FIG. 4B. For example, in GPS systems, the intersection of the Equator and the Prime Meridian is typically used as the reference point. Sensor 18 receives the signals 21 and determines location values representing the position of the MT 17 relative to the reference point and transmits these values to MT manager 29.

The MT manager 29 compares the current location values of the MT 17 with the location values in the MT schedule 39a in order to determine which entry in the MT schedule 39a corresponds with the current location of the MT 17, as shown by block 87 of FIG. 4B. The corresponding entry is preferably the entry having location values that most closely match the current location values received from the sensor 18.

After selecting the corresponding entry, the MT manager 29 retrieves the location values associated with the corresponding entry and subtracts these values from the current location values received from the sensor 18 and used by the MT manager 29 to select the corresponding entry. Referring to block 91 of FIG. 4B, the resulting value or values (referred to as the deviation indicator) indicates the MT's deviation from the MT schedule 39a. As shown by block 93 of FIG. 4B, the MT manager 29 then compares the deviation indicator to the alarm threshold value. If the deviation indicator exceeds the alarm threshold value, then the MT manager 29 transmits an alarm message to the BS manager 41, as depicted by block 95 of FIG. 4B. The alarm message includes the current location of the MT 18, and the BS manager 41 tracks the location of the MT 17 based on the alarm messages transmitted from the MT manager 29. The information provided by the alarm message can be used by law enforcement agencies to track the MT 17.

After determining whether an alarm message should be generated, the MT manager 29 retrieves the time value associated with the corresponding entry and compares it with the time value indicated by clock 38a (i.e., the time value indicating the amount of time elapsed since the start of the route). The MT manager 29 also retrieves a predetermined threshold value indicating how much the MT 17 can deviate from the MT predefined schedule 39a before the MT 17 is considered to be off schedule. Referring to block 97 of FIG. 4B, if the difference of the foregoing time values exceeds the predetermined threshold value, then the MT manager 29 determines that the MT 17 is off schedule. However, if the difference of the foregoing time values is less than the predetermined threshold value, then the MT manager 29 determines that the MT 17 is on schedule.

When the MT manager 29 determines that the MT 17 is on schedule, the MT manager takes no further action regarding the current location values received from the sensor 18. The MT manager 29 merely receives a new set of location values from the sensor 18 and analyzes the new set of values according to the methodology described herein. However, when the MT manager 29 determines that the MT 17 is off schedule, the MT manager 29 generates a status message and transmits the status message to the BS manager 41, as depicted by block 99 of FIG. 4B.

In this regard, the MT manager 29 determines whether the MT 17 is early or late and how far the MT 17 is off schedule (e.g., how many minutes or miles the MT 17 is from the location specified by the location values in the corresponding entry). The MT manager 29 then generates a status message including this information and transmits the status message to the BS manager 41 via communications devices 44 and 52.

In order to reduce the number of transmissions between the MT 17 and the base station control unit 40, the MT manager 29 preferably (although not necessary) transmits the status message to the BS manager 41 only if another status message has not been transmitted within a predetermined delay period. For example, if a status message has been sent within a predetermined time period, for example, within the last five minutes, then the MT manager 29 refrains from sending another status message. It should be apparent to one skilled in the art that other delay periods can be selected to update the location of the MT 17 at a desirable rate.

Furthermore, it is possible to selectively control the delay period. For example, when the MT 17 stops to make a delivery or is slowly traveling through congested areas, it may be desirable to increase the delay period to decrease the number of status messages sent to the BS manager 41. Alternatively, when the MT 17 is traveling quickly and the location of the MT 17 is changing rapidly, it may be desirable to decrease the delay period. Furthermore, when the MT 17 enters an area where no immediate deliveries or pick ups are to made, there is no immediate need to monitor the MT 17 and the delay period can be increased. The delay periods can be predefined in memory 30a, can be controlled by the operator of the MT 17, or can be controlled via signals transmitted from remote locations to the MT manager 29 (e.g., from the BS manager 41 to the MT manager 29 via communications device 44). Other methodologies for controlling the delay periods are possible.

Another way to reduce the number of transmissions of status messages at desired times is to selectively increase the predefined amount that the MT 17 should be off schedule before a status message is transmitted to the base station control manager 41. Similar to the changes in the delay periods described above, the changes to the aforementioned predefined amount can be predefined in memory 30a, can be controlled by the operator of the MT 17, or can be controlled via signals transmitted from remote locations to the MT manager 29 (e.g., from BS manager 41 to MT manager 29 via communications device 44).

The input device 34a (FIG. 2) can be used to input changes in the delay period and/or in the predefined amount that the MT should be off schedule before a status message is transmitted. In this regard, the input device 34 a may include switches, buttons, a key pad, or any other device that can be manipulated by the operator of the MT 17 to input the changes.

When the BS manager 41 receives a status message, the BS manager 41 stores the status message in memory 30b. If desired, the BS manager 41 transmits a message to the user via communications devices 72 and 73 indicating that the MT 17 is off schedule and indicating how much the MT 17 is off schedule in response to the status message.

The BS manager 41 periodically determines whether a notification message should be sent to the user indicating that arrival of the MT 17 at the bus stop is imminent (e.g., indicating that the MT 17 is ten minutes from the bus stop). In this regard, the notification message should be sent to the user when the MT 17 is within a predetermined proximity (i.e., a predetermined time or distance) from the bus stop. To determine whether the notification message should be sent, the BS manager 41 compares the location values of the current location of the MT 17 to the location values of the predetermined location (e.g., the bus stop). If the difference between the location values of the current location of the MT 17 and the bus stop is greater than a threshold value, then the MT 17 is too far from the bus stop for notification to be sent to the user. Therefore, a notification message is not generated. However, if the difference between the location values of the current location of the MT 17 and the bus stop is less than the threshold value, then a notification message is transmitted to the user via communications devices 72 and 73, unless a similar notification message (i.e., a message indicating that the MT 17 is off schedule by the same amount) associated with the bus stop has previously been sent to the user.

In determining the current location of the MT 17, the BS manager 41 assumes that the MT 17 is on schedule unless a recent status message has been received. Therefore, the MT manager 41 determines which entry in the base station schedule 39b corresponds to the assumed location of the MT 17. In this regard, the MT manager 41 compares the time values in the base station schedule 39b with a lapsed time value indicating how much time has lapsed since the MT 17 started the route. The entry having a time value closest to this lapsed time value is the corresponding entry. The location values associated with the corresponding entry represent the assumed location of the MT 17. Unless a recent status message has been received, the BS manager 41 uses these location values as the current location values to be compared against the location values of the predetermined location (e.g., the bus stop) in order to determine whether a notification message should be sent to the user. However, if a recent status message has been received, then the BS manager 41 determines the current location values of the MT 17 based on the recent status message and/or the location values associated with the corresponding entry.

For example, if the recent status message includes location values indicating the actual location of the MT 17, then the BS manager 41 uses these values to compare with the coordinate values of the predetermined location (e.g., the bus stop). However, if the status message only indicates how much the MT 17 is off schedule, then the BS manager 41 calculates the current location values of the MT 17 based on the status message and the location values associated with the corresponding entry in the base station schedule 39b.

Once the current location values of the MT 17 have been determined, the BS manager 41 compares the current location values of the MT 17 with the location values of the predetermined location (e.g., the bus stop) as previously described hereinabove to determine whether a notification signal should be transmitted to the user.

The operation of the preferred embodiment has been described hereinabove in the context where the MT manager 29 compares location values to determine the corresponding entry in the MT predefined schedule 39a. Therefore, the MT manager 29 compares the time value associated with the corresponding entry in the MT schedule 39a to determine whether or not the MT 17 is on schedule. However, it should be apparent to one skilled in the art upon reading this disclosure that time values may be compared by the MT manager 29 to determine the corresponding entry in the MT predefined schedule 39a.

In this regard, the entry in the MT schedule 39a having a time value most closely matching the lapsed time value indicated by the clock 38a (i.e., the value indicating the amount of time lapsed since the start of the route) can be selected as the corresponding entry. As a result, the MT manager 29 determines how far the MT 17 is off schedule based on distance rather than time. For example, if the difference between the current location values of the MT 17 (as determined by the sensor 18) and the location values associated with the corresponding entry is greater than a predetermined threshold value, then the MT 17 is off schedule. Otherwise, the MT 17 is on schedule. Furthermore, regardless of which embodiment is used to determine how far the MT 17 is off schedule, the MT manager 29 can indicate how far the MT 17 is off schedule via the status message using either distance values, time values, or any other type of values known in the art for indicating the position of the MT 17.

It should be noted that the preferred embodiment has been described hereinabove assuming that the sensor 18 is capable of determining the MT's location based on signals received from satellites 23. However, this is not a necessary feature, and any type of sensor 18 that may be used for determining the MT's position along the route of travel is sufficient. For example, the sensor 18 may be designed as an odometer that indicates how far the MT 17 travels. Therefore, the predetermined points along the route of travel used to determine whether the MT 17 is on or off schedule can be defined in the schedules 39a and 39b relative to their distance from the starting point of the route. In other words, the location values stored in the schedules 39a and 39b correspond to distance values indicating how far the predetermined points are from the starting point of the route. Therefore, the MT manager 29 can determine how far the MT 29 is from any of the predetermined points by determining how far the MT 17 has traveled from the starting point of the route.

L. User Notification Preferences and Reports

Figure 5A:
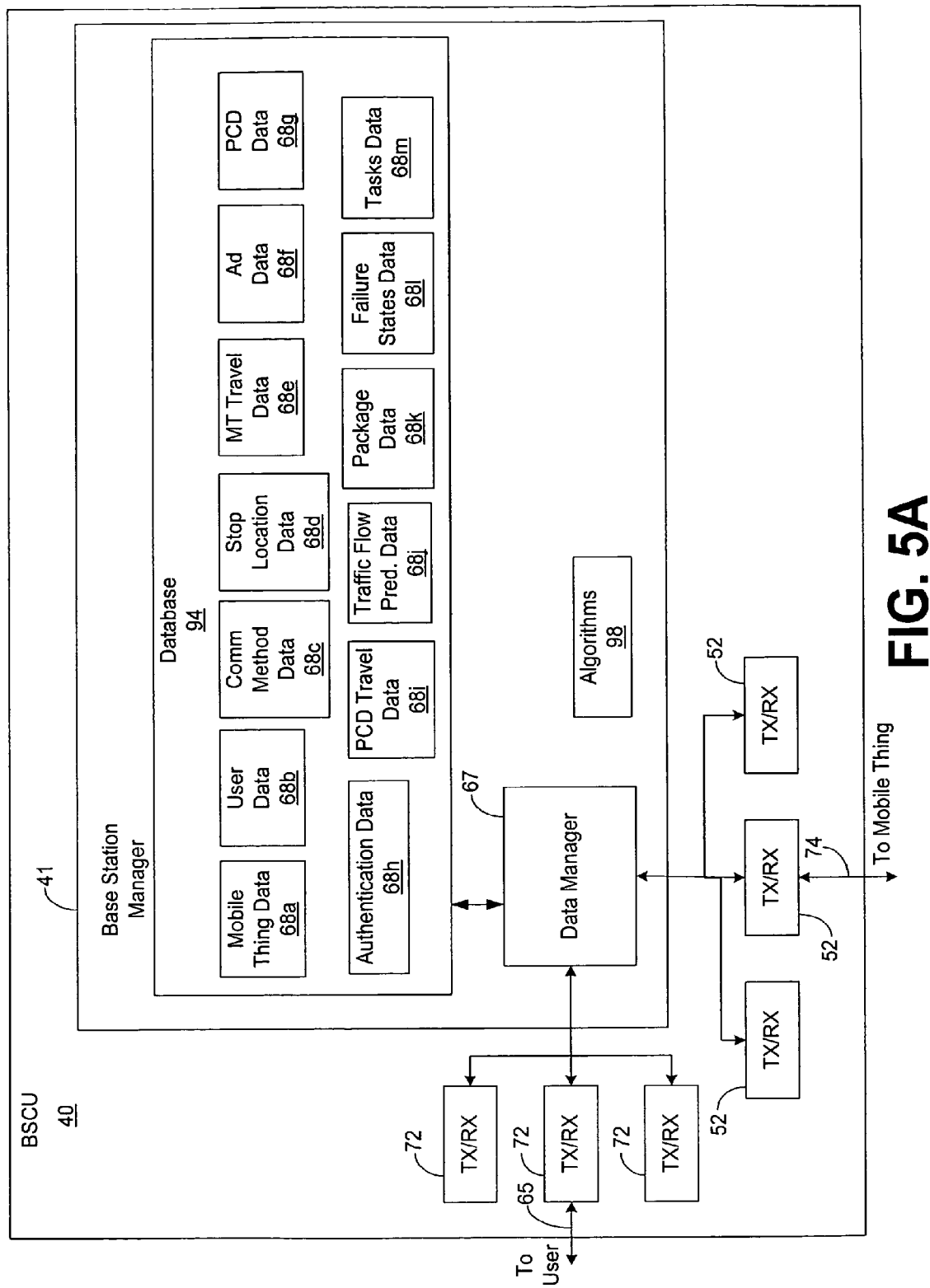
FIG. 5A is a functional block diagram illustrating an exemplary implementation of at least part of the architecture, functionality, and operation of the BS manager of FIG. 1.

BS manager 41 is designed to receive the travel data transmitted from MT manager 29 and to monitor the travel of the MT attached to the MTCU 15 by monitoring the travel of the MTCU 15. In this regard, BS manager 41 is designed to include a data manager 67 configured to receive the travel data via signal 66 from communications device 52, as depicted by FIG. 5A. Data manager 67 is designed to store the travel data for each MTCU 15 being monitored in a database 94, which is preferably a relational database having a number of tables 68, but other databases are possible, for example, flat-file database, inverted-list database, one made up of lookup tables, etc.

As is well known in the art, a relational database is a database or database management system that stores information in tables—rows and columns of data—and conducts searches by using data in specified columns of one table to find additional data in another table. In a relational database, the rows of a table represent records (collections of information about separate items) and the columns represent fields (particular attributes of a record). In conducting searches, a relational database matches information from a field in one table with information in a corresponding field of another table to produce a third table that combines requested data from both tables. For example, if one table contains the fields MOBILE-THING-ID, PACKAGE-ID, and LOAD-DATE, and another contains the fields STOP-TIME, MOBILE-THING-ID, and STOP-LOCATION, a relational database can match the MOBILE-THING-ID fields in the two tables to find such information as the possible pickup stop locations for packages transported by the MT or the delivery times (stop times) for all packages loaded on the MT within the last day. In other words, a relational database uses matching values in two tables to relate information in one to information in the other.

Although not limited to this configuration, in one embodiment, among others, the database 94 includes, among other things and in general, an MT data table 68*a* having information pertaining to the MT, such as an ID, type (package, mobile vehicle type, etc.), model, whether the thing has air conditioning, etc.; a user data table 68*b* having information regarding user preferences; a communication method data table 68*c* having information pertaining to various communications methods that can be utilized for contacting a user (which can be linked to the user preferences); a stop location data table 68*d* having information pertaining to stop locations of MTs; an MT (MT) travel data table 68*e* having information concerning travel status of MTs, an advertisement data table 68*f* having advertisements that can be communicated to a PCD 75; a PCD data table 68*g* having information pertaining to the devices 75; an authentication data table 68*h* having authentication information or indicia to be described later in this document, a PCD travel data table 68*i* having information pertaining to travel of a tracked PCD 75, a traffic flow predicament data table 68*j*, a package data table 68*k*, a failure states data table 68*l*, a tasks data table 68*m*, sub-tables of the foregoing, etc. The tables 68 include related fields for linking and relating various elements in the various tables 68.

Furthermore, in this embodiment, MTCUs are related to identification values in MT data table 68*a*, and these values are correlated with travel data in MT travel data table 68*e*. Travel data can include information such as, but not limited to, the MTCU's coordinate values (i.e., the MTCU's 15 location relative to a predetermined reference point), information regarding delivery status of items to be delivered, and/or the times that the MTCU 15 reached particular locations or stops. The database 94 is configured to contain all of the desirable information to monitor the status of each MTCU 15 associated with the notification system 10.

Figure 5B:
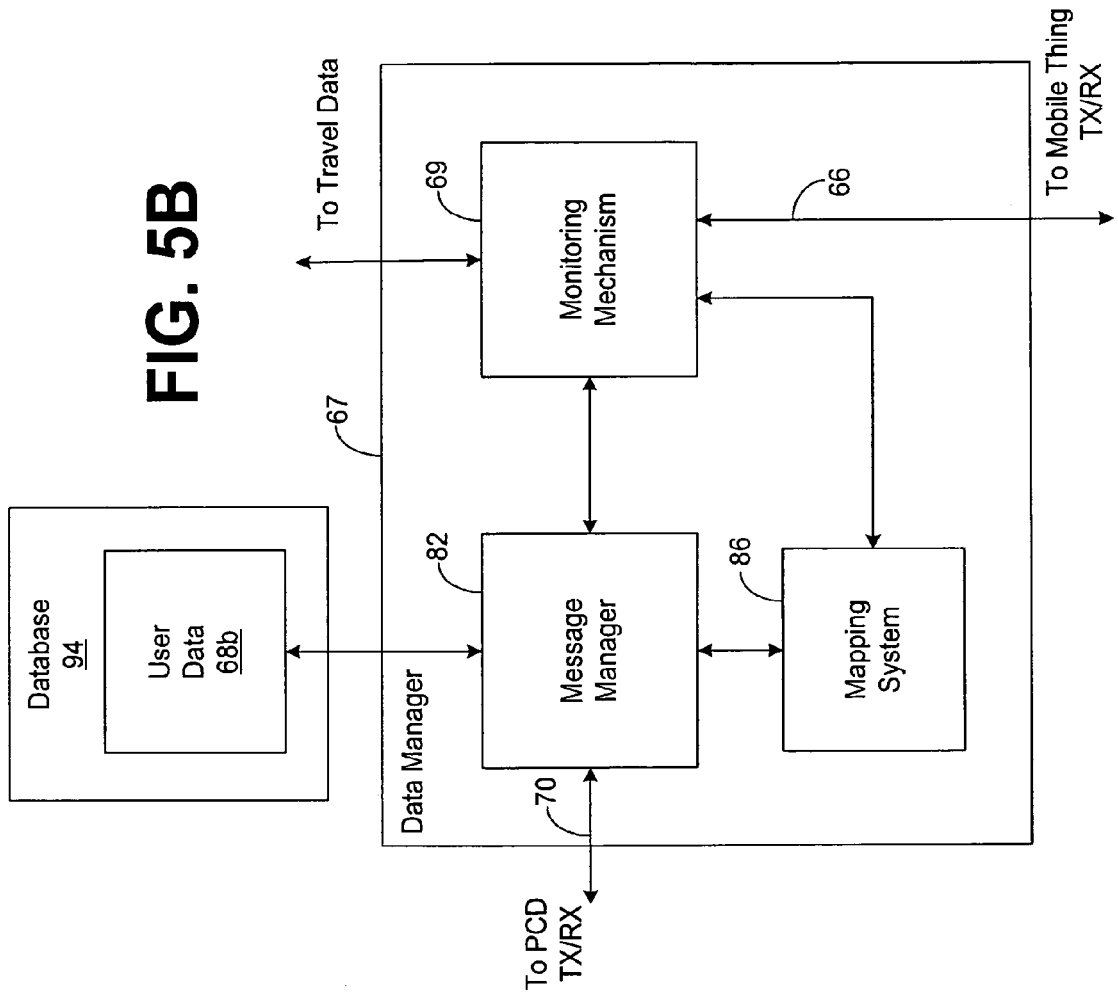
FIG. 5B is a functional block diagram illustrating an exemplary implementation of at least part of the architecture, functionality, and operation of the data manager associated with the BS manager of FIG. 5A.
Figure 5C:
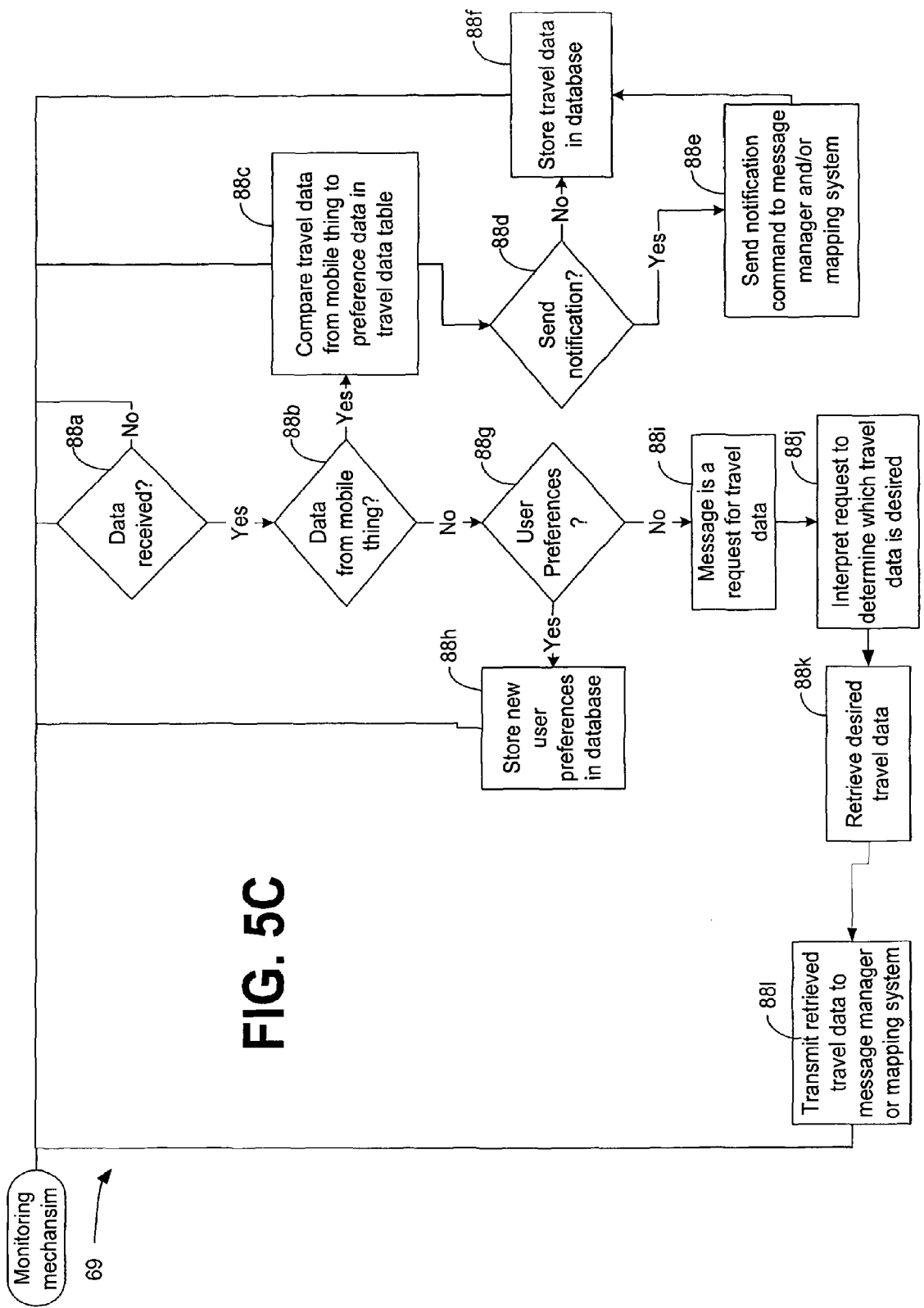
FIG. 5C is a flow chart illustrating an exemplary implementation of at least part of the architecture, functionality, and operation of the monitoring mechanism associated with the BS manager of FIGS. 5A and 5B.

Referring to FIG. 5B, data manager 67 is configured to include a monitoring mechanism 69. The functionality of monitoring mechanism 69 is depicted in FIG. 5C. As shown by blocks 88*a*-88*f* of FIG. 5C, monitoring mechanism 69 is configured to receive travel data from MTCU 15 and to compare the travel data with predefined preference data stored in the database 94, particularly the user data table 68*b*. Preference data, as used herein, is data that defines the preferred parameters indicating when to notify a user of the impending arrival of the MTCU 15 at a particular location. It can be system defined or user defined. For example, preference data can be coordinates of a desired location whereby a notification message is sent to a user when the coordinates of the MTCU 15 pass the coordinates of the desired location. In this context, the desired location defined by the preference data can, for example, represent a location that is a predetermined distance from the user house, place of delivery or pickup, or other particular location. Therefore, when the user receives the notification message, the user is aware of the approximate location of the MTCU 15 or of the distance of the MTCU 15 from a predetermined point (i.e., of the proximity of the MTCU 15 from a predetermined point or location). Consequently, the user can prepare for the arrival of the MTCU 15, since the user knows that arrival of the MTCU 15 is imminent.

As an alternative embodiment, the preference data can define a certain time before the MTCU 15 reaches a destination or other particular location (i.e., a proximity of the MTCU 15 from the predetermined point). In this regard, the monitoring mechanism 69 is designed to determine the location of the MTCU 15 from the travel data stored in MT travel data table 68*e* of database 94. The monitoring mechanism 69 is then designed to calculate the time it will take for the MTCU 15 to reach the location specified by the preference data based on the location of the MTCU 15 and the location of the desired destination. In calculating the travel time, the monitoring mechanism 69 can be configured to make assumptions about the time necessary to travel to the specified location. For example, if the route of the MTCU 15 is through congested areas, the monitoring mechanism 69 can assume a certain delay time for traveling certain distances, and if the route of the MTCU 15 is through less congested areas, the monitoring mechanism 69 can assume another delay time that is less than the delay time assumed for the congested areas. Alternatively, the monitoring mechanism 69 can use an average of the times it has previously taken for MTs 17 to travel over the same route during other deliveries. Therefore, by comparing the travel data transmitted from MTCU 15 with preference data, the monitoring mechanism 69 can determine when to send a notification message to a user.

As depicted by blocks 88*a*, 88*b*, 88*g*, and 88*h* of FIG. 5C, the preference data can be stored in user data table 68*b* of the database 94 (FIG. 5B). As stated hereinbefore, the MT travel data table 68*e* of the database 94 is preferably configured to store the travel data associated with each MTCU 15 in a respective entry uniquely identified with the associated MTCU 15. Accordingly, each data entry can also include the preference data associated with each MTCU 15 that corresponds with the entry, or the preference data can be stored in separate entries which are correlated with corresponding MTCU entries.

Once the monitoring mechanism 69 determines that a notification message should be sent to a user, the data manager 67 is designed to communicate a message to a user at a remote location via PSTN network 55 and communications devices 72 and 73 (FIG. 1). In this regard, communications devices 72 and 73 are preferably PSTN modems capable of communicating with PSTN network 55. Data manager 67 is designed to transmit the message as signal 70 to user communications device 72, which communicates the message with PTSN network 55 via signal 74. PTSN network 55 then communicates the message to communications device 73, which is preferably configured to communicate the message to a PCD 75. PCD 75 is configured to notify the user of the impending arrival of the MTCU 15. As mentioned, PCD 75 can be a computer capable of displaying the notification through e-mail or some other communications software. Alternatively, PCD 75 can be a telephone, a pager or any other device capable of notifying a user.

1. User Activation

In order for data manager 67 to transmit a notification PCD 75, data manager 67 should be aware of certain contact information enabling data manager 67 to contact the PCD 75. In this regard, data manager 67 is configured to include a user data table 68*b* (FIG. 5) containing contact information pertaining to each user that is to receive a notification message from the data manager 67. In the preferred embodiment, the user table 68*b* is capable of uniquely identifying each user of the notification system 10, and has entries that specify contact information associated with each user. Each entry preferably includes a user identification number unique to each user that identifies the information in the entry as relating to a particular user.

Each entry preferably includes a value specifying the medium through which the user has specified to be contacted. For example, the value can indicate that the user is to be contacted through e-mail, in which case the entry should also include the user e-mail address. Alternatively, the value can indicate that the user is to be contacted through a telephone call or a page. In these situations, the entry should also include the user telephone number or pager number. The value can also indicate multiple methods of notification. For example, the value can indicate that the user is to be first contacted via telephone. If there is no answer when the data manager 67 attempts to deliver a notification message, then the data manager 67 can be configured to attempt notification via paging. If paging fails, then the data manager 67 can be configured to attempt notification through e-mail or other computer oriented messaging system. Accordingly, the order of notification media should be indicated by the data in the user data table 68*b*, and the contact information necessary for each method selected (e.g., the telephone number, pager number, and e-mail address of the user) should also be included in the entry. It should be noted that various other communications media and combinations of communications media can be employed.

The contact information (and preference data, which will be discussed in further detail hereinafter) can be manually entered or downloaded into the user data table 68*b* in order to activate a user for the notification system 10. In this regard, a system operator can receive the contact information (and preference data) via a telephone call or e-mail, for example, and manually enter the information into the notification system 10.

Figure 5D:
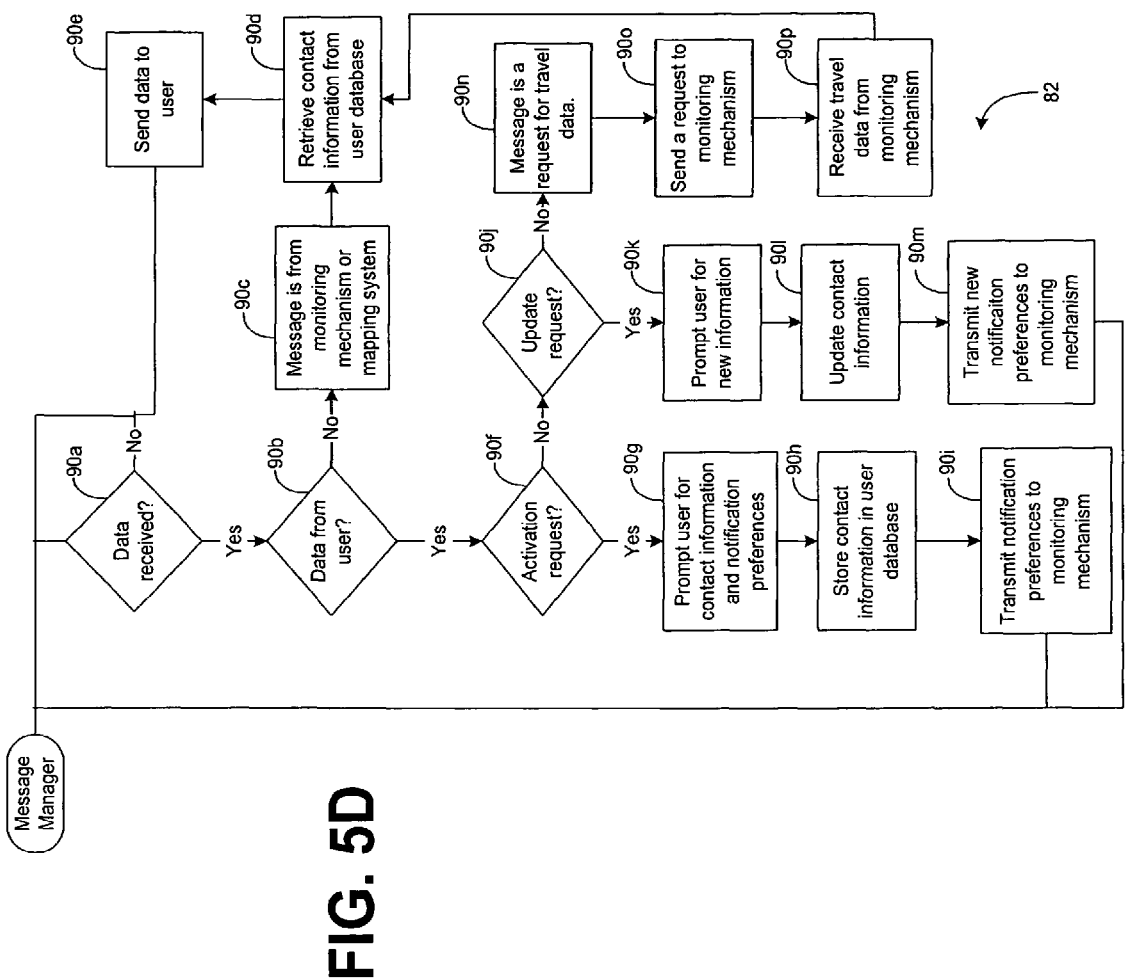
FIG. 5D is a flow chart illustrating an exemplary implementation of at least part of the architecture, functionality, and operation of the message manager associated with the BS manager of FIGS. 5A and 5B.

However, in the preferred embodiment, the contact information is automatically entered into the user data table 68*b* via a message manager 82, which is depicted by FIG. 5B. The functionality of the message manager 82 is shown in FIG. 5D. The message manager 82 is configured to receive, via communications device 72 (FIG. 1), an activation request from a user at PCD 75, as shown by blocks 90*a*, 90*b*, 90*f* of FIG. 5D. In this regard, the request can be transmitted to PCD 75, via any suitable technique known in the art, and the BSCU 38 can be configured to include a plurality of communications devices 72, as depicted by FIG. 5A.

Each of these communications devices 72 can be configured to simultaneously communicate with a respective user of the notification system 10. The information received by the communications devices 72 can be transmitted to message manager 82 (FIG. 5B) via any suitable technique, such as time division multiplexing, for example. Each user communications device 72 can also be designed to communicate with different communications media. For example, one user communications device 72 can be designed as a modem to communicate with a modem associated with a user. This user communications device 72 can be designed to send data configured to prompt the user to return data pertaining to contact information. An example of such a prompt, could be a template or web page where the PCD 75 (i.e., a computer in this case) displays the template, and the user can fill in fields of the template with the appropriate contact information. Alternatively, another one of the user communications devices 72 can be designed to receive a telephone call from a user and to prompt the user to enter data through touch-tone signaling. Other user communications devices 72 can be designed to communicate with other types of communications media known in the art.

Once the message manager 82 (FIG. 5B) receives the request from the user, the message manager 82 is designed to determine that the request is a request for activation (i.e., a request for the user to be entered into the notification system 10). In response, the message manager 82 transmits data to the user, via user communications device 72, in order to prompt the user to transmit the necessary contact information, as shown by block 90*g* of FIG. 5D. In this regard, the message manager 82 is configured to determine the type of medium used by the user to communicate the request for activation and to transmit a prompt to the user that is compatible with this medium. For example, when the user is communicating via a modem, the message manager 82 is configured to transmit signals compatible with the user modem in order to prompt the user to enter the appropriate contact information. This data could be in the form of a web page transmitted through the Internet, or the prompt could simply be messages transmitted through e-mail or some other data communications system.

When the user is communicating via a PCD 75 in the form of a telephone, the message manager 82 can be designed to transmit recorded messages to the user. The user can then select or enter data by transmitting touch-tone signals in response to the prompting messages, as is commonly known in the art. The message manager 82 may be configured to communicate with the user in other formats and media known in the art.

Once the message manager 82 receives the contact information from the user, the message manager 82 is designed to store the contact information as an entry in the user data table 68*b*, as depicted by block 90*h* of FIG. 5D. When the monitoring mechanism 69 determines that a user should be notified of an impending arrival of an MTCU 15, the monitoring mechanism 69 is designed to send a notification command to message manager 82. The notification command may include travel data to be sent to the user, such as data indicating that a particular MT is a certain proximity from the destination defined by the preference data. In response, the message manager 82 is designed to retrieve the contact information associated with the user from the user data table 68b and to determine how to contact the user based on the retrieved contact information, as depicted by blocks 90c and 90d of FIG. 5D.

The message manager 82 is then designed to transmit a message compatible with the medium previously selected by the user for notification, as depicted by block 90e of FIG. 5D. The message can include any travel data sent to the message manager 82 from the monitoring mechanism 69. For example, when the contact information indicates that a telephone call is the preferred medium for notification, the message manager 82 can send a recorded telephone message to the telephone number that is indicated by the contact information retrieved from the user data table 68b. If the monitoring mechanism 69 included travel data indicating the time of arrival in the command to message manager 82, then message manager 82 can be configured to include a message indicating the expected time of arrival at a particular location. Alternatively, the same information can be sent via e-mail, facsimile, page or other type of communications medium to the user, depending on the preferences selected by the user during activation.

During activation, the message manager 82 can be further configured to prompt for and receive preference data (i.e., data pertaining to when the user is to be notified) from the user, as shown by block 90g of FIG. 5D. In this regard, the message manager 82 can be designed to prompt the user to return information indicating which MTCU 15 is to be monitored on behalf of the user and when the notification is to be sent to the user. For example, the user can be prompted to select an MTCU 15, a destination (or other particular location), and a notification preference to indicate a time or distance that the MTCU 15 should be from the selected destination or other particular location when a notification is to be sent to the user. In response, the user specifies, through any known suitable communications technique, which MTCU 15 the user wishes the notification system 10 to monitor and how the user wishes to be notified of an impending arrival of the selected MTCU 15 at the selected destination. If the user knows the coordinate values of the destination, the user can simply transmit the coordinate values to the data manager 67. If the user selects the destination without supplying the coordinates of the destination (e.g., the user selects a destination from a list of locations) then the data manager 67 is preferably designed to determine the coordinate values transparently.

In some instances, the user may be aware of the vehicle number and stop number used by the notification system 10 to identify a particular MTCU 15 and destination. For example, many buses are associated with a commonly known bus number, and the stops along the bus' route are associated with commonly known bus stop numbers. The data manager 67 can be configured to recognize the MTCU 15 and destination associated with the bus number and stop number entered by the user in order to register the user with the notification system 10.

As depicted by block 90i of FIG. 5D, the message manager 82 is preferably designed to automatically transmit to monitoring mechanism 69 the preferences selected by the user that pertain to when the user is to be notified. The monitoring mechanism 69 is designed to store this preference information in the database 94 and designed to relate it to the selected MTCU 15.

Once a user becomes activated with the notification system 10, the user may make changes to the preferences specified by the user, as shown by blocks 90j-90m of FIG. 5D. The message manager 82 is configured to receive the request for changes from the user. The message manager 82 can be configured to request the user to resubmit all contact information and preference data, as updated, or can be configured to request the user to only submit desired changes to the contact information or preference data. After receiving the new data, the message manager 82 is configured to update the contact information in user data table 68b and to send a request to monitoring mechanism 69 to update the preference data relating to the monitoring of travel data. In response, monitoring mechanism 69 is designed to update the preference data in database 94, as shown by blocks 88g and 88h of FIG. 5C.

It should be further noted that as described hereinabove, the preference data and travel data can be automatically received and stored in the database 94 and selected MTs 17 can be automatically monitored by the notification system 10.

2. Requests for Travel Data

In addition to providing the user with automatic advance notification of an impending arrival of an MTCU 15, the notification system 10 can also be used to provide the user with travel data on demand, as depicted by blocks 90n-90p, 90d and 90e of FIG. 5D. In this regard, the user communications device 72 is designed to receive a request for travel data from a user. For example, the user may call the communications device 72 on a telephone and through touch-tone signaling select, among other options, an option to discover the distance and/or time a particular MTCU 15 is from the destination specified by the user preference data or specified by the user during the request for travel data. The user communications device 72 is designed to transmit the user selections to message manager 82. Based on the selections, the message manager 82 is designed to determine that the user message is a request for travel data. In response, the message manager 82 sends a request to monitoring mechanism 69 to retrieve the requested database 94.

The monitoring mechanism 69 is designed to receive the request for travel data from message manager 82 and to interpret the request in order to determine which travel information from the MT travel data table 68e of the database 94 is desired by the user, as depicted by blocks 88i and 88j of FIG. 5C. The monitoring mechanism 69 is then designed to retrieve from the database 94 the desired travel data and to transmit the retrieved travel data to message manager 82, as shown by blocks 88k and 88l of FIG. 5C.

In the case where the user desires to know the time and/or distance the selected MTCU 15 is from the selected location, the monitoring mechanism 69 is designed to retrieve from MT travel data table 68e of database 94 the coordinates of the destination specified by the user (if not provided in the request for travel data) and the current coordinates of the MTCU 15 of interest to the user. Prior to retrieving this data, the monitoring mechanism 69 can be configured to update the travel data for the MTCU 15 by transmitting an update request to the MTCU 15 via MT communications device 52. Similar to the user communications devices 72, a plurality of MT communications devices 52 may be located at the BSCU 38 in order for multiple MTs 17 to simultaneously communicate with the monitoring mechanism 69, as depicted by FIG. 5B. The MT communications devices 52 are configured to communicate with the monitoring mechanism 69 through any suitable technique, such as time division multiplexing, for example.

After receiving the update request via communications devices 52 and 44, the MT manager 29 is designed to transmit the current values of the MT travel data to the monitoring manager 69. By updating the MT travel data before responding to the user request for travel data, the monitoring mechanism 69 can ensure the accuracy of the response transmitted to the user.

After retrieving the coordinate values from the database 94, the monitoring mechanism 69 is designed to calculate the distance that the MTCU 15 is from the selected destination based on the coordinate values of the MTCU 15 and the coordinate values of the destination. If the preference data and/or request for travel data indicates that the user is to be notified when the MTCU 15 is a certain time from the selected destination, the monitoring mechanism 69 is then designed to determine the estimated time of arrival of the MTCU 15 at the destination based on this distance. As described previously, the monitoring mechanism 69 is designed to either assume that certain distances will take a certain amount of time to travel based on the type of traffic conditions usually encountered on the route or to calculate an average time previously required for MTs 17 of the system to travel the route. To increase the accuracy of the calculations, the route should be divided into sections where the time required to travel each section is independently calculated. Furthermore, time delays associated with scheduled stops or deliveries can be factored into the calculations by assuming a delay time for each stop or delivery depending on the type of stop or delivery expected.

After calculating the distance and, if requested, the time the MTCU 15 is from the destination, the monitoring mechanism 69 is configured to transmit the calculated values to the message manager 82. In response, the message manager 82 is designed to transmit the calculated information to the user via user communications device 72. Since the user already has an established communications connection with user communications device 72 when requesting travel data, there is no need for the message manager 82 to consult the contact information in the user data table 68b. The message manager 82 can simply transmit the data over the same connection. However, if desired, the message manager 82 may consult the contact information in the user data table 68b to determine the user preferences in notification and notify the user of the distance and/or time accordingly.

The monitoring mechanism 69 can also be configured to transmit a command to a mapping system 86 (FIG. 5B) to transmit mapping data to the message manager 82, if the user request for travel data or user preference data in database 94 includes a request for a mapping. The mapping system 86 may be any system known in the art for producing and supplying a user with mapping data for rendering a display of a map. The command to the mapping system 86 preferably includes the coordinate values of the MTCU 15 and the destination. In response, the mapping system 86 transmits to message manager 82 mapping data sufficient for forming a display map with the locations of the MTCU 15 and the destination graphically displayed by the display map. The message manager 82 is designed to retrieve the contact information for the user requesting the travel data and is further configured to determine an address (e.g., an IP address or other type of address indicating how the mapping data is to be routed to user) associated with the user for sending the mapping data. The message manager 82 is then designed to transmit the mapping data to the retrieved address, which preferably identifies a computer associated with the user. When the PCD 75 (i.e., a computer in this case) receives the mapping data, the user computer is configured to render a graphical display depicting a map that shows the MT's location relative to the destination on the map.

If desired, the monitoring mechanism 69 can be configured to transmit the coordinate values of the MTCU 15 to the mapping system 86 each time the coordinate values are updated. The user request for travel data can request this feature or the user can indicate this desire in the preference data submitted during activation. Accordingly, for each update, the mapping system 86 is designed to transmit updated mapping data to the user computer 75 via message manager 82, as previously described. As a result, the position of the MTCU 15 is updated, and the user can monitor the progress of the MTCU 15 on the display map rendered by the computer 75.

Although the preferred embodiment illustrates the requests for travel data by determining the distance the MTCU 15 is from a particular location or by determining the time the MTCU 15 is from the particular location, other information can be used to indicate the proximity of the MTCU 15 from the particular location. For example, the message transmitted to the user in response to a request for travel data can indicate that the MTCU 15 is currently at another particular location or landmark, preferably known to the user. Any other information indicating the proximity of the MTCU 15 from a particular location can be used.

3. Establishing User Preferences

Initially, a user at remote location establishes communication with the message manager 82 via communications devices 72 and 73. As used herein, the term "remote location" shall refer to any location off the site of the BSCU 38. The user can establish communication via a telephone, an e-mail message, the Internet, or any other suitable communication medium. The message manager 82 preferably transmits a list of options to the user, such as whether the user would like to activate a monitoring of a particular MT, to retrieve travel data for a particular MT or to modify preferences previously selected by the user in an earlier communication session with the message manager 82. In response, the user selects the activation option.

The message manager 82 then prompts the user to select certain preferences. For example, the message manager 82 can request the user to identify a particular MTCU 15 that the user wishes the notification system 10 to track and a particular destination for the selected MTCU 15. If the user knows the identification number of the MTCU 15 or MT stop number used by the notification system 10 to identify the particular MTCU 15 and/or destination, the user can simply transmit a message including this information. As an example, the bus numbers and/or bus stops of commercial and state operated buses are usually available to the public. Therefore, the user may be aware of the bus number and/or stop number of a particular bus that the user wishes to ride, and the user can simply transmit the bus number and/or stop number to the message manager 82. Also, the user should be able to specify other identifying information such as the day or days of desired travel and the time of day of desired travel.

In the embodiment where the user is expecting to receive a package from a particular delivery vehicle, the user may be aware of the package number or delivery number used by the notification system 10. Therefore, by specifying the package number and the address that the vehicle is to deliver the package, the particular MTCU 15 of the vehicle that is to deliver the package can be located by the notification system 10. In this regard, a database should be defined by the operators of the notification system 10 that relates package numbers to MTCU 15 numbers.

Alternatively, if the user is unable to identify a particular MT or MTCU 15, the message manager 82 can send information to the user that can be used to help the user identify a particular MTCU 15. For example, the message manager 82 can transmit to the user a list of buses or a list of MT stops to the user. The user can use this information to select a particular MTCU 15 that is suitable to the user.

Also, the message manager 82 can send map data from mapping system 86 to the user. The user can then view the map and select points on the map where the user would like to know when the MTCU 15 reaches the selected point. The points available for selection can be predetermined, such as scheduled bus stops or other types of vehicle stops, or the user can be allowed to freely select any point on the map. In either case, the mapping logic preferably transmits the coordinates of the selected points to the message manager 82, which can use this information to not only identify the selected destination, but to also choose an appropriate MTCU 15.

The message manager 82 also prompts the user to enter contact information such as how the user would like to be notified of an impending arrival of the selected MTCU 15 at the selected destination. In response, the user selects a notification medium or combinations of media to be used to notify the user and supplies the necessary information to enable communication of the notification. For example, if the user selects a telephone as a notification medium, then the user provides a telephone number. In addition, if the user selects a computer as the notification medium, then the user provides a suitable address for the computer, such as an e-mail address or IP address. If the user selects a pager as the notification medium, then the user provides a pager number. It should be apparent to one skilled in the art when reading this disclosure that other types of notification media are possible. After receiving the desired contact information from the user, the message manager 82 stores the contact information in the user data table 68*b*.

The message manager 82 also prompts the user to transmit travel data preferences, which is information pertaining to when the user would like to be notified. For example, the user can select to be notified a certain time before the selected MTCU 15 is to arrive at the selected destination. Also, the user can choose to be notified when the selected MTCU 15 is within a certain distance of the destination, and the user can choose to be notified when the selected MTCU 15 is a certain number of deliveries or stops away from the destination.

Since the monitoring mechanism 69 should have access to the travel data preferences in order to determine when a notification is appropriate, the message manager 82 preferably transmits the travel data preferences to the monitoring mechanism 69 along with a unique identification number that identifies the user and a unique identification number identifying the selected MTCU 15. The unique identification number identifying the selected MTCU 15 can be the MT number entered by the user provided that the number entered by the user identifies the MTCU 15 to be monitored. In turn, the monitoring mechanism 69 stores this in database 94. Entries associated with a particular MTCU 15 can be related together in the database 94. For example, each entry associated with a particular MTCU 15 can be stored, and each of the entries can have a pointer pointing to another one of the entries associated with the particular MTCU 15. Therefore, entries associated with a particular MTCU 15 can be easily located. Other methods known in the art for categorizing the entries and correlating the entries with a particular MT or with the travel data of a particular MT are also possible.

Once the message manager 82 has received the desired contact information and travel data preferences from the user, the communication between the message manager 82 and the user can be terminated. The BS manager 41 should now have sufficient information to monitor the selected MTCU 15. If the user wishes to change the contact information and/or the travel data preferences, the user can reestablish communication with the message manager 82. The message manager 82 preferably recognizes the user requests as an update rather than an activation and prompts the user to transmit the new information. In this regard, the message manager 82 can prompt the user for all of the desired contact information and/or preference data, similar to the activation session, and simply replace the previously stored contact information and/or preference data, or the message manager 82 can prompt the user for only the information to be updated and then merely update the previously stored information.

It should be noted that the information transferred between the user and the message manager 82 can be interfaced with the message manager 82 through a human operator during the activation session or update session described hereinabove and during other sessions, which will be described further hereinbelow. The human operator can prompt the user for certain information through a telephone call or other suitable medium of communication and can enter the response of the user into the message manager 82.

4. Monitoring the MT

The monitoring mechanism 69 of FIGS. 5B and 5C, upon receiving travel data from MTCU 15, stores the travel data (in the preferred embodiment, coordinate values) relating to the MTCU 15, in MT travel data table 68*e* of database 94 that is configured to contain travel data and is associated with the MTCU 15. After accessing an entry for storing travel data, the monitoring mechanism 69 compares the current travel data (either received from the MTCU 15 or selected from a predetermined or assumed set of travel data, as described hereinabove) with the user preferences stored in user data table 68*b* in order to determine whether a notification should be sent to the user. Alternatively, the monitoring mechanism 69 can be configured to periodically poll each entry in the MT data table 68*a* and to compare the travel data corresponding to each entry with the corresponding preference data in user data table 68*b* to determine which users should receive a notification.

In analyzing each entry, the monitoring mechanism 69 preferably subtracts the current coordinate values in the accessed entry of the MTCU 15 with the coordinate values previously stored in travel data 68*e* that indicate the destination location selected by the user. If the resulting value is less than a predetermined value, then the monitoring mechanism 69 sends a notification command to message manager 82 instructing the message manager 82 to notify the user of the impending arrival of the MTCU 15. This predetermined value corresponds to the distance that the MTCU 15 should be from the destination before a notification is sent to the user. Preferably, this predetermined value is calculated from or is included in the preference data supplied by the user during activation or during an update to the activation.

The monitoring mechanism 69 can also send the notification command to the message manager 82 based on the estimated time the MTCU 15 is from the destination. After calculating the value indicating the distance of the MTCU 15 from the destination, the monitoring mechanism 69 can estimate how long it will take for the MTCU 15 to reach the destination by assuming that the MTCU 15 can travel certain distances in a certain amount of time. In order to increase the accuracy of the notification system 10, the monitoring mechanism 69 can vary the time for the distances according to the type of traffic that is typically encountered at the MT's location and route of travel. If traffic conditions are usually congested along the MTCU's route, then the monitoring mechanism 69 can assume higher rates of time. Furthermore, if the travel data indicates that the MTCU 15 has a number of MT stops prior to reaching the destination, the monitoring mechanism 69 can factor in a delay time for each stop depending on the type of the stop.

Once the monitoring mechanism 69 determines the MTCU's expected time of arrival at the destination, the monitoring mechanism 69 can determine whether the user should be notified based on this estimated time. If the estimated time is less than a predetermined value indicating the desired estimated time of arrival chosen by the user, then the monitoring mechanism 69 sends the notification command to the message manager 82.

The message manager 82, in response to the notification command from the monitoring mechanism 69, retrieves the contact information from user data table 68b indicating how the user desires to be notified. Utilizing the contact information, the message manager 82 then sends a message to the user at remote location. The monitoring mechanism 69 preferably includes certain travel data in the notification command, such as the MTCU's location. Consequently, the message manager 82 is able to include this travel data with the message sent to the user. For example, the message may indicate that the MTCU 15 (and, therefore, that the MT attached to the MTCU 15) is a certain amount of time or distance from the destination or the message may indicate the MTCU's specific location, perhaps with reference to street names and/or street blocks.

If the contact information indicates that the user wishes to have map data sent to a computer at the remote location, the message manager 82 sends a request for map data to monitoring mechanism 69. In response, the monitoring mechanism 69 sends to the mapping system 86 the necessary data (e.g., the coordinates of the MTCU 15 and the destination) for the mapping system 86 to transmit the appropriate mapping data. The mapping system 86 transmits the mapping data to message manager 82 which again utilizes the contact information retrieved from user data base 78 to communicate the mapping data to the appropriate PCD 75 at remote location. The PCD 75 then displays the mapping data in graphical form so that the user can see the MT's location relative to the destination within the map graphically displayed by the PCD 75.

The notification message sent to the user indicates the impending arrival of the MTCU 15 at the destination previously selected by the user. Accordingly, the user can prepare for the arrival of the MTCU 15 knowing approximately how long it should take for the MTCU 15 to arrive at the destination.

Note that U.S. Pat. No. 6,317,060, which is incorporated herein by reference, describes a communication handler that can be implemented in or in connection with the manager 41 for enabling communication of a large number of concurrent or substantially concurrent notification communications (perhaps due to a large number of vehicles and/or users).

5. Requesting Travel Data

During the monitoring process described hereinabove, the user can discover the status of the MTCU 15 or of the MT attached to the MTCU 15, on demand, by contacting the BS manager 41 and requesting information pertaining to the travel data stored in the database 94. In this regard, the user establishes communication with the message manager 82 (FIG. 5B) via communications devices 72 and 73. The medium used for communication can be any suitable medium known in the art (e.g., telephone, e-mail, Internet, cellular phone, etc.). The preferred will be discussed hereinafter with the user establishing communication via telephone, although other media of communication are also suitable.

After the telephone connection is established, the message manager 82 prompts the user with a series of recorded questions or options in order to determine the user request. The user responds to these prompts through touch-tone signaling which is well known in current telephony communications systems. Initially, the message manager 82 prompts the user to indicate whether the call is an activation, an update of an activation, or a request for travel data. The user selects the appropriate touch-tone number to indicate that the user is requesting travel data.

The message manager 82 receives and interprets the touch-tone signal to determine that the user is requesting travel data. In response, the message manager 82 prompts the user to transmit an identification number of the MTCU 15 of concern for the user. This prompt can include information to aide the user in selecting an MTCU 15. The user responds by transmitting a series of touch-tone signals that indicate the identification number or other unique data of the particular MTCU 15 of concern for the user. The message manager 82 receives and interprets the touch-tone signals and determines which MTCU 15 is selected by the user based on the received touch-tone signals.

The message manager 82 can then, if desired, prompt the user to indicate which travel data the user desires to know. For example, it is likely that the user may want to know how far the MTCU 15 is from the destination or how long it should take the MTCU 15 to arrive at the destination. However, the user may want to know other information, such as, but not limited to, how many MT stops the MTCU 15 encounters en route or the type of MT that is en route, etc. The user responds with touch-tone signals, as appropriate, to indicate what information the user is requesting.

The message manager 82 then transmits a request for data to the monitoring mechanism 69. The request for data includes the unique identification number used to identify the MTCU 15, as well as any other information needed by the monitoring mechanism 69 to provide the desired information. For example, the message manager 82 may also transmit information indicating that the user wishes to discover information pertaining to the type of MT that is en route. The monitoring mechanism 69, in turn, retrieves the desired travel data from the database 94.

After retrieving the desired travel data, the monitoring mechanism 69 transmits the retrieved data to the message manager 82, which communicates the data information to the user in a message transmitted to the user. The message can include the travel data retrieved by the monitoring mechanism 69 or can be formed to indicate the information contained by the travel data. For example, when communication is over a telephone connection, a recorded message can be formed by the message manager 82 indicating the distance the MTCU 15 is from the destination based on the travel data sent to the message manager 82. When communication is via modem signals, travel data can be transmitted to the user by the message device 82. In either case, the contents of the message is based on the travel data retrieved by the monitoring mechanism 69. Since a communications line between the user and message manager 82 is already established in order for the user to make the request for travel data, the message manager 82 preferably transmits the data to the user over the established communication connection. When the user desires to receive map data (indicated by the selection of an option during the request for travel data or by the user preferences stored in the database 94), the monitoring mechanism 69 transmits a map generation command and travel data of the selected MTCU 15 to mapping system 86. Mapping system 86 then transmits graphical data to message manager 82.

Message manager 82 communicates the graphical data to PCD 75 which is capable of generating a map display based on the graphical data. In order to communicate this data, the message manager 82 retrieves the user contact information from the user data table 68b. The contact information indicates the address (and/or other pertinent information) of the PCD 75 so that the message manager 82 knows where to transmit the graphical data. By viewing the map display generated by the PCD 75, the user can determine the location and estimated time of arrival of the MTCU 15. The map display preferably shows the intended route of travel by the MTCU 15 and any scheduled MT stops along the route.

Since the notification system 10 stores certain travel information in order to monitor the travel of an MTCU 15 for providing an advance notification of an impending arrival of an MTCU 15, the notification system 10 can also provide an easy and low cost way for a user to access information pertaining to the MTCU 15, on demand. Accordingly, the user does not have to wait for preselected preferences to be satisfied before learning of the MTCU's (and, therefore, the MT's) location and/or estimated time of arrival. The user can monitor the travel of the MTCU 15 at any time by submitting a request for travel data and can, therefore, know the location and status of the MTCU 15 before receiving an advance notification signal that is based on comparisons between the MTCU's travel data and the user preselected preferences. As a result, the user can better prepare for an arrival of any particular MTCU 15 or MT attached to the MTCU 15 associated with the notification system 10.

It should be apparent to one skilled in the art that at least a portion of the functionality of the data manager 67 can be implemented by the MT manager 29, if desired. In this regard, preference data and/or travel data for the MTCU 15 can be stored in the computer system 31a coupled to the MTCU 15. Accordingly, it is possible for the MT manager 29 to determine when to transmit a notification to the user and to transmit a notification to the user via communication device 52 and 72. However, such an implementation can increase the complexity and cost of the notification system 10 and is therefore generally not desirable.

M. Alternative Embodiment for Communications

U.S. Pat. No. 5,732,074, which is incorporated herein by reference, describes systems for enabling communications between mobile vehicles and a remote computer, via standardized network communications links. In one embodiment, the links include the Internet and a controller area network used in vehicles. A TCP/IP stack is implemented in the controller. In another embodiment, each of the vehicles has an Internet address or designation associated with it.

The systems and methods described in this patent can be employed in connection with a notification system 10 and can be implemented to accomplish the many features described in this document.

N. Response Systems/Methods

Response systems (and methods) are provided for notification systems. Several nonlimiting exemplary embodiments of possible response systems will be described in detail hereafter.

Figure 6:
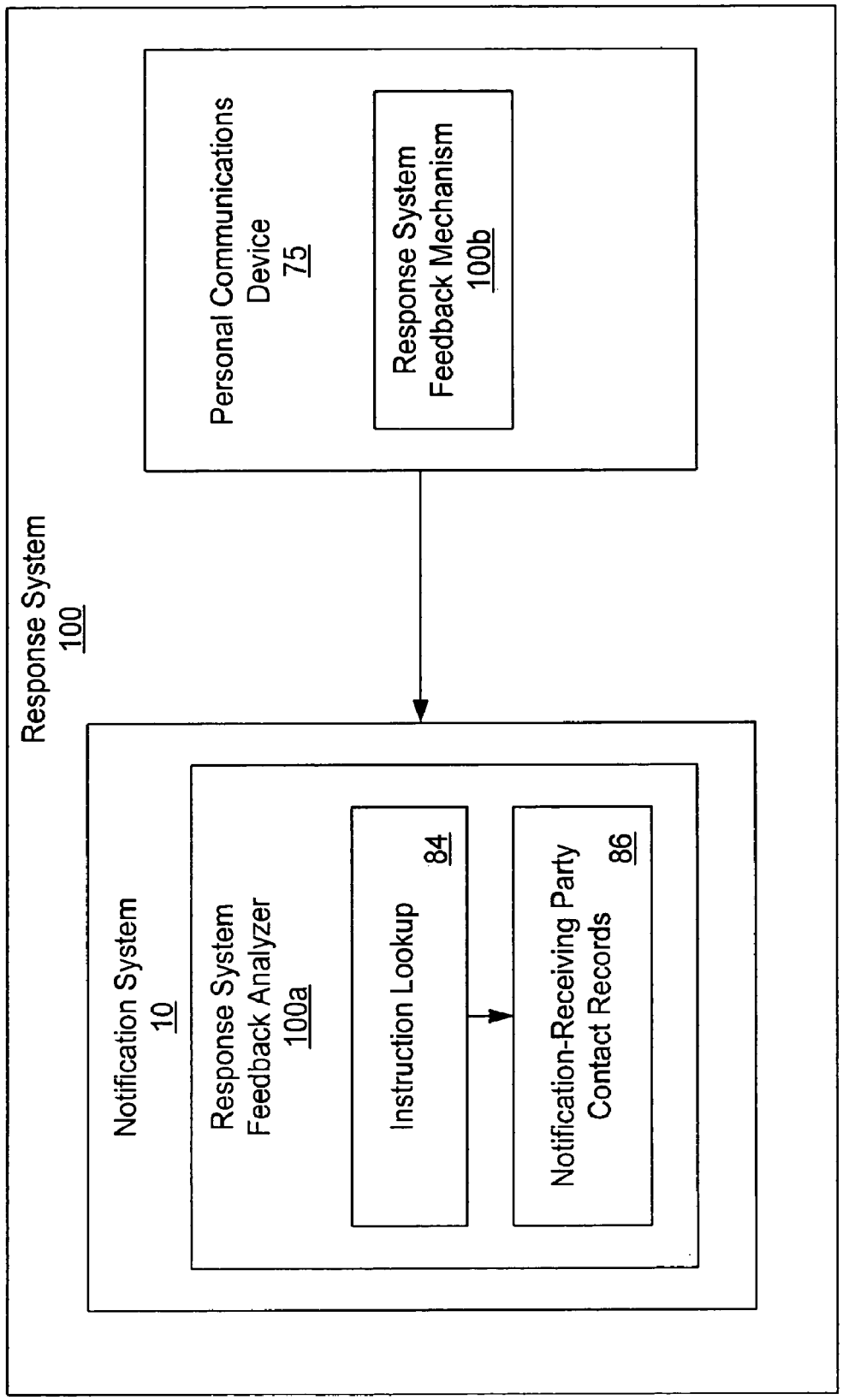
FIG. 6 is a block diagram illustrating an exemplary implementation of the response system of FIG. 1, which has the response system feedback mechanism and the response system feedback analyzer.

The architecture of one such embodiment, among others, is shown in FIG. 6 and is generally denoted by reference numeral 100. Although not limited to this particular implementation, this response system 100 is implemented in the notification system 10 of FIG. 1.

1. Response System Feedback Analyzer a. First Embodiment

The response system 100, particularly the response system feedback analyzer 100a, can be configured to implement the following methodology, as is summarized by flow chart in FIG. 7A: causing initiation of or monitoring a notification communication to a PCD 75 associated with a party, as shown in block 101 of FIG. 7A; and during the notification communication, receiving a response from the party via the party's PCD 75, indicating that the party associated with the PCD 75 has received notice, as indicated by block 102 in FIG. 7A. The response can be produced by any system or method that verifies that any party or one or more specific parties received the notification communication. Some such systems and/or methods can accomplish this by verifying or detecting the physical presence of such party(ies) at the PCD 75. Some such systems and/or methods can accomplish this by having the notification-receiving party exercise a physical action that can be converted to an electronic signal and communicated back to the notification system 10.

Figure 3:
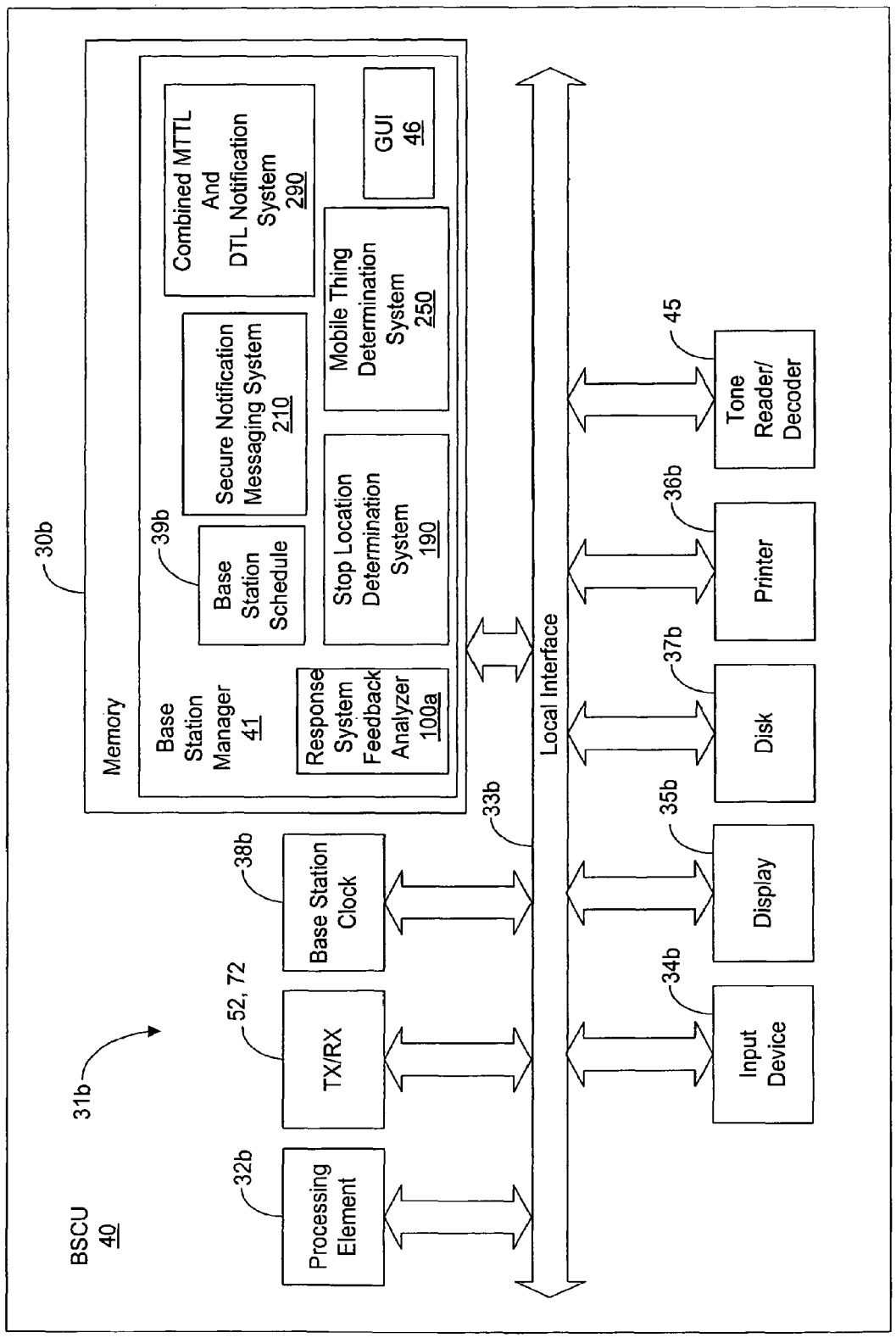
FIG. 3 is a block diagram illustrating an exemplary implementation of a computer system implementing the functionality of the base station manager (BS manager) of FIG. 1.

Although not necessary for implementation, the foregoing methodology can be implemented, and in the preferred embodiment is implemented, by software associated with the message manager 82 (FIG. 5B), the monitoring mechanism 69 (FIG. 5B) and/or the data manager 67 (FIG. 5A) associated with the BS manager 41 (FIGS. 1 and 3). See response system feedback analyzer in FIGS. 1 and 3. The blocks of FIG. 7A essentially represent the high level architecture of such software, i.e., the response system feedback analyzer in FIGS. 1 and 3. Note, however, that it is possible to have special purpose digital or analog hardware designed to implement the same or similar methodology, and such hardware could be associated with the BSCU 40.

In this embodiment, the initiating step 101 is performed by the transmitter 72 associated with the BSCU 40 (FIG. 1), under the control of the response system feedback analyzer 100a associated with the BS manager 41. The notification communication passes through the network 55 (FIG. 1) to the receiver 73 (FIG. 1) associated with the PCD 75.

The response from the notification-receiving party is first produced by a party associated with the PCD 75. The response is electronically recognized by a response system feedback mechanism 100b of the PCD 75. The response system feedback mechanism 100b causes the transmitter 73 (FIG. 1), also associated with the PCD 75, to communicate suitable feedback data, which ultimately is communicated in some form to the response system feedback analyzer 100a.

In one embodiment, among other possible embodiments, the PCD 75 is a conventional and commercially available touch-tone telephone, and the response can be accomplished by having the notification-receiving party depress one or more appropriate keys on the keypad associated with the telephone. In this embodiment, the response system feedback mechanism 100b is already built into the telephone, in the sense that there are already on-board the phone, system components for recognizing keypad keys that are depressed and for generating dual frequency tones that can be carried across the communications medium. Also, the telephone is equipped with a transmitter 73 for communicating the dual frequency tones. In this embodiment, the BSCU 40 is equipped with a receiver 45 (communicatively coupled to local interface 33b of FIG. 3) for receiving and decoding the dual frequency tone that results from depression of a telephone button. Such receivers/decoders 45 are well known in the art of telephony and are readily commercially available. For instance, the star (*) button could be assigned for indicating that the receiving party has in fact received the notification communication. Once the receiving party depresses this key and once the BS manager 41 recognizes that it has been depressed by detecting this event, then the BS manager 41 can definitively conclude receipt of the notification communication by the party associated with the PCD 75.

More than one key can be used to convey multiple instructions or indications from the notification-receiving party to the BS manager 41. The BS manager 41 can be equipped with an instruction lookup mechanism 84, for example, a lookup table, database, or other mechanism for identifying what each received key stroke means.

In some embodiments, more than one party may have access to the PCD 75, and it may be desirable to give each party their own personal code of one or more keys, so that when a response is given by a party, the party can enter his/her own personal code, and the BS manager 41 will therefore be advised as to which party actually received the notification.

In another embodiment, the PCD is a conventional telephone and the BSCU 40 is equipped with voice recognition software. The receiving party confirms receipt of the notification communication with any suitable voice command, for instance, "notification received." Voice recognition systems (e.g., IVR) are well known in the art.

In another embodiment, when the PCD 75 is a computer, one or more keys on the keyboard, a mouse click on a button provided in a screen image, etc., can be assigned for indicating that the receiving party has in fact received the notification communication. In this embodiment, software associated with the computer recognizes the key depression or mouse click and communicates occurrence of same back to the notification system 10. The software can be a conventional web browser and the notification communication could involve sending an HTML page (or other markup language) to the computer that can be operated upon by the web browser. An applet(s) associated with the HTML page can cause a window to appear on the computer screen with a selectable button, for example, "Notification Received" and when selected by the mouse, the applet can cause the browser to return an HTML page from the computer back to the notification system 10, which in this case would have a web server that can accept the HTML page response and analyze the content. As an alternative, the response system 100 could be designed so that any input from an input/output (I/O) peripheral device connected to the notification-receiving party's computer could be recognized as a confirmation of receipt by the party of the notification. Also, note that the response can occur during the same communication session as the notification or in a separate communication within a reasonable time period.

Any response data, including confirmation of receipt of a notification, that is received by the response system feedback analyzer 100a can be stored, if desired, with party contact records 86, as shown in FIG. 6, which can take the form of a table, database, etc.

It is also possible that the response system 100 and the response system feedback analyzer 100a can be designed so that the party's response indicates that the party associated with the PCD 75 is willing to accept or refuses a task, or job, associated with the notification. The task can be virtually anything that is to be performed by the party. For example, in the context of a taxi service, a BSCU 40 could send a notification via a telephone to a taxicab, and a message could be played over the telephone asking the party if another party can be picked up at a particular location within a prescribed time period. The party associated with the taxicab could send a response back to the BSCU 40, indicating either acceptance or refusal of the task, by actuating a key that is coded to each of these responses. Note that U.S. Pat. No. 5,945,919, which is entirely incorporated by reference, describes an automated dispatch system, in which the response system 100 can be employed.

As another example, consider a public bus transit system that communicates bus arrival/departure information to a PCD 75 and wherein a party can send a response indicating receipt of notice and indicating that the party will be a passenger on the bus. This information would be helpful with respect to bus scheduling.

It is also possible, in the context of a notification system 10 employed in connection with a service (e.g., cable installation, telephone line installation, etc.) to be performed at a destination, that the response system 100 and the response system feedback analyzer 100a can be designed so that the party's response indicates that the party associated with the PCD 75 needs to have an additional service performed at the destination or that additional equipment will be needed at the destination. As an example in the context of a telephone line installation, the notified party could indicate that it wishes two lines to be installed instead of the one which was ordered, so that the telephone service vehicle operator is notified in advance of the requisite additional service/equipment.

It is also possible, in the context of a notification system 10 employed in connection with a service to be performed at a destination, that a work order (of work to be performed at the stop location) is communicated to the PCD 75 during the notification communication. Furthermore, the notification message can indicate to the notified party an option that can be selected by the notified party to connect with and communicate with the driver of a vehicle or a party at the BSCU 40 or another location, in order to enable the notified party to discuss the content of the work order.

b. Second Embodiment

FIG. 7B is a flow chart illustrating another exemplary implementation of a response system feedback analyzer of the present invention, which is optionally implemented as at least part of the architecture, functionality, and operation of the BS manager of FIGS. 1 and 3. In this embodiment, a notified party can cause a connection to be made with a representative that knows the particulars of or that can access the particulars of a pickup or delivery of an item or service in connection with a stop location.

In this embodiment, the response system 100, particularly the response system feedback analyzer 100a, can be configured to implement the following methodology, as is summarized by flow chart in FIG. 7B: monitoring travel data in connection with an MT 17 that is destined to pickup or deliver (an item or service) at a stop location, as indicated at block 105; causing initiation of a notification communication to a PCD 75 based upon the travel data (e.g., when the MT 17 is in close proximity, has just departed a prior stop location, etc.), as indicated at block 106; and during the notification communication, enabling a party associated with the PCD 75 to select whether or not to communicate, for example, via voice by way of a telephone or via text by way of a computer network link, with a party having access to particulars of the pickup or delivery, as indicated at block 107, so that a discussion can be had regarding the particulars of the pickup or delivery.

In some embodiments, where there is a BSCU 40 associated with the notification system 10, the BS manager 41 causes communicative coupling between the PCD 75 of the party and a communications device associated with the party having access to particulars of the pickup or delivery. The latter could be located at a call center, at a place that is local to the BSCU 40, etc.

In some embodiments, where there is a BSCU 40 associated with the notification system 10, the BS manager 41 causes communicative coupling between the PCD 75 of the party and a PCD 75 associated with the MT 17 or person in the MT 17.

A message can be provided during the notification communication that includes a work order or description of the reason why the stop is being made. This can be very useful in connection with, for example, services to be performed at the stop location. The party being called can communicate with somebody associated with the pickup/delivery service to correct information that is in error on the work order, add additional tasks to the work order, delete tasks on the work order, etc.

As a further option, the BS manager 41 can be designed to enable the party to select an option that indicates to the notification system 10 that the work order is proper. For instance, a voice recording over a telephone link may say "Hit the pound key if the work order is accurate or hit the star key to talk with a representative." Selection of the pound key would confirm to the BS manager 41 the order and the MT 17 would travel to the stop location, as scheduled, and perform the requisite pickup/delivery task. Selection of the star key would cause the BS manager 41 to connect the notified PCD 75 with a communications device of a party having access to particulars of the pickup or delivery.

c. Third Embodiment

FIG. 7C is a flow chart illustrating yet another exemplary implementation of a response system feedback analyzer of the present invention, which is optionally implemented as at least part of the architecture, functionality, and operation of the BS manager of FIGS. 1 and 3. A response from a notified party is used to change one or more tasks associated with a pickup or delivery of an item or service associated with a stop location.

In this embodiment, the response system 100, particularly the response system feedback analyzer 100a, can be configured to implement the following methodology, as is summarized by flow chart in FIG. 7C: monitoring travel data in connection with a MT 17 that is destined to pickup or deliver an item or service at a stop location, as indicated at block 108; causing initiation of a notification communication (which may include a message indicating one or more tasks to be accomplished at the stop location) to a personal communications device based upon the travel data, as indicated at block 109; and during the notification communication, enabling a party associated with the personal communications device to change one or more tasks associated with the pickup or delivery, as indicated at block 110.

The tasks can be stored in and changed within database 94 (FIG. 5A), particularly in tasks table 68m. The BS manager 41 can be designed to change any of the tasks, based upon one or more inputs from the notified party. A set of options can be provided by the BS manager 41 to the notified party, for example, via IVR, text, screen prompts, or otherwise, and the party can select one or more of the options. Possible options are as follows: an option that indicates that the one or more tasks are proper or confirmed (so go ahead and follow through with the scheduled pickup or delivery; an option that enables the party to change the one or more tasks or scope thereof; an option to enable adding a task; or an option to enable deletion of a task.

This embodiment has numerous applications. One nonlimiting example (e.g., pizza delivery, package delivery, etc.) involves indicating in a message associated with the notification communication the amount of a bill and enabling the notified party to confirm the amount and/or the intention to pay the amount when the MT 17 reaches the stop location for the pickup or delivery. In some embodiments, the system can be configured so that the notified party can make payment during the notification communication session. The BSCU 40 can be designed to prompt the notified party to enter a credit card number to be used to pay the bill. The card number can also be stored in user preferences and retrieved by the manager 41 pursuant to an appropriate prompt from the notified party during the notification communication session.

As another nonlimiting example of such an application, consider a configuration where a service, such as a telephone installation, is being provided at the stop location. Furthermore, assume that there is a work order for installation of a single telephone line. An advertisement (from table 68f of database 94 of FIG. 5A) could be provided to the notified party during the notification communication that indicates that a second line can be installed for half the price of the first line and for half of the monthly subscription fee. An option to select or deselect the second line installation can be provided to the notified party. Accordingly, the notified party has the ability to add or change the tasks to be performed at the stop location.

This idea can be applied to other contexts: changing the number of goods (e.g., groceries, etc.) to be delivered or picked up; changing the number of rooms to be carpet cleaned, changing the level of service (each having a different price), etc.

d. Fourth Embodiment

FIG. 7C is a flow chart illustrating still another exemplary implementation of a response system feedback analyzer 100a, which is optionally implemented as at least part of the architecture, functionality, and operation of the BS manager of FIGS. 1 and 3. In essence, a response from a notified party is used to select one of a plurality of times for a pickup or delivery of an item or service to occur at a stop location.

Figure 7D:
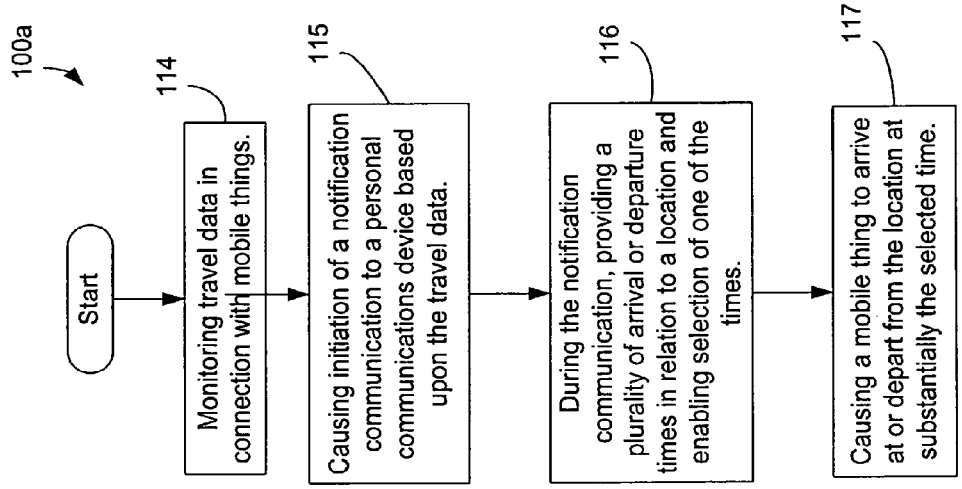
FIG. 7D is a flow chart illustrating still another exemplary implementation of a response system feedback analyzer, which is optionally implemented as at least part of the architecture, functionality, and operation of the BS manager of FIGS. 1 and 3. A response from a notified party is used to select one of a plurality of times for a pickup or delivery of an item or service associated with a stop location.

In this embodiment, the response system 100, particularly the response system feedback analyzer 100a, can be configured to implement the following methodology, as is summarized by flow chart in FIG. 7D: directly or indirectly monitoring travel or travel data in connection with one or more MTs 17 in order to track them, as indicated at block 114; initiating or engaging in a notification communication session with a PCD 75, when appropriate, based upon impending arrival or departure of one or more MTs 17 in relation to a location as indicated at block 115; during the notification communication session, providing a plurality of arrival and/or departure times in relation to the location and enabling selection of at least one of the times (directly or indirectly; the selection can be of an item that is associated in some way with the time so that the selection is essentially indirect), as indicated at block 116; and causing an MT 17 to arrive at or depart from the location at substantially the selected time, as indicated at block 117.

As for step 114, the arrival or departure times associated with MTs 17 can be stored and updated in database 94 (FIG. 5A), particularly in MT travel data table 68e. One or a plurality of MTs 17 can be monitored by the BS manager 41 for purposes of carrying out this embodiment.

With respect to step 115, the notification communication session can be initiated by the BS manager 41 based upon user or system defined preferences stored in database 94 (FIG. 5A). User and system defined preferences have been described elsewhere in this document. The predefined preferences may include, for instance, (a) a proximity to the location or (b) a designated location or region that is near the location at issue and that when encountered by one or more MTs 17, will result in the communication session.

The arrival or departure times of the one or more MTs 17 in relation to the location may be determined, at least in part based upon actual travel status information of the MTs 17 or at least in part based upon existing scheduling of the MTs 17 (which may or may not be updated).

As an example of a mechanism for triggering a notification in accordance with step 115, the user may indicate that the user would like to receive a notification when a pickup vehicle is one hour from arriving at a particular stop location. The BS manager 41 may determine, based upon the monitoring of travel data, that a particular vehicle 17 can arrive in one hour or, if a stop is skipped by such vehicle 17, then the vehicle 17 can arrive in 35 minutes instead of one hour. The BS manager 41 can be designed to initiate the notification communication under these circumstances and provide the different options during the notification communication, one of which can be selected by the notified party.

Thus, as can be seen from the aforementioned example, during the communication session, first and second times may be offered that corresponds substantially with a scheduled time and a sooner time. Moreover, different fees may be charged for selection of the different times. Or, a fee may be charged for selection of the sooner time.

As another example of a mechanism for triggering a notification in accordance with step 115, the user may indicate via user preferences that the user would like to receive a notification when a vehicle is one hour from departing from a location. The BS manager 41 may determine, based upon the monitoring of travel data, that two different vehicles are available, one departing in 15 minutes and the other departing in one hour. The BS manager 41 can be designed to initiate the notification communication under these circumstances to provide the two different options, one of which can be selected by the notified party.

With respect to step 116, the BS manager 41 can be easily designed to provide options to the notified party and to receive selections during the notification communication session. The set of options can be provided by the BS manager 41 to the notified party, for example, via voice recording, IVR, text, screen prompts, or otherwise, communicated to the notified PCD 75. The notified party can select one or more of the options on the notified PCD 75 via, for example, IVR, entering text, pressing touch pad keys to send a DTMF signal that means something to the BS manager 41, selecting a screen prompt via a mouse or touch screen, selecting a link on an HTML screen communicated by the BS manager 41 or a source controlled by or affiliated with the BS manager 41, etc.

In the case of a plurality of monitored MTs 17, a number of times can be provided to correspond respectively with the MTs 17. Furthermore, the notified party can select one of the plurality of times for an MT 17 to arrive at or depart from the location, which will identify to the BS manager 41 which one of the MTs 17 should be caused to arrive at or depart from the location.

With respect to step 117, the BS manager 41 can cause, directly or indirectly, an MT 17 to arrive at or depart from the location at the selected time by any of a variety of possible systems and/or methods. One method involves having the selected time communicated to a PCD 75 associated with the appropriate MT 17 so that the operator of the appropriate MT 17 knows of the scheduled arrival or delivery at the location and can make it happen. In alternative embodiments, the steps 114-117 are performed in a PCD 75 associated with a tracked MT 17, in which case the operator will be advised of the scheduled arrival or delivery at the location and can make it happen.

Another method in which the BS manager 41 can cause the MT 17 to arrive at or depart from the location at the selected time, in a case where the MT 17 can be remotely controlled, would be to communicate appropriate data or control signals to the MT 17.

This embodiment has numerous applications, but are not all listed here for simplicity.

e. Fifth Embodiment

Figure 8:
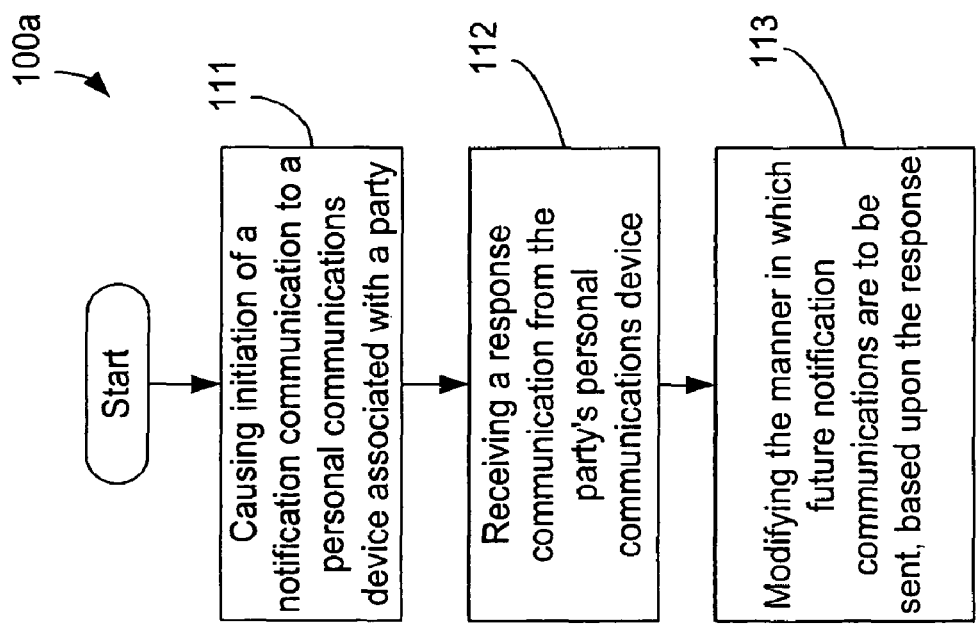
FIG. 8 is a flow chart illustrating another exemplary implementation of a response system feedback analyzer of the present invention, which is optionally implemented as at least part of the architecture, functionality, and operation of the BS manager of FIGS. 1 and 3.

Another embodiment of a response system feedback analyzer 100a, among others, is shown in FIG. 8. This embodiment envisions more than one notification communication, perhaps regular notifications, occurring between the notification system and a party, and enabling a party to influence how future notification communications are to occur, after the first one. This response system feedback analyzer 100a can be summarized by the following steps: initiating a first notification communication to a PCD associated with a party, as indicated by block 111 in FIG. 8; receiving a response communication from the party's PCD, as indicated by block 112 in FIG. 8; and modifying the manner in which future notification communications are to be sent to the party, based upon the response, as indicated by block 113 in FIG. 8. Although not necessary for implementation, the foregoing methodology can be implemented, and in the preferred embodiment is implemented, by software associated with the BS manager 41. The blocks of FIG. 7 would represent the high level architecture of such software. Note, however, that it is possible to have special purpose digital or analog hardware designed to implement the methodology. Such hardware can be easily associated with the BSCU 40.

In this embodiment, the initiating step 111 is performed by the transmitter 72 associated with the BSCU 40 (FIG. 1), under the control of the response system feedback analyzer 100a of the BS manager 41. The notification communication passes through the network 55 (FIG. 1) to the receiver 73 (FIG. 1) associated with the PCD 75.

The response from the receiving party is communicated by the transmitter 73 (FIG. 1), under the control of the response system feedback mechanism 100b associated with the PCD 75 that is associated with the receiving party. In one embodiment, the PCD 75 is a conventional touch-tone telephone, and the response can be accomplished by having the receiving party depress one or more appropriate keys on the keypad of the telephone 75 to communicate one or more instructions. In this embodiment, the BSCU 40 is equipped with a receiver (communicatively coupled to local interface 33b of FIG. 3) for receiving and decoding the dual frequency tone that results from depression of a telephone button. For instance, the star (*) button could be assigned for indicating an instruction from the receiving party. Once the receiving party depresses this key and once the response system feedback analyzer 100a of the BS manager 41 recognizes that it has been depressed by detecting this event (with receiver 72 under the control of the BS manager 41), then the response system feedback analyzer 100a of the BS manager 41 can act upon the instruction.

As mentioned previously, more than one key can be used in order to convey one or more instructions from the notification-receiving party to the notification system 10. Furthermore, the PCD 75 could also be a computer or any of the other devices that have been mentioned, or equivalents thereof.

As indicated at block 113 in FIG. 8, the response system feedback analyzer 100a of the BS manager 41 modifies the manner in which future notification communications are to be sent, based upon the response or content in the response, by manipulating data stored in connection with the notification-receiving party contact records 86 (FIG. 6). The response system feedback analyzer 100a of the BS manager 41 can be configured to modify the manner in which future notification communications are to be sent in a number of possible ways.

In one embodiment, among many possible embodiments, when the response system feedback analyzer 100a is implemented in software, it is designed to maintain one or more records pertaining to one or more parties and one or more communication methods associated with each party. Any suitable table or database can be maintained to store this information, if desired. In this embodiment, this data is stored in party contacts records 86 (FIG. 6). At this step in the process, after receiving the response from the notification-receiving party, the response system feedback analyzer 100a associated with the BS manager 41 modifies these records, based upon the notification-receiving party's instructions in the response, to store/create modified contact data, in order to affect changes in the manner in which future notification communications are communicated.

By its instructions, the notification-receiving party can, among other things, change the party(ies) to which notification communications are sent in the future, change the MT(s) that is monitored by the notification system 10, change the proximity parameter that provokes a notification communication, change the MT stop location that is used by the notification system 10 to provoke a notification communication, change the notification communication method and/or PCD, change a notification communication to a later time based upon a time of day or time period, cancel initiation of one or more scheduled future notification communications, etc.

Figure 9:
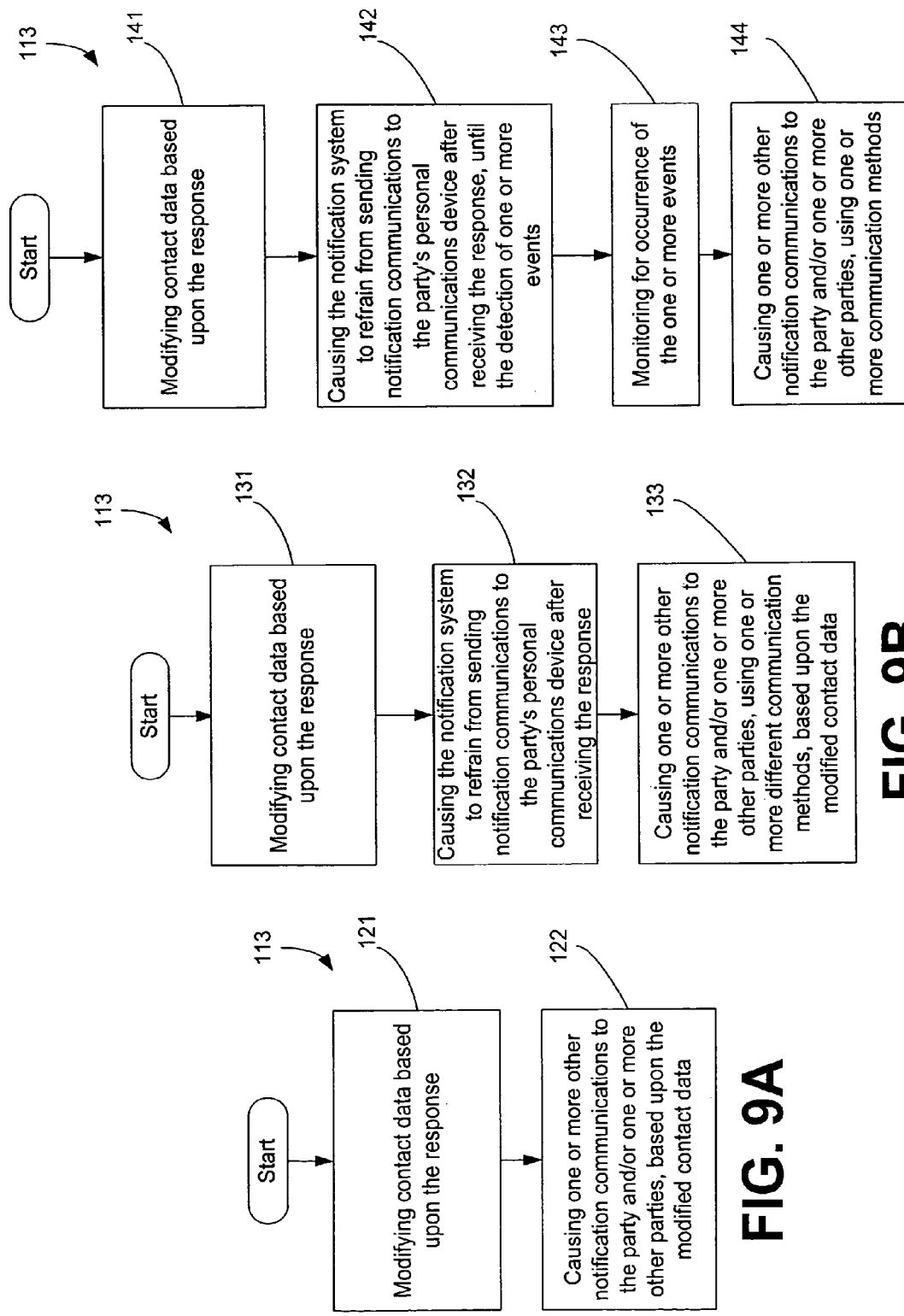
FIG. 9A is a flow chart illustrating an exemplary implementation of the modify step in the response system feedback analyzer of FIG. 8, which is optionally implemented as at least part of the architecture, functionality, and operation of the BS manager of FIGS. 1 and 3.
FIG. 9B is a flow chart illustrating another exemplary implementation of the modify step in the response system feedback analyzer of FIG. 8, which is optionally implemented as at least part of the architecture, functionality, and operation of the BS manager of FIGS. 1 and 3.
FIG. 9C is a flow chart illustrating yet another exemplary implementation of the modify step in the response system feedback analyzer of FIG. 8, which is optionally implemented as at least part of the architecture, functionality, and operation of the BS manager of FIGS. 1 and 3.

FIGS. 9A through 9C illustrate, pictorially, notable non-limiting examples of ways in which the response system feedback analyzer 100a of the BS manager 41 can cause the notification system 10 to modify the manner in which future notification communications are communicated by the notification system 10.

As illustrated in FIG. 9A, the response system feedback analyzer 100a associated with the BS manager 41 may be designed to cause the notification system 10 to modify contact data after receiving the response, as indicated in block 121, and to cause the notification system 10 to initiate one or more other future notification communications in accordance with, or based upon, the modified contact data resulting from the notification-receiving party's response, as indicated in block 122.

For example, the response system feedback analyzer 100a associated with the BS manager 41 can be configured to cause the notification system 10 to wait a time period before sending another communication to the receiving party. The time period may be predefined or maybe be dynamically programmable. The receiving party may define the time period in his/her response, for example, by selecting an appropriate keypad or keyboard button in the case of a telephone or computer, respectively. The instruction may indicate to the response system feedback analyzer 100a associated with the BS manager 41 that the notification-receiving party cannot handle any further notifications for a predetermined time period, such as 50 minutes, because the party now attends to a task (e.g., unloading or loading an item from an MT) resulting from the first notification. The task may even be identified in the notification-receiving party's response. Accordingly, the notification-receiving party can influence how the BS manager 41 handles future notifications to the particular party.

As another example, the response system feedback analyzer 100a associated with the BS manager 41 can be configured to cause the notification system 10 to wait for the MT 17 to move a prescribed distance or come within a predetermined proximity of a location before sending another communication to the notification-receiving party.

As another example, the response system 100 and the response system feedback analyzer 100a may be designed to enable the notification-receiving party to advise the response system feedback analyzer 100a to communicate one or more future notifications to one or more different parties that have assigned devices 75, in addition to the notification receiving party or instead of same.

As another example, the response system 100 and the response system feedback analyzer 100a may be designed so that the response may indicate to the response system feedback analyzer 100a associated with the BS manager 41 that the notification-receiving party will be changing locations. Therefore, the BS manager 41 should contact a different PCD 75 in connection with future notifications that is situated where the party will be in the future, for example but not limited to, a different telephone in a different facility.

As another example, the response system 100 and the response system feedback analyzer 100a may be designed so that an instruction may be used to advise the notification system 10 that the notification-receiving party would like to receive a status message in future notification communications, indicating the status of travel of the MT 17. For example, in future notifications, the status message may indicate the location of the MT 17 or the proximity (distance and/or time) of the MT 17 with respect to a location.

As another example, the response system 100 and the response system feedback analyzer 100a may be designed so that an instruction may be used to advise the notification system 10 that the notification-receiving party would like to receive directions to a site associated with the notification or an advertisement played during the notification. In this embodiment, the BSCU 40 can be communicatively coupled to suitable map software. To further illustrate this concept, a couple of specific examples are described hereafter.

As a first example consider a scenario where a telephone message advises a taxicab driver to: "Pick up at 325 East Broad Street. Confirm by pressing pound. If you need directions, press the star key." The system could be configured so that the response system feedback analyzer 100a recognizes the # key as a confirmation that the driver has in fact received the notification and recognizes the * key as a desire to receive directions. In this case, the response system feedback analyzer 100a would access direction information from the map software and forward the direction information, or a part thereof, to the driver, during the original notification communication or in a subsequent communication.

As a second example consider a scenario where a message sent to a computer advises a person that: "Your UPS package has arrived and is ready to be picked up at 325 East Broad Street. Confirm by pressing the one key. Pizza Hut is next door, and if you press the two key now, you will receive a free beverage." The system could be configured so that the response system feedback analyzer 100a recognizes depression of the 1 key as a confirmation that the person has in fact received the notification and recognizes depression of the 2 key as a desire to receive the discount. In this case, the response system feedback analyzer 100a could be designed to subsequently send a coupon electronically to the person via the computer, which could then be printed and taken by the person to the Pizza Hut to receive the discount.

As illustrated in FIG. 9B, the response system feedback analyzer 100a associated with the BS manager 41 may be designed to cause the notification system 10 to modify contact data, as indicated in block 131, to refrain from sending notification communications to the party's PCD 75 after receiving a response, as denoted in block 132, and to initiate one or more other future notification communications to the party and/or one or more other parties, using one or more different communication methods, based upon the modified contact data, as denoted in block 133. The communication methods, may include for example, but not limited to, contacting the same or a different cellular or land-line telephone, sending an internet email, sending a wireless text message to a PDA, sending a navigation screen to a computer, sending a notification signal and/or message to a television (TV) or computer via a cable modem or satellite modem, sending a notification signal and/or message via telex, communicating a message via radio transceiver, etc.

As a specific example of the overall process, the receiving party may indicate in the response that any future communications should be forwarded to a different communications PCD 75. For example, in the case of a touch-tone telephone, the "#" button may be assigned to indicate that the party has in fact received the notification, and the "5" button could be assigned to the function of indicating that the communication method is to be changed. Furthermore, having the party depress the "2" key after depression of # and 5, could be used to advise the BS manager 41 that communication method 2, corresponding to a computer, should be used in the future.

As a further option, the response system 100 and the response system feedback analyzer 100a can be designed to enable a party to define times (times of day, days of the week, etc.) for use of each future communications method or PCD 75.

As illustrated in FIG. 9C, the response system feedback analyzer 100a associated with the BS manager 41 may be designed to cause the notification system 10 to modify contact data, as indicated at block 141, to refrain from sending notification communications to the party's PCD 75 after receiving a response, until the detection of one or more events, as indicated in block 142, and then to monitor for occurrence of the one or more events, as indicated in block 143, and then to cause the notification system 10 to initiate one or more other future notification communications to the party and/or one or more other parties, using one or more communication methods, as denoted at block 144. The one or more events can include, for example but not limited to, detection that the MT 17 is about to arrive at, is at, and has left a particular location or has moved a prescribed distance, manual or automatic actuation of a switch on the MT 17 or at a location where the MT 17 visits, a certain time of the day has been achieved, a time period has lapsed since the last notification communication, cancellation of a package delivery or pickup, cancellation of an expected stop of an MT 17 at a stop location, delay of an expected stop of an MT 17 at a stop location, another communication from the party indicating that future notifications are welcome, etc. Detection may occur by actually monitoring travel of the MT 17 or by reviewing data corresponding with travel.

2. Response System Feedback Mechanism

Figure 10:
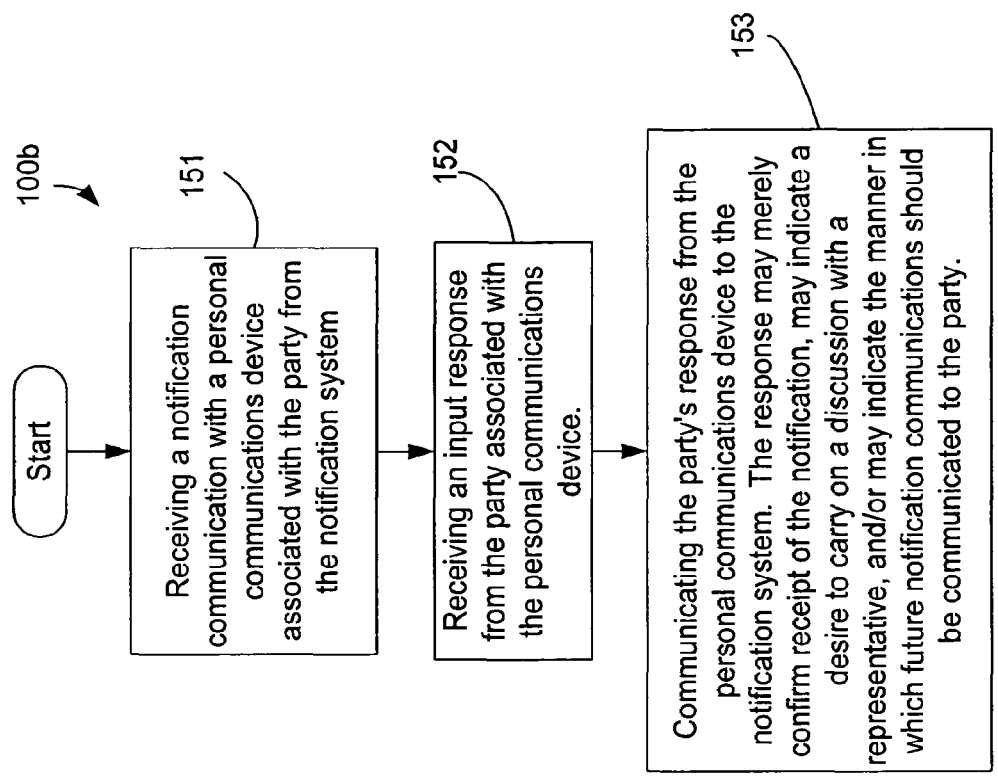
FIG. 10 is a flow chart illustrating an exemplary implementation of the response system feedback mechanism, which is optionally implemented as at least a part of the architecture, functionality, and operation of the personal communications device (PCD) of FIG. 1, and which interacts with the response system feedback analyzer of any of FIGS. 7 through 9C.

FIG. 10 shows the high level steps taken by the PCD 75 in connection with the foregoing embodiments of the response system feedback analyzer 100a. Some devices 75 may already be configured with the appropriate functionality, while others may need to be configured to exhibit the functionality and operate as shown in FIG. 10. For example, in the case where a conventional touch-tone telephone is to be used as the PCD 75 and where dual-frequency key stroke tones are to be used to convey instructions to the BSCU 40, the telephone already has the requisite functionality to perform the steps illustrated in FIG. 10.

First, the PCD 75 receives the notification communication from the BSCU 40, as denoted by block 151 in FIG. 10. Accordingly, the party associated with the PCD 75 is given a notification with respect to the MT, e.g., the mobile MT 17.

Next, the PCD 75 receives an input response, e.g., depression of one or more keys, a voice command, swiping of a magnetic strip of a card through a card reader, etc., from the party associated with the PCD 75, as indicated at block 152 of FIG. 10. The input from the party to the PCD 75 can be manually or automatically accomplished, but it is desirable to implement a mechanism that shows that the party that is supposed to be associated with the PCD 75 has received the notification communication by way of the PCD 75.

For security, it may be desirable to have the notification-receiving party identified (perhaps even uniquely identified) as one who is authorized or permitted to send a response. For instance, a fingerprint scanner, a retina scanner, and/or key insertion authentication could potentially be employed to verify the appropriateness of the party to produce a response.

Finally, as denoted at block 153 of FIG. 10, the PCD 75 communicates the party's response to the notification system, or in this example, the BSCU 40. The response may confirm receipt of the notification, may indicate to the BSCU 40 that the notified party would like to have a discussion (oral, text, or otherwise) with somebody who has access to the particulars of the pickup/delivery, may enable the notified party to change one or more tasks (or scope thereof) associated with the pickup or delivery, and/or may indicate the manner in which future notification communications should be communicated to the party, as will be further described below.

O. Response Failure States

The notification system 10, such as the manager 41 of the BSCU 40, can be designed to implement failure states in connection with a request for a response. A failure state occurs when a state of a variable has been reached without receiving a response back from a notified party or PCD 75. Internally, a failure state causes the system 10 to terminate notification communication attempts and/or to take one or more actions to accommodate the failure to receive a response. A failure state can also be shown on a screen or otherwise indicated to the operator of a PCD 75 (see FIGS. 25A through 25D; the one being tracked and/or the one being notified). A failure state can be system-defined or user-defined, and can be stored in user data table 68b (FIG. 5A) and/or failure state data table 68l (FIG. 5A).

A set of nonlimiting examples of failure state variables are as follows: (a) a time period variable (FIG. 25A) pertaining to the amount of time that has elapsed since invocation of the notification; when the time period variable has expired, it triggers a failure state in the PCD 75k; (b) a distance variable pertaining to the distance traveled by the tracked PCD 75k (FIG. 25B) since invocation of the notification; when the PCD 75k has traversed a prescribed distance that is monitored with the distance variable, then a failure state can be invoked in the moving/tracked PCD 75k; (c) a predetermined location variable (FIG. 25C) pertaining to a location to be traversed by the moving/tracked PCD 75k; in other words, once the PCD 75k determines that it has reached this predetermined location, then a failure state will result; and (d) an acceptance variable (FIG. 25D) which tracks the number of responses and/or acceptances associated with notification communications; this is useful in a configuration where a number of parties have been invited to visit a particular location (e.g., a restaurant), and there are only a limited number of openings; as an example, the system can be set to accept the first party to respond to the notification and invoke a failure state in connection with all other notifications (which can be communicated, if desired, to the other PCDs 75 that responded late).

Once a failure state has been determined by the manager 41, the manager 41 may be designed to implement one or more of the following actions: look for additional instructions to notify the next person on a contact or route list, try different contact information for the same individual, or utilize this information to re-route drivers to another destination; automatically notify another user of this failure state event; and/or automatically notify third party companies providing additional services, such as but not limited to, transportation services, that there has been a notification failure.

P. Advertisement Methods of Doing Business in Connection with Notification Services Various advertisement methods of doing business can be implemented in connection with the notification services, for example, those described hereinbefore.

One such advertisement method of doing business, among others, is illustrated in FIG. 11 and can be broadly summarized by the following steps (not necessarily in this order): (a) monitoring travel data associated with an MT 17, as indicated by reference numeral 161; (b) contacting a party based upon the travel data, as indicated by reference numeral 162; (c) providing an advertisement to the party substantially during the contact, as indicated by reference numeral 163; and (d) charging a fee or monetarily benefiting from providing the advertisement, as indicated by reference numeral 164. There are various alternatives and optional steps that may be practiced in connection with this method. For example, the fee may be charged for each advertisement in each notification, for a block of advertisements, or for the advertisement service in general. As yet another example, a discount on the advertisement service may be offered or extended based upon a purchase of a predetermined number.

An advertisement database 68f (FIG. 5A) can be disposed within the BS manager 41 or communicatively coupled to same to enable the manager 41 to initiate an advertisement at an appropriate time during a communication with a PCD 75. The advertisement can be conveyed by voice communication, by text communication, by visual presentation on a screen (e.g., an email with an accompanying advertisement, etc.), or by other means.

Another advertisement method of doing business, among others, is illustrated in FIG. 12 and can be broadly summarized by the following steps (not necessarily in this order): (a) enabling a party to indicate a willingness to receive one or more advertisements during a notification regarding an MT 17, as indicated by reference numeral 171; (b) providing a notification communication involving travel status of the MT 17, as indicated by reference numeral 172; (c) providing an advertisement as part of or accompanying the notification communication, as indicated by reference numeral 173; and (d) charging a fee for or monetarily benefiting from providing the advertisement, as indicated by reference numeral 174. There are various alternatives and optional steps that may be practiced in connection with this method. For example, the fee may be charged for each advertisement in each notification, for a block of advertisements, or for the advertisement service in general. As yet another example, a discount on the advertisement service may be offered or extended based upon a purchase of a predetermined number.

Yet another advertisement method of doing business, among others, is illustrated in FIG. 13 and can be broadly summarized by the following steps (not necessarily in this order): (a) enabling a party to indicate a willingness to receive one or more advertisements during a notification regarding an MT 17, as indicated by reference numeral 181; (b) providing a notification communication involving travel status of the MT 17, as indicated by reference numeral 182; (c) charging a fee or monetarily benefiting from providing the notification communication, as indicated by reference numeral 183; (d) providing an advertisement as part of or accompanying the notification communication, as indicated by reference numeral 184; (e) charging a fee for or monetarily benefiting from providing the advertisement, as indicated by reference numeral 185; and (f) providing a discount based upon the party's willingness to receive the one or more advertisements, as indicated by reference numeral 186. There are various alternatives and optional steps that may be practiced in connection with this method. For example, the fee may be charged for each advertisement in each notification, for a block of advertisements, or for the advertisement service in general. As yet another example, a discount on the advertisement service may be offered or extended based upon a purchase of a predetermined number.

In alternative embodiments, the stop location of the MT 17 and/or the location of the user and/or PCD 75 can be determined and taken into account with respect to advertisements. See next section for a discussion of the location determination of the user, PCD 75, and/or stop location. With this location information, the advertisements can be selected based upon the geographical location of the user, PCD 75, and/or stop location. As an example, advertisements can be sorted in a database based upon the geographical areas to which they pertain. Then, if it is determined that the PCD 75 or that the stop location is near the intersection of First Street and $10^{th}$ Street, then the advertisement database can be accessed for those advertisements that pertain to the vicinity around First Street and $10^{th}$ Street. For instance, the database might include an advertisement about Pizza Hut, and there might be a Pizza Hut that is located one block from this intersection. In this case, the manager 14 may be designed to select the Pizza Hut advertisement and communicate this to the PCD 75 because the PCD 75 is in close proximity to the Pizza Hut that is at issue. Also, the system may be designed to forward directions to the Pizza Hut to the PCD 75 before, during, or after the advertisement is effectuated at the PCD 75.

In alternative embodiments, the timing of the notification communication may be taken into account when advertisements are selected from a database for communication to the PCD 75. For example, the hours when a store is open may be tracked in the advertisement database. Further, when a notification communication is initiated, it may be desirable to refrain from communicating those advertisements that pertain to stores that are closed at the time of the notification communication. In this case, the manager 41 could be designed to prevent such advertisements to occur during prescribed time periods. Moreover, the converse could be designed into the system, i.e., the system could be designed so that advertisements pertaining to those stores that are known to be open at the time of the notification communication are communicated to the PCD 75.

In alternative embodiments, information regarding a notification-receiving party, for example, a personal profile in user data table 68b indicating interests, activities, historic information regarding prior purchases, traveling, etc., may be stored in memory and used to make decisions regarding which advertisements to communicate to the PCD 75.

In alternative embodiments, discount awards can be communicated to the notification-receiving party. For example, an image of a discount coupon could be forwarded to the PCD 75 that has a screen, which can be printed or shown by the user to the business establishment to which it pertains, in order to obtain the discount. As another example, a discount code can be forwarded to the PCD 75 via voice or text, which can be communicated by the user to the business establishment to which it pertains, in order to obtain the discount. The discount code can be predefined by the business establishment and communicated to the notification system 10, which can store it in the memory 30b, such as in association with advertisement data table 68f.

In alternative embodiments, the waiting times associated with retail establishments, for example but not limited to, restaurants, are monitored with periodic communications between a PCD 75 associated with such retail establishments and the BS manager 41. Furthermore, these waiting times can be communicated with advertisements involving such retail establishments to the notified PCD 75.

Q. Stop Location Determination Systems and Methods Based Upon User and/or Device Location Feedback Stop location determination systems (and methods) 190 that utilize user and/or device location feedback can be implemented in connection with the notification systems, for example, those described hereinbefore. Several nonlimiting exemplary embodiments of possible stop location determination systems (and methods) 190 will be described in detail hereafter. Although not limited to this application, such stop location determination systems 190 are particularly useful in connection with transportable PCDs that are carried with a mobile person, as will be clear from the discussion hereafter.

1. First Embodiment

The architecture of one such embodiment, among others, is shown in FIG. 14A and is generally denoted by reference numeral 190a. Although not limited to this particular configuration, in this embodiment, the stop location determination system 190a is implemented in the notification system 10 of FIGS. 1 and 3, particularly the BS manager 41. The stop location determination system 190a, can be configured to implement the following methodology, as is summarized by flow chart in FIG. 14: monitoring travel data associated with an MT 17, as indicated at block 191; causing the notification system 10 to communicate a notification involving a delivery or pickup task associated with the MT 17 to a PCD 75 associated with a party, as indicated at block 192; receiving location data from the PCD 75 (ultimately from the device user, device itself, and/or another source), as indicated at block 193; determining one or more stop locations, based upon the device location data and the travel data associated with the MT 17, as indicated at block 194; and causing the notification system 10 to communicate an identification of the one or more stop locations to the PCD 75 so that the delivery or pickup task can be accomplished at the determined stop location, as indicated at block 195. Note that these steps can occur as part of the same communication session or link or in more than one communication transaction.

Although not necessary for implementation, the foregoing methodology can be implemented, and in the preferred embodiment is implemented, by software associated with the data manager 67, such as the monitoring mechanism 69, of the BS manager 41. See stop location determination system 190 in FIGS. 1 and 3. The blocks of FIG. 14 essentially represent the high level architecture of such software. Note, however, that it is possible to have special purpose digital or analog hardware designed to implement the same or similar methodology, and such hardware could be associated with the BSCU 40.

In this embodiment 190a, the BS manager 41 monitors travel of the MT 17, as previously described, and stores such information in the database 94. As mentioned, the database 94 can employ an MT travel data table 68e for storing such information, along with other fields that relate such information to other data in the same table 68 and in other tables 68. The tracking can be based upon timing, distance, and/or location information.

The transmitter 72 associated with the BSCU 40 (FIG. 1), under the control of the BS manager 41, communicates the notification communication. The notification communication passes through the network 55 (FIG. 1) to the receiver 73 (FIG. 1) associated with the PCD 75. The BS manager 41 can be designed to cause initiation of the notification communication when the MT 17 is an acceptable proximity, perhaps a predetermined proximity or system-defined or user-defined proximity, with respect to one or more stop locations, or has just passed one or more stop locations.

As another alternative, the BS manager 41 can be designed to cause initiation of the notification communication when the MT 17 has already traveled a predefined time period or distance along a predefined route.

As another alternative, the BS manager 41 can be designed to initiate a first notification in order to sense the current location of the PCD 75, make a selection of the stop location(s) (and perhaps notify the user of the identity of the stop location(s) during this first notification), and then provide a second notification communication at a later time, when the MT 17 is an acceptable proximity to the stop location (and perhaps notify the user, again or for the first time, of the identity of the stop location(s) during the second notification communication).

The location data identifying the location of the PCD 75 is stored in the database 94, which as mentioned can contain a PCD data table 68g for storing this information.

The location data identifying the location of the PCD 75 can be generated by a physical action taken by the party associated with the PCD 75 or can be generated automatically by the PCD 75 itself or by other remote sensing means. As an example of a physical action, the party could be prompted (e.g., by voice recording) by the BS manager 41 to enter a digit on a telephone to indicate a geographical area. For instance, the voice recording could say, "Press one if you are located in northwest Atlanta, press two for northeast Atlanta, press three for southwest Atlanta, and press four for southeast Atlanta." Obviously, many other encoding schemes are possible. In this example, once the party presses one of these telephone buttons, the BS manager 41 via a dual frequency tone decoder is able to determine the location of the party and PCD 75.

For automatic generation of location data, a location sensor 80 can be associated with the PCD 75 to determine or communicate location data to the BS manager 41 via transmitter 73, network 55, and receiver 72. Although not limited to this configuration, in the preferred embodiment, the location sensor 80 includes a GPS receiver that receives GPS signals from GPS satellites. In at least one configuration, the PCD 75 is a cellular or personal communication system (PCS) device and the network 55 is a cellular network and has computer-based support functionality and processing for receiving location signals from the GPS receiver and communicating location information to the BS manager 41. Examples of such systems are described in the following patents: U.S. Pat. Nos. 6,360, 101; 6,519,466; 6,453,237; and 5,479,482, all of which are incorporated herein by reference in their entirety.

In alternative embodiments, for automatic generation of location data, other types of positioning systems may be utilized to determine location information for the PCD 75. For example, radar could be used to remotely track the PCD 75 and then the radar system could be designed to convey position information to the PCD 75 or the base station control unit (BSCU) 40, for ultimate consumption and analysis by the BS manager 41.

The BS manager 41 is designed to determine a stop location(s), based upon the location data provided by the PCD 75 and based upon the travel status of the MT 17. The stop location(s) can be determined based upon any suitable set of criteria. The database 94 can be provided with a stop location data table 68*d* for storing stop locations and relating them to MTs 17 that are further identified in the MT data table 68*a*.

As an example, the BS manager 41 may be designed to determine an exact or approximate midpoint location between the location of the MT 17 and the location of the PCD 75 to serve as the stop location. The BS manager 41 can be interfaced with or be designed to include mapping software (many versions of which are commercially available at the present time), geographic information system (GIS) software, or an address lookup table to enable the BS manager 41 to perform the foregoing determination. Mapping software and interfaces thereto are well known in the art and are commercially available. Also, see U.S. Pat. No. 5,594,650, which is incorporated herein by reference and which describes an example of mapping software.

As another example, the stop location(s) may be selected from a group of predetermined stops (a collection or along a predetermined route), known intersections, known addresses, detected locations, locations on a map, etc., that are in an acceptable proximity to the PCD 75 and the MT 17, at the time that the determination is made.

In some embodiments, a selection among of group of possible stops can be made by correlating a maximum device distance requirement (distance between the device and a possible stop location) and a maximum MT distance requirement (distance between the MT 17 and a possible stop location) to the group of possible stop locations.

One or more algorithms 98 (FIG. 5A) can be provided and stored in memory for this purpose. For instance, assume that the maximum device distance requirement is set at a mile and assume that the maximum MT distance requirement is set at 5 miles. Also, assume that the BS manager 41 has determined, based upon its database, address lookup table, mapping programs, or otherwise, that three locations A, B, and C are possible candidates for the device user to pickup from or deliver to the MT 17. In this scenario, the BS manager 41 can be designed to analyze the locations A, B, and C to determine which meet the requirements. It can be designed to select one or more locations that meets the requirements.

The BS manager 41 communicates an identification of each of the one or more stop locations to the PCD 75 so that the delivery or pickup task can be accomplished at a stop location. The identification can be any suitable information that will enable the device user to travel to the stop location(s), for example but not limited to, street address information, bus stop location or number, street intersection location, longitude and latitude coordinates, audio or visual description of a place, an image of the stop location, a map image, etc. All of the foregoing can be stored, if desired, in and accessed from the stop location data table 68*d* (FIG. 5A). Directions to the stop location(s) can also be provided by the BS manager 41 over the communications link to the PCD 75. The directions can be stored in memory and accessed by an appropriate index that is stored in the table 68*d*. Note that computer-based functionality for a notification system for communicating a map image to the PCD is described in U.S. Pat. No. 6,278, 936, which is incorporated herein by reference in its entirety.

In alternative embodiments, the BS manager 41 may be designed to communicate, along with an identification(s) of the stop location(s), an identification of the MT 17 to the PCD 75. For example, the identification could be a bus number, visual or audio description, description of the driver or vehicle type (bus, railroad train, tax, etc.), etc. The foregoing information can be stored in and accessed from the MT data table 68*a* (FIG. 5A).

In alternative embodiments, the BS manager 41 may be designed to communicate, along with an identification of the stop location(s), a code to the PCD 75 that will be used by the contacted party to indicate to a party associated with the MT 17, for example, a driver of the MT 17, for authentication purposes so that the party associated with the MT 17 knows that the party arriving at the stop location is properly authorized to perform the pickup or delivery. The code can be stored in and accessed from, for example, the authentication data table 68*h*.

In alternative embodiments, the BS manager 41 may be designed to receive an indication from the PCD 75 that the party is unwilling to perform the delivery or pickup task associated with the notification; and as a consequence, to initiate another notification communication to another different PCD 75 associated with another party in order to request assistance in the delivery or pickup task from the another party. As an example, the BS manager 41 may prompt the party to press a particular telephone button to indicate a willingness or unwillingness to accept the responsibility of the delivery or pickup. As another example, the BS manager 41 may forward an HTML page (or other markup language) of code to a computer-based PCD 75 that visually prompts the party to make a selection.

2. Second Embodiment

In further alternative embodiments, as is shown in FIG. 14B, the BS manager 41 may be designed to perform the following steps: monitoring travel data associated with a plurality (two or more) of MTs 17, for instance, first and second MTs 17, as shown in block 201; communicating a notification involving a delivery or pickup task to a PCD associated with a party, as shown in block 202; receiving location data from the PCD, as shown in block 203; determining one or more first stop locations and one or more second stop locations, based upon the device location data and the travel data associated with the first and second MTs 17, as shown in block 204; and communicating one or more identifications for each of the first and second MTs 17 as well as their respective first and second stop locations to the PCD so that the delivery or pickup task can be accomplished at a stop location, as shown in block 205.

In alternative embodiments, the BS manager 41 may be designed to communicate, an indication of the type of MT 17 that will stop at each location, for example but not limited to, whether the MT 17, is a bus, railroad train, tax, etc. This would enable the notification-receiving party to select which mode of transportation to utilize.

In alternative embodiments, the manager 41 is designed to enable the user of the PCD 75 to select which of the stop locations and/or which of the MTs 17 that the user wishes to utilize. This can be accomplished using one of the variations of the response system, which have been described in detail previously. Furthermore, this selection or information indicative thereof can be forwarded by the manager 41 to a communications device, for example, device 44 (FIG. 1), associated with the selected MT 17, so that the MT 17 is aware of the pickup or delivery by the user at the selected stop location. Also, if desired, the manager 41 can be designed to advise one or more other MTs 17 that they have not been selected.

R. Stop Location Determination Systems and Methods Based Upon Timing Criteria Stop location determination systems (and methods) 190 that utilize timing criteria (system defined or user defined via user preferences) can be implemented in connection with the notification systems, for example, those described hereinbefore. Several nonlimiting exemplary embodiments of possible stop location determination systems (and methods) 190 of this type will be described in detail hereafter. Although not limited to this application, such stop location determination systems 190 are particularly useful in connection with transportable PCDs that are carried with a mobile person, as will be clear from the discussion hereafter.

1. First Embodiment

The architecture of one such embodiment, among others, is shown in FIG. 15A and is denoted by reference numeral 190c. Although not limited to this particular configuration, in this embodiment, the stop location determination system 190c is implemented in the monitoring mechanism 69 (FIG. 5B) associated with the notification system 10, particularly in the software associated with the BS manager 41 (FIG. 3). This stop location determination system 190c, can be configured to implement the following methodology, as is summarized by flow chart in FIG. 15A, via suitable programming: receiving one or more timing criteria corresponding to a pickup or delivery, as denoted at block 211; monitoring travel data pertaining to an MT 17, as denoted at block 212; determining one or more pickup/delivery locations for the MT 17 based upon the travel status and the timing criteria, as denoted at block 213; and communicating with a PCD 75 associated with a party and providing the pickup/delivery locations to the communications device, as denoted at block 214, so that pickup or delivery can be accomplished in accordance with the timing criteria at a stop location.

The timing criteria can be, for example but not limited to, a time of the day, a period of time during the day (e.g., 2:00 pm to 4:00 pm, daytime, nighttime, etc.), days of the week, weeks of the month, a period of time to elapse from the time that the timing criteria are made known to the notification system (e.g., in 3 hours), an indication of ASAP (as soon as possible), etc. In the preferred embodiment, the timing criteria are communicated to the BS manager 41 by the user and are stored in user data table 68b of the database 94 (FIG. 5A).

The entity that owns and/or operates the notification system 10 or notification service could even practice a business method involving charging a user for delivering to or enabling pickup at a location that was not originally scheduled or charging different fees to a user for different degrees of notification immediacy or charging for facilitating a delivery or pickup. For example, the entity could charge more for ASAP service than for a service having a timing requirement of within 24 hours. A stratified billing schedule could be implemented, for example, similar to the manner in which the U.S. Postal Service charges for mail services: overnight is one charge, two-day service is another, etc.

Note that, with the stop location determination system 190c, a user can meet a driver of a vehicle at any one of a number of vehicle stops along a route traveled by the vehicle. As an example, a party may wish to meet a driver and obtain a package as soon as possible. This system 190c allows the party to interact with the driver/vehicle at an appropriate vehicle stop (address or map based location) that meets the timing criterion, perhaps one that was not originally intended by the party or driver.

In this embodiment 190c, the massage manager 82 of the BS manager 41 receives the one or more timing criteria corresponding to a pickup or delivery and stores this information in the user data table 68b. The timing criteria can be communicated to the BS manager 41 via any suitable means, for example but not limited to, via a computer over the Internet, in response to screen prompts associated with a graphical user interface displayed on the user's computer screen and generated from HTML (with applets, if desired, in the implementation) communicated from the BSCU 40 to the user computer.

The data manager 67 and/or the monitoring mechanism 69 of the BS manager 41 is designed to monitor travel of the MT 17, as previously described. The tracking can be based upon timing, distance, and/or location information.

The data manager 67 and/or the monitoring mechanism 69 of the BS manager 41 is further designed to determine a pickup/delivery location(s) for the MT 17 based upon the travel status and the timing criteria (and in alternative embodiments, additionally based upon location data associated with the PCD 75 itself, an originally scheduled pickup/delivery location, or some other location or geographical reference). Any suitable algorithms may be employed by the BS manager 41 to accomplish this determination task.

The stop location(s) may be determined from a group of predetermined eligible stops (a collection or along a predetermined route), from known intersections, from a set of detected locations, from locations on a map, from addresses, etc. The BS manager 41 can be interfaced with or be designed to include conventional mapping software to enable the BS manager 41 to perform the foregoing determination.

As a simple example of a determination process, the BS manager 41 could select the next stop or next two stops along a predetermined route associated with a delivery vehicle when it will arrive at such stop or stops within a specified timing criterion, e.g., 30 minutes.

In some embodiments, a selection among a group of possible stops can be made by correlating a maximum device time requirement (time that it will take a person carrying the device to travel the distance between the device and a possible stop location) and a maximum MT time requirement (time that it will take the MT 17 to travel the distance between the MT 17 and a possible stop location) to the group of possible stop locations. For instance, assume that the timing criterion is set at 15 minutes, that the BS manager 41 has determined, based upon its database, mapping programs, or otherwise, that three locations A, B, and C are possible candidates for the device user to pickup from or deliver to the MT 17, that the maximum device time requirement for locations A, B, and C are 10, 16, and 20 minutes, respectively, and that the maximum MT time requirement for locations A, B, and C are 5, 11, and 9 minutes, respectively. In this scenario, the BS manager 41 can be designed to select location A, because the timing criterion will be met.

In alternative embodiments, the stop location(s) may be selected from locations that are in an acceptable proximity to the PCD 75 and the MT 17, at the time that the determination is made, but which would satisfy the one or more timing criteria. In these alternative embodiments, the location of the PCD 75 can be assumed, in general, based upon the home address, work address, telephone number exchange associated with the PCD 75, etc., associated with the user, could be determined using a location sensor situated on the PCD 75 (as previously described), could be based upon other configuration data provided by the user, etc.

When a notification communication is to occur, the transmitter 72 associated with the BSCU 40 (FIG. 1), under the control of the BS manager 41, communicates the notification communication. The notification communication passes through the network 55 (FIG. 1) to the receiver 73 (FIG. 1) associated with the PCD 75. The BS manager 41 can be designed to cause initiation of the notification communication when a suitable MT 17 is an acceptable proximity, perhaps a predetermined proximity or system-defined or user-defined proximity, with respect to one or more stop locations.

As another alternative, the BS manager 41 can be designed to cause initiation of the notification communication when a suitable MT 17 has already traveled a predefined time period along a predefined route.

The BS manager 41 communicates an identification of the stop location(s) to the PCD 75 so that the delivery or pickup task can be accomplished at a stop location. The identification can be any suitable information that will enable the device user to travel to the stop location(s), for example but not limited to, street address information, bus stop location or number, street intersection location, longitude and latitude coordinates, audio or visual description of a place, an image of the stop location, a map image, etc. Directions to the stop location(s) can also be provided by the BS manager 41 over the communications link.

In alternative embodiments, the BS manager 41 may be designed to communicate, along with an identification of the stop location(s), an identification of the MT 17 to the PCD 75. For example, the identification could be a bus number, visual or audio description, description of the driver or vehicle type, etc.

In alternative embodiments, the BS manager 41 may be designed to communicate, along with an identification of a plurality of stop locations, an indication of the type of MT 17 that will stop at each location, for example but not limited to, whether the MT 17, is a bus, railroad train, tax, etc.

In alternative embodiments, the BS manager 41 may be designed to communicate, along with an identification of the stop location, a code to the PCD 75 that will be used by the contacted party to indicate to a party associated with the MT 17, for example, a driver of the MT 17, for authentication purposes so that the party associated with the MT 17 knows that the party arriving at the stop location is properly authorized to perform the pickup or delivery.

In alternative embodiments, the BS manager 41 may be designed to receive an indication from the PCD 75 that the party is unwilling to perform the delivery or pickup task associated with the notification; and as a consequence, to initiate another notification communication to another different PCD 75 associated with another party in order to request assistance in the delivery or pickup task from the another party. As an example, the BS manager 41 may prompt the party to press a particular device button to indicate a willingness or unwillingness to accept the responsibility of the delivery or pickup. As another example, the BS manager 41 may forward an HTML page of code to a computer-based PCD 75 that visually prompts the party to make a selection.

2. Second Embodiment

As illustrated in FIG. 15B, the BS manager 41 may be configured to perform the following steps: receiving one or more timing criteria corresponding to a pickup or delivery, as denoted at block 221; monitoring travel data pertaining to a plurality of MTs 17, for instance, first and second MTs 17, as denoted at block 222; determining a pickup/delivery locations for the first and second MTs 17 based upon the travel status and the timing criteria, as denoted at block 223; and contacting a communications device associated with a party and providing the pickup/delivery locations for the first and second MTs 17, respectively, to the communications device, so that pickup or delivery can be accomplished in accordance with the timing criteria, as denoted at block 224.

In alternative embodiments, the BS manager 41 may be designed to communicate, an indication of the type of MT 17 that will stop at each location, for example but not limited to, whether the MT 17, is a bus, railroad train, tax, etc. This would enable the notification-receiving party to select which mode of transportation to utilize.

In alternative embodiments, the BS manager 41 is designed to enable the user of the PCD 75 to select which of the stop locations and/or which of the MTs 17 that the user wishes to utilize. This can be accomplished using one of the variations of the response system, which have been described in detail previously. Furthermore, this selection or information indicative thereof can be forwarded by the BS manager 41 to a communications device, for example, device 44 (FIG. 1), associated with the selected MT 17, so that the MT 17 is aware of the pickup or delivery by the user at the selected stop location. Also, if desired, the BS manager 41 can be designed to advise one or more other MTs 17 that they have not been selected.

S. Secure Notification Messaging Systems and Methods

Secure notification messaging systems and methods can be implemented in connection with the notification systems, for example, those described hereinbefore, to give the contacted party confidence that the notification message is genuine and legitimate.

More specifically, the BS manager 41 may be designed to send authentication information to the PCD 75 when a notification is in progress to indicate to the user that the notification is originating from the proper source. The authentication information can be, for example but not limited to, any of the following: a logo, trademark, coat of arms, symbol, predefined symbol or text or numeric code that has been made known to or selected by the party being contacted, specific sound or sounds or music, a distinctive ring as described in U.S. Pat. No. 6,313,760 that is selected by the user, image of a vehicle or driver, live image of vehicle or driver, a telephone number that can be called to verify the notification, such as the telephone number associated with a telephone situated on the MT 17 or associated with a verification entity, part of a credit card number, such as the last four digits, an image of a signature, such as the signature of the notified party, a public official, or another party, etc.

The authentication information can be preset or dynamically programmable. It can be user defined or system defined.

When the PCD 75 is equipped with a screen (e.g., a Sanyo Model 8100 wireless PCS vision picture phone distributed by Sprint, a Sony Ericsson T300 wireless picture phone distributed by T-Mobile, etc.), an image can be sent. When the PCD 75 is equipped with audio capabilities, a signal that causes an audible signal at the user end can be sent. When the PCD 75 is equipped with motion or vibration capabilities, a signal can be sent that causes a particular motion or vibration signal to occur at the user end.

The authentication data can be stored in authentication data table 68$h$ of the database 94 or the data can be accessed remotely, even dynamically during a communication with PCD 75.

Figure 16:
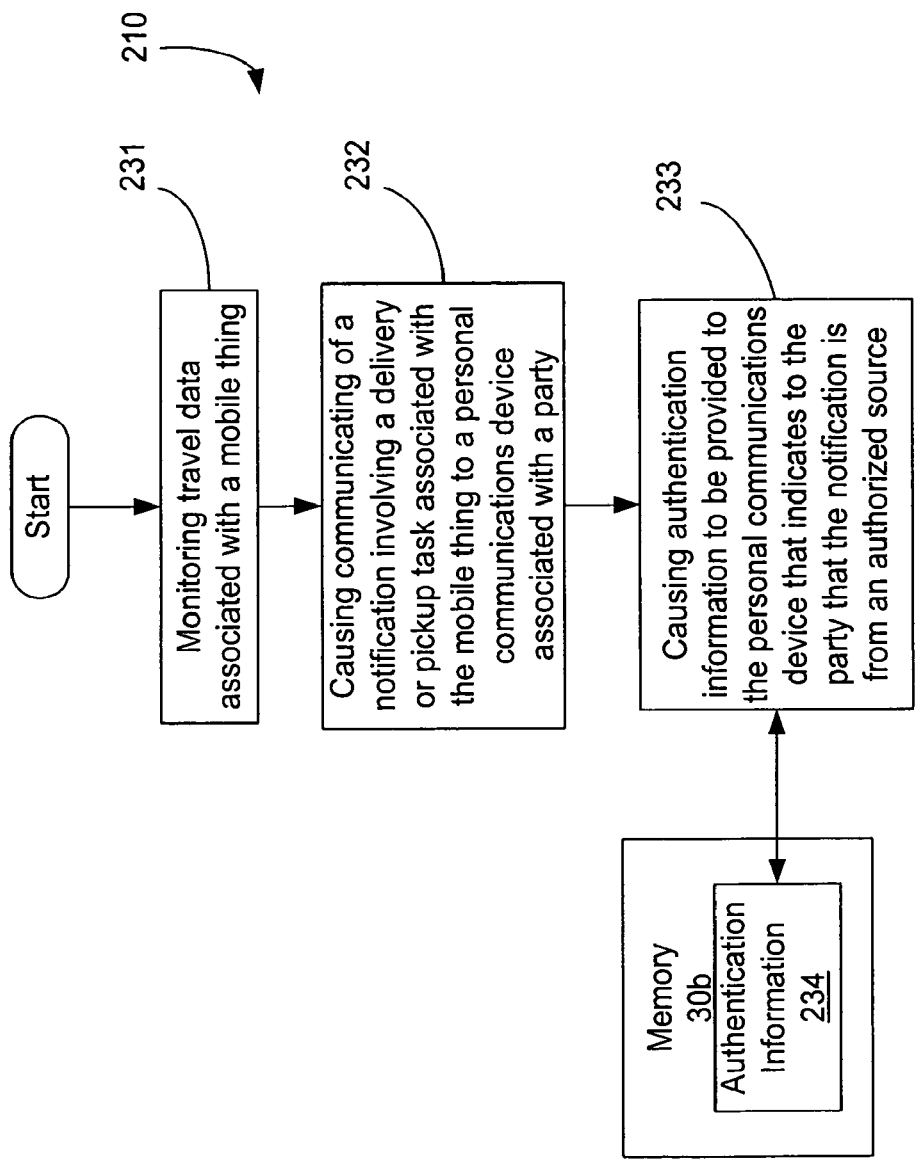
FIG. 16 is a flow chart illustrating an exemplary implementation of a secure notification messaging system (and method) that can be optionally implemented in connection with any notification system, for example, as at least part of the architecture, functionality, and operation of the BS manager of FIGS. 1 and 3.

FIG. 16 shows graphically the secure notification messaging system and is generally denoted by reference numeral 210. As an exemplary implementation, the system 210 is implemented in software in the monitoring mechanism 69 associated with the BS manager 41. The software is configured to perform or cause performance of the following steps: monitoring travel data associated with an MT 17, as indicated at block 231; communicating a notification involving a delivery or pickup task associated with the MT 17 to a PCD associated with a party, as indicated at block 232; and providing authentication information 234 to the PCD that indicates to the party that the notification is from an authorized source, as indicated at block 233. The providing step can be performed before, during (as part of the same step), or after the communicating step. As is shown in FIG. 16, the authentication information 234 can be stored in the memory 30$b$, can be accessed by the BS manager 41, and communicated by the BS manager 41 to the PCD 75.

In alternative embodiments, among others, a party can predefine one or more authentication indicia to be sent to the PCD 75 during a notification. The BS manager 41 is designed with functionality to permit a party to communicate with the BS manager 41 and provide configuration information, such as an identification of the authentication indicia. Such configuration information can be stored and accessed by the BS manager 41 in the user data table 68$b$ and/or the authentication data table 68$h$.

As an example, the contact can occur by having the party use a computer or computer-based device to communicate with the BS manager 41 over the Internet, particularly the WWW. Any suitable graphical user interface can be employed to enable communications. U.S. Pat. No. 6,411,891 describes systems and methods for enabling interactions between a party using a computer and a base station computer associated with a notification system, the description of which is incorporate herein by reference. These systems and methods can be employed in the context of this example.

As another example, the contact can occur by having the party use a conventional telephone to communicate with the BS manager 41 over the PSTN. In connection with such a telephone link, any suitable interactive voice response (IVR) system or dual-tone encoding scheme may be utilized to communicate information. U.S. Pat. No. 5,657,010 describes systems and methods for enabling interactions between a party using a telephone and a base station computer associated with a notification system, the description of which is incorporate herein by reference. These systems and methods can be employed in the context of this example.

In further alternative embodiments, a link may be provided by the BS manager 41 with the authentication information to enable the party to certify that the authentication information is from an authorized source. For example, the link may be a hyperlink to a server on the Internet. The party can select the link to communicate with the server to certify that the authentication information is from the authorized source.

As an example, a certifiable image may be utilized. More specifically, an image is communicated to the PCD 75 and the user of the PCD 75 can have the content of the image certified or verified as originating from an authorized source. In one such embodiment, the image (captured live via digital camera or prerecorded) is a picture of a mobile vehicle driver that is communicated to a computer-based PCD 75 during the notification communication. The image is embedded in HTML, XML, or some other markup language with Java applets. A hyperlink is provided so that the device user can click on, or select, the image or select the hyperlink, which causes the image to be sent to a remote certification/verification server on the Internet. The certification/verification server can be part of the notification system or a separate entity. The server compares the image with an image of the driver that is stored in a local accessible database. When it matches or does not match, the server is designed to communicate such message back to the PCD 75 indicating the match or nonmatch, respectively.

As another example, a certifiable code may be utilized. In this example, the certification/verification server has a list of authorized codes in its database that are authorized to be used by the notification system/service. The server compares the incoming code with a code that is stored in an accessible database. When it matches or does not match, the server is designed to communicate such message back to the PCD 75 indicating the match or nonmatch, respectively.

As another alternative embodiment, the MT 17 may be equipped with one or more digital cameras (or the cameras may be disposed remote from the MT 17) for capturing an image, series of images, and/or video (real time live or delayed) of the MT 17, of a person (e.g., a driver) or thing situated within the MT 17, or of something outside the MT 17 and for communicating the image or video to a website server on the World Wide Web (WWW) of the Internet. Moreover, the authentication information may include a hyperlink to the website server on the WWW of the Internet so that the notification-receiving party can view the image or video taken from the MT 17.

Figure 16A:
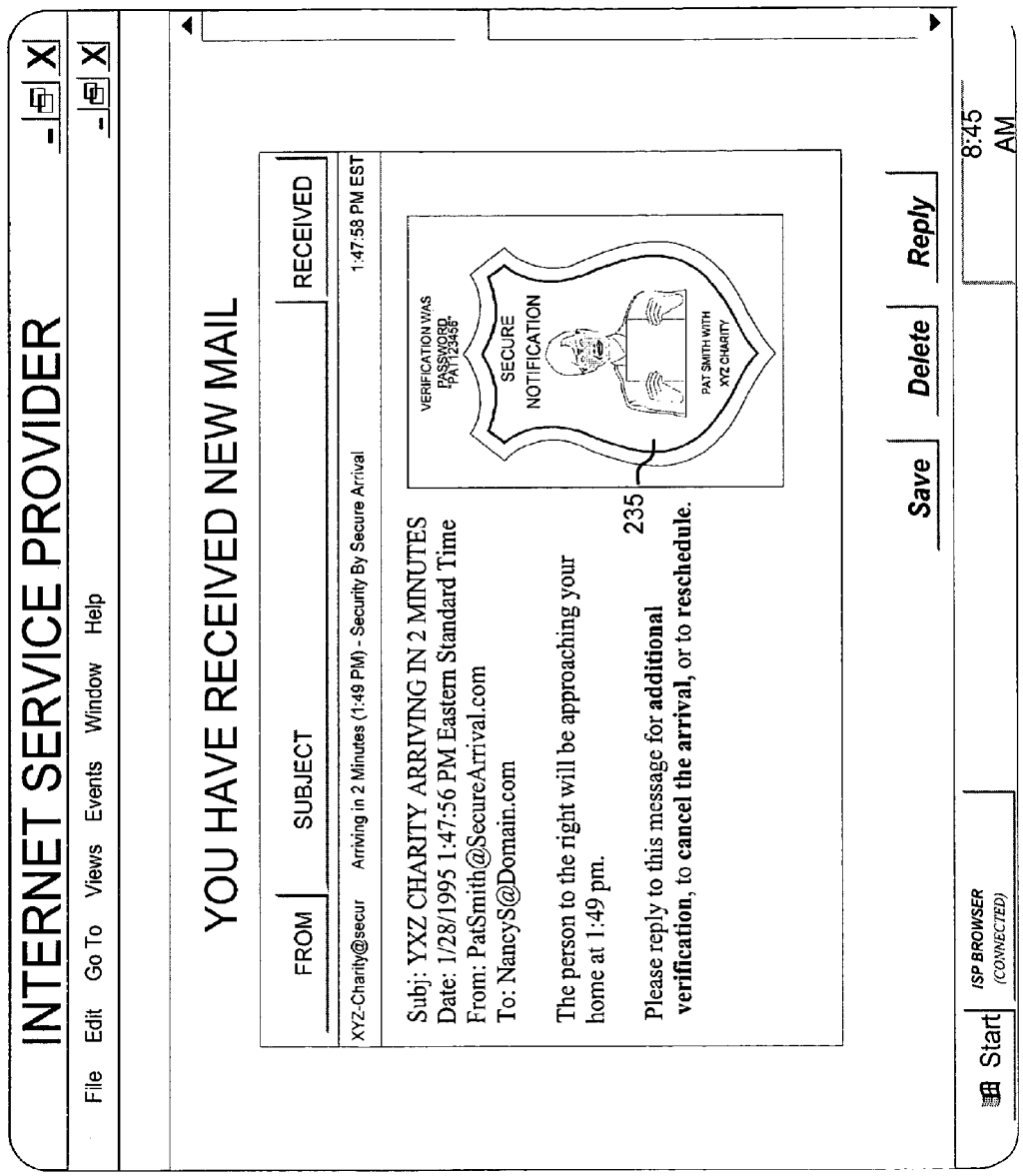

FIG. 16A shows a possible screen message that can be driven to (such as over the internet) and shown on a notified PCD 75 during a notification communication. The screen has an image 235 of the party associated with the MT 17 who will be arriving at the stop location. Also, with this example, a response system, as described previously in this document, is implemented. More specifically, the notified party is prompted: "Please reply to this message for additional verification, to cancel the arrival, or to reschedule." Hyperlinks can be associated with each of the foregoing sentence elements, so that when the recipient selects one, the BSCU 40 receives the selection and can act accordingly.

T. Mobile Thing Determination Systems and Methods

1. First Embodiment

Mobile thing determination systems (and methods) 250 can be implemented in connection with the notification systems, for example, those described hereinbefore. Several nonlimiting exemplary embodiments of possible MT determination systems (and methods) 250 will be described in detail hereafter. Although not limited to these applications, such determination systems 250 are particularly useful in connection with transportable PCDs that are carried with a mobile person and in connection with transportation services, like taxicab services, that have a number of vehicles and stop locations that can be anywhere, as will be clear from the discussion hereafter.

The architecture of one such embodiment, among others, is shown in FIG. 17A and is generally denoted by reference numeral 250a. Although not limited to this particular configuration, in this embodiment, the MT determination system 250a is implemented in the notification system 10, particularly the BS manager 41. The MT determination system 250a, is configured to implement the following methodology, as is summarized by flow chart in FIG. 17A: permitting a party to identify a pickup location, a dropoff location, and one or more user notification preferences, as indicated at block 251; identifying an MT 17 based upon the identity of the pickup location, the dropoff location, or both, as indicated at block 252; and communicating an identity of the MT when appropriate, pursuant to the one or more notification preferences, as indicated in block 253. Note that these steps can occur as part of the same communication session or link or in more than one communication transaction.

Additionally and optionally, the MT determination system 250a (or system 250b) can be further designed to receive an identification or characteristic of a thing during a communication session between the BSCU 40 and the PCD 75, for example but not limited to, an identity or characteristic of a package or person, to be picked up at the pickup location. This information can be used for planning and/or verification purposes. Further, if desired, the system 250a (or system 250b) can be configured to cause the BSCU 40 to communicate this identification or characteristic of the thing to be picked up to a communications device associated with the MT 17, so that a party associated with the MT 17 can verify the thing at the pickup location. The identity or characteristic can be any of a number of possibilities, such as a number (e.g., bar code number, Federal Express number, etc.) associated with a package, the weight or size of a package, or the name of a person.

Although not necessary for implementation, the foregoing methodology can be implemented, and in the preferred embodiment is implemented, by software associated with the data manager 67 and/or the monitoring mechanism 69 (FIG. 5B) of the BS manager 41. See stop location determination system 250 in FIGS. 1 and 3. The combination of blocks of FIG. 17A essentially represents the high level architecture of such software. Note, however, that it is possible to have special purpose digital or analog hardware designed to implement the same or similar methodology, and such hardware could be associated with the BSCU 40.

Pickup and dropoff locations can be stored and accessed in the stop location data table 68d. Identification of MTs can be stored and accessed in the MT data table 68a. Further, user notification preferences can be stored and accessed in the user data table 68b.

More specifically, with respect to step 251, the BS manager 41 is designed to permit a party to identify a pickup location, a dropoff location, and one or more notification preferences. The communication can occur via any suitable communications device and with any suitable user interface, but in the preferred embodiment, the communication is accomplished through a portable computer-based PCD 75, such as a wireless telephone or PDA. The notification preferences may include, for example but not limited to, a proximity of the MT to the pickup location (e.g., a distance between the MT and the pickup location that is to be met before a notification will occur, a telephone number to be used when making the notification communication, a time period that it will take the MT to reach the pickup location, the arrival or departure of the MT from a location, the entry of the MT into a geographic region, etc.), a particular time that the passenger must arrive at the dropoff location, a time period that the user is willing to expend on the trip (several selections could be provided pertaining to the same or different vehicles), the type or location of seat that the passenger would like to reserve, whether a pickup vehicle has air conditioning, the type of security or care that is to be taken with respect to a package that is being picked up, an identification and/or when to use one or more communications methods, a specification to attempt another communications device if a first one fails, any of those preferences mentioned previously in this document, etc. The communications methods may involve, for example but not limited to, communicating a signal and/or a message to a land-line telephone, cellular, satellite, or wireless telephone, facsimile machine, computer, television, cable TV transceiver, satellite transceiver, personal data assistant (PDA), pager, any addressable communications device on the internet, etc. Both a signal and a message may be sent to the target communications device, for example, a ring signal and a text message could be communicated to a PDA, pager, or computer.

With respect to step 252, any of a number of possible criteria may be used by the BS manager 41 to identify and/or select an MT 17 to accomplish the pickup and dropoff task, while complying with the user preferences. As an example of the MT identification process in the context of taxicabs, consider a scenario where the user has indicated that one of his/her preferences is to get picked up within fifteen minutes and that another one of his, her preferences is that the taxicab must have air conditioning. Further assume that the BS manager 41 knows that a taxicab having air conditioning is currently available in the geographical area of the pickup location and can travel to the pickup location within the specified fifteen minutes. In this example, the BS manager 41 can be designed to assign the taxicab to the task of picking the user up at the pickup location and dropping the user off at the dropoff location. A communication can be sent by the BSCU 40 to a communications device associated with the taxicab, indicating the pickup particulars.

With respect to step 253, the BS manager 41 is designed to initiate a notification communication and communicate an identity of the MT 17, when appropriate, pursuant to the one or more notification preferences. In the preferred embodiment, the notification communication session is initiated by the BS manager 41 when the MT 17 is at a particular location, is within a particular geographical region, or is within a particular proximity of the dropoff location, using the monitoring systems and algorithms described previously in this document.

During the notification communication session, the MT 17 can be identified with a vehicle number, with a description of a vehicle type, color, etc., with reference to a logo on the MT, with a digitized picture or video of the MT, or in some other way.

The BS manager 41 can be designed to enable the party to accept or deny the pickup and dropoff using the identified MT 17 during the notification communication session or during a subsequent communication session. This can be accomplished with a suitable graphical user interface, assuming the PCD 75 has display capabilities, with an IVR, by touch tone commands pressed by the device user, by other means of communication described elsewhere in this document, etc.

The BS manager 41 can be designed to provide information concerning the capacity of the MT 17 during the notification communication session, for example but not limited to, the number of passengers, packages, or other items currently residing on the MT 17, the number of vacant spaces, seats, slots, etc.

The BS manager 41 may be designed to receive information regarding an item, for example but not limited to, a package, that is placed on the MT 17, based upon it being placed on the MT 17 at the pickup location, based upon it being dropped off at the dropoff location, or both. This information is useful for tracking the item as well as the capacity of the MT to handle new items. Furthermore, a machine readable code, for example, a bar code or electronic tag (see U.S. Pat. No. 6,144,301), could reside on or in or be placed on or in the item and read by a suitable reader, such as a bar code scanner or electronic tag reader, at some time when the item is matched up with the MT 17. Moreover, this code or a derivative thereof (e.g., an indicator of less bit size, a coded representation, an index in a lookup table, etc.) could be communicated from the MT, using a suitable communications device on the MT 17, to the BSCU 40 for further processing and analysis, if desired.

2. Second Embodiment

The architecture of another embodiment of the MT determination system 250, among others, is shown in FIG. 17B and is generally denoted by reference numeral 250b. Although not limited to this particular configuration, in this embodiment, the MT determination system 250b is implemented in the notification system 10, particularly the BS manager 41. The MT determination system 250b, is configured to implement the following methodology, as is summarized by flow chart in FIG. 17B: establishing a first communication session between the system 10 and a PCD 75, as indicated at block 261; during the first communication session, permitting a party associated with the PCD 75 to identify (a) a communications method for providing a notification, (b) a pickup location and (c) a dropoff location, as indicated at block 262; identifying an MT that will arrive at the pickup location for pickup and that will travel to the dropoff location for dropoff, based upon the identity of the pickup location, the dropoff location, or both, as indicated at block 263; establishing a second communication session in accordance with the communications method for providing a notification, as indicated at block 264; and during the second communications session, identifying the MT, as indicated at block 265. In the preferred embodiment, the second communication session is initiated by the BS manager 41 when the MT 17 is at a particular location, is within a particular geographical region, or is within a particular proximity of the dropoff location, using the monitoring systems and algorithms described previously in this document.

Although not necessary for implementation, the foregoing methodology can be implemented, and in the preferred embodiment is implemented, by software associated with the BS manager 41. See stop location determination system 250 in FIGS. 1 and 3. The combination of blocks of FIG. 17B essentially represents the high level architecture of such software. Note, however, that it is possible to have special purpose digital or analog hardware designed to implement the same or similar methodology, and such hardware could be associated with the BSCU 40.

During the first and/or second communication sessions, the MT 17 can be identified with a vehicle number, with a description of a vehicle type, color, etc., with reference to a logo on the MT, with a digitized picture or video of the MT, or in some other way.

The BS manager 41 can be designed to enable the party to accept or deny the pickup and dropoff using the identified MT 17 during the first communication session, during the second communication session, or during a subsequent communication session. This can be accomplished with a suitable graphical user interface, assuming the PCD 75 has display capabilities, with an IVR, by touch tone commands pressed by the device user, by other means of communication described elsewhere in this document, etc.

Note that the second communication session can occur between the BSCU 40 and a different PCD 75, that is, different from the one involved in the first communication session, based upon user notification preferences. The user can specify in the first communication session or in some other communications session with the BS manager 41, which communication method(s) should by used for the second communication session (which is the notification session).

The BS manager 41 can be designed to provide information concerning the capacity of the MT 17 during the first communication session, second communication session, or both, for example, the number of passengers, packages, or other items, the number of vacant spaces, seats, slots, etc.

The BS manager 41 can be designed to receive information regarding an item, for example, a package, that is placed on the MT 17, based upon it being placed on the MT 17 at the pickup location, based upon it being dropped off at the dropoff location, or both. This information is useful for tracking the item as well as the capacity of the MT to handle new items. Furthermore, a machine readable code, for example, a bar code, could reside on or in or be placed on or in the item and read by a suitable reader, such as a bar code scanner, at some time when the item is matched up with the MT 17. Moreover, this code or a derivative thereof could be communicated from the MT, using a suitable communications device, to the BSCU 40 for further processing and analysis, if desired.

3. Third Embodiment

Figures 17C, 17D:
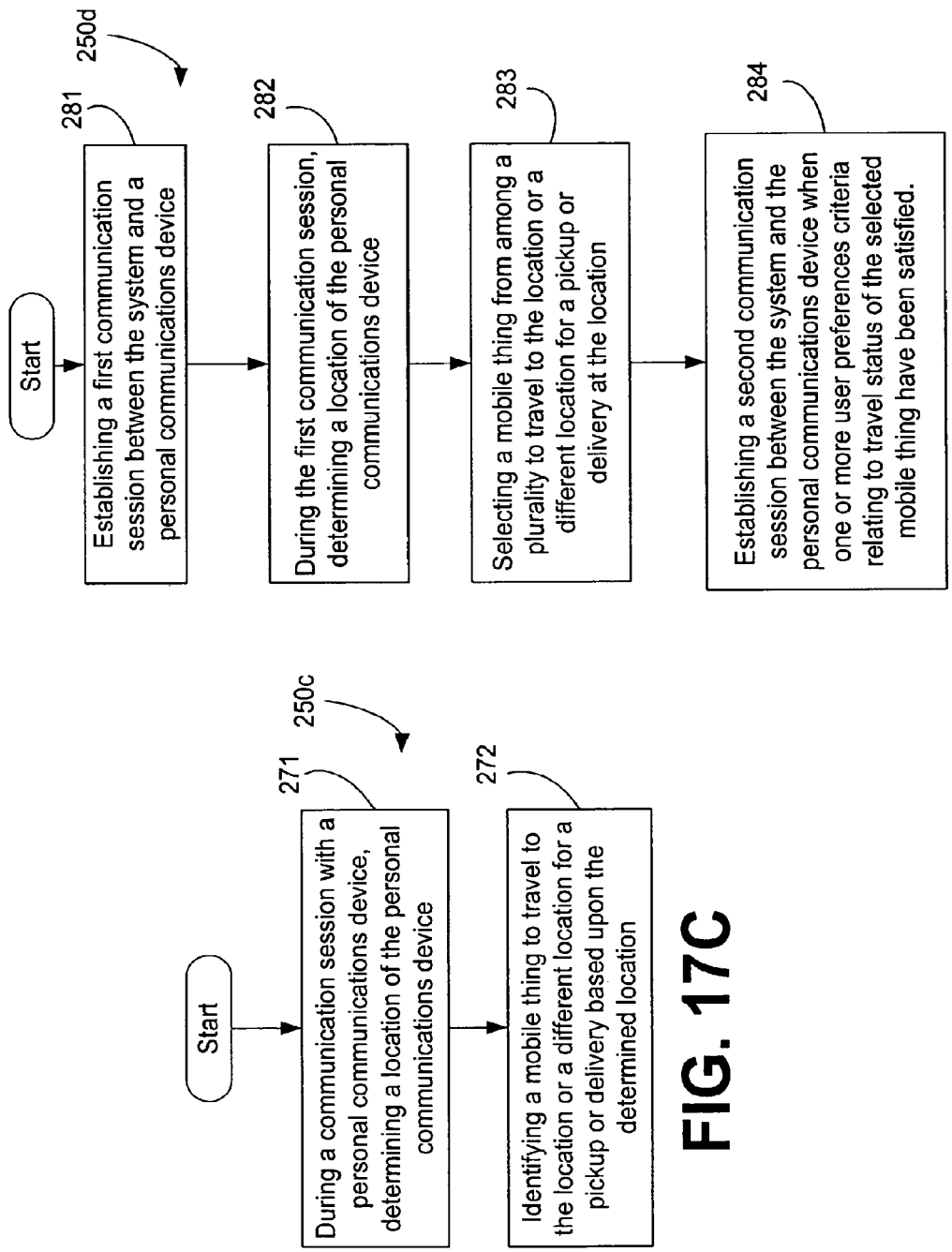
FIG. 17C is a flow chart illustrating an exemplary implementation of a third mobile thing determination system (and method; system and method are based upon the detected location of the PCD and/or user) that can be optionally implemented in connection with any notification system, for example, as at least part of the architecture, functionality, and operation of the BS manager of FIGS. 1 and 3.
FIG. 17D is a flow chart illustrating an exemplary implementation of a fourth mobile thing determination system (and method; system and method are based upon the detected location of the PCD and/or user) that can be optionally implemented in connection with any notification system, for example, as at least part of the architecture, functionality, and operation of the BS manager of FIGS. 1 and 3.

The architecture of yet another embodiment of the MT determination system 250, among others, is shown in FIG. 17C and is generally denoted by reference numeral 250c. Although not limited to this particular configuration, in this embodiment, the MT determination system 250c is implemented in the notification system 10, particularly the BS manager 41. The MT determination system 250c, is configured to implement the following methodology, as is summarized by flow chart in FIG. 17C: during a communication session with a PCD 75, determining a location (can be a geographic area or an approximate location, depending upon the precision needed to effect pickup or delivery) of the PCD 75; and identifying an MT 17 to travel to the location or another location that is near the determined location for a pickup or delivery based upon the determined location of the PCD 75.

Note that, in this embodiment 250c, the communication session that is used to enable detection of the location of the PCD 75 can be a notification communication initiated from the system 10 to the PCD 75, based upon one or more criteria defined by a user in user notification preferences, or can be a communication initiated by the PCD 75 to the system 10. When the latter is implemented, the system 250c may be designed to cause a subsequent notification communication session to the PCD 75 and/or a different PCD 75 (defined by user preferences) from the system 10 based upon travel status of the MT 17, e.g., when the determined MT is at a particular location, is within a particular geographical region, or is within a particular proximity of the location.

The location of the PCD 75 can be determined automatically, using any of the techniques described previously, or can be determined by prompting the device user to manually enter an identification (e.g., an address, region, stop number, etc.) or description of the device location. As an example, the device user could be prompted to enter a text message that includes the post office address that is nearest the PCD 75 or to enter the zip code in which the PCD 75 resides.

Further, when the MT 17 is identified, it may be selected, if necessary, from a plurality of possible MTs 17, based upon user notification preferences in addition to the determined location of the PCD 75.

As with the other embodiments of the system 250, and as previously described, although not in this context, this embodiment 250*c* can be further designed to communicate an identification of the location of the PCD 75 to a communications device associated with the MT 17.

As with the other embodiments of the system 250, and as previously described, this embodiment 250*c* can be further designed to communicating an identification of the MT 17, such as a number or description, to the PCD 75.

As with the other embodiments of the system 250, and as previously described, this embodiment 250*c* can be further designed to enable the party associated with the PCD 75 to accept or deny the responsibility of the pickup or the delivery using the identified MT during the communication session or during a subsequent communication session with an appropriate response from the user of the PCD 75. See response systems and methods described earlier in this document. Furthermore, the BS manager 41 can be designed to forward the detected location of the PCD 75 back to the PCD 75, so that the user of the PCD 75 is aware of the system detected location and can confirm it.

As with the other embodiments of the system 250, and as previously described, this embodiment 250*c* can be further designed to provide information concerning a capacity of items situated on the MT 17 that is to travel to the pickup or delivery location.

As with the other embodiments of the system 250, and as previously described, this embodiment 250*c* can be further designed to receive information from the PCD 75 regarding an item that is to be placed on the MT 17 at the location or dropped off at the location, or both. With respect to the former, the item may be equipped with a human readable code or machine readable code that can be read or scanned and sent to the system 10.

As with the other embodiments of the system 250, and as previously described, this embodiment 250*c* can be further designed to receive an identification or characteristic of a thing to be picked up by the MT 17 at the location, and to communicate the thing identification or characteristic to a communications device, personal or otherwise, associated with the MT 17.

In other alternative embodiments, the BS manager 41 can also be designed to communicate a location to the PCD 75 that is different than the detected location or approximate detected location of the PCD 75 or that is in an area that the PCD 75 is detected to be within or near. For example, if the PCD 75 is detected to be near an already existing scheduled stop location for an MT 17, then the PCD 75 may be advised of the stop location. An identity of, description of, and/or directions thereto can be communicated to the PCD 75. The device user can be given the opportunity to accept or deny a pickup or delivery at the different location. As another example, the zip code associated with the area in which the PCD 75 presently resides may have been manually communicated to the system 10 by the user of PCD 75. In this example, the BS manager 41 may be configured to select any suitable stop location that is within the geographic region corresponding to the zip code.

The user can even be given the opportunity to select between the determined or the different location. The user could even be charged a fee or a higher rate for causing the MT 17 to travel to the device location as opposed to the different location (the one that may correspond to an already scheduled stop).

4. Fourth Embodiment

The architecture of still another embodiment of the MT determination system 250, among others, is shown in FIG. 17D and is generally denoted by reference numeral 250*d*. Although not limited to this particular configuration, in this embodiment, the MT determination system 250*d* is implemented in the notification system 10, particularly the BS manager 41. The MT determination system 250*d*, is configured to implement the following methodology, as is summarized by flow chart in FIG. 17D: causing or establishing a first communication session between the system 10 and a PCD 75; during the first communication session, determining a location (can be a geographic area or an approximate location, depending upon the precision needed to effect pickup or delivery) of the PCD 75; selecting an MT 17 from among a plurality to travel to the determined location or another location for a pickup or delivery at one of the locations; and causing or monitoring establishment of a second communication session between the system 10 and the PCD 75 when one or more user preferences criteria relating to travel status of the selected MT 17 have been satisfied to notify the user of the PCD 75 of the impending arrival of the MT 17 at one of the locations.

Note that, in this embodiment 250*d*, the communication session that is used to enable detection of the location of the PCD 75 can be a notification communication initiated from the system 10 to the PCD 75, based upon one or more criteria defined by a user in user notification preferences, or can be a non-notification communication initiated by the PCD 75 to the system 10.

The system 250*d* can be designed to cause the second communication session to the PCD 75 (and perhaps to a different PCD 75 pursuant to user preferences) from the system 10 based upon travel status of the MT 17 and predefined user preferences, e.g., when the determined MT is at a particular location, is within a particular geographical region, or is within a particular proximity of the location with respect to timing or distance.

Further, when the MT 17 is identified, it may be selected, if necessary, from a plurality of possible MTs 17, based upon user notification preferences in addition to the determined location of the PCD 75.

As with the other embodiments of the system 250, and as previously described, although not in this context, this embodiment 250*d* can be further designed to communicate an identification of the location of the PCD 75 to a communications device associated with the MT 17.

As with the other embodiments of the system 250, and as previously described, this embodiment 250*d* can be further designed to communicate an identification of the MT 17, such as a number or description, to the PCD 75.

As with the other embodiments of the system 250, and as previously described, this embodiment 250*d* can be further designed to enable the party associated with the PCD 75 to accept or deny the responsibility of the pickup or the delivery using the identified MT during the communication session or during a subsequent communication session with an appropriate response from the user of the PCD 75. See response systems and methods described earlier in this document. Furthermore, the BS manager 41 can be designed to forward the detected location of the PCD 75 back to the PCD 75, so that the user of the PCD 75 is aware of the system detected location and can confirm it.

As with the other embodiments of the system 250, and as previously described, this embodiment 250*d* can be further designed to provide information concerning a capacity of items situated on the MT 17 that is to travel to the pickup or delivery location.

As with the other embodiments of the system 250, and as previously described, this embodiment 250*d* can be further designed to receive information from the PCD 75 regarding an item that is to be placed on the MT 17 at the location or dropped off at the location, or both. With respect to the former, the item may be equipped with a human readable code or machine readable code that can be read or scanned and sent to the system 10.

As with the other embodiments of the system 250, and as previously described, this embodiment 250*d* can be further designed to receive an identification or characteristic of a thing to be picked up by the MT 17 at the location, and to communicate the thing identification or characteristic to a communications device, personal or otherwise, associated with the MT 17.

In other alternative embodiments, the BS manager 41 can also be designed to communicate a location to the PCD 75 that is different than the detected location or approximate detected location of the PCD 75 or that is in an area that the PCD 75 is detected to be within or near. For example, if the PCD 75 is detected to be near an already existing scheduled stop location for an MT 17, then the PCD 75 may be advised of the stop location. An identity of, description of, and/or directions thereto can be communicated to the PCD 75. The device user can be given the opportunity to accept or deny a pickup or delivery at the different location.

The user can even be given the opportunity to select between the determined or the different location. The user could even be charged a fee or a higher rate for causing the MT 17 to travel to the device location as opposed to the different location (the one that may correspond to an already scheduled stop).

U. Combined Mobile-Thing-To-Location (MTTL) And Device-To-Location (DTL) Notification Systems and Methods Systems (and methods) can be implemented in connection with the notification systems, for example, those described hereinbefore, including system 10, wherein a notification is communicated to the PCD 75, based upon the proximity of the MT 17 to a location or region, and another notification is communicated to the PCD 75, based upon the proximity of the PCD 75 itself to the same location or region (or a location or region that is in close proximity to or based upon the same location or region). Several nonlimiting exemplary embodiments of such systems (and methods), which will generally be denoted by reference numeral 290, will be described in detail hereafter. Although not limited to these applications, such systems 290 are particularly useful in connection with transportable PCDs 75 that are carried with a mobile person and in connection with transportation services, like taxicab services, that have a number of vehicles and stop locations that can be anywhere, as will be clear from the discussion hereafter.

Figure 18:
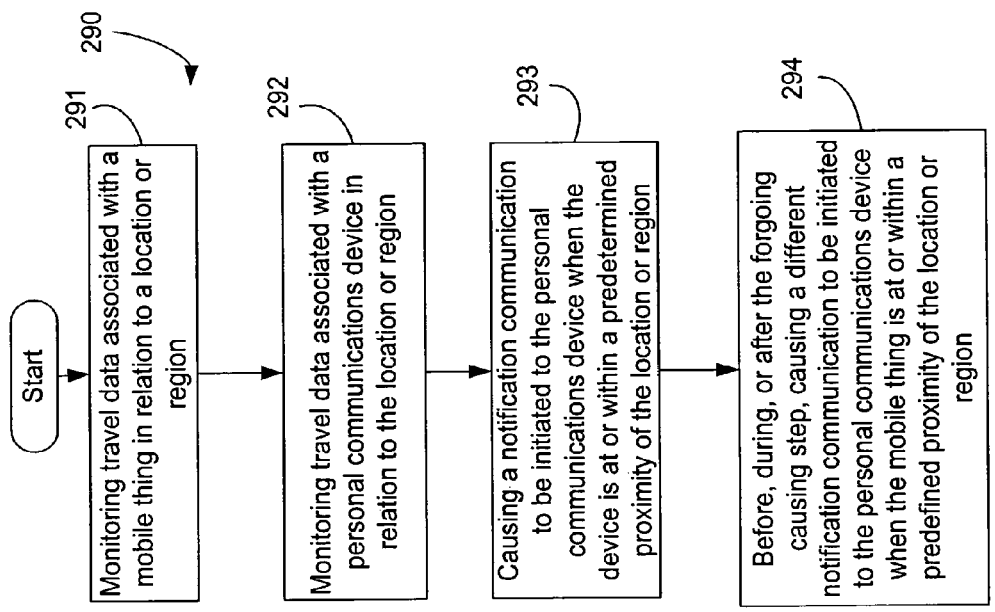
FIG. 18 is a flow chart illustrating an exemplary implementation of a combined mobile-thing-to-location (MTTL) and device-to-location (DTL) notification system (and method) that can be optionally implemented in connection with any notification system, for example, as at least part of the architecture, functionality, and operation of the BS manager of FIGS. 1 and 3.

The architecture of one such embodiment, among others, is shown in FIG. 18 and is generally denoted by reference numeral 290. Although not limited to this particular configuration, in this embodiment, the system 290 is implemented in the notification system 10, particularly the BS manager 41. The system 290 is configured to implement the following methodology, as is summarized by flow chart in FIG. 18: (a) monitoring travel data associated with an MT 17 in relation to a location or region, as indicated at block 291; (b) monitoring travel data associated with a PCD 75 in relation to the location or geographic region (or a location or region that is in close proximity to or based upon the same location or region), as indicated at block 292; (c) causing a notification communication to be initiated to the PCD 75 when the PCD 75 is at or is within a predetermined proximity of the location or region, as indicated at block 293; and before, during, or after the forgoing causing step, causing a different notification communication to be initiated to the PCD 75 when the MT 17 is at or within a predefined proximity of the location or region, as indicated at block 294.

The stop location or region can be predetermined or dynamically determined while the MT 17 and/or the PCD 75 are in motion. The user can selectively predetermine the stop location or region via user preferences. The system 290 can be designed to give the user a stop location or region or to give a number of stop locations or regions to choose from. The system 290 can also be designed to permit the user to enter longitude and latitude values to specify a particular stop location.

The system 290 can be designed to determine a stop location based upon the location of the PCD 75. Techniques for determining the location of the PCD 75 have been described herein.

Note that the aforementioned steps 293 and 294 can occur as part of the same communication session or link or in more than one communication transaction. As an example of the former scenario, a text communication can be generated by the system 290 and communicated to a pager or PDA that indicates (a) that the device is within 10 yards of the stop location and (b) that the MT 17 is within 10 minutes of arriving at the stop location. As another example of the former scenario, two telephone numbers associated with a telephone could be called, substantially concurrently, by the notification system 10. Further, each could have their own distinctive ring.

The notification system 10 can track the location of the PCD 75 and the MT 17 by using any of the location tracking techniques that have been previously described. Travel data associated with the MT 17 can be stored in a table 68*e*, while travel data associated with the PCD 75 can be stored in a PCD travel data table 68*i* of database 94 (FIG. 5A). Furthermore, the notifications can be triggered using any of the previously described techniques and user preferences.

In alternative embodiments, the system 290 can be designed to communicate an identification of the MT 17 to the PCD 75 during one or both of the notification communications (blocks 293, 294). Furthermore, the system 290 can be configured to enable the party associated with the PCD 75 to accept or deny a pickup or a delivery using the identified MT 17 during the communication session using any of the response techniques described previously in this document.

In alternative embodiments, the system 290 can be designed to enable a party associated with the PCD 75 to define user preferences in connection with the notification communications and to operate in accordance with the user preferences. For example, among other things, the party can define the predetermined proximity between the MT 17 and the stop location or region for triggering a notification to the PCD 75 and/or the predetermined proximity between the PCD 75 and the stop location or region for triggering a notification communication to the PCD 75. The predetermined proximities can be defined as a point when the MT 17 is at a particular location, is within a particular geographical region, or is within a particular proximity of the stop location in terms of timing, distance, or a combination thereof.

In alternative embodiments, the system 290 can be designed to provide information concerning a capacity of items situated on the MT 17. This type of information would be communicated from the MT 17 to the system 10, directly or indirectly.

In alternative embodiments, the system 290 can be designed to receive information regarding an item that is placed on the MT 17 at the stop location or dropped off of the MT 17 at the stop location, or both. A machine readable code can be disposed on the item and can be read when the item is introduced onto or dropped off of the MT 17. The information communicated to the system 10 can be the code or a derivative thereof.

In alternative embodiments, the system 290 can be designed to select the MT 17 from a plurality of MTs 17, based upon user-defined or system-defined notification preferences.

In alternative embodiments, the system 290 can be designed to receive from the PCD 75 an identification or characteristic of a thing to be picked up at the stop location. Moreover, the system 290 can optionally be designed to communicate the thing identification or characteristic to a communications device associated with the MT 17.

In alternative embodiments, the notification system 10 can employ the functionality described in U.S. Pat. No. 6,360,101 for tracking the proximity of the PCD 75 to the location or region and issuing a notification to the PCD 75. U.S. Pat. No. 6,360,101, which is incorporated herein by reference, describes a GPS-receiver-equipped mobile communications device, such as a cellular telephone, that determines its current location and compares the current location of one or more target locations. When the device is at or near one of the target locations, then the device annunciates its arrival by generating an audible alarm, or displays or transmits a predetermined arrival message. The target location(s) can be entered manually at the device with the keypad, can be obtained via a positioning receiver, or can be loaded via a server connected to a communications network.

V. Notifications Based Upon Traffic Flow Predicament Data

The notification system 10 may be designed to take into account traffic flow and anything that can influence traffic flow when determining when and if notification communications should be initiated.

Although not limited to this application, this feature is particularly useful when the system 10 is to initiate a notification when an MT 17 is a predefined proximity in terms of time from a stop location. This predefined proximity can be system-defined via any suitable programming mechanism or user-defined via predefined user preferences. This feature is also useful to trigger a notification to a user to enable the user to plan for a best transmit route (see third embodiment, hereafter).

1. First Embodiment

In one possible embodiment, among others, the BS manager 41 can be configured to implement the following algorithm, as denoted by reference numeral 210a in FIG. 19A: monitoring travel data associated with an MT 17, as denoted at block 311; scheduling a notification communication, such as in a call queue in message manager 82 (FIG. 5B), as denoted at block 312; analyzing traffic flow predicament data associated with a travel path (e.g., a road) to be traveled by the MT 17, as denoted at block 313; and rescheduling the notification communication, such as in the call queue of message manager 82 (FIG. 5B), based at least in part upon the traffic flow predicament data, as denoted at block 314. As can be appreciated by this methodology, the internal scheduling of the notification communication can be initiated later, or delayed, or in the alternative, initiated earlier, based upon the influence of heavy or light traffic, adverse or favorable environmental conditions, etc., so that the system-defined or user-defined advance notification is more accurately timed and implemented.

As with this embodiment and the others described in this section, the traffic flow predicament data can be stored in a traffic flow predicament data table(s) 68j in the database 94 (FIG. 5A) and accessed by the message manager 82 (FIG. 5B). The traffic flow predicament data can take a variety of forms, and it can be system-defined, user-defined, or a combination thereof.

As a nonlimiting example, the traffic flow predicament data can take the form of time periods during the day correlated to a road segment, indicating how long it should take a motor vehicle under normal circumstances to traverse that road segment during the different time periods. As one way to accomplish this, in a traffic flow predicament data table(s) 68j (FIG. 5A), the following could be a record of fields (or this information could be related and retrieved from several tables or sub-tables): ROAD-SEGMENT-044, TIME-OF-DAY-6-7, TRAVERSAL-TIME-PERIOD. The first of the foregoing fields identifies the road segment as number 044, which is Main Street in this example. The second field identifies the time period of the day, i.e., 6:00 am to 7:00 am, and this information is correlated with the road segment 044. The third field identifies the time period to traverse the segment 044 when this type of traffic flow is in existence.

As a specific example of traffic flow predicament data and how it can be used to effect the timing of a notification, consider the following. It may take 10 minutes to traverse Main Street at between 6:00 am and 7:00 am, but it may take 30 minutes to traverse Main Street between 7:00 am and 9:00 am. So, continuing this example, assume that the stop location for the vehicle is at the end of Main Street, assume that the user preferences indicate that the user would like to be notified 10 minutes prior to arrival of the vehicle at the stop location, assume that the vehicle has just arrived at the beginning of Main Street, and assume that it is 8:30 am. With these assumptions, the BS manager 41, particularly, the message manager 82 (FIG. 5B) can be designed to wait to make the notification until it is detected that the vehicle is ⅔ of the way through Main Street. However, if the time of day were 6:30 am, then the BS manager 41 can be designed to make the notification, at once, when it is detected that the vehicle started on Main Street.

Carrying this example further, the BS manager 41 could be designed to, recognize that Main Street is wet and slick, and therefore, initiate five minutes later any notification communication corresponding to any MT 17 that must traverse Main Street (because it will take five minutes longer for the MT 17 to traverse Main Street.

As a further example of traffic flow predicament data, the traffic flow predicament data could include the real time detection of an accident, the knowledge of construction work, the knowledge of a reduced speed limit due to road work or some other reason on a road segment and its effect on traffic flow (e.g., one of three lanes may be blocked, so it will take 33% longer for a motor vehicle to traverse the road segment, the speed limit is now 25 mph instead of 45 mph, etc.). As one way to accomplish this, in a traffic flow predicament data table(s) 68j (FIG. 5A), the following could be a set of fields that can be related and retrieved: ROAD-SEGMENT-044, TRAFFIC-FLOW-02, TRAVERSAL-TIME-PERIOD. The first of the aforementioned fields identifies the road segment as number 044. The second field identifies the number of lanes that are open, i.e., two of three lanes are open for traffic flow (there are other entries that include TRAFFIC-FLOW-01 and TRAFFIC-FLOW-03), and this information is correlated with the road segment 044. The third field identifies the time period to traverse the segment 044 when this type of traffic flow is in existence.

As yet another example of traffic flow predicament data, the traffic flow predicament data could include information concerning the environmental or physical conditions associated with a road segment and the effect of such conditions on traffic flow. For instance, the environmental conditions could be whether the road segment is exhibited by fog, rain, snow, darkness, sun, dryness, slickness, numerous pot holes, etc. This information can be obtained via a variety of sources, including weather report data from a weather reporting source, inspection via camera or physical human presence, etc., and this information can be entered into the notification system 10, either automatically or manually. As one way to accomplish this, in a traffic flow predicament data table 68j (FIG. 5A), the following could be a retrievable set of fields: ROAD-SEGMENT-044, ENVIRONMENT-05, TRAVERSAL-TIME-PERIOD. The first of the foregoing fields identifies the road segment as number 044. The second field identifies the type of environmental condition of the road segment, which in this case is number 05, which corresponds to foggy. The third field identifies the time period to traverse the segment 044 when there is fog.

As with this embodiment and others to be described in this section, the travel path to be monitored by the notification system 10 can be determined by the notification system 10 or entered/selected by a user. Furthermore, the parameters or metrics that can be used to trigger a notification communication can be system-defined, user-defined (in user preferences data, such as in table 68b), or a combination thereof.

2. Second Embodiment

In another possible embodiment, among others, the BS manager 41 can be configured to implement the following algorithm, as denoted by reference numeral 310b and illustrated in FIG. 19B: monitoring travel data associated with an MT 17, as indicated at block 321; determining a notification time period, as indicated at block 322, by reading a system-defined or user-defined time period (in user preferences data); analyzing traffic flow predicament data associated with a travel path (e.g., a road) to be traveled by the MT 17 (for example, based upon the current location of the MT 17, the ultimate stop location, and the known travel path or travel path data, such as map data from a mapping system showing how the MT 17 is expected to travel), as indicated at block 323; and determining when a notification communication should be initiated (earlier or later), based upon the notification time period, the influence of traffic that is derived from the traffic flow predicament data, and other user preferences, if any, as indicated at block 324.

3. Third Embodiment

Although not limited to this application, the following embodiment is particularly useful in a case where a party would like to know if and when travel flow is being hindered, is acceptable, or is being expedited on a road segment, so that the party in a vehicle can better plan his/her route, for example, enable the party to take an alternative route or, enable the party to take the travel path at issue, if and when travel flow is acceptable or is sufficiently expedited.

Figure 19C:
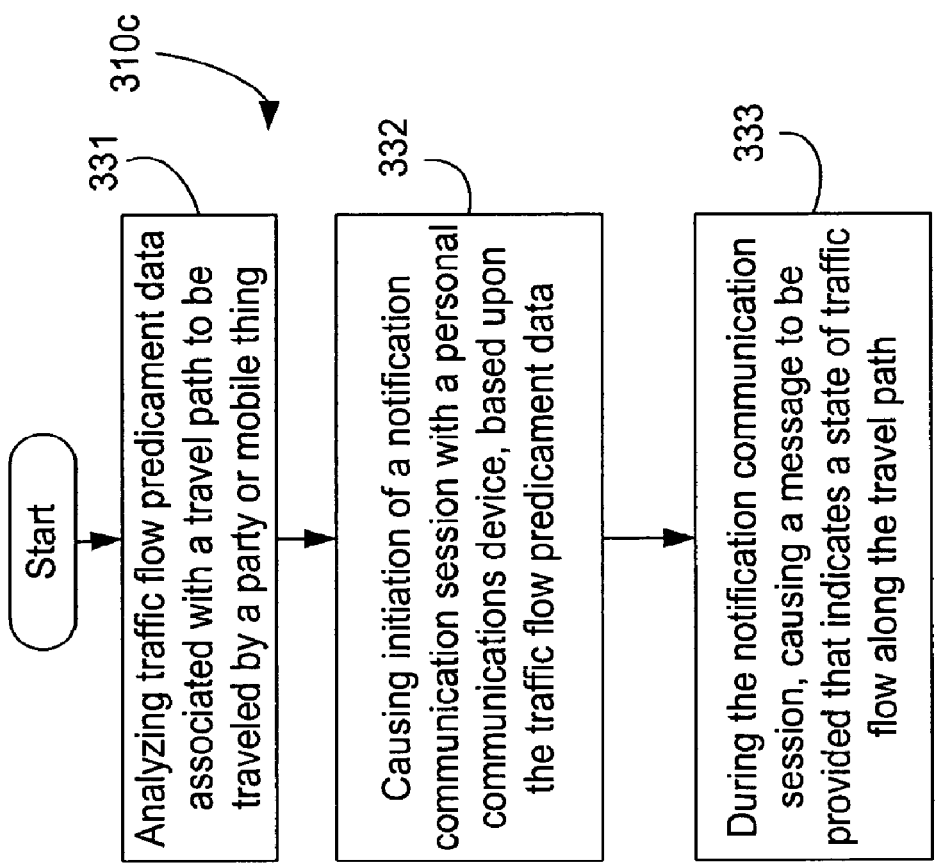
FIG. 19C is a flow chart illustrating an exemplary implementation of a third system (and method) for making more accurate notifications by considering traffic flow predicament data. This system can be optionally implemented in connection with any notification system, for example, as at least part of the architecture, functionality, and operation of the BS manager of FIGS. 1 and 3.

In this possible embodiment, the BS manager 41 is configured to implement the following algorithm, as denoted by reference number 310c and as illustrated in FIG. 19C: analyzing traffic flow predicament data associated with a travel path to be traveled by a party or MT 17, as indicated at block 331; initiating a notification communication session with a PCD 75, based upon the traffic flow predicament data, as indicated at block 332; and during the notification communication session, providing a message indicating a state of traffic flow along the travel path (e.g., there will be a delay and perhaps to what extent, traffic is flowing at an acceptable level and perhaps to what extent, etc.), as indicated at block 333.

The BS manager 41 can be configured to store the travel path at issue, which can be, for example, one or more road segments (but could also be waterways, airspace, etc., in the case of other vehicles) and can be configured to receive and store traffic flow predicament data associated with the travel path.

In some embodiments, the BS manager 41 can be designed to receive (via entry or selection from available options; data can be stored in user preferences data) user preferences from a user, for example but not limited to, an identification of the travel path, a delay acceptance threshold, which is a metric that can be used to determine whether the travel path is acceptable or unacceptable and which is used by the BS manager 41 to trigger a notification communication, an identification of a time of day or time period during the day, etc. The BS manager 41 initiates the notification communication based upon, not only the travel flow predicament data, but also upon one or more other user-defined preferences.

More specifically, in regard to the delay acceptance threshold, the delay acceptance threshold can be expressed in any suitable terms to enable the determination of whether or not a delay is acceptable. For example, the delay acceptance threshold could be expressed in terms of percentages: if traffic traveling along the path will take 50% longer than usual, then initiate the notification communication. As another example, the threshold could be expressed in terms of delay time: if traffic traveling along the path will be delayed by an additional 10 minutes, then initiate the notification communication. As still another example, the threshold could be expressed in terms of speed: if traffic traveling along the path is 45 mph or greater, then initiate the notification communication.

In alternative embodiments, the notification communication session can be initiated or triggered based upon, not only traffic flow predicament data, but also upon one or more other parameters, for example but not limited to, at a predetermined time (e.g., at 5:00 pm) or during a time period of the day (e.g., between 5:00 pm and 6:00 pm, after 7:00 pm, in the evening, etc.). As an example, the BS manager 41 can be designed to initiate the notification communication at 5:00 pm, or in the alternative, between 5:00 pm and 6:00 pm, only if and when traffic traveling along the path will take 50% longer than usual. As another example, the BS manager 41 can be designed to initiate the notification communication at 5:00 pm, or in the alternative, between 5:00 pm and 6:00 pm, only if traffic traveling along the path will be delayed by at least 10 minutes. As yet another example, the BS manager 41 can be designed to initiate the notification communication at 5:00 pm, or in the alternative, between 5:00 pm and 6:00 pm, only if and when traffic flow is at an acceptable rate along the path as determined by the delay acceptance threshold, which can be system-defined or user-defined.

In alternative embodiments, the BS manager 41 can be designed to determine a location or region of the PCD 75 in accordance with techniques described previously in this document (see Response Systems). From this information, the BS manager 41 can be equipped with suitable algorithms for determining the travel path to be traveled by the party or the PCD 75.

The BS manager 41 can determine direction of travel by receiving two or more location values from the PCD 75 that are spaced in time. The BS manager 41 can also determine direction of travel based upon a known destination of the PCD 75. From this location and direction information, the BS manager 41 can anticipate travel paths, such as road segments, that will be traversed by the party or MT 17.

As a specific nonlimiting example, assume that a party has given instructions to the notification system 10 to advise the party of any unacceptable road segments when the party starts to return home after work at 5:00 pm. Further assume that the party can take two different routes (which can be communicated to the notification system 10 by the user or determined by the notification system 10 based upon a knowledge of the user destination): (a) from the workplace to First Street to Elm Street to 416 Barker Street, or (b) from the workplace to McClelland Avenue to West Morton Street to 416 Barker Street, or (c) from the workplace to McClelland Avenue to Domino Avenue to 416 Barker Street. In this scenario, further assume that the party and PCD 75 commence onto McClelland. When the notification system 10 determines the location of the PCD 75 to be McClelland, then the BS manager 41 can be designed to select the next one or more road segments that correspond to the one or more possible routes that have been taken and to analyze those one or more road segments in terms of traffic flow predicament data. In the present scenario, further assume that the notification system 10 has determined that West Morton Street is unacceptable based upon the delay acceptance threshold and the present traffic flow predicament data associated with West Morton Street. In this situation, the BS manager 41 will advise the party via the PCD 41 of this fact, in which case the party can decide to travel route (c) instead of route (b) to get home.

W. Systems and Methods for Monitoring Travel of PCDs and Communicating Messages Between PCDs The notification system 10 may be designed to implement systems and methods for monitoring travel of MTs 17 that are PCDs 75 and communicating notifications and responses among the PCDs 75, as more particularly described hereafter.

1. First Embodiment

One embodiment, among others, can be practiced by the notification system 10, particularly in the manager 41, and involves the following methodology, which is shown in FIG. 20A and denoted by reference numeral 340*a*: monitoring travel data associated with a first PCD 75, as indicated at block 341; causing a notification communication session to be initiated to a second PCD 75, the notification communication session including a message requesting a response and a travel status report indicating a proximity of the first PCD 75 to a location, as indicated at block 342; receiving the response from the second PCD 75, as indicated at block 343; and communicating the response to the first PCD 75 (the one being tracked by the notification system 10), as indicated at block 344.

Note that the travel data in this embodiment, as well as the others described herein, can be directly related to the device 75, e.g., data that directly relates to the location of the device 75 itself or can be indirectly related to the device 75, e.g., data that directly relates to the location of an MT that transports or is closely associated with the device 75. Further note that in this embodiment, as well as the others described herein, although the concepts are described for simplicity in connection with a first device 75 (the tracked device that receives a response) and a second device 75 (the notified device), the concepts can be employed in connection with one or more first devices 75 and one or more second devices, in virtually any combination thereof.

In alternative embodiments, the notification system 10 can be designed to enable a first party associated with the first PCD 75 (the one being tracked) to select whether or not a response is requested at all during the notification communication session initiated by the system 10 to the second PCD 75. This can be useful in many circumstances, such as when a delivery vehicle needs a signature in order to drop off a package, and therefore, the delivery vehicle driver, who is associated with the first PCD 75 needs to know whether a party associated with the second PCD 75 will be available at the stop location to sign for the package. A response by the party that gets communicated eventually to the driver will enable the driver to schedule deliveries accordingly.

In alternative embodiments, the notification system 10 can be equipped with functionality to determine whether or not a response is necessary from the second PCD 75. For example, the notification system 10 could track whether or not deliveries need a signature in database 94 (FIGS. 5A and 5B), such as in a package data table(s) 68*k*. For those requiring a signature, the system 10 would invoke a requirement for a response. For those not requiring a signature, the system 10 would not invoke a requirement for a response.

The notification system 10 can be designed to communicate the status of one or more responses to the first PCD 75. For example, the status could be "Confirmed" for the situation where a response has been received and the notified party is willing to commit to the pickup/delivery, "Unconfirmed" for the situation where a response has been received and the notified party does not want to commit to the pickup/delivery or it is unclear whether the notified party wishes to commit, and "Waiting" for the situation where a response that has not been received at all from the notified party.

In a design where the first PCD 75 is shown the status of multiple notifications, the system 10 can be designed to enable the party associated with the first PCD 75 to make a selection of one of the entries, such as by touch tone, touching a screen, voice recognition (IVR), etc. The system 10 can be designed to communicate an indication of the selection to the selected ones of the PCDs 75. This feature would be useful in the context of a delivery vehicle 17 so that the driver can notify the prospective package recipients of the driver's intention to deliver a package to them.

In alternative embodiments, the notification system 10 can be designed to receive a message from the first PCD 75 and communicate the message to the second PCD 75 during the notification communication session. The message can be virtually anything, for example, "Can you meet me at Pizza Hut in 20 minutes."

In alternative embodiments, the notification system 10 can be equipped with functionality to enable the party associated with the second PCD 17 (notified party) to select or enter a time for a pickup or delivery at the stop location. The time can then be communicated to the first PCD 17 (tracked party).

2. Second Embodiment

Another embodiment, among others, can be practiced by the notification system 10, particularly in the manager 41, and involves the following methodology, which is shown in FIG. 20B and denoted by reference numeral 340b: monitoring travel data of a first PCD 75, as denoted at block 351; receiving a message from the first PCD 75, the message including a request for a response, as denoted at block 352; initiating a notification communication having the message and a travel status report of the first PCD 75 to a second PCD 75, as denoted at block 353; receiving the response from the second PCD 75; and communicating the response to the first PCD 75, as denoted at block 354.

The travel status report can indicate a proximity (in terms of time, distance from, etc.) of the first PCD 75 to a stop location, that the first PCD 75 has left a location, that the first PCD 75 has arrived at a location, that the first PCD 75 is in a particular geographic region, etc.

The response from the second PCD 75 can indicate a number of possibilities, including but not limited to, whether or not a second party associated with the second PCD 75 is willing to meet a first party associated with the first PCD 75 at the stop location, whether or not a second party associated with the second PCD 75 is willing to accept responsibility for a pickup or delivery at the stop location.

The stop location can be remote from the locations of the first and second PCD 75s. The second PCD 75 could also be located at or in close proximity to the stop location.

In alternative embodiments, first PCD 75 or the notification system 10 can communicate another message during the notification communication session that indicates to the second party associated with the second PCD 75 one or more criteria for a response to be effective. For example, the one or more criteria may include one or more of the following: a time limit to respond, a travel distance limit associated with travel of the first PCD 75, a limit based upon the first PCD 75 traveling to a particular location or region, or a limit based upon one or more acceptance responses from other PCD 75s.

In alternative embodiments, the one or more criteria can be communicated to the notification system 10 from a suitable communications device, such as but not limited to, the first PCD 75, and stored in user preference data in user data table 68b (FIG. 5A). Or, the criteria can be system-defined via suitable programming.

3. Third Embodiment

Figure 20C:
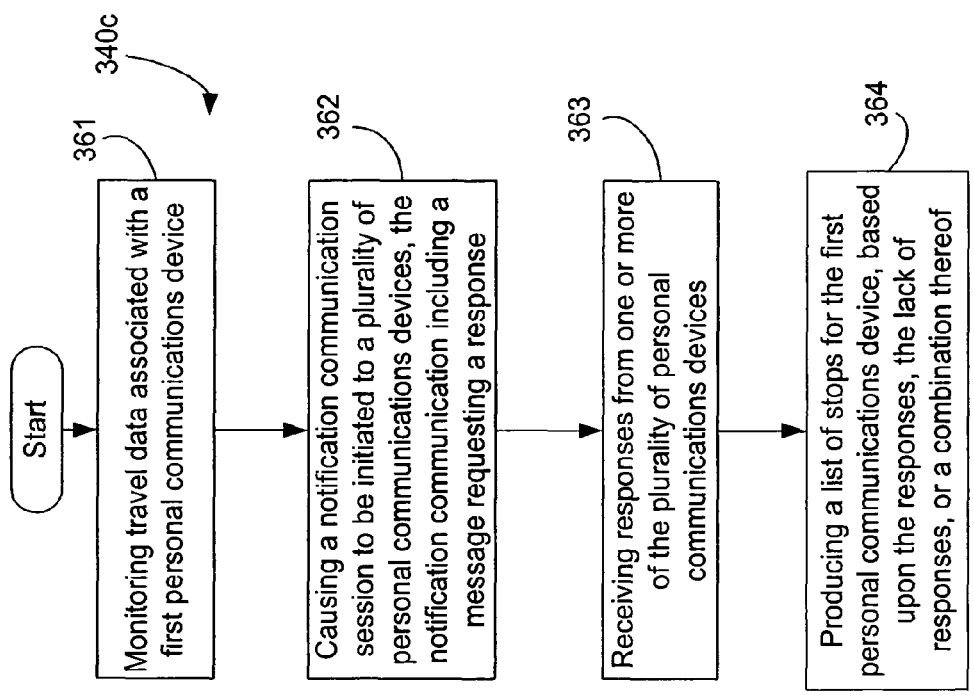
FIG. 20C is a flow chart illustrating an exemplary implementation of a third system (and method) for monitoring travel of MTs that are PCDs and communicating notifications and responses among the PCDs. This system can be optionally implemented in connection with any notification system, for example, as at least part of the architecture, functionality, and operation of the BS manager of FIGS. 1 and 3.

Yet another embodiment, among others, can be practiced by the notification system 10, particularly in the manager 41, and involves the following methodology, which is shown in FIG. 20C and denoted by reference numeral 340c: monitoring travel data associated with a first PCD 75, as indicated at block 361; initiating a notification communication session to a plurality of PCD 75s, the notification communication including a message requesting a response, as indicated at block 362; receiving responses from one or more of the plurality of PCDs 75, as indicated at block 363; and producing a list of stops for the first PCD 75, based upon the responses, the lack of responses, or a combination thereof, as indicated at block 364. Although not limited to this application, the foregoing methodology is particularly useful in connection with package delivery services.

The stop list can be produced at the notification system 10, such as in the BSCU 40, at the first PCD 75 that is being tracked (see FIG. 26 and accompanying discussion), or at a computer that is communicatively coupled to either. If produced remote from the first PCD 75, then the list can be communicated to the first PCD 75, stored therein, and displayed, if desired, to enable a party associated with the first PCD 75 to take appropriate delivery/pickup action.

The stop list can be a list of predetermined stop locations or stop numbers, can be street address, longitude/latitude designations, etc.

In alternative embodiments, functionality for accepting a reply from the first PCD 75 and communicating the reply to the one or more plurality of PCDs 75 that have responded can be implemented in the BSCU 40 or in the first PCD 75 (which would push the reply back to the relevant notified PCD(s)). As an example, this would be a useful feature in a case where a first PCD 75 associated with a delivery vehicle wishes to confirm or advise a notified PCD 75 or party that the party has been officially placed on a delivery list. Furthermore, a party can indicate in user preferences in table 68b of database 94 (FIG. 5A) that the party would like to have a confirmation reply.

The travel status report can indicate any of a number of things, for example but not limited to, a proximity (in terms of time, distance, or number of stops) of the first PCD 75 to a location or region, can indicate that the first PCD 75 has left a location, region, or scheduled stop location, etc.

The notification communication session can be initiated when the first PCD 75 is within a predetermined proximity of a stop location, region, or a location of the one or more plurality of PCD 75s, can be initiated when the first PCD 75 has left a location, region, or stop location, can be initiated when the plurality of PCDs are within a prescribed number of stops or distance of the first PCD 75, etc.

In alternative embodiments, the BSCU 40, particularly the BS manager 41, can be configured to determine whether or not a response to a notification communication is necessary based upon the nature of the delivery/pickup (e.g., a package requiring a signature would like to be delivered, and therefore, a person needs to be at the stop location to sign for the package, a package does not require a signature and therefore a party need not be present to deliver the package, business or residential delivery, inside service or outside service, etc.). When a stop does not require a response, it can be scheduled with the other stops that do require a response. As an example, see FIG. 26.

The responses from the notified PDC(s) 75 can indicate (via suitable text messaging, voice commands, depression of keys on a keypad to emit tones, etc.) whether or not a party associated with a notified PCD 75 is willing to accept responsibility for a pickup or delivery at a stop location or meet a first party associated with the first PCD 75 at the stop location. The stop location can be remote from the locations of the first and second PCD 75s.

Figure 25A:
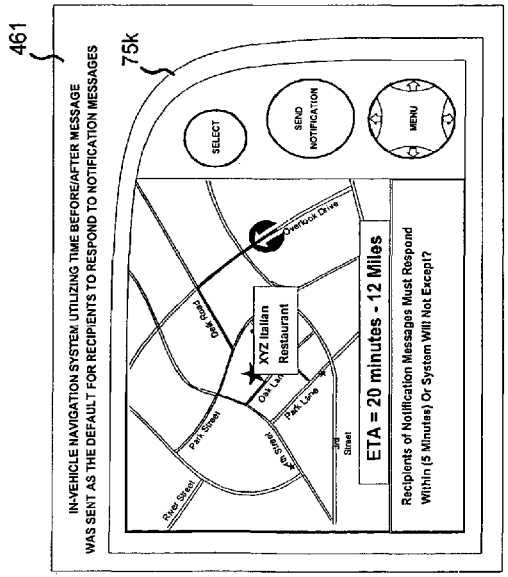
FIGS. 25A through 25D illustrate examples of possible failure states the can be shown on the screen of the tracked PCD.
Figure 25B:
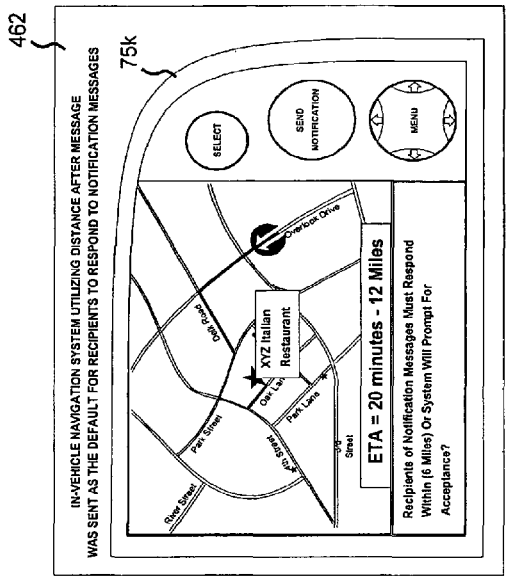
Figure 25C:
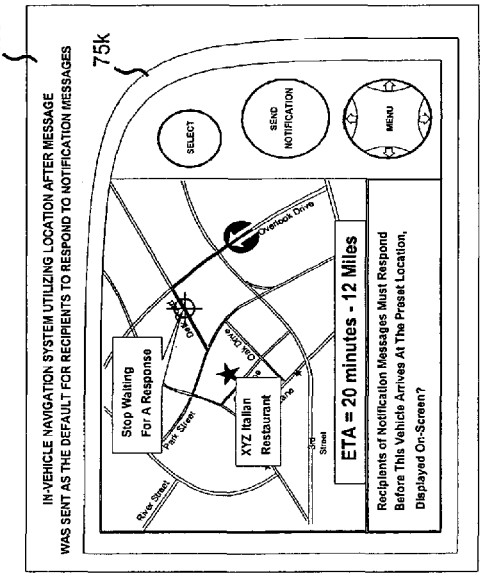
Figure 25D:
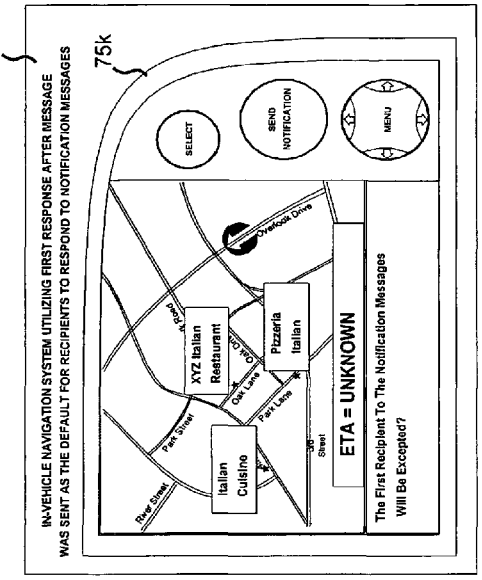

Another message can be communicated by the BSCU 40 to the notified PCD(s) 75 during the notification communication that indicates one or more criteria for a response to be effective. The one or more criteria could include, for example but not limited to, one or more of the following: a time limit (FIG. 25A), a travel distance limit associated with travel of the first PCD 75 (FIG. 25B), a limit based upon the first PCD 75 traveling to a particular location or region (FIG. 25C), or a limit based upon one or more acceptance responses from other PCD 75s (FIG. 25D).

In alternative embodiments, the BS manager 41 can be designed to receive the one or more criteria from a communications device, for example, the first PCD 75. Such criteria can be stored in user preference data.

In alternative embodiments, the BS manager 41 can be configured to enable a party associated with the first PCD 75 to select whether or not a response is requested of a notified party during a notification communication session.

In the preferred embodiment, the software architecture associated with the BS manager 41 implements failure states in connection with the request for a response. A failure state occurs when a state of a variable has been reached without receiving a response back from the notified party. Internally, a failure state causes the system to terminate notification communication attempts and to ensure that a stop associated with the failed communication attempts is not scheduled on the stop list. A failure state can also be shown on a screen or otherwise indicated to the operator of the first PCD 75, as is shown in FIGS. 25A through 25D. A failure state can be system-defined or user-defined, and can be stored in table 68b (FIG. 5A) and/or failure state data table 68I (FIG. 5A).

As illustrated in FIGS. 25A through 25D, a set of nonlimiting examples of failure state variables are as follows: (a) a time period variable (FIG. 25A) pertaining to the amount of time that has elapsed since invocation of the notification; when the time period variable has expired, it triggers a failure state; (b) a distance variable pertaining to the distance traveled by the tracked first PCD 75 (FIG. 25B) since invocation of the notification; when the first PCD 75 has traversed a prescribed distance that is monitored with the distance variable, then a failure state can be invoked; (c) a predetermined location variable (FIG. 25C) pertaining to a location to be traversed by the moving/tracked first PCD 75; in other words, once the PCD 75 has reached this predetermined location, then a failure state will result; and (d) an acceptance variable (FIG. 25D) which tracks the number of responses and/or acceptances associated with notification communications; this is useful in a configuration where a number of parties have been invited to visit a particular location (e.g., a restaurant), and there are only a limited number of openings; as an example, the system can be set to accept the first party to respond to the notification and invoke a failure state in connection with all other notifications (which can be communicated, if desired, to the other PCDs 75 that responded late).

In alternative embodiments, the BS manager 41 can be designed to communicate an additional message to the plurality of one or more PCDs 75. As an example, this could be a description of the MT 17 or of the driver.

In alternative embodiments, a status of the responses can be communicated by the BSCU 40 to the first PCD 75. As an example of a possible scheme for indicating status, the following text coding cold be employed and could be displayed on a display associated with the first PCD 75: "w" for waiting for a response, "c" for confirmed indicating that a response was received and delivery/pickup is to occur, and "u" for unconfirmed indicating that a response was received and a delivery/pickup is not to occur)

In alternative embodiments, the BSCU 40 can be designed to enable a party associated with one or more of the plurality of PCD 75s to select or enter a time for a pickup or delivery at a stop location, and then this information can be communicated to the first PCD 75.

4. Example Implementations of Tracked PCD to Notified PCD Communications

Figure 21:
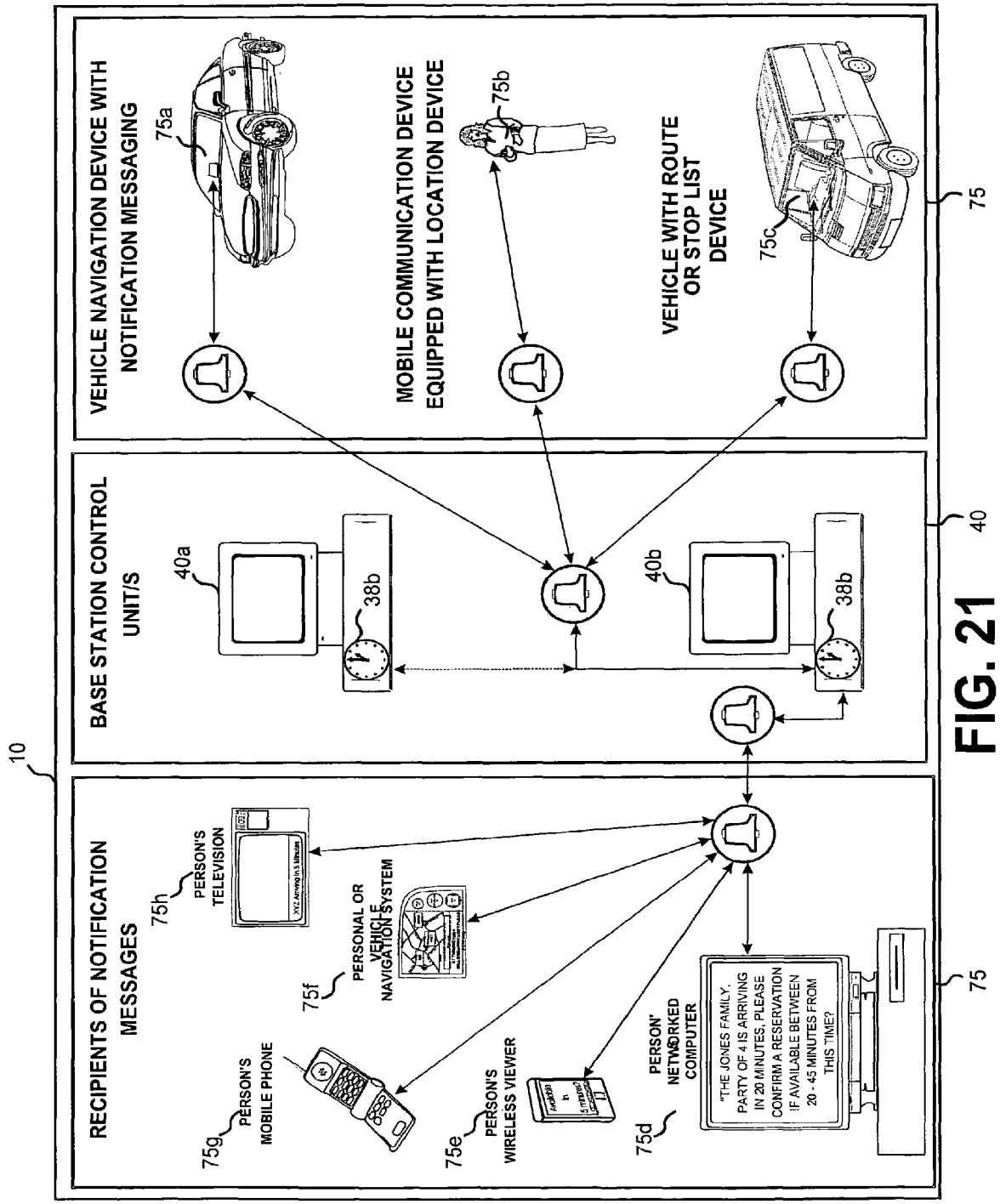
FIG. 21 is an illustration of an exemplary system with various PCDs being tracked, communicating notifications to other PCDs, and receiving responses from the other PCDs, all by way of a base station control unit.

FIG. 21 is a graphical illustration of an example of a notification system 10 having a base station control unit 40 monitoring travel of PCDs 75 and capable of communicating notifications and responses among the various PCDs 75. A PCD 75 in the form of a person's networked computer 75d is shown receiving a notification communication from one of the tracked PCDs 75a-75c, which asks for a response, i.e., in this example, the party associated with the tracked PCD 75 at issue is attempting to make a reservation at a restaurant having the networked computer 75d.

Figure 22:
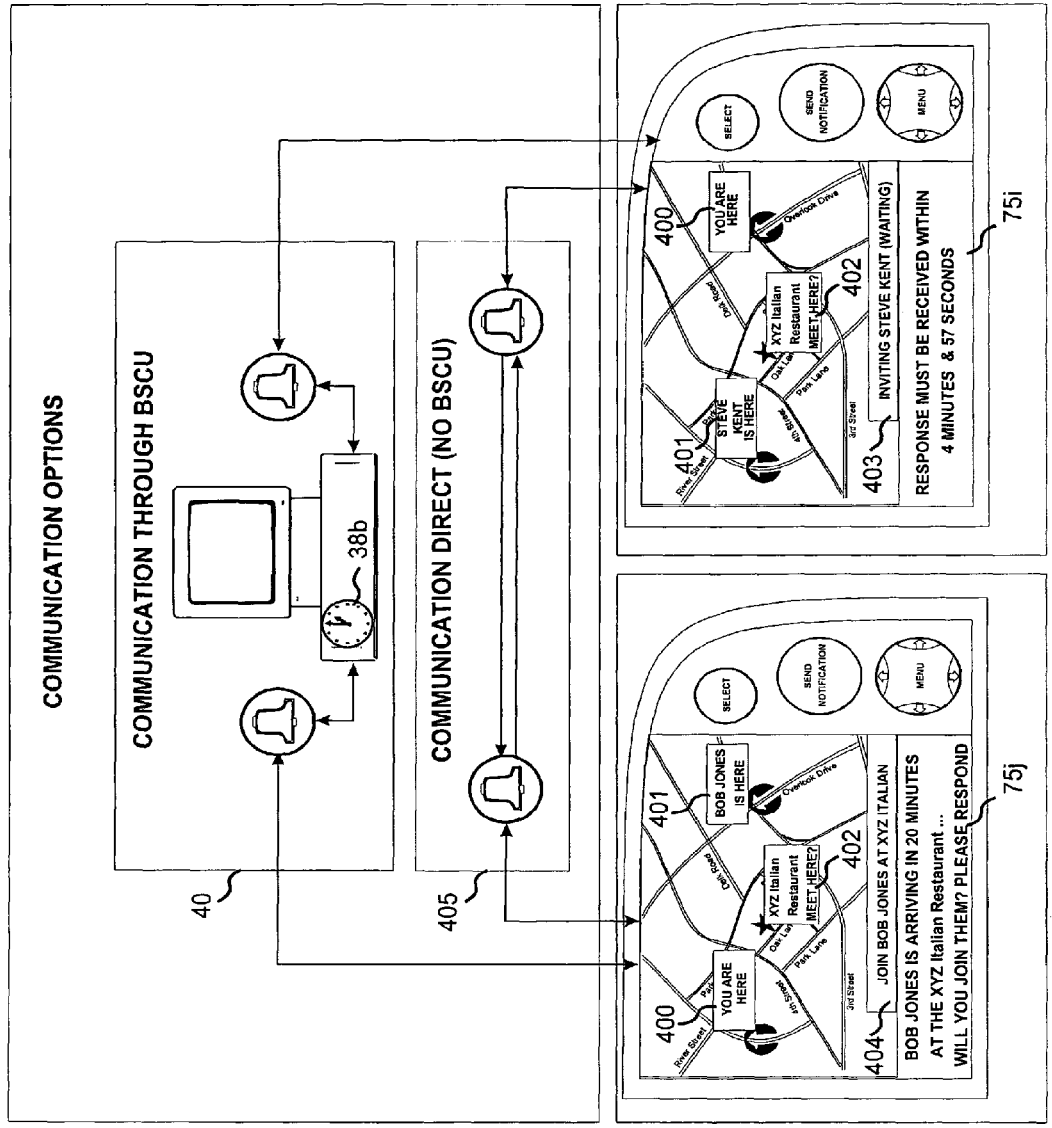
FIG. 22 is an illustration of an exemplary system with a PCD in the form of a first navigation system (a) tracking its location, (b) communicating a notification to another PCD in the form of a second navigation system, and (c) receiving a response from the second navigation system, either indirectly by way of a base station control unit or directly from navigation system to navigation system.

FIG. 22 is a graphical illustration of possible ways in which communications can occur between a tracked PCD 75 and a notified PCD 75. As shown, one embodiment involves indirect communications using the BSCU 40, while the other involves direct communications between the PCDs 75. In the latter case, the functionality that would have been associated with the BSCU 40 is incorporated in one of the devices 75 or the functionality is distributed across the devices 75.

Figure 23:
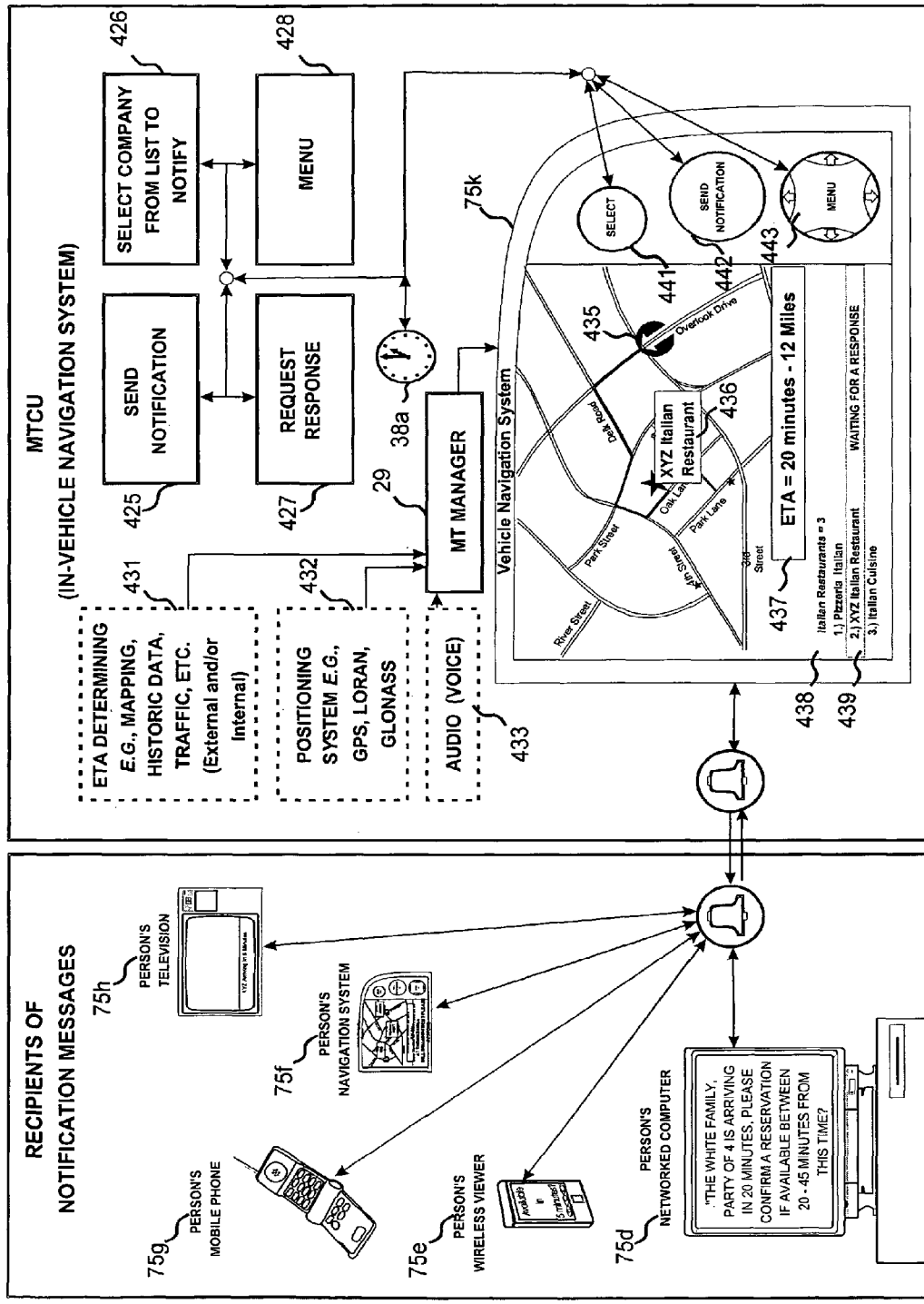
FIG. 23 is an illustration of a possible architecture for implementing the direct communications configuration between a tracked PCD in the form of an in-vehicle navigation system and one or more other PCDs.

FIG. 23 is a graphical illustration of a possible architecture for implementing the direct communications configuration between a tracked PCD 75 in the form of an in-vehicle navigation system and one or more other PCDs 75d-75h. The in-vehicle navigation system 75 has functional blocks 425-428 and optional functional blocks 431-433, which can be implemented as part of the MT manager 29 or as separate software routines, as is shown in FIG. 23. The MT manager 29 (also see FIGS. 1 and 2) is designed to cause the navigation system 75k to provide a list of locations of interest, such as local restaurants in this example. At present, such technology is known in the art. The user is permitted to select a listed item, in this case, the XYZ Italian Restaurant has been selected via the user interface buttons that are shown. As shown, the display indicates that a response is being waited upon. Also, the expected time of arrival (ETA) is shown on the screen in terms of both time (20 minutes) and distance (12 miles). Either or both of the foregoing ETAs can be communicated to the PCD 75d, depending upon the desired design.

A PCD 75 in the form of a person's networked computer 75d at the XYZ Italian Restaurant is shown receiving a the notification communication from the in-vehicle navigation system 75k, which asks for a response, i.e., in this example, the party associated with the tracked PCD 75k at issue is attempting to make a reservation at a restaurant having the networked computer 75d.

The text content of the message that is sent by PCD 75k to PCD 75d can be entered by the user of the PCD 75d using any suitable graphical user interface (GUI) and screen prompts and any suitable hardware input devices, such as buttons 441-443. The content is communicated in packetized manner with the other content associated with the notification communication.

The text content could also be pre-stored in the memory associated with the PCD 75k and selected by the user using any suitable GUI and screen prompts and user interface buttons 441-443.

Figure 24:
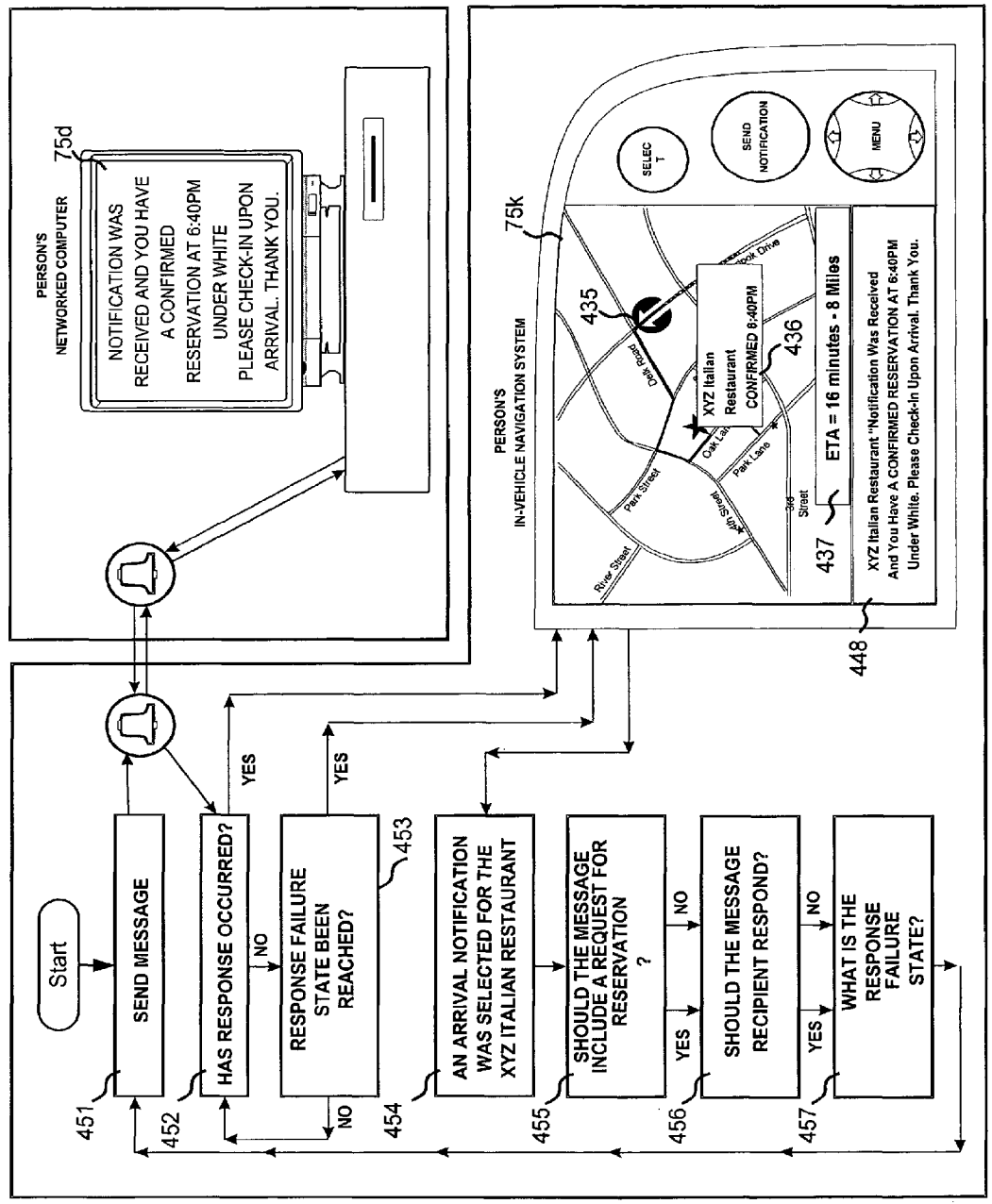
FIG. 24 is a continuation of the example in FIG. 23 and shows implementation of response requests and failure states.

FIG. 24 is a continuation of the example in FIG. 23 and shows implementation of response requests and failure states, both of which have been discussed previously.

As illustrated in FIG. 24, the PCD 75d at the XYZ Italian Restaurant is used to send a response message back to the in-vehicle navigation system 75k. In this case, the person operating the PCD 75d creates a message indicating receipt of the notification and confirming the reservation at a particular time, i.e., 6:40 pm, and communicates this message back to the PCD 75*k*, so that the party associated with the PCD 75*k* knows that the reservation is properly scheduled.

Another part of the software architecture associated with the PCD 75*k* is shown at blocks 451-457. Although not limited to this configuration, this functionality in this example is implemented in the MT manager 29 (FIGS. 1 and 2). As is clear, the user of the PCD 75*k* can indicate that a response should be requested (in user preferences stored in PCD 75*k* or otherwise during interaction with PCD 75*k*). The PCD 75*k* can also be configured to determine that a response is necessary based upon the type of notification communication (e.g., a package requiring a signature would like to be delivered, and therefore, a person needs to be at the stop location to sign for the package).

The software architecture further implements failure states in connection with the request for a response. A failure state occurs when a state of a variable has been reached without receiving a response back from the notified party. Internally, a failure state causes the system to terminate notification communication attempts. A failure state can also be shown on a screen or otherwise indicated to the operator of the PCD 75*k*, as is shown in FIGS. 25A through 25D. A failure state can be system-defined or user-defined, and can be stored in table 68*b* (FIG. 5A) and/or failure state data table 681 (FIG. 5A).

As illustrated in FIGS. 25A through 25D, a set of nonlimiting examples of failure state variables are as follows: (a) a time period variable (FIG. 25A) pertaining to the amount of time that has elapsed since invocation of the notification; when the time period variable has expired, it triggers a failure state in the PCD 75*k*; (b) a distance variable pertaining to the distance traveled by the tracked PCD 75*k* (FIG. 25B) since invocation of the notification; when the PCD 75*k* has traversed a prescribed distance that is monitored with the distance variable, then a failure state can be invoked in the moving/tracked PCD 75*k*; (c) a predetermined location variable (FIG. 25C) pertaining to a location to be traversed by the moving/tracked PCD 75*k*; in other words, once the PCD 75*k* determines that it has reached this predetermined location, then a failure state will result; and (d) an acceptance variable (FIG. 25D) which tracks the number of responses and/or acceptances associated with notification communications; this is useful in a configuration where a number of parties have been invited to visit a particular location (e.g., a restaurant), and there are only a limited number of openings; as an example, the system can be set to accept the first party to respond to the notification and invoke a failure state in connection with all other notifications (which can be communicated, if desired, to the other PCDs 75 that responded late).

Figure 26:
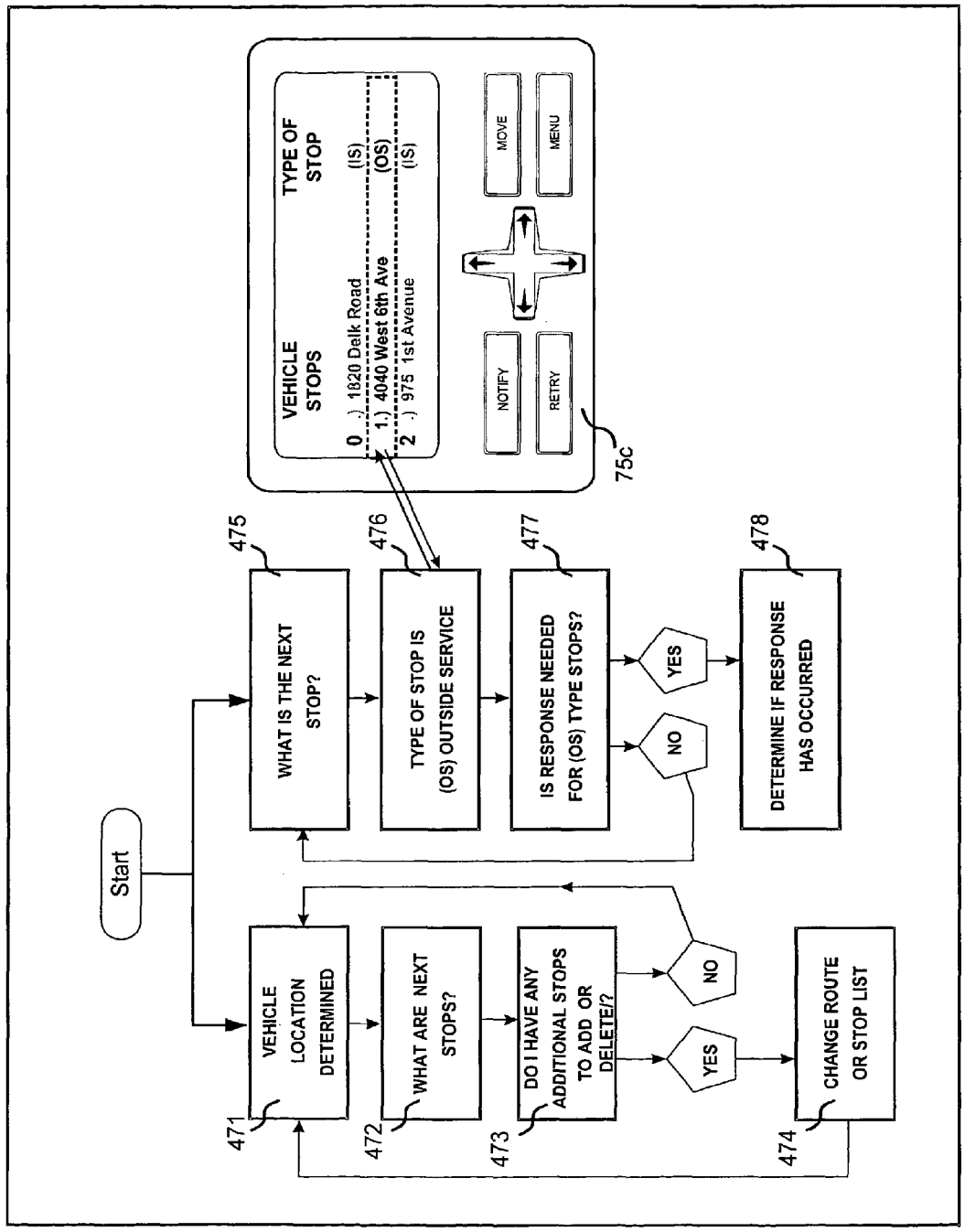
FIG. 26 is an illustration of an embodiment of a stop list generation system that may be used in connection with a delivery vehicle. A stop list is compiled based upon whether or not a stop requires a response and whether or not a response has been received from such stops that require one.

FIG. 26 illustrates an embodiment that can be implemented, if desired, in connection with a vehicle having a route-or-stop-list device 75*c* (FIG. 21) that determines whether a response to a notification is needed, based upon user preferences, system preferences, and/or the nature/type (e.g., business or residential, inside service or outside service, etc.) of the stop.

In this nonlimiting example, a determination is made as to whether the stop is associated with (a) inside service (IS; for example, a signature must be obtained to drop off a package, a person must inspect an item before dropoff, a person must personally provide an item for pickup, a user has requested that a response from the user must be received before the user is scheduled for a delivery/pickup, etc.) or (b) outside service (OS; for example, an item can be dropped off without signature, an item is waiting outside a building to be picked up and nobody needs to be present to give the item to the pickup vehicle, etc.).

The functionality associated with this embodiment, as defined at blocks 471-478, can be implemented in the BSCU 40 and/or the tracked PCD 75*c*. In this embodiment, it is implemented solely in the PCD 75*c*, and the route or stop list that is generated and periodically changed by the PCD 75*c* is periodically communicated to the BSCU 40. Furthermore, in terms of external controls and user interfacing, the PCD 75*c* has, as shown in FIG. 26, a screen for listing stops and the type of stop, a notify button to initiate a notification communication, a retry button to retry a notification communication, a move button to move a cursor on the screen and/or to move through the stop list, a menu button to move through various menus and submenus, and a cursor movement control with arrows in the center, which can be also be used to scroll through the listing of stops.

In terms of internal programming, as shown in blocks 471-474, there is a looping process for creating, determining, and/or changing the route or stop list, and as illustrated in blocks 475-478, there is looping process for determining whether a response is needed for the stop, based upon whether the stop is associated with IS or OS, and for determining whether a response has in fact been received from those stops that require a response. In this example, the two foregoing processes execute concurrently.

In this example, the PCD 75*c* can be designed to retrieve all stops within a particular distance of the PCD 75*c* (e.g., a 3 mile radius), the location of which is known, as indicated at blocks 471-472. Then, a list is created and iteratively updated, at blocks 473 and 474. Once a stop is tentatively added to the route or listing of stops, via blocks 471-474, then the looping process associated with blocks 475-478 analyzes the stop type to determine if the stop requires a response and if the required response has been received. In this example, if a stop is OS or if a stop is IS (requires a response) and the response was received, then blocks 473-474 cause the stop to be officially added to the stop list. Otherwise, when the stop is IS and no response was received, then the stop is removed per block 474. Furthermore, system or user preferences can be set so that a stop is classified as IS or OS.

Figure 27:
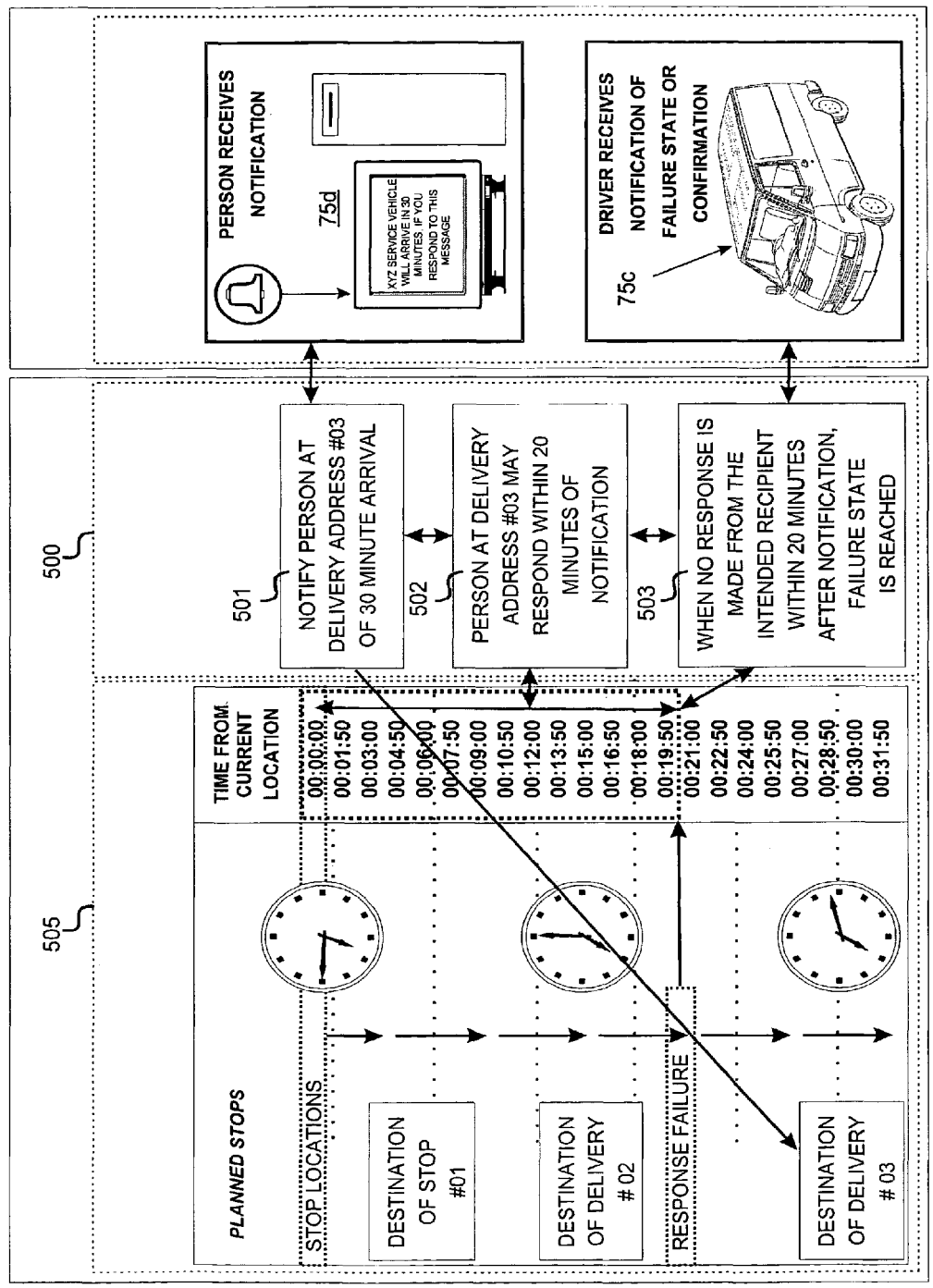
FIG. 27 is an illustration of an embodiment of a stop list generation system that may be used in connection with a delivery vehicle. A notified party is given a predetermined time period to respond until a failure state is reached. The existence of failure states (No Responses) and confirmations are communicated to the PCD associated with the delivery vehicle.

FIG. 27 is an illustration showing an embodiment involving a delivery vehicle with tracked PCD 75*c* that has a predetermined route 505, or stop list, with a number of prescheduled delivery stops, for example, destinations #01 through #03. In this embodiment, the BS manager 41 or PCD 75*c* has functionality 500 that is designed to cause a notification communication to be initiated to a PCD 75*d* at a point when the tracked PCD 75*c* is a predefined proximity, for example, at or about 30 minutes, from a delivery destination. Also, the BS manager 41 is designed so that a failure state will occur if a response is not received from the PCD 75*d* within predefined time period, for example, 20 minutes, of the notification. Furthermore, the driver associated with the tracked PCD 75*d* is notified of the occurrence of the failure state or confirmation, for example, via suitable text (e.g., "Confirmed" or "No Response" in the event of a failure state) on a screen associated with the PCD 75*d*, so that the driver associated with the PCD 75*c* knows whether or not to make the stop at destination #03.

Figure 28:
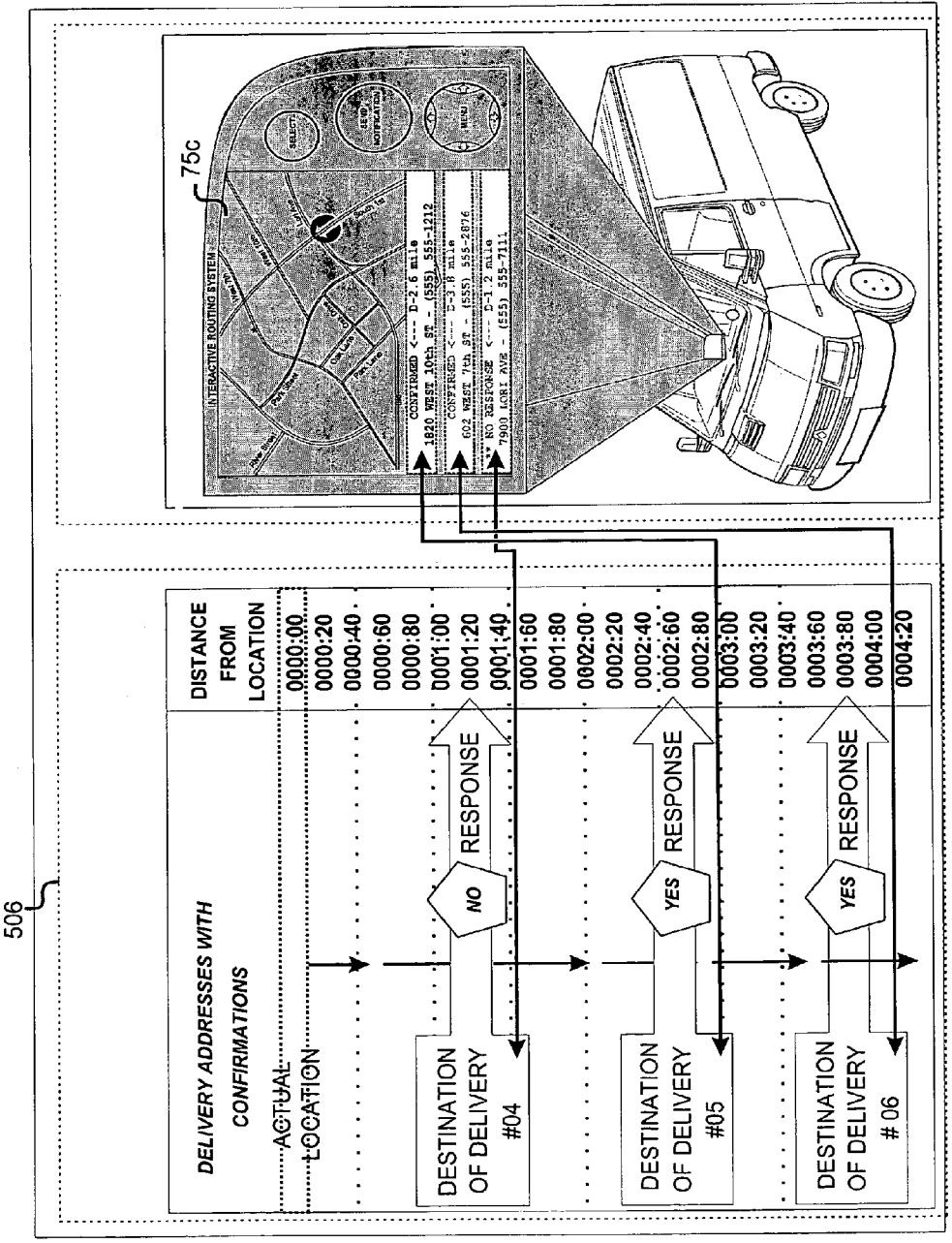
FIG. 28 is an illustration of an embodiment of a stop list generation system that may be used in connection with a delivery vehicle. A delivery vehicle driver can select or otherwise indicate which of the confirmed notified parties will be visited by the delivery vehicle.

FIG. 28 is an illustration showing an embodiment involving a delivery vehicle with tracked PCD 75*c* that has a predetermined route 506, or stop list, with a number of prescheduled delivery stops, for example, destinations #04 through #06. In this embodiment, the BS manager 41 or PCD 75*c* has functionality that is designed to cause a notification communication to be initiated to a PCD 75 at a point when the tracked PCD 75*c* is a predefined proximity in terms of distance from a delivery destination. Also, the BS manager 41 is designed so that a failure state will occur if a response is not received from the notified PCD 75 based upon one or more failure state criteria. Furthermore, the driver associated with the tracked PCD 75*d* is notified of the occurrence of the failure state or confirmation, for example, via suitable text (e.g., "Confirmed" or "No Response" in the event of a failure state) on a screen associated with the PCD 75*d*, which in this case, is in the form of an in-vehicle navigation system, so that the driver associated with the PCD 75*c* knows whether or not to make particular stops.

As shown on the screen, two deliveries have been confirmed, and the system still awaits a response involving the delivery for destination #04. The PCD 75*c* can be equipped with suitable programming to enable the driver to scroll through and select (e.g., via arrows on menu button and select buttons, as shown) or otherwise enter the deliveries that the driver intends to make, based upon the confirmation/no-response information pertaining to each destination as well as the distance information provided to the driver on the screen. This selection or entry, or information indicative thereof, can be communicated from the PCD 75*c* to the appropriate confirmed PCD, directly or indirectly via the BSCU 40, depending upon the notification system implementation. In some implementations, the selection or entry information is communicated only to the BSCU 40 for tracking purposes and is not forwarded to the confirmed PCD.

Figure 29:
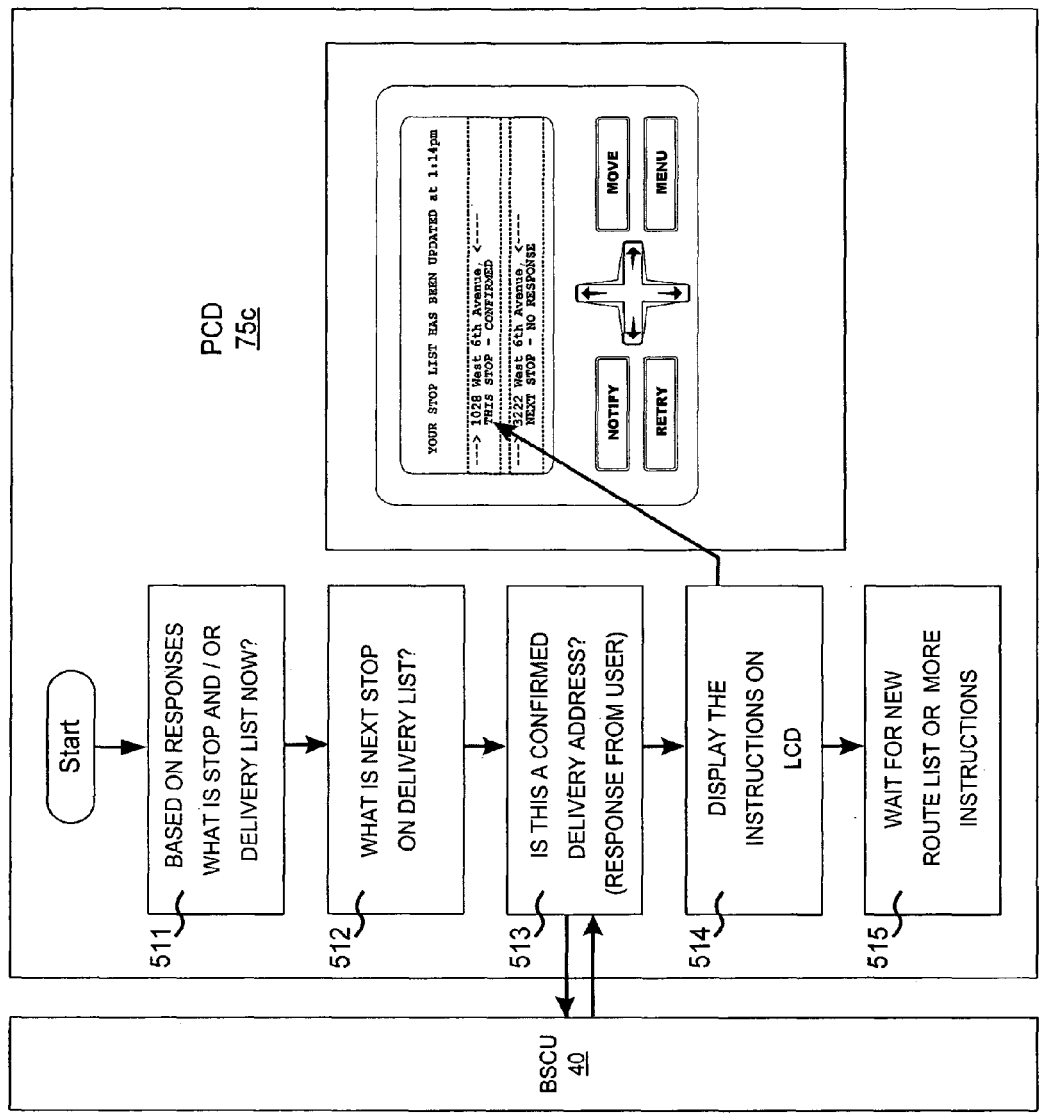
FIG. 29 is an illustration of an embodiment of a stop list generation system that may be used in connection with a delivery vehicle. The PCD associated with the delivery vehicle and driver communicates with the BSCU in order to determine whether or not a response pertaining to a stop has been received.

FIG. 29 is an illustration of another embodiment involving a delivery vehicle having a PCD 75*c*, which shows functionality at blocks 511-515 that can be programmed into the PCD 75*c* for updating a stop list based upon whether or not responses were received. The software can be designed to show confirmed and unconfirmed (no response) stops or to show only confirmed stops, as desired, on the screen of the PCD 75*c*.

Figure 30:
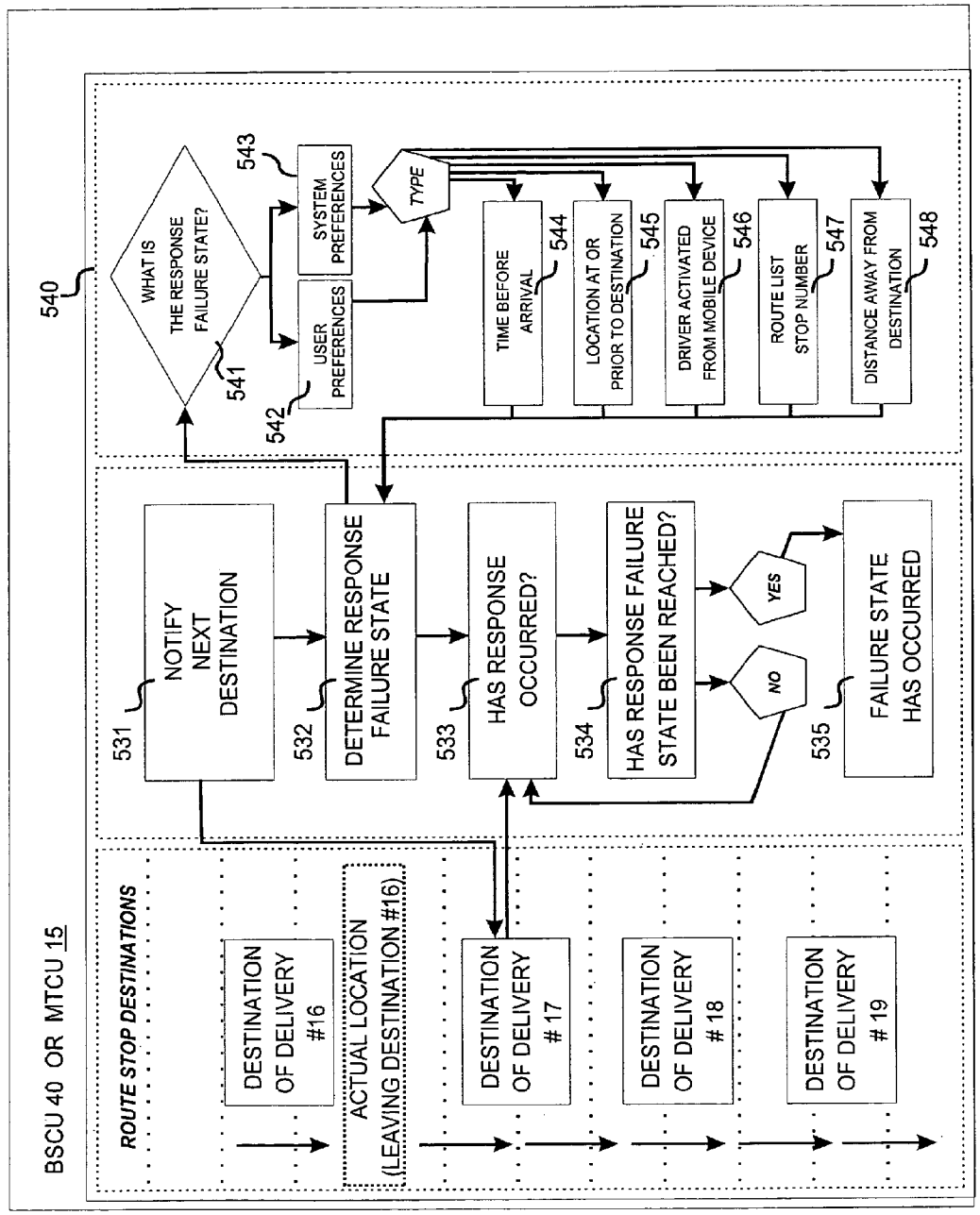
FIG. 30 is an illustration of an embodiment that can be implemented at the BSCU or MTCU showing implementation of failure states in connection with responses and nonresponses to notification communications in the context of a delivery vehicle.

FIG. 30 is an illustration of an embodiment that can be implemented at the BSCU 40, such as the BS manager 41 (FIGS. 1 and 3) or at the MTCU 15, such as the MT manager 29 (FIGS. 1 and 3), showing implementation of failure states in connection with responses and nonresponses to notification communications in the context of a delivery vehicle. As shown at respective blocks 542 and 543 and as described previously, failure states can be user defined and/or system defined. Furthermore, failure states can be defined in a number of ways, a few examples of which are indicated at blocks 544-548.

Figure 31:
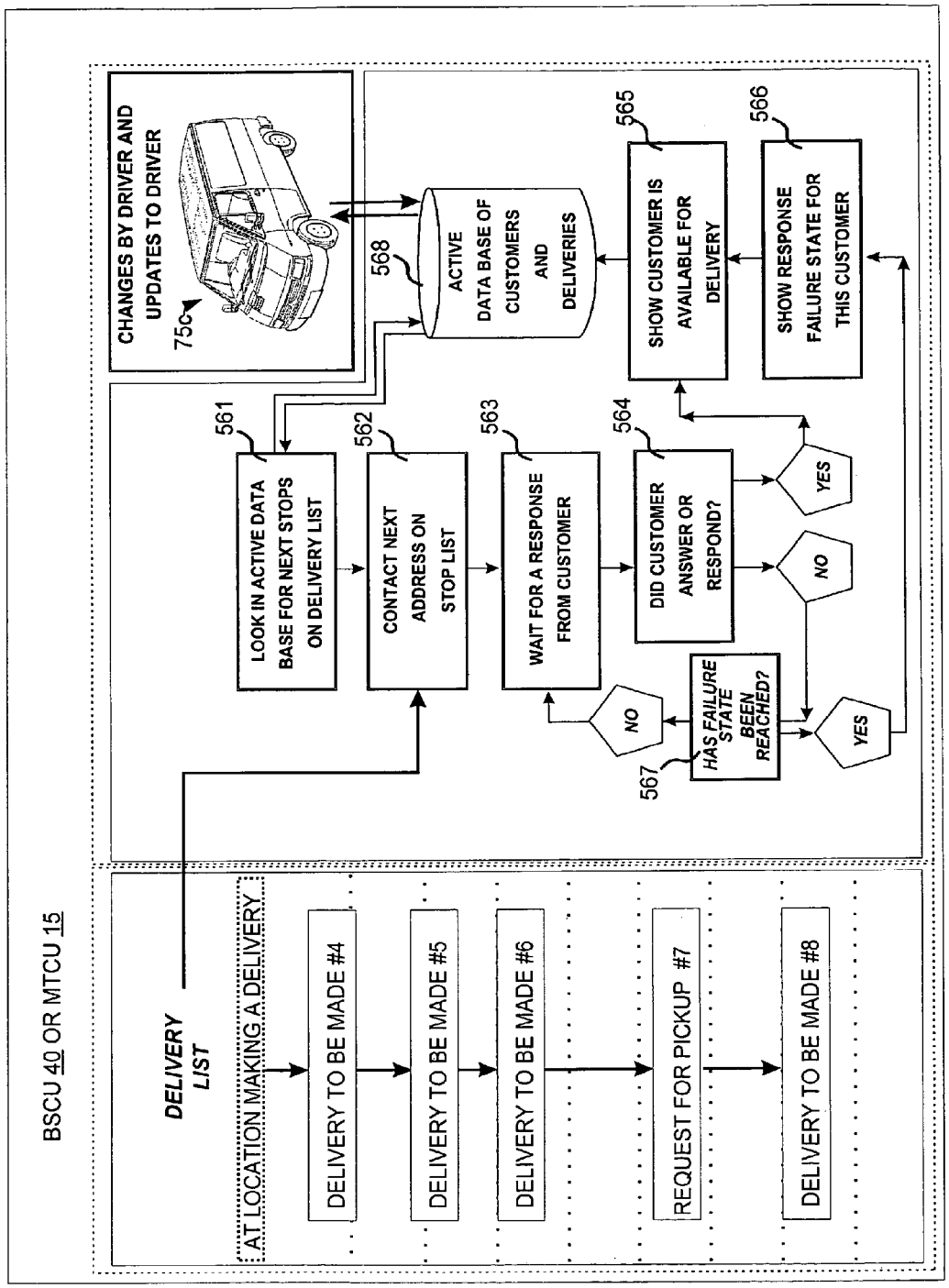
FIG. 31 is an illustration of another embodiment that can be implemented at the BSCU or MTCU showing implementation of failure states in connection with responses and nonresponses to notification communications in the context of a delivery vehicle.

FIG. 31 is an illustration of another embodiment that can be implemented at the BSCU 40, such as the BS manager 41 (FIGS. 1 and 3) or at the MTCU 15, such as the MT manager 29 (FIGS. 1 and 3), showing implementation of failure states in connection with responses and nonresponses to notification communications in the context of a delivery vehicle. Blocks 561-568 represent the high level architecture of the software. As illustrated, the stop list can be determined and changed dynamically, based upon responses and nonresponses. Also, a request for a pickup can be introduced into the stop list of scheduled deliveries at any point.

FIG. 32 is an illustration of an embodiment of route data 471 and corresponding driver display data that can be maintained and implemented in connection with a delivery or pickup service. The route data 471 can be maintained at the BSCU 40, at the MTCU 15, or at both. The driver display data 472 is displayed to the driver of the delivery/pickup vehicle 17.

As indicated at reference numeral 477 in the driver display data 472, the status of response and nonresponses to notifications is monitored and shown to the driver. In this example embodiment, the status is "C" for confirmed for the situation where a response has been received and the notified party is willing to commit to the pickup/delivery, is "U" for unconfirmed for the situation where a response has been received and the notified party does not want to commit to the pickup/delivery or it is unclear whether the notified party wishes to commit, and is "W" for waiting for the situation where a response that has not been received at all from the notified party.

Figure 33:
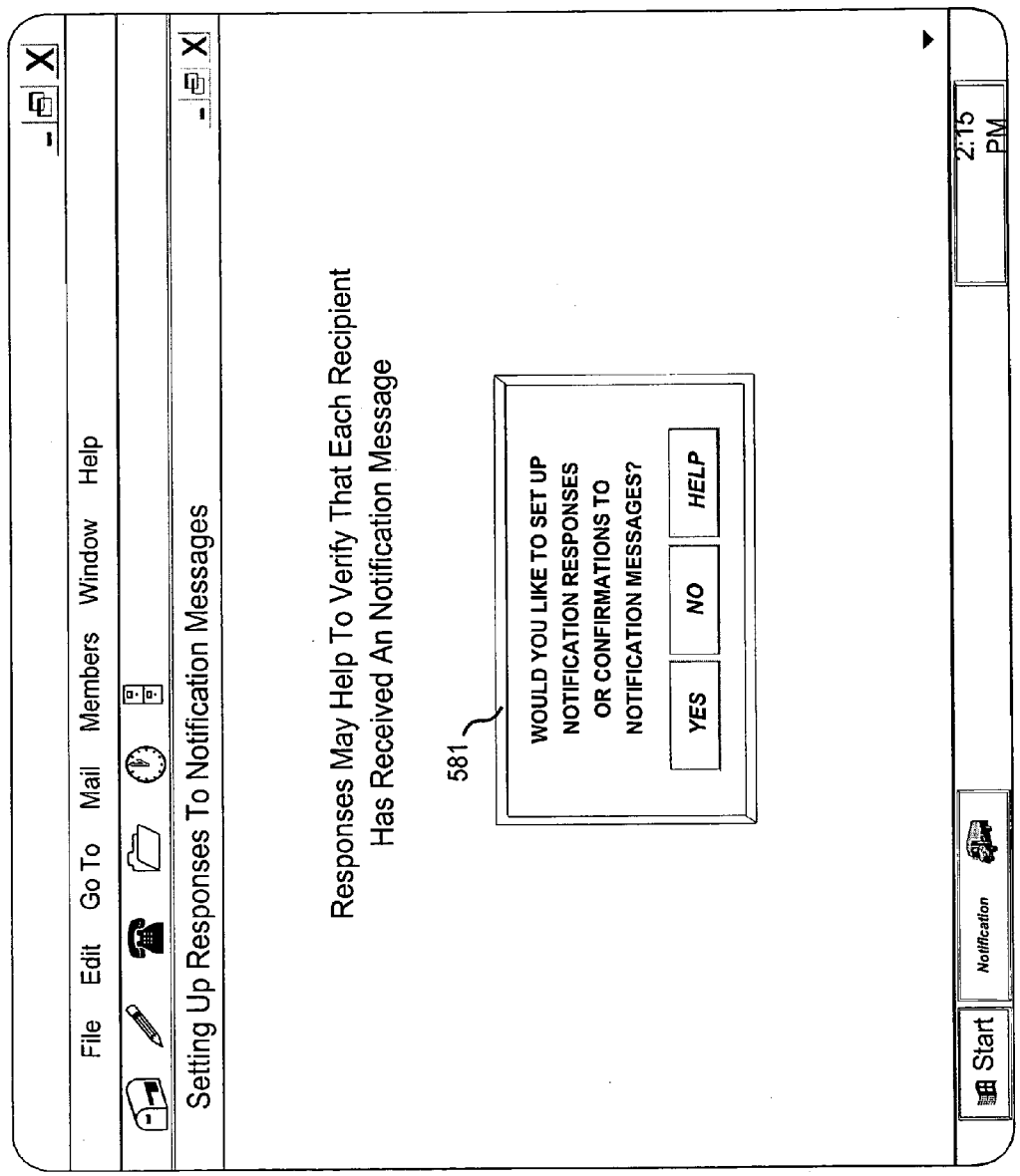
FIG. 33 shows an example of a possible user interface screen that can be generated by the GUI of FIG. 3 and used in connection with the response systems (and methods).

Preferably, although not necessarily, the BSCU 40, particularly the BS manager 41, is equipped with a suitable graphical user interface (GUI), denoted by reference numeral 46 in FIG. 3, to enable a party to communicate with the BSCU 40 via the Internet. FIG. 33 shows an example of a possible user interface screen that can be generated by the GUI 46 and pushed to the remote communications device via, for example, HTML over the Internet. Other examples of user interface screens to be described in paragraphs to follow can also be generated and communicated to a party in this manner.

As shown in FIG. 33, the screen prompts the party to make a decision as to whether or not the party wishes a response to a notification communication. This screen can be used in connection with the response systems and methods that have been described previously in this document. This selection can be stored in the database 94 (FIG. 5A), such as in users preferences in user data table(s) 68*b*.

Figure 34:
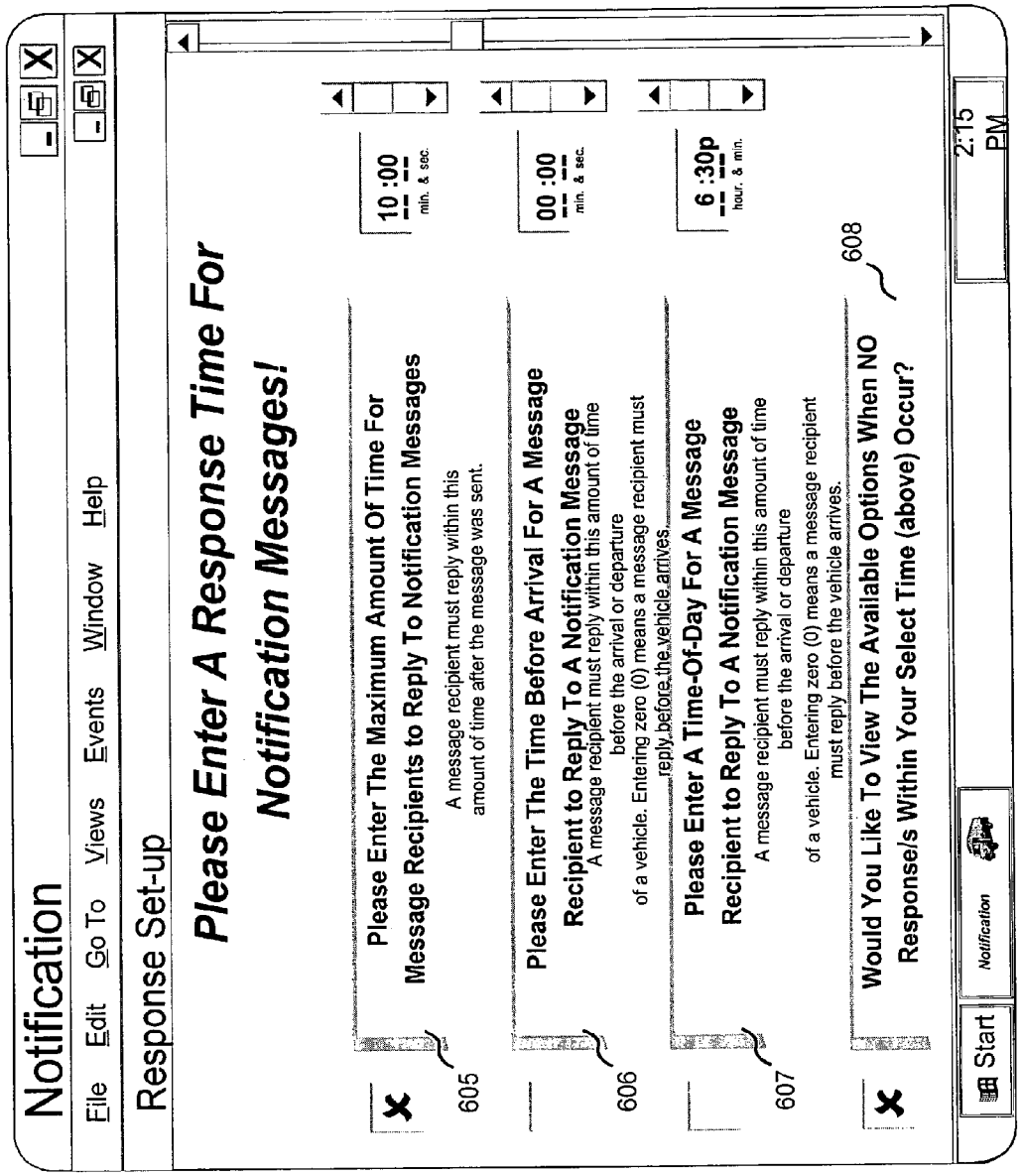
FIG. 34 shows an example of a possible user interface screen that can be generated by the GUI of FIG. 3 and used in connection with the response systems (and methods).

FIG. 34 shows another example of a possible user interface screen that can be generated by the GUI of FIG. 3 and used in connection with the response systems (and methods). This screen can be used separately or in addition to the one of FIG. 33.

Figure 39:
FIG. 39 shows an example of a possible user interface screen that can be generated by the GUI of FIG. 3 and used in connection with the response systems (and methods).

As shown, this screen can be used to solicit selections from a party that will be used by the BS manager 41 in connection with nonresponses (failure states). These selections can be stored in the database 94 (FIG. 5A), such as in users preferences in user data table(s) 68*b*. Reference numerals 605-607 illustrate questions relating to when failure states should occur after a notification and response request have been communicated to a notified party, while reference numeral 608 illustrates a selection for enabling the party to define what will occur when no response is received by the BSCU 40. An example of a screen for enabling a party to select such options is shown in FIG. 39.

Figure 35:
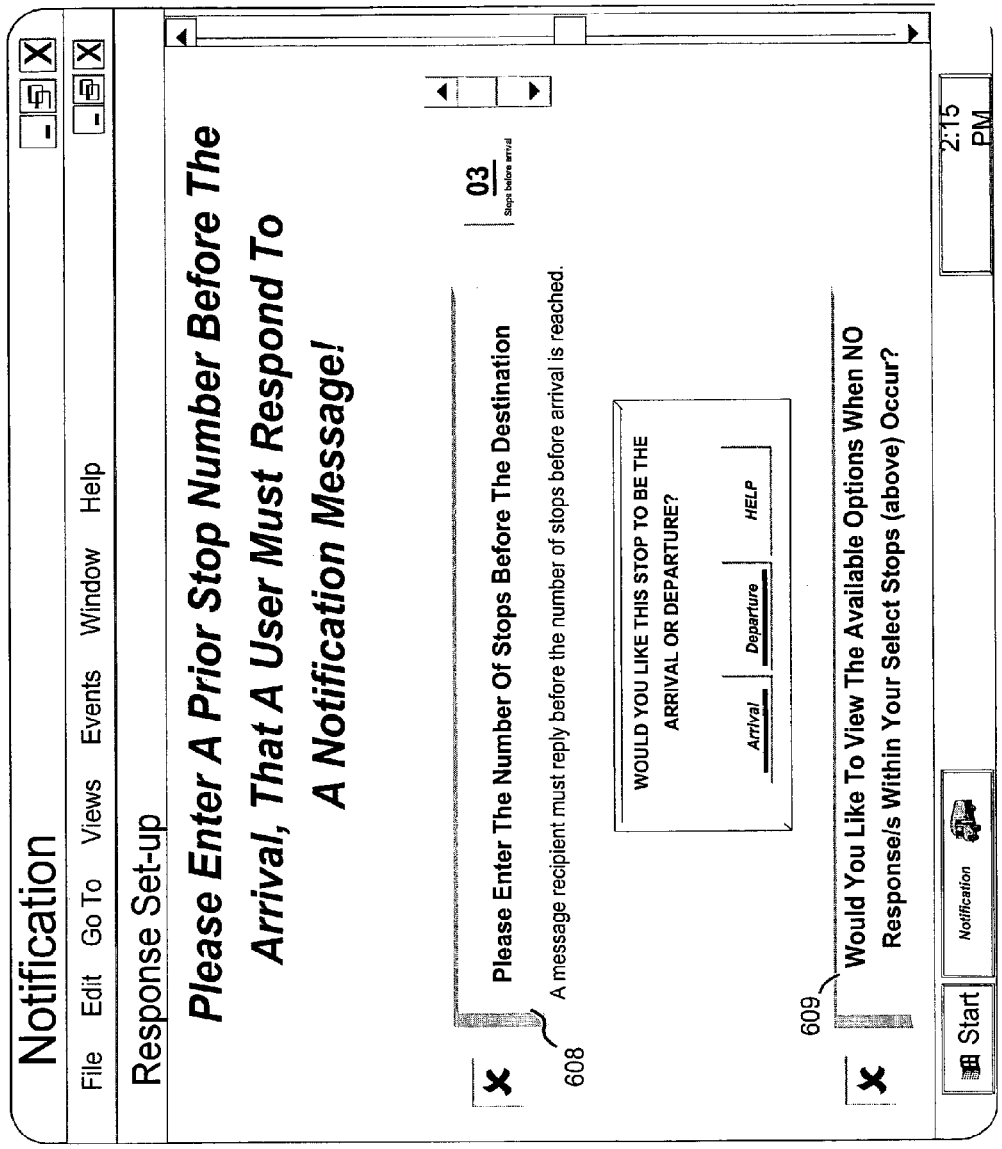
FIG. 35 shows an example of a possible user interface screen that can be generated by the GUI of FIG. 3 and used in connection with the response systems (and methods).

Referring now to FIG. 35, FIG. 35 shows another example of a possible user interface screen that can be generated by the GUI of FIG. 3 and used in connection with the response systems (and methods). This screen can be used separately or in addition to those screens of FIGS. 33 and 34.

As shown, this screen can be used to solicit selections from a party that will be used by the BS manager 41 in connection with nonresponses (and occurrence of failure states). These selections can be stored in the database 94 (FIG. 5A), such as in users preferences in user data table(s) 68*b*. Reference numeral 608 illustrates a question relating to when a failure state should occur after a notification and response request have been communicated to a notified party, while reference numeral 609 illustrates a selection for enabling the party to define what will occur when no response is received by the BSCU 40. An example of a screen for enabling a party to select such options is shown in FIG. 39.

Note that, in this example, the party can set the system so that a failure state will occur in the event that a notified party does not respond before the vehicle 17 travels to within a preset number of stops from a scheduled stop location, or destination.

Figure 36:
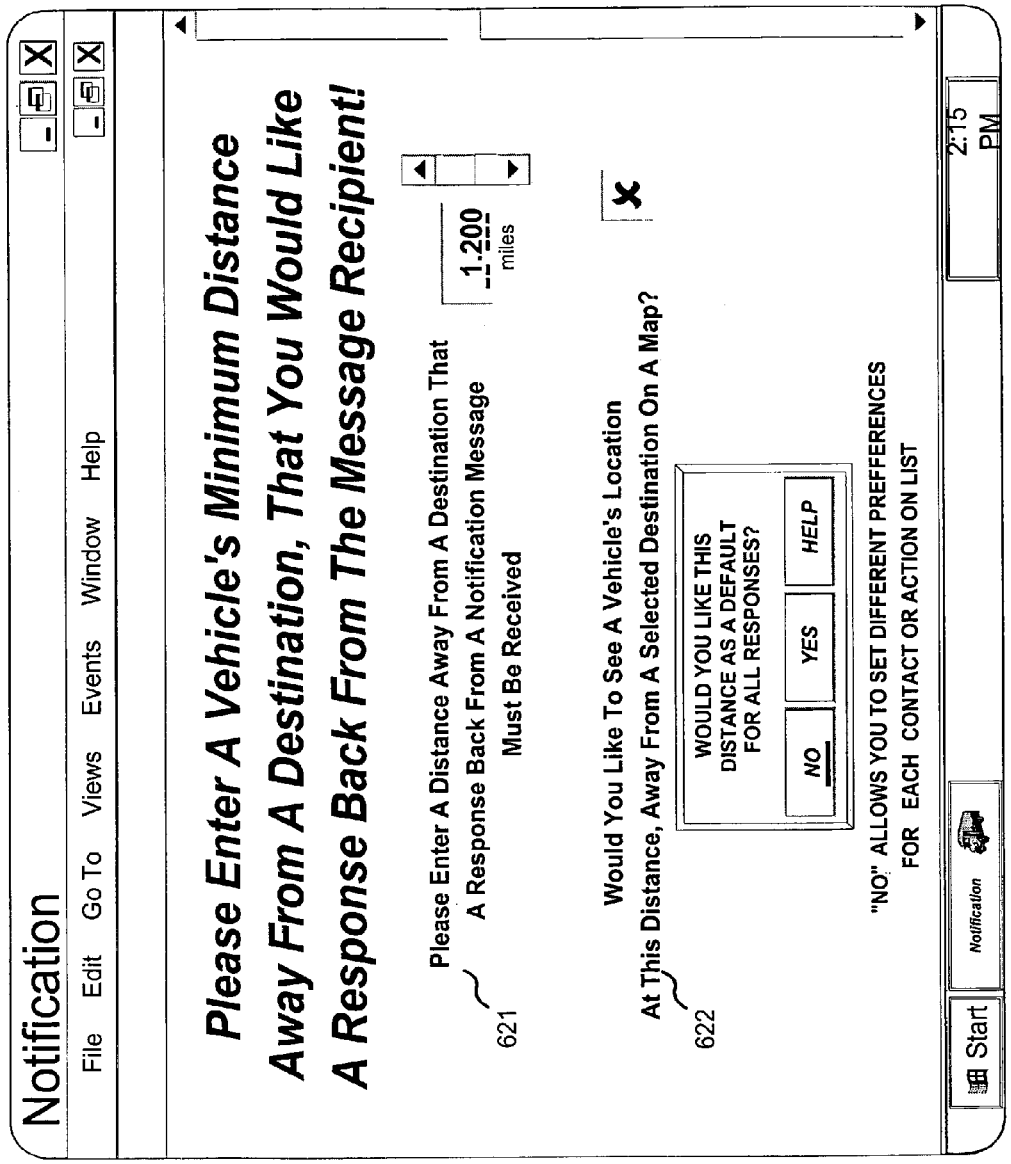
FIG. 36 shows an example of a possible user interface screen that can be generated by the GUI of FIG. 3 and used in connection with the response systems (and methods).

With reference to FIG. 36, FIG. 36 shows another example of a possible user interface screen that can be generated by the GUI of FIG. 3 and used in connection with the response systems (and methods). This screen can be used separately or in addition to those of FIGS. 33-35.

As shown, this screen can be used to solicit selections from a party that will be used by the BS manager 41 in connection with failure states. These selections can be stored in the database 94 (FIG. 5A), such as in users preferences in user data table(s) 68b. Reference numerals 621 and 622 illustrate questions relating to when failure states should occur after a notification and response request have been communicated to a notified party.

Figure 37:
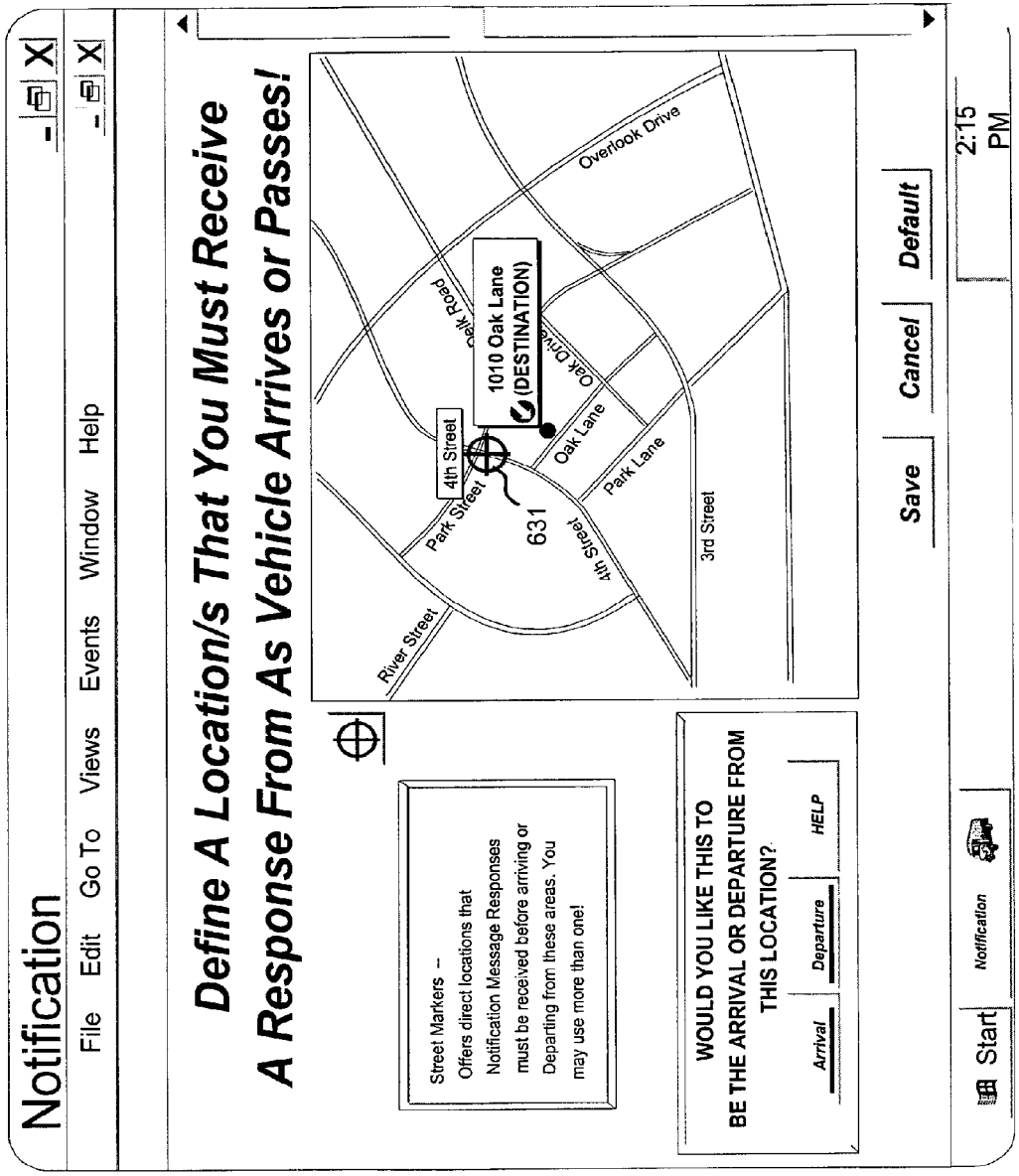
FIG. 37 shows an example of a possible user interface screen that can be generated by the GUI of FIG. 3 and used in connection with the response systems (and methods).

FIG. 37 shows another example of a possible user interface screen that can be generated by the GUI of FIG. 3 and used in connection with the response systems (and methods). This screen can be used separately or in addition to those of FIGS. 33-36.

As shown, this screen can be used to solicit selections from a party that will be used by the BS manager 41 in connection with failure states. These selections can be stored in the database 94 (FIG. 5A), such as in users preferences in user data table(s) 68b. Reference numeral 631 illustrates a marker that can be moved across a map of streets, for example, via a mouse, and used to select one or more locations on the map pertaining to when a failure state should occur for nonresponsiveness on the part of the notified party. The marked location(s) pertains to the moving vehicle 17 that is headed for the stop location, or destination, which, in this example, is 1010 Oak Lane.

U.S. Pat. No. 6,618,668, which is incorporated herein by reference, describes a mapping system for a notification system that can be used to implement the input-via-map functionality illustrated in FIG. 37 (as well as FIG. 38).

Figure 38:
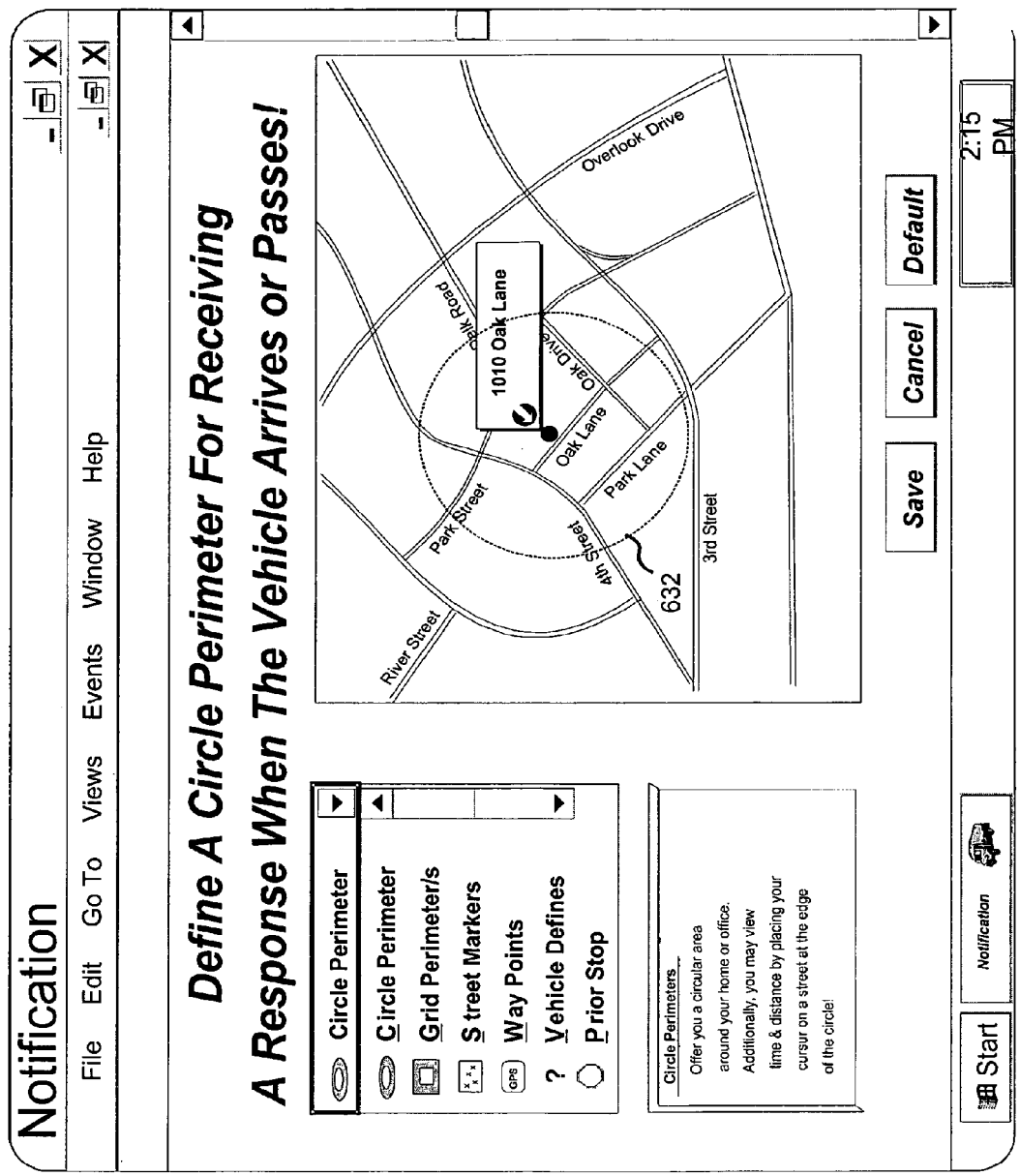
FIG. 38 shows an example of a possible user interface screen that can be generated by the GUI of FIG. 3 and used in connection with the response systems (and methods).

FIG. 38 shows another example of a possible user interface screen that can be generated by the GUI of FIG. 3 and used in connection with the response systems (and methods). This screen can be used separately or in addition to those of FIGS. 33-37.

As shown, this screen can be used to solicit selections from a party that will be used by the BS manager 41 in connection with failure states. These selections can be stored in the database 94 (FIG. 5A), such as in users preferences in user data table(s) 68b. Reference numeral 632 illustrates a circle perimeter that can be moved, expanded in size, and/or reduced in size in relation to the map of streets, for example, via a mouse, and used to select a geographic region on the map pertaining to when a failure state should occur for nonresponsiveness on the part of the notified party. The marked area(s) pertains to the moving vehicle 17 that is headed for the stop location, or destination, which, in this example, is 1010 Oak Lane.

FIG. 39 shows another example of a possible user interface screen that can be generated by the GUI of FIG. 3 and used in connection with the response systems (and methods). This screen can be used separately or in addition to those of FIGS. 33-38.

As shown, this screen can be used to solicit selections from a party that will be used by the BS manager 41 in connection with failure states. This screen enables a party to define what will occur in the event of occurrence of a failure state in connection with nonresponsiveness by a notified party. These selections can be stored in the database 94 (FIG. 5A), such as in users preferences in user data table(s) 68b. Reference numerals 644-648 illustrate possible options that can be selected by the party.

Figure 40:
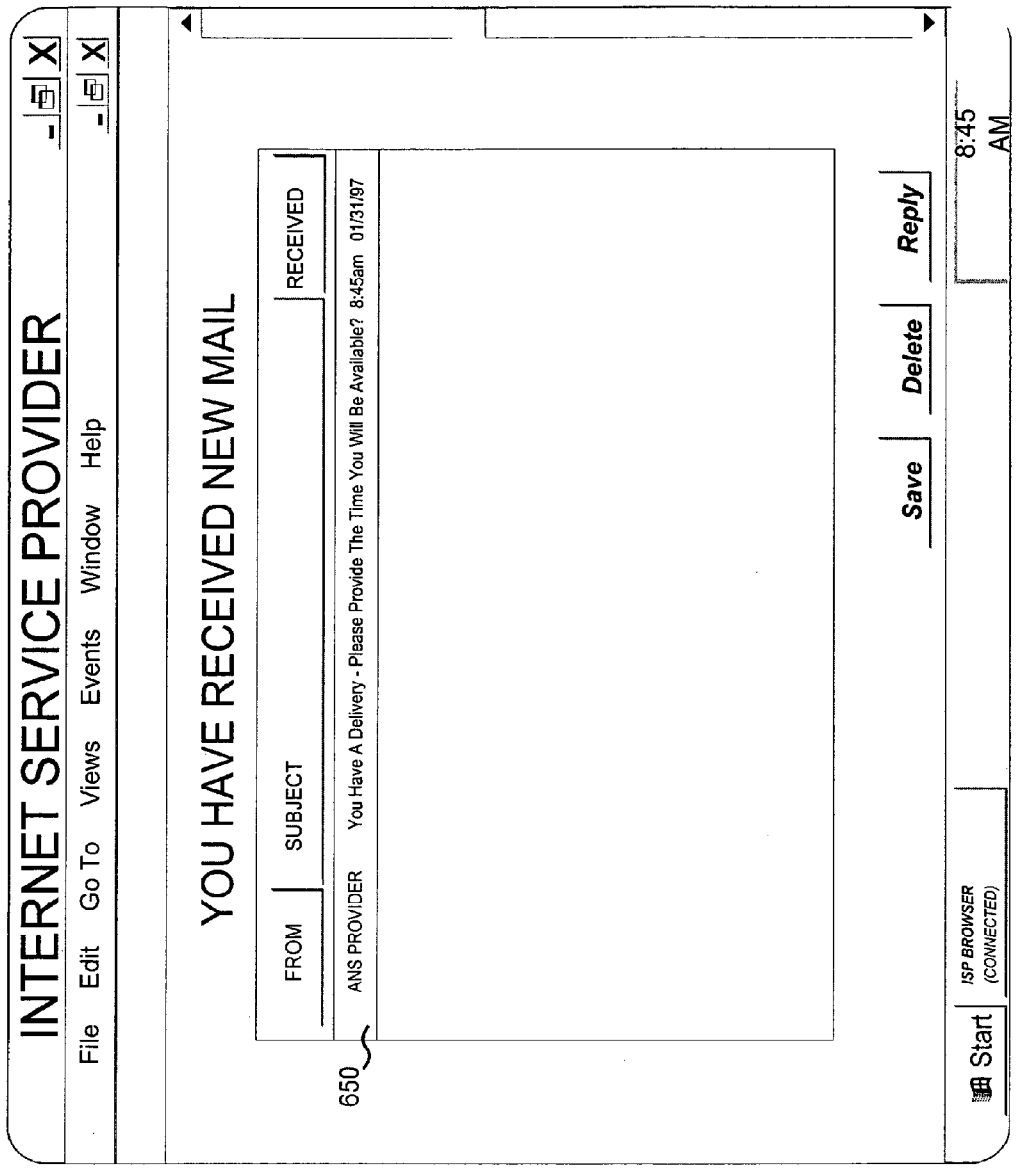
FIG. 40 shows an example of an email that can be generated and sent by the BSCU 40 of FIG. 3 and used in connection with the response systems (and methods).

FIG. 40 shows an example of another type of computer network message. As shown in FIG. 40, an electronic mail (email) message can be generated and sent by the BSCU 40 (FIG. 3) over the Internet and used in connection with the response systems (and methods).

As illustrated, a party can be sent an email by the BSCU 40 during a notification communication to indicate impending arrival of a delivery vehicle at a stop location, such as the party's street address. In this example, the notification communication, in the form of an email sent over the Internet to the party by the BSCU 40 asks the party to identify when the party is available for the delivery. The information input by the party can be utilized to fine tune the scheduling of the delivery vehicle 17.

There are many possible variations of this concept. For example, the email could provide a plurality of options, one of which can be selected by the party. Furthermore, there could be different charges associated with different delivery time options (e.g., more expensive options for faster service, etc.).

Further note that this information from the notified party can be communicated to a PCD 75c associated with the delivery vehicle 17 and correlated with other scheduling information at the PCD 75c.

X. Notification Failure Detection Systems (and Methods) that Cause Implementation of One or More Tasks when a Scheduled Notification Communication is not Received A notification failure detection system can be implemented in connection with a PCD 75 (FIG. 1) that is scheduled to be notified that will cause one or more tasks to be performed in the event that such PCD 75 does not in fact receive a scheduled notification communication.

As an example of an application of the notification failure detection system, among numerous possible scenarios, consider an implementation where a service provider (e.g., maid, pool maintenance worker, lawn care worker, etc.) is scheduled to provide service at a residential home, and the service provider is to initiate a notification communication to a PCD 75 at the house. A notification failure detection system situated in or communicatively coupled to the PCD 75 can be designed to monitor for the incoming notification communication. If one does not occur as scheduled, then the notification failure detection system can be designed to perform one or more tasks, for instance, communicating with another service provider to request service from the another instead, communicating with the home owner to advise the home owner of the failure state, communicating with the service provider office, communicating with a security company that can check on the service provider, or communicating with another party or system, etc.

As another example of an application, among numerous possible scenarios, consider an implementation where a home owner, after completing work each day, is scheduled to provide a notification communication to a PCD 75 at his/her home within a prescribed time period, indicating impending arrival. When the notification communication is received during the prescribed time period, then the notification failure detection system can be designed to do nothing or perform one or more steps, such as adjust the air conditioning or heater down or up. However, when the notification communication is not received during the prescribed time period, then the notification failure detection system can be designed to perform one or more tasks, such as turn on light switches (because it will be dark when the home owner approaches since the home owner will be late). When the notification communication is received during the prescribed time period, then the notification failure detection system can be designed to do nothing or perform one or more steps. Moreover, when the notification communication is not received during the prescribed time period, then the notification failure detection system can be designed to perform one or more tasks, such as communicate with another fire or police station.

As yet another example of an application, among numerous possible scenarios, consider an implementation where the notification failure detection system is designed to monitor a fire or security alarm system associated with a facility and to determine whether a notification communication is received from a fire or police station within a prescribed time period after the alarm is triggered. When the alarm gets triggered and no notification communication is received indicating that the fire or police department is on their way, then the notification failure detection system can be designed to contact another party, such as the owner, another fire department, another police department, etc.

As still another example of an application, among numerous possible scenarios, the notification failure detection system can be implemented in connection with cargo ships, tankers, or other ships. An incoming vessel to a harbor can be scheduled to send a notification communication (which can include the ship identity and/or other particulars pertaining to the ship and/or its cargo) to the harbor master (which typically determines when the vessel will dock and sends out tug boats) when the incoming vessel is near and ready to dock. The notification failure detection system can be designed to contact the coast guard or other security group if a ship is approaching and no notification communication is received after the ship has come within a predefined proximity of the harbor or dock location. In an alternative embodiment, the notification failure detection system can be designed to contact providers of services (unloaders, customs personnel, crane operators, truck drivers, etc.) that were intending to meet the ship at the dock at a prescribed time or time period, so that the service providers can cancel their trips to the dock and/or take other remedial actions.

Figure 41:
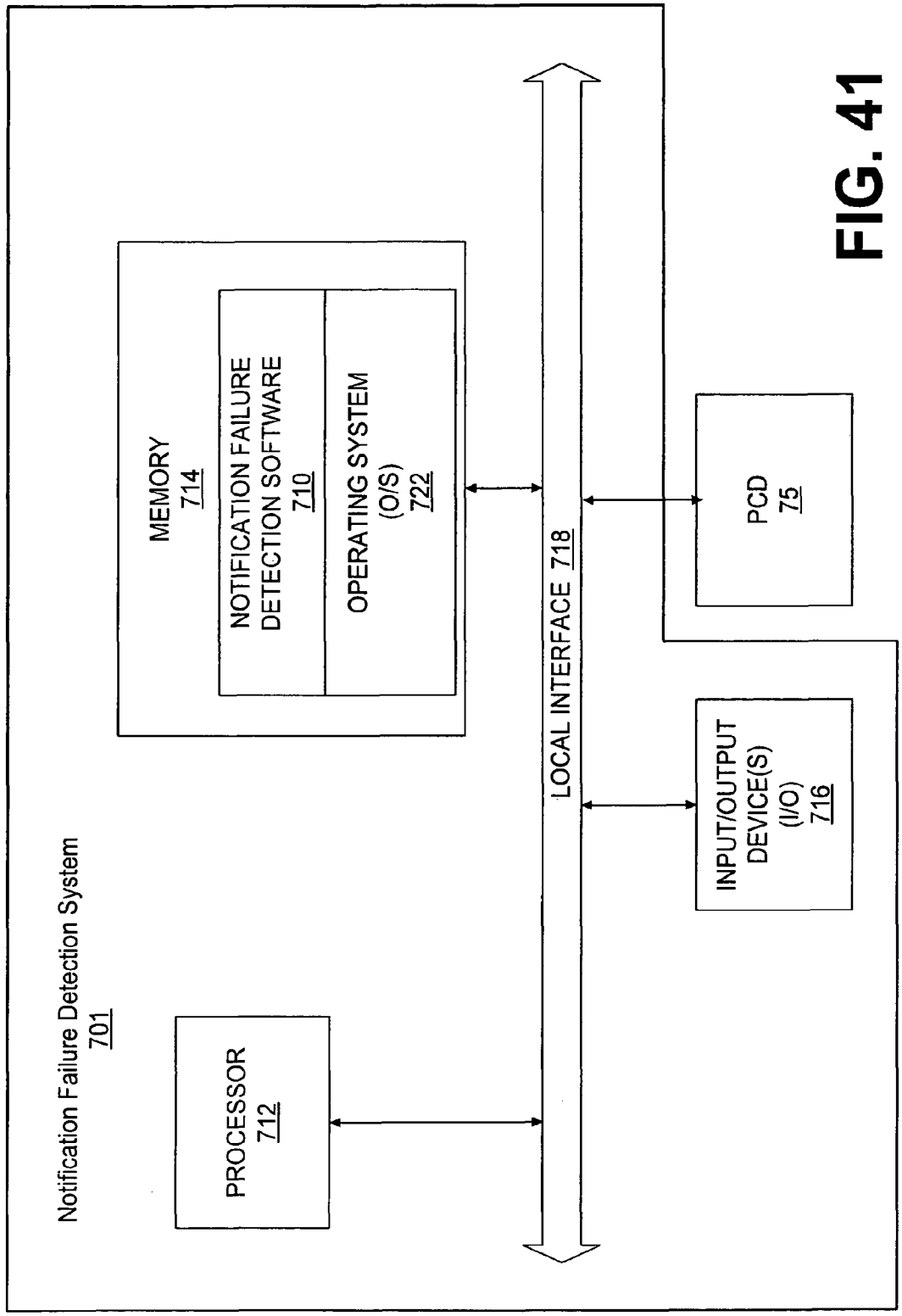
FIG. 41 is a block diagram illustrating an exemplary implementation of a computer-based notification failure detection system implemented in connection with a notified PCD.

The notification failure detection system can be implemented in software (e.g., firmware), hardware, or a combination thereof. In the currently contemplated best mode, the notification failure detection system is implemented with a computer-based system that is a combination of hardware and software. An example of a general purpose computer that can implement the notification failure detection system is shown in FIG. 41. In FIG. 41, the notification failure detection system is denoted by reference numeral 701.

Generally, in terms of hardware architecture, as shown in FIG. 41, the computer-based system 701 includes a processor 712, memory 714, and one or more input and/or output (I/O) devices 716 (or peripherals) that are communicatively coupled via a local interface 718. The local interface 718 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 712 is a hardware device for executing software, particularly that stored in memory 714. The processor 712 can be any custom made or commercially available processor, a central processing unit (CPU), an auxiliary processor among several processors associated with the system 701, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from the Motorola Corporation.

The memory 714 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 714 may incorporate electronic, magnetic, optical, and/or other types of storage media. Note that the memory 714 can have a distributed architecture, where various components are situated remote from one another, but can be accessed by the processor 712.

The software in memory 714 may include one or more separate programs, each of which comprises an ordered listing of executable instructions for implementing logical functions. In the example of FIG. 41, the software in the memory 714 includes notification failure detection software 710 and a suitable operating system (O/S) 722. A nonexhaustive list of examples of suitable commercially available operating systems 722 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 722 essentially controls the execution of other computer programs, such as the notification failure detection software 710, and provides scheduling, input-output control, file and data management, memory management, and communication control and related services.

The notification failure detection software 710 is a source program, executable program (object code), script, or any other entity comprising a set of instructions to be performed. When a source program, then the program needs to be translated via a compiler, assembler, interpreter, or the like, which may or may not be included within the memory 714, so as to operate properly in connection with the O/S 722. Furthermore, the notification failure detection software 710 can be written as (a) an object oriented programming language, which has classes of data and methods, or (b) a procedure programming language, which has routines, subroutines, and/or functions, for example but not limited to, C, C++, Pascal, Basic, Fortran, Cobol, Pen, Java, and Ada.

The optional I/O devices 716 may include input devices, for example but not limited to, a keyboard, mouse, scanner, microphone, etc. Furthermore, the I/O devices 716 may also include output devices, for example but not limited to, a printer, display, etc. Finally, the I/O devices 716 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer-based notification failure detection system 711 is a PC, workstation, or the like, the software in the memory 714 may further include a basic input output system (BIOS) (omitted for simplicity). The BIOS is a set of essential software routines that initialize and test hardware at startup, start the O/S 722, and support the transfer of data among the hardware devices. The BIOS is stored in ROM so that the BIOS can be executed when the system 701 is activated.

When the system 701 is in operation, the processor 712 is configured to execute software stored within the memory 714, to communicate data to and from the memory 714, and to generally control operations of the computer 711 pursuant to the software. The notification failure detection software 710 and the O/S 722, in whole or in part, but typically the latter, are read by the processor 712, perhaps buffered within the processor 712, and then executed.

The notification failure detection software 710 (as well as any other software that is described in this document), as is shown in FIG. 41, can be stored on any computer readable medium for transportation or use by or in connection with computer related systems. In the context of this document, a computer readable medium is an electronic, magnetic, optical, or other physical device or means that can contain or store a computer program for use by or in connection with a computer related system or method. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In an alternative embodiment, where the notification failure detection system 701 implemented in hardware, the notification failure detection system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 42:
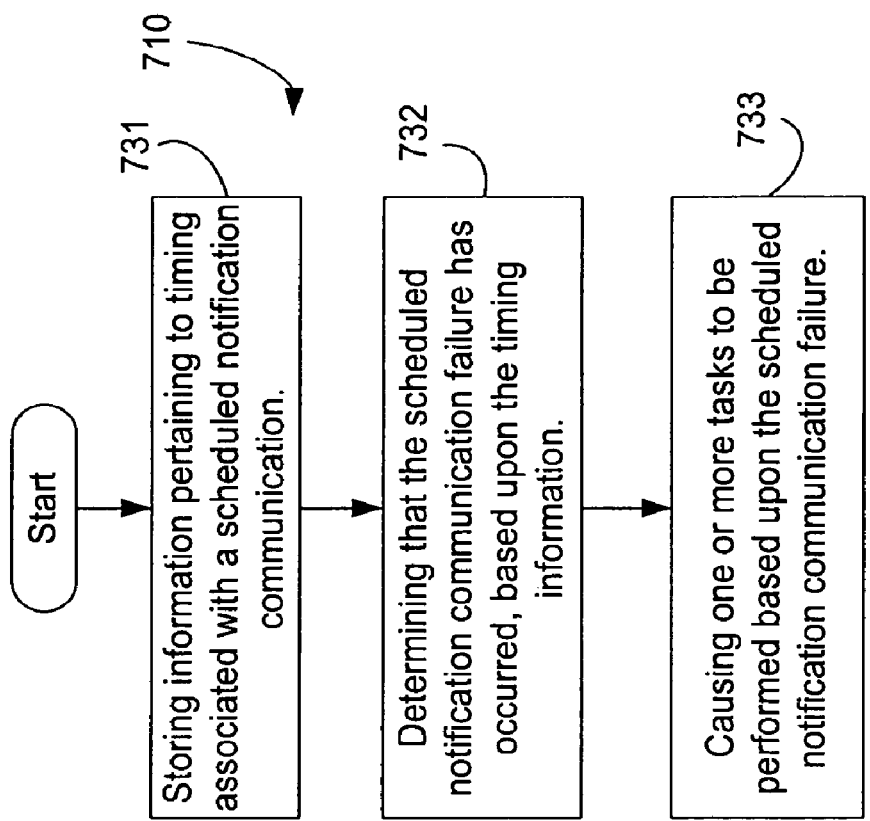
FIG. 42 is a flow chart illustrating an exemplary implementation of notification failure detection software of FIG. 41.

An example of a possible architecture, among others, of the notification failure detection software 710, is shown in FIG. 42. As illustrated by way of flow chart in FIG. 42, the notification failure detection software 710 is designed to perform the following steps: storing information in memory 714 pertaining to timing (e.g., a time of day, time period, etc.) associated with the scheduled notification communication, as indicated at block 731; determining that the scheduled notification communication failure has occurred, based upon the timing information, as indicated at block 732; and causing one or more tasks to be performed using I/O device(s) 716 and/or using PCD 75 based upon the scheduled notification communication failure, as indicated at block 733. The tasks can include, for example but not limited to, initiation of voice and/or data communications to other parties or systems, actuation or adjustment of switches or transducers, etc.

Note that failure in the context of the notification failure detection system 701 can be defined as failing to receive a notification communication at a scheduled time or time period, failing to receive a notification communication when the system 701 knows or is advised that the system 701 should have based upon the MT 17 reaching a location or region or distance from the stop location, or as failing to receive proper authentication indicia (which can be stored, accessed, and analyzed in memory 714) during the notification communication session. The authentication indicia, or information, can be any of a number of things, for example, a caller's telephone number, which can be compared with an incoming telephone caller ID to determine if there is a match. For other examples, see the section in this document relating to secure notification messaging systems and methods.

Y. Further Variations and Modifications

In concluding the detailed description, it should be noted that the terminology "preferred embodiment" herein means the one example embodiment currently believed by the inventor(s) to be the best embodiment of a plurality of possible embodiments. Moreover, it will be obvious to those skilled in the art that many variations and modifications may be made to the preferred embodiment(s) without substantially departing from the principles of the present invention. All such variations and modifications are intended to be included herein within the teachings of the present invention in this document and to be protected by the scope of the following claims. A few examples of possible variations and/or modifications are set forth hereafter.

With respect to variations, note that although not specifically described for simplicity, any combination of the various systems/methods that have been described under headings above may be employed in connection with a notification system. For example, use of authentication data for secure notification messaging can be employed in connection with one of the versions of the response system.

As another example of a variation, it is possible to implement the systems and methods of this patent application in connection with notification systems where notifications are made from the moving thing itself (those systems that do not utilize a BSCU 40 to implement the notifications). Essentially, the functions associated with the BSCU 40 are implemented in the tracked MT 17. One such system is described in U.S. Pat. No. 5,444,444, which is incorporated herein by reference in its entirety.

As another example of a variation, MTCU 15 and/or the BSCU 40 can be implemented within a single computer system, across a plurality of computers that are communicatively coupled, or within a computer system having a distributed architecture.

As another example of a variation, the notification system can be one that notifies a party or PCD 75 after an MT 17 leaves or while an MT 17 is located at a location, as opposed to a notification system that notifies a party or PCD 75 in advance of arrival of the MT 17 at the location, as with the notification system 10 described herein.

As another example of a variation, the BS manager 41 can be designed to cause the notification system 10 to notify the user based upon a arrival time and/or departure time data in a schedule or route of one or more stops associated with the MT 17, as opposed to basing the notifications on real time monitoring of the location of the MT 17.

As another example of a variation, the BS manager 41 can be designed to cause the notification system 10 to notify the user when the MT's schedule has been changed or the MT's stop at a location has been cancelled, as opposed to waiting on tracking information to determine delay in arrival or departure of the MT 17. This information could be input manually by a person or it could come from another computer system. The software associated with the BS manager 41 could also be configured to enable a user to configure the system so that the user is notified upon a change and/or cancellation.

As another example of a variation, the notification system (as well as the inventions claimed herein) can be employed in connection with an amusement park ride, for instance, a roller coaster, water vehicle, etc. PCDs 75 can be handed out to prospective passengers of the ride, and when appropriate, one or more of the devices 75 can be notified to alert one or more prospective passengers their departure time (or arrival time of their pickup mobile vehicle) is near. Any suitable form of tracking can be utilized. For example, a passenger wait list or queue can be maintained and tracked (which leads to an indirect way of monitoring the mobile vehicles).

As another example of a variation, the notification system (as well as the inventions claimed herein) can be employed in connection with electronic tags on assets (e.g., packages, luggage, containers, etc.) that are being warehoused or shipped to notify a party concerning the travel status of such assets. Typically, an electronic tag has a controller, a transceiver controlled by the controller, and a memory that is controlled by the controller and that stores an identification that can be communicated by the transceiver. U.S. Pat. No. 6,144,301, which is incorporated by reference, describes an example of a tag and U.S. Pat. No. 5,774,876, which is incorporated herein by reference in its entirety, describes a system for monitoring assets with electronic tags. The BS manager 41 can be designed to communicate with the operations center 13 and/or the computer 14, both described in the '876 patent, to track the assets and make notifications pertaining to the assets. However, note that any design of electronic tag can be utilized.

U.S. Pat. Nos. 6,408,108 and 6,211,781, which are both also incorporated by reference, disclose systems that utilize tags to track articles. A notification system (and the systems/methods claimed herein) can be implemented in the context of these tag systems. As an example, notification communications can be initiated from computer 118 in these patents.

Therefore, I claim at least the following:

1. A method for implementation in a computer based system, comprising:
   scheduling a notification communication to be initiated by a computer based notification system, the notification communication indicating travel status of a mobile thing in relation to a stop location and initiated by the computer based notification system when the mobile thing is within a predefined proximity of the stop location;
   failing to receive the scheduled notification communication; and
   causing one or more tasks to be performed based upon the scheduled notification communication failure.

2. The method of claim 1, further comprising:
   storing information pertaining to timing associated with the scheduled notification communication; and
   determining that the scheduled notification communication failure has occurred, based upon the timing information.

3. The method of claim 1, wherein the scheduling, the failing, and the causing are implemented by a computer-based system that is part of or communicatively coupled to a personal communications device that is to receive the scheduled notification communication.

4. The method of claim 3, wherein the computer-based system is remote from a host computer system and wherein the host computer system is configured to initiate the scheduled notification communication.

5. The method of claim 1, wherein at least one task that is caused is initiating a communication to a personal communications device.

6. The method of claim 1, further comprising enabling input and storage of at least one of the tasks.

7. The method of claim 1, wherein are performed by a computer-based system that is part of or communicatively coupled to a personal communications device that is to receive the scheduled notification communication.

8. A system, comprising:
   a host computer system having a means for monitoring travel data corresponding to a mobile thing and a means for initiating a notification communication indicating travel status of the mobile thing; and
   a remote computer system having a means for detecting a failure to receive the notification communication and a means for causing one or more tasks to be performed based upon the notification communication failure.

9. The system of claim 8, wherein the remote computer system further comprises:
   means for storing information pertaining to timing associated with the notification communication; and
   means for determining that the notification communication failure has occurred, based upon the timing information.

10. The system of claim 8, wherein at least one task is initiating a communication to a personal communications device.

11. The system of claim 8, wherein the base station computer system or the remote computer system further comprises a means for enabling input and storage of at least one of the tasks.

12. The system of claim 8, wherein the remote computer system further comprises authentication information that is used by the means for detecting a failure in order to detect whether or not a failure has occurred.

13. A computer based system that is designed to receive a scheduled notification communication indicating travel status of a mobile thing in relation to a stop location from a host computer based system that is designed to monitor travel data corresponding to the mobile thing, comprising:
   means for storing information identifying the scheduled notification communication;
   means for storing timing information pertaining to the scheduled notification communication;
   means for detecting a failure to receive the scheduled notification communication based upon the timing information; and
   means for causing one or more tasks to be performed based upon the scheduled notification communication failure.

14. The system of claim 13, wherein at least one task is initiating a communication to a personal communications device.

15. The system of claim 13, further comprising a means for enabling input and storage of at least one of the tasks.

16. The system of claim 13, further comprising:
   means for storing authentication information; and
   means for using the authentication information to determine whether or not the scheduled notification communication has been received.

17. The system of claim 13, wherein the scheduled notification communication corresponds to a first service provider that is to provide a service at the stop location and wherein the one or more tasks includes initiating a communication to a second service provider so that the second service provider can provide the service at the stop location.

18. The system of claim 13, wherein the one or more tasks includes adjusting a control in a building.

19. The system of claim 13, wherein the task includes initiating a communication to a security provider.

20. The system of claim 13, wherein the timing information is a time period that commences when an alarm is triggered.

21. A computer based system that is designed to receive a scheduled notification communication indicating travel status of a mobile thing in relation to a stop location from a host computer based system that is designed to monitor travel data corresponding to the mobile thing, comprising:
- memory storing computer program instructions; and
- one or more processors configured by the computer program instructions to:
  - store information identifying the scheduled notification communication;
  - store timing information pertaining to the scheduled notification communication;
  - detect a failure to receive the scheduled notification communication based upon the timing information; and
  - cause one or more tasks to be performed based upon the scheduled notification communication failure.

22. The system of claim 21, wherein at least one task is initiating a communication to a personal communications device.

23. The system of claim 21, further comprising computer program instructions configured to enable input and storage of at least one of the tasks.

24. The system of claim 21, further comprising computer program instructions configured to:
- store authentication information; and
- use the authentication information to determine whether or not the scheduled notification communication has been received.

25. The system of claim 21, wherein the scheduled notification communication corresponds to a first service provider that is to provide a service at the stop location and wherein the one or more tasks includes initiating a communication to a second service provider so that the second service provider can provide the service at the stop location.

26. The system of claim 21, wherein the one or more tasks includes adjusting a control in a building.

27. The system of claim 21, wherein the task includes initiating a communication to a security provider.

28. The system of claim 21, wherein the timing information is a time period that commences when an alarm is triggered.

29. The system of claim 21, wherein the memory resides in a single computer or a plurality of computers.

30. The system of claim 21, wherein the one or more processors reside in a single computer or a plurality of computers.

* * * * *